US012386638B2

(12) United States Patent
Schulze et al.

(10) Patent No.: US 12,386,638 B2
(45) Date of Patent: Aug. 12, 2025

(54) SYSTEM AND METHOD FOR DYNAMIC DISPLAY OF AIRCRAFT EMISSIONS DATA

(71) Applicant: The Boeing Company, Arlington, VA (US)

(72) Inventors: Jonas Schulze, Frankfurt (DE); Hilna Sahle, Darmstadt (DE); Anna-Lisa Mautes, Darmstadt (DE); Daniel Artic, Biebesheim (DE); Michael Gottscheck, Frankfurt (DE); Rahul Ashok, Singapore (SG); Neil Titchener, Jackson, NH (US); Nicholas Applegate, Long Beach, CA (US); Hubert Wong, Huntington Beach, CA (US); Nadine Akari, Lynnwood, WA (US); Lisa Liu, Paramus, NJ (US); David Raymond, Reston, VA (US); Brian Yutko, Somerville, MA (US)

(73) Assignee: The Boeing Company, Arlington, VA (US)

( * ) Notice: Subject to any disclaimer, the term of this patent is extended or adjusted under 35 U.S.C. 154(b) by 249 days.

(21) Appl. No.: 18/352,947

(22) Filed: Jul. 14, 2023

(65) Prior Publication Data

US 2024/0086208 A1 Mar. 14, 2024

Related U.S. Application Data

(60) Provisional application No. 63/501,945, filed on May 12, 2023, provisional application No. 63/382,001,
(Continued)

(51) Int. Cl.
*G06F 9/451* (2018.01)

(52) U.S. Cl.
CPC .................................. *G06F 9/451* (2018.02)

(58) Field of Classification Search
CPC .................................................. G06F 9/451
See application file for complete search history.

(56) References Cited

U.S. PATENT DOCUMENTS 6,970,151 B1 * 11/2005 Mosier ................ G09G 3/3674 327/551
8,548,835 B2 10/2013 Singh et al.
(Continued)

FOREIGN PATENT DOCUMENTS

CN 106096312 B 2/2019
CN 114399294 B 7/2022
(Continued)

*Primary Examiner* — Tadesse Hailu
(74) *Attorney, Agent, or Firm* — Alleman Hall & Tuttle LLP

(57) ABSTRACT

Systems and methods are provided for dynamically modeling and depicting overall emissions of the aviation industry and changes thereto when taking into account, for example, traffic growth and introduction of sustainability strategies, such as new and/or improved technologies, an increase in operational efficiency, and carbon offsets. Using the dynamic tool described herein, users can define scenarios on how to reduce emissions through the introduction of different sustainability strategies, both statically and over time, analyze the impact of those strategies on emissions, and understand the dependencies between select strategies.

20 Claims, 107 Drawing Sheets
(106 of 107 Drawing Sheet(s) Filed in Color)

Related U.S. Application Data filed on Nov. 2, 2022, provisional application No. 63/368,774, filed on Jul. 18, 2022.

(56) References Cited

U.S. PATENT DOCUMENTS

| | | | |
|---|---|---|---|
| 11,164,406 | B2 | 11/2021 | Meroux et al. |
| 11,465,763 | B2 * | 10/2022 | Kumar ................... B64D 27/10 |
| 2012/0271561 | A1 | 10/2012 | Keller-goralczyk et al. |
| 2013/0232027 | A1 | 9/2013 | Reich et al. |
| 2021/0009282 | A1 * | 1/2021 | Long .................. G06Q 10/0631 |
| 2022/0107193 | A1 | 4/2022 | Mehra et al. |
| 2022/0195919 | A1 * | 6/2022 | Akbari .................... C01B 3/047 |
| 2022/0219831 | A1 * | 7/2022 | Gonidec ................. F02C 7/047 |
| 2022/0297854 | A1 * | 9/2022 | Bourgueil ................ G08G 5/56 |
| 2022/0349866 | A1 * | 11/2022 | Nabhan ................ G01N 33/004 |
| 2022/0358515 | A1 | 11/2022 | Kahn et al. |

FOREIGN PATENT DOCUMENTS

| | | | |
|---|---|---|---|
| CN | 115470993 | A | 12/2022 |
| CN | 115564114 | A | 1/2023 |
| CN | 110110943 | B | 2/2023 |
| CN | 115829085 | A | 3/2023 |
| KR | 101419686 | B1 | 7/2014 |

* cited by examiner

200

10

10

300

300

10

300

10

300

10

300

10

SYSTEM AND METHOD FOR DYNAMIC DISPLAY OF AIRCRAFT EMISSIONS DATA

TECHNICAL FIELD

The present disclosure generally relates to presentment of emissions data for one or more aircraft.

BACKGROUND

The aviation industry has pledged to maintain 2019 levels of carbon emissions out to 2050 and to also reach net-zero carbon emissions by the end of that timeframe. There are many different ways to apply sustainability measures or strategies. However, existing techniques for displaying emissions data for the aviation industry include static views, graphs, and/or charts of discrete aspects of the available data, thus making it difficult and time-consuming to model and/or analyze such data and determine which of the strategies to implement.

SUMMARY

The invention is intended to solve the above-noted problems by providing systems and methods that are designed, among other things, to dynamically model and depict overall emissions of the aviation industry and changes thereto when taking into account traffic growth and introduction of sustainability strategies, such as new and/or improved technologies, an increase in operational efficiency, and carbon offsets. Using the dynamic tool described herein, users can define scenarios on how to reduce emissions through the introduction of different sustainability strategies, both statically and over time, and analyze the impact of those strategies on emissions.

For example, one embodiment provides a computer-implemented method of graphically displaying sustainability strategies for an aviation industry, the method comprising: receiving, at one or more processors, aviation emissions information for a plurality of flights and a select time period: displaying, on a display device, an aviation strategies graphical user interface: graphically presenting, via the aviation strategies graphical user interface and using the one or more processors, the aviation emissions information in association with a plurality of sustainability strategies: receiving, via one or more input devices of the aviation strategies graphical user interface, a user input for adjusting a select strategy of the plurality of sustainability strategies; and based on the user input, dynamically adjusting, using the one or more processors, the graphical presentation of one or more aspects of the aviation emissions information in the aviation strategies graphical user interface.

Another exemplary embodiment provides a system comprising: a display device; and one or more processors communicatively coupled to the display device, the one or more processors configured to: receive aviation emissions information for a plurality of flights and a select time period; and display, via the display device, an aviation strategies graphical user interface, wherein the aviation strategies graphical user interface is configured to: graphically present the aviation emissions information in association with a plurality of sustainability strategies: receive, via one or more input devices of the aviation strategies graphical user interface, a user input for adjusting a select strategy of the plurality of sustainability strategies; and based on the user input, dynamically adjust the graphical presentation of one or more aspects of the aviation emissions information.

Another exemplary embodiment provides a non-transitory computer-readable storage medium comprising instructions that, when executed by one or more processors, cause the one or more processors to: receive aviation emissions information for a plurality of flights and a select time period: display, via the display device, an aviation strategies graphical user interface; graphically present, via the aviation strategies graphical user interface, the aviation emissions information in association with a plurality of sustainability strategies: receive, via one or more input devices of the aviation strategies graphical user interface, a user input for adjusting a select strategy of the plurality of sustainability strategies; and based on the user input, dynamically adjust the graphical presentation of one or more aspects of the aviation emissions information in the aviation strategies graphical user interface.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXAMPLE EMBODIMENTS

Figure 1:
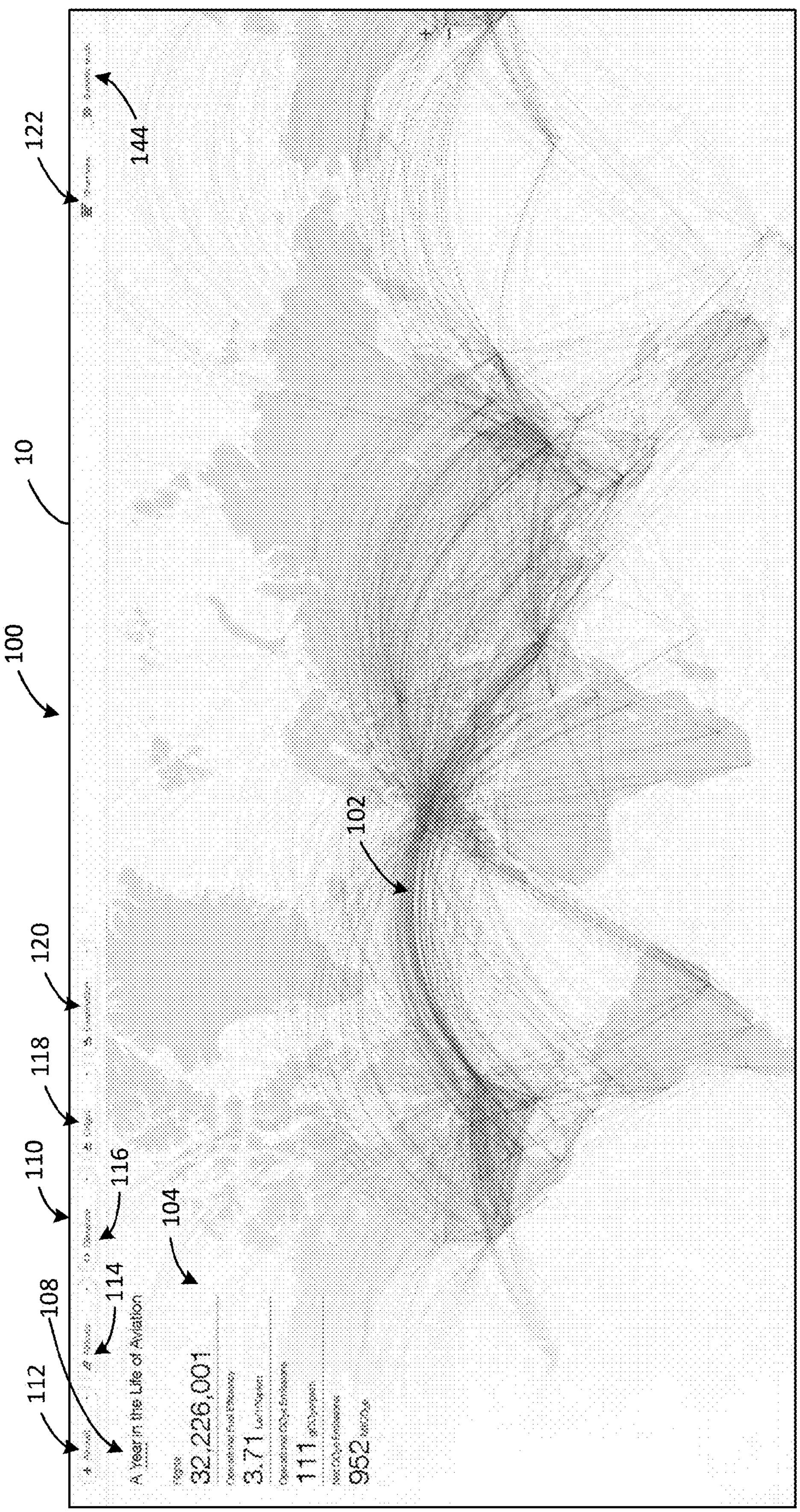
FIG. 1 is a screenshot of an exemplary graphical user interface for depicting an exemplary map view of a dynamic aviation emissions modeling tool, the map view including all flight paths in a given year and corresponding emissions data, in accordance with certain embodiments.

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a clearer description. In addition, system components can be variously arranged, as known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Existing tools for displaying emissions data for the aviation industry lack detailed analysis and dynamic depiction of the dependencies between different strategies to reduce emissions (e.g., CO2 emissions). Systems and methods described herein provide a dynamic display tool (or graphical user interface) configured to visualize various sustainability strategies in an easily discernible and interactive manner that can help improve the user's understanding of the dependencies between the strategies. In embodiments, the dynamic display tool (also referred to herein as a "dynamic aviation emissions modeling tool") includes various graphical elements, including, e.g., interactive levers, sliders, or other input devices, for representing the different sustainability strategies and for allowing selection and/or adjustment of each strategy. The dynamic display tool also includes various graphics or graphical elements for visually and dynamically depicting the environmental impact of implementing the selected strategies and the dependencies between them. For example, the dynamic tool may be used to display the impact of using hydrogen aircraft on emissions and hydrogen carbon intensity. The techniques described herein may be useful to various entities including, for example, regulators, airlines, research institutes, and other users interested in different sustainability strategies for the aviation industry and how they can mitigate CO2 emissions, interact with each other, and/or are dependent on each other.

According to embodiments, exemplary sustainability strategies or options may include: (1) fleet renewal, or changing a composition of the aircraft in the fleet (e.g., from the current A/C type to the latest A/C type), (2) future aircraft, or changing the aircraft technology used (e.g., from conventional aircraft to hydrogen aircraft, electric aircraft, or other next generation aircraft), (3) operational efficiency improvement, or assessing the total improvement in efficiency, (4) sustainable aviation fuel ("SAF"), or increasing the use of renewable energy sources (e.g., for electric aircraft, changing the electricity grid composition from fossil fuel sources to renewable energy sources: for hydrogen aircraft, changing the hydrogen carbon intensity from black to grey, blue, or green: etc.), and looking at the global SAF market share being utilized by the aviation industry, and (5) market-based measures. As will be appreciated, other sustainability strategies may be used in addition to, or instead of, the above-listed strategies, in accordance with the techniques described herein.

In the following paragraphs, these and other aspects of the dynamic display tool will be described in more detail with reference to FIGS. 1 through 47C, which show exemplary aviation strategies graphical user interfaces ("GUIs") for implementing various aspects of the dynamic display tool on an electronic device. Some of the graphical user interfaces shown in FIGS. 1 through 47C may be substantially similar in overall design and operation but may differ in terms of content, due to a difference in the inputs received from the user for selecting certain sustainability strategies, flights, and/or other parameters. It should be appreciated that the graphical user interfaces shown herein are merely exemplary and can comprise various other details, arrangements, and/or selectable options.

In embodiments, one or more of the GUIs may be generated or provided by a system or computing device (e.g., computing device 400 in FIG. 48) and displayed on a display screen or other display device for presentation to the user, such as, e.g., display screen 10 shown in the figures. While the illustrated embodiments depict a GUI with a particular shape and size configured for presentation on, for example, a personal computer, laptop, or stand-alone display screen, it is contemplated that the techniques described herein can also be used to provide GUIs having other formats or configurations to accommodate other types of electronic devices and/or display screen sizes, such as, for example, tablets, smartphones, televisions, and other media devices.

All or portions of the dynamic display tool may reside on a remote computing device (e.g., server) that is in communication (e.g., via wired and/or wireless networks) with a client device of a user configured to display the GUI 100 on a display screen of the client device. User inputs received via the dynamic display tool (e.g., strategy selections) may cause or trigger a call to backend services, such as the remote server, a remote database coupled thereto, or other backend device, in order to request a data set that is tailored to the user's preferences (e.g., strategy selections).

In embodiments, the dynamic display tool may be configured, for example, using software executed by a computing device, to receive, from the backend services, aviation emissions information for a plurality of flights and a select period of time, and graphically present, via the aviation strategies graphical user interface, the aviation emissions information in association with a plurality of adjustable sustainability strategies. The dynamic display tool may be further configured to dynamically adjust the graphical presentation of one or more aspects of the aviation emissions information based on a user input for adjusting a selected strategy, as described herein. The aviation emissions information may include carbon emissions information, other emissions information, and/or any other data useful for studying and evaluating the environmental impact of the aviation industry. The aviation emissions information may include measured data collected for a past portion of the select time period (e.g., from 2019 until present day) and forecasted data determined based on projections for a future portion of the select time period (e.g., the next ten years). The forecasted data may be determined based on the measured data, expected changes over time (e.g., population growth, technological advances, etc.), predicted impacts of each sustainability strategy, and/or other relevant data.

FIG. 1 illustrates an aviation strategies graphical user interface (or GUI) 100 configured to graphically display a plurality of flights 102 in a geographic map view, or on a map of the world (also referred to herein as a "geographic map user interface"). In the illustrated embodiment, each flight 102 (or flight path) is represented by a thin line that extends between the starting point and the destination. Other depictions of the flight paths 102 are also contemplated. Also, while the illustrated map shows the whole world, it should be appreciated that the map view may be limited to smaller sections of the world in other embodiments.

Figure 35A:
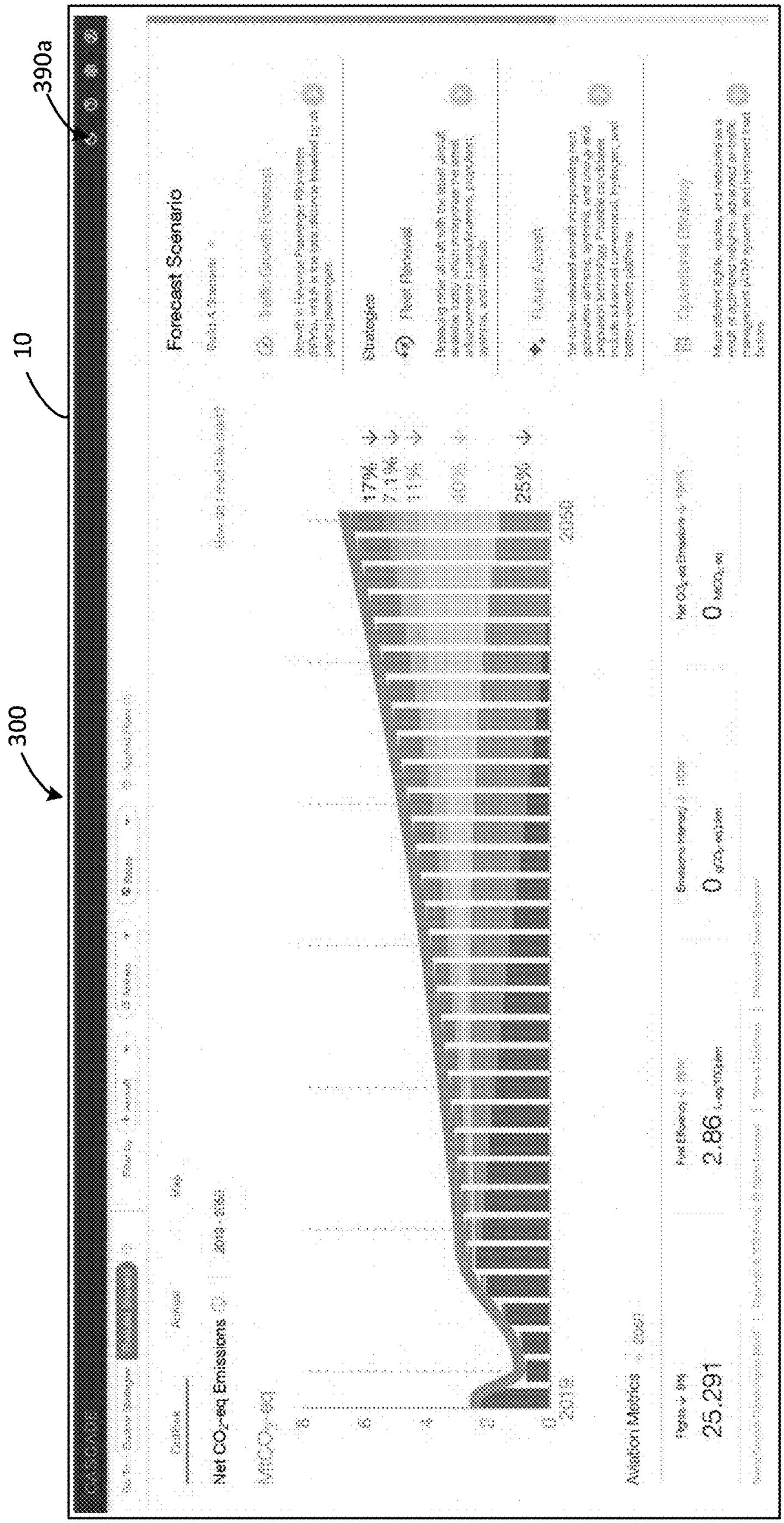
FIGS. 35A to 35C are screenshots of an exemplary outlook view included in the forecast scenarios view of FIG. 34A, shown in light and dark modes, in accordance with certain embodiments.
Figure 44A:
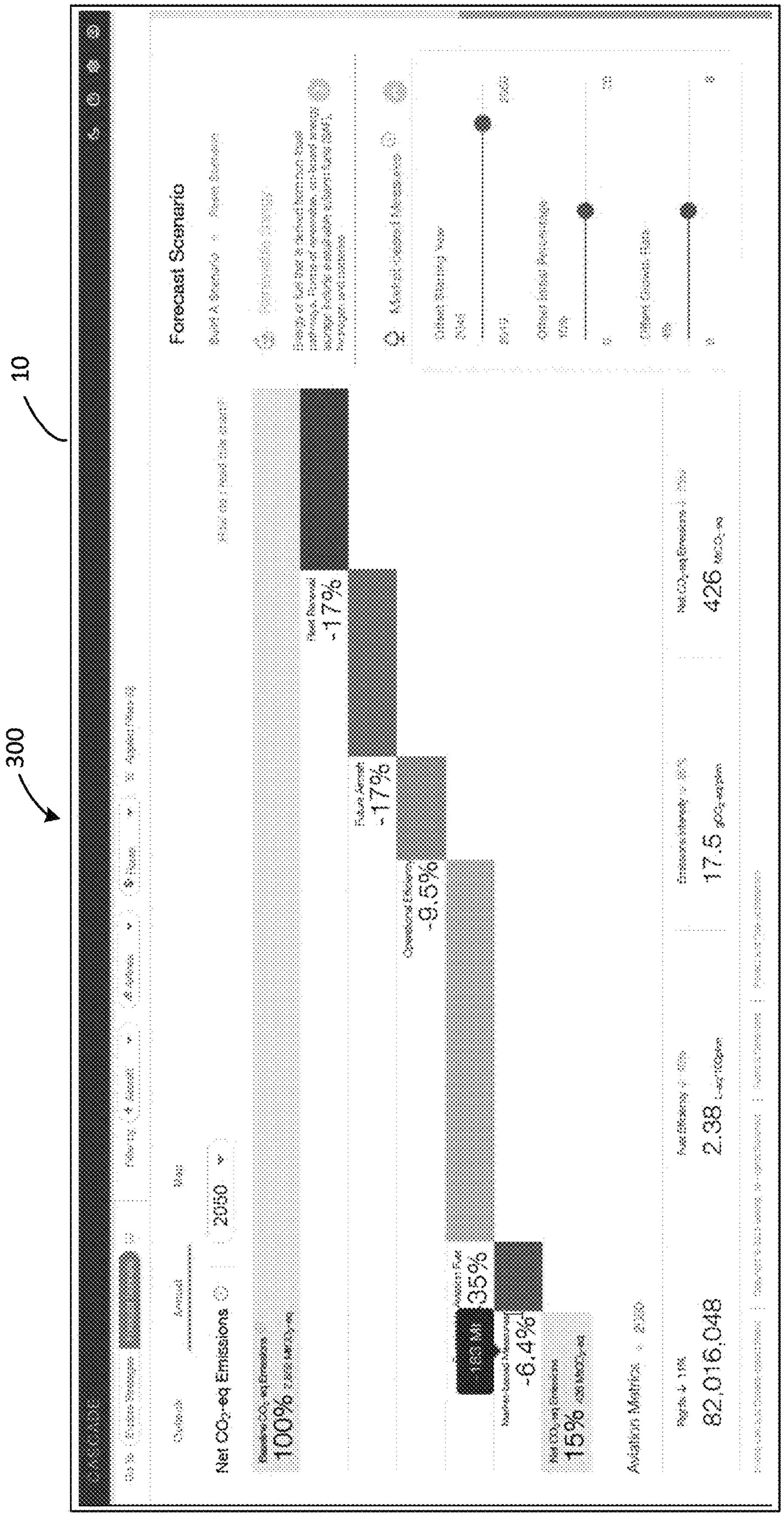
FIGS. 44A and 44B are screenshots of additional exemplary annual views included in the forecast scenarios view of FIG. 34A, the additional views showing pop-up screens with measurement values corresponding to percentage values displayed on the screen, in accordance with certain embodiments.
Figure 44B:
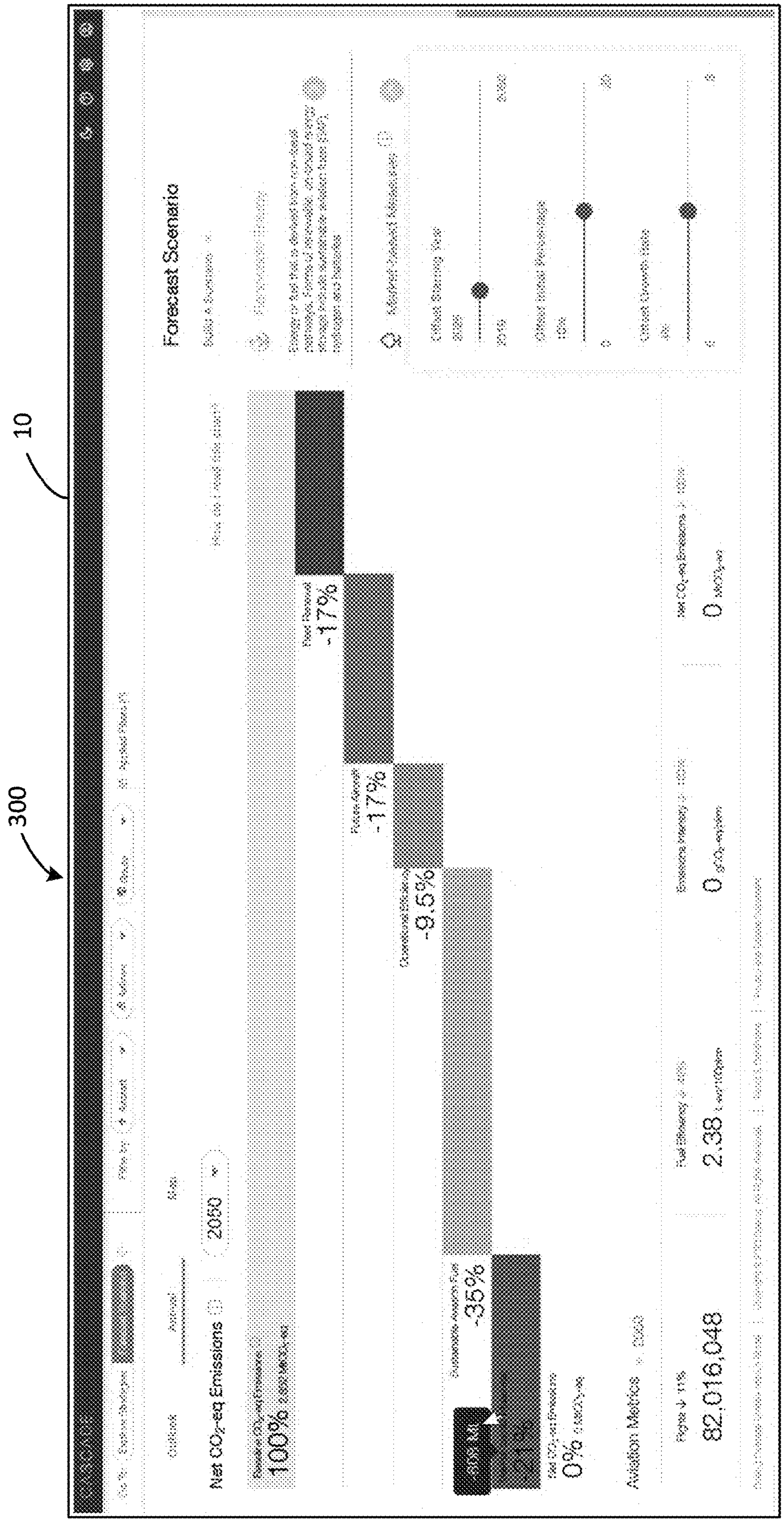

The GUI 100 is also configured to display a table or chart 104 for listing select metrics related to the emissions impact of the depicted flights 102. For example, the table 104 lists data, or metrics, for the total number of flights shown on the map, the operational fuel efficiency of those flights (e.g., in Le/100 pkm, or petrol liters equivalent per passenger per 100 kilometers (km)), the operational CO2 emissions level for those flights (e.g., in $gCO_2e$/pkm, or grams of $CO_2$ equivalent per passenger per 100 km), and net CO2 emissions (e.g., in $MtCO_2e$). In other embodiments, the GUI 100 may be configured to display additional and/or different metrics in the table 104. In some cases, the GUI 100 may be configured to allow user selection of the units used for the displayed metrics, for example, as shown in FIG. 35C. In general, the table 104 is configured to provide the metrics in a clear and easily discernible manner. For example, the metrics are displayed as text with a title line and a value line below it, where the value line contains the value and the unit. The GUI 100 may also be configured to display a tooltip or explanation of each metric when the user hovers over the unit depiction, for example, as shown in FIGS. 44A and 44B. In other embodiments, the GUI 100 may be configured to display the metrics in other, easily discernible formats (i.e. pie chart, block diagram, etc.).

FIGS. 2-10 illustrate various aspects of the GUI 100 in accordance with certain embodiments. FIGS. 12A-22B illustrate various aspects of another graphical user interface 200 (or GUI 200) in accordance with other embodiments. FIGS. 23-47C illustrate various aspects of yet another graphical user interface 300 (or GUI 300) in accordance with still other embodiments. Each of GUI 100, GUI 200, and GUI 300 may be similar to one or more of the other GUIs in at least some respects. Accordingly, the following paragraphs will only describe the aspects of GUI 300 and GUI 200 that differ from GUI 100, for the sake of brevity.

Figure 6:
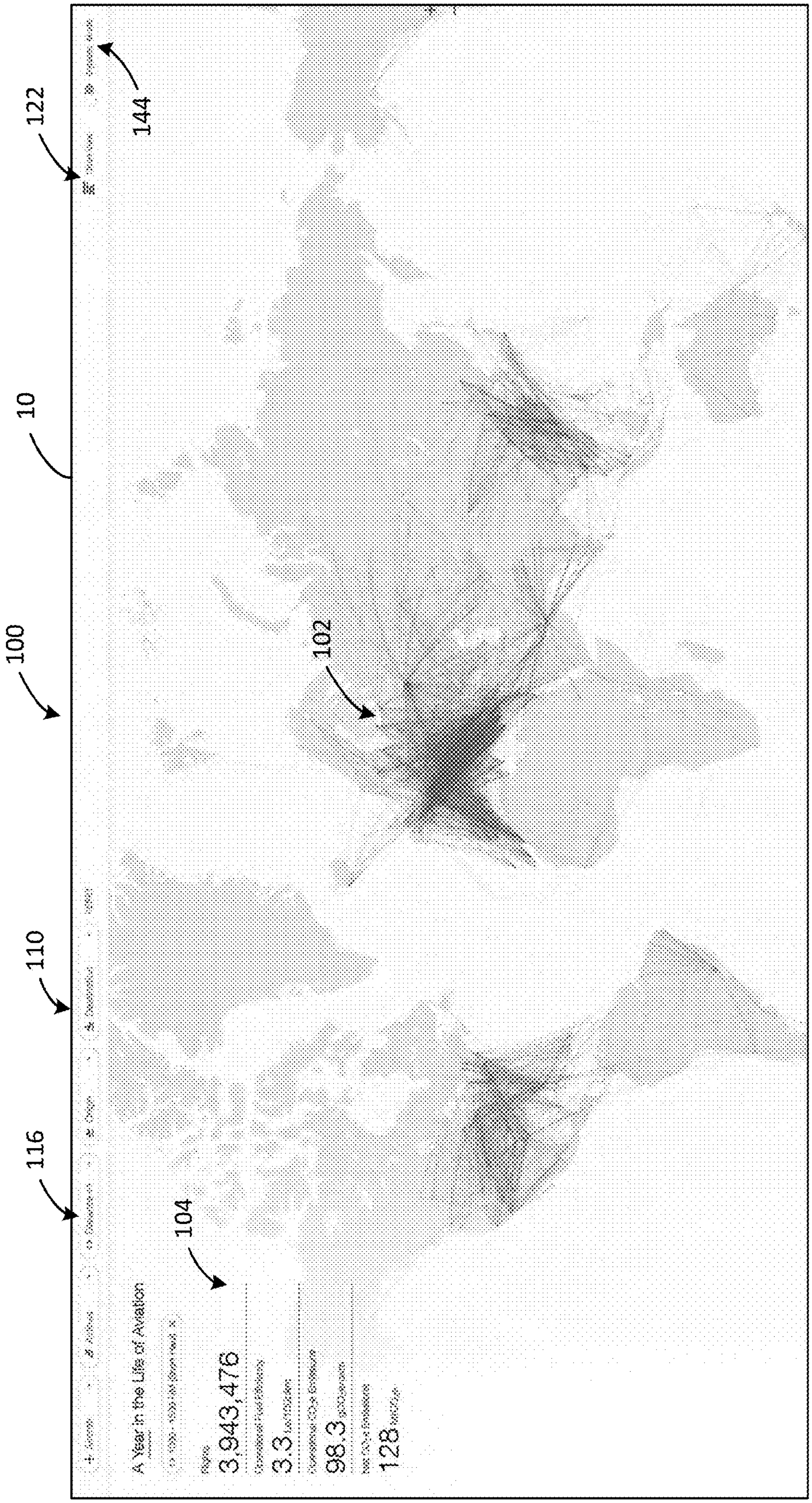
FIG. 6 is a screenshot of a filtered version of the map view of FIG. 1 after applying a selection from the first filter menu of FIG. 4, in accordance with certain embodiments.
Figure 8:
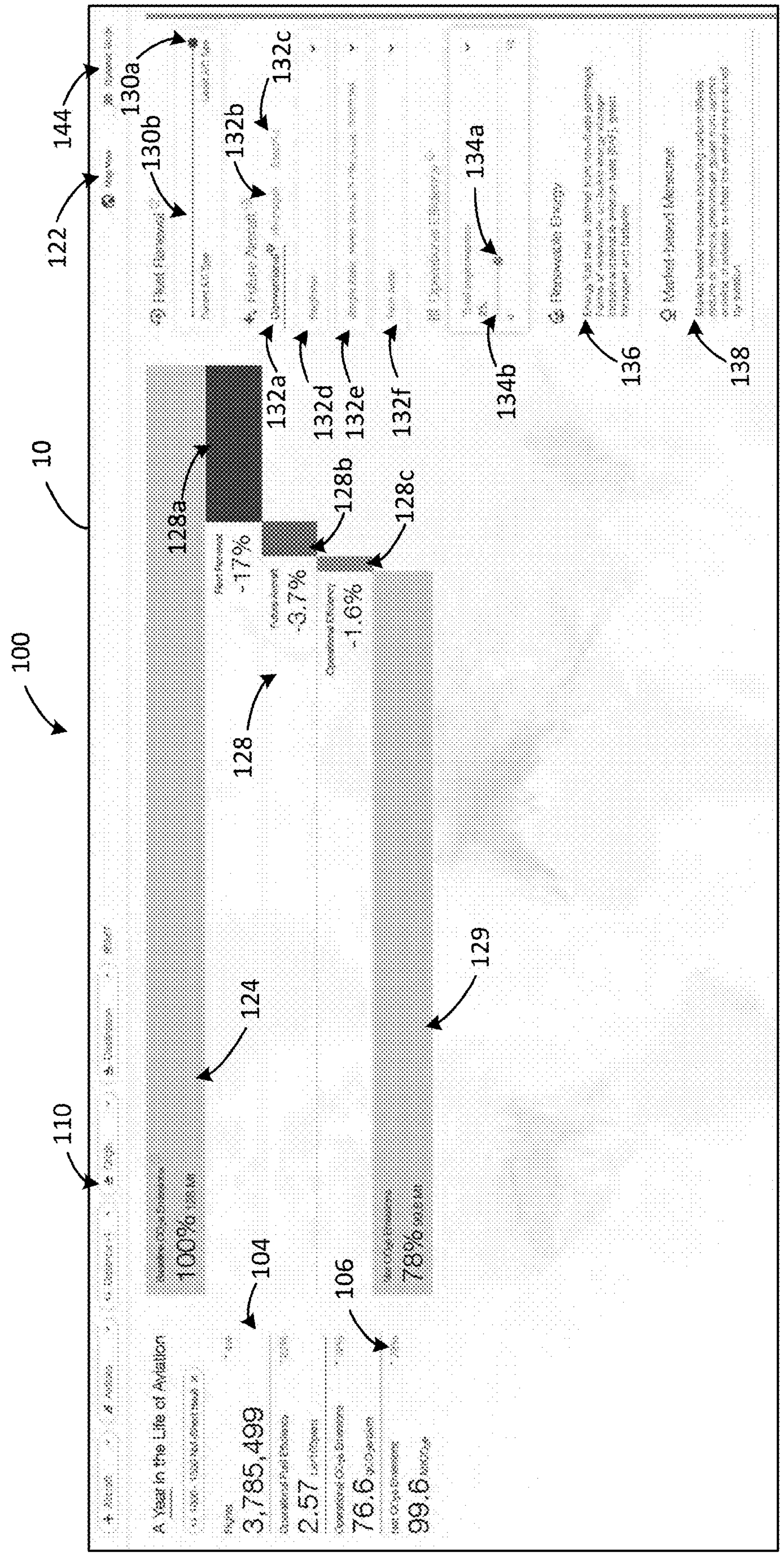
FIG. 8 is a screenshot of an exemplary modification of the chart view of FIG. 7 showing the CO2 emissions impact of a first set of sustainability strategies, in accordance with certain embodiments.

FIG. 1 specifically displays metrics for the flights 102 without user mitigation (e.g., application of sustainability strategies, selection of filter values, etc.) and thus, depicts baseline emission values for comparison of the impact of selected sustainability strategies. Once the user makes selections or inputs via the GUI 100, the values in table 104 will change to reflect those inputs, for example, as shown in FIG. 6. As shown in FIG. 8, change indicators 106 may appear next to each metric, or data line, to indicate, e.g., in percentages, if/how the value changes compared to the baseline. The color and arrow direction of the change indicator may depict whether the change is positive or negative, compared to the baseline. For example, in the illustrated embodiment, a green, downward arrow represents a positive outcome (e.g., decrease) and a red, upward arrow represents a negative outcome (e.g., increase). If the user makes a selection that results in zero flights, the table 104 may display "0" for the number of flights and blanks or dashes for the remaining metrics.

Figure 2A:
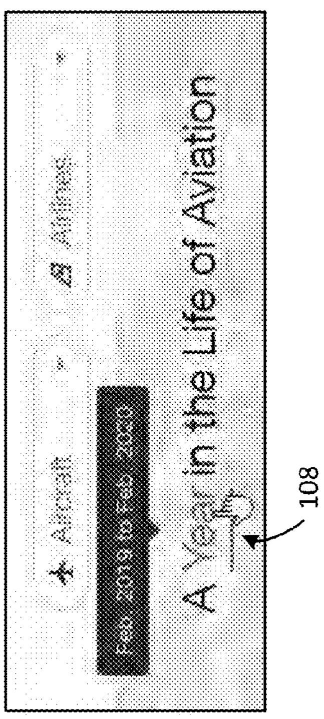
FIGS. 2A to 3B are close-up screenshot views of a timeline variable and the emissions data portion of the map view of FIG. 1 as the timeline variable is changed from year to day, in accordance with certain embodiments.
Figure 2B:
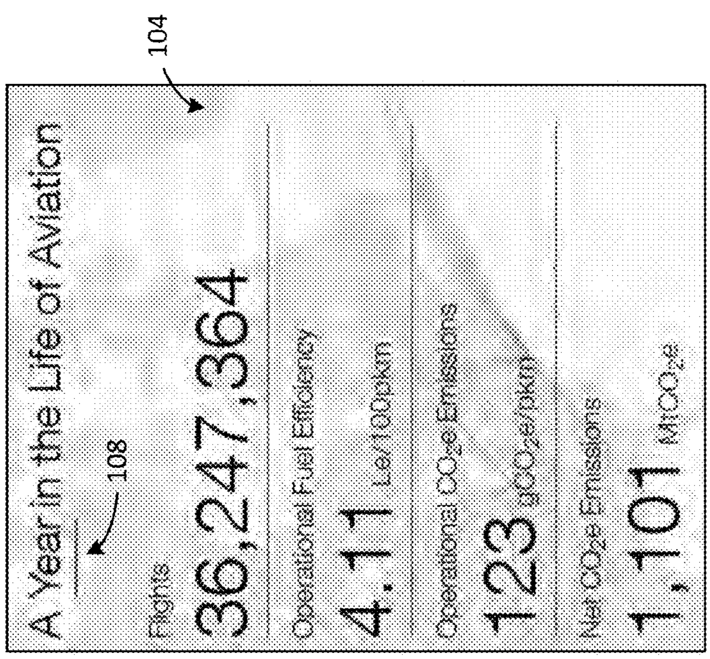
Figure 3A:
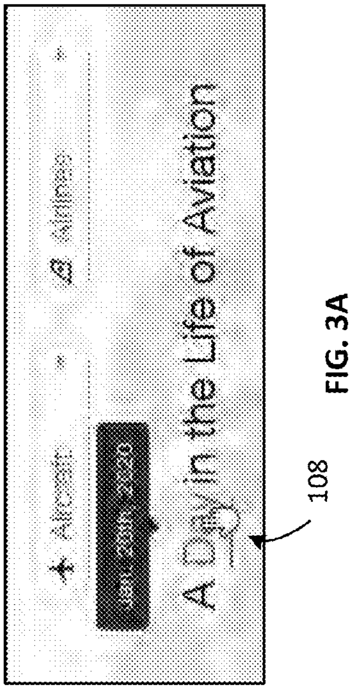
Figure 3B:
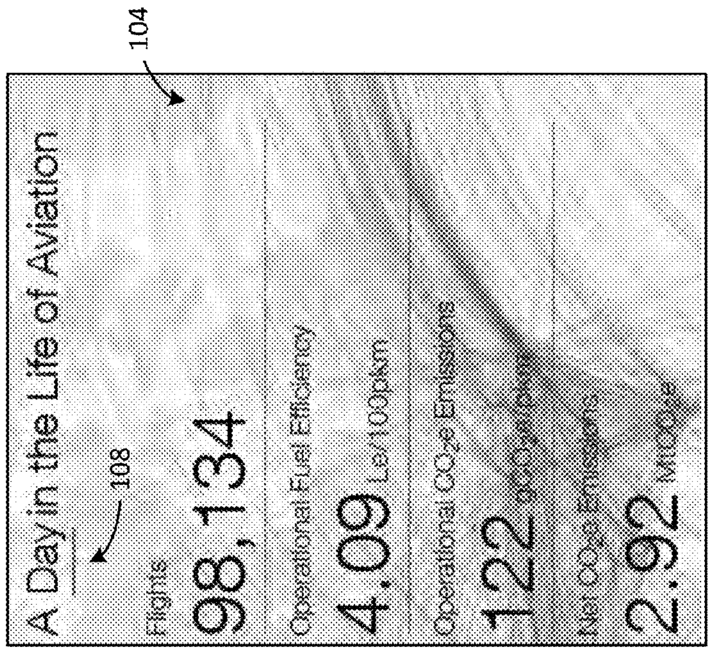

As shown in FIG. 1, the GUI 100 also includes the phrase "A Year in the Life of Aviation" to indicate that the data in table 104 and the flights 102 shown on the map represent yearly data for a specific year or 12-month period. Referring additionally to FIGS. 2A through 3B, shown is an exemplary illustration of how the user can change the time period displayed in the map view by using a user-selectable time option 108 for switching or toggling between two or more time periods. In particular, when option 108 is set to "year" (i.e. as shown in FIG. 1), the GUI 100 is configured to display yearly data for the flights in a given year (e.g., February 2019 to February 2020, as shown in FIG. 2A). When the option 108 is set to "day," the GUI 100 is configured to display daily data for the flights in a given day (e.g., Jan. 20, 2020, as shown in FIG. 3A). As would be expected, there is a stark difference in magnitude when comparing the number of yearly flights in FIG. 2B to the number of daily flights in FIG. 3B. Other changes in data may also appear, such as, e.g., the number of flight paths 102 displayed in the map and the amount of CO2 emissions displayed in the table 104. In other embodiments, the user-selectable time option 108 may be configured to allow selection of other time periods (e.g., week, month, etc.) in addition to, or instead of, the year and day time periods. In some embodiments, changing the time option 108 from one value to the other may involve animation that mimics scrolling between values on a wheel, or other appropriate animation.

Figure 11A:
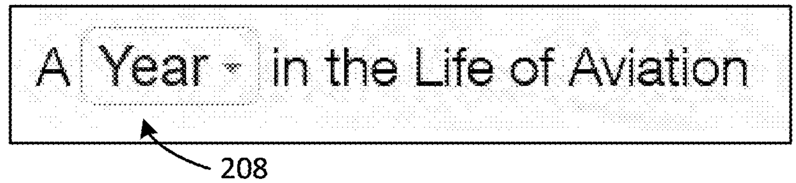
FIGS. 11A to 11D are close-up views of a timeline menu for changing the time period shown in a map view, in accordance with certain embodiments.
Figure 11B:
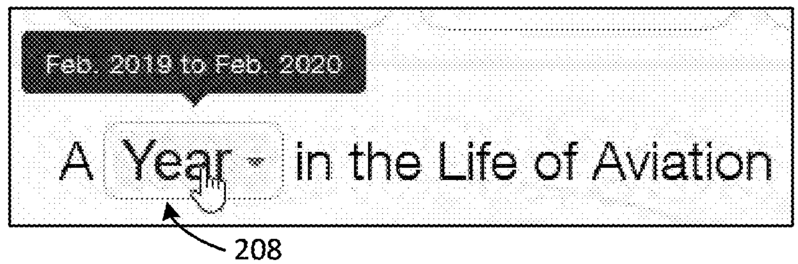
Figure 11C:
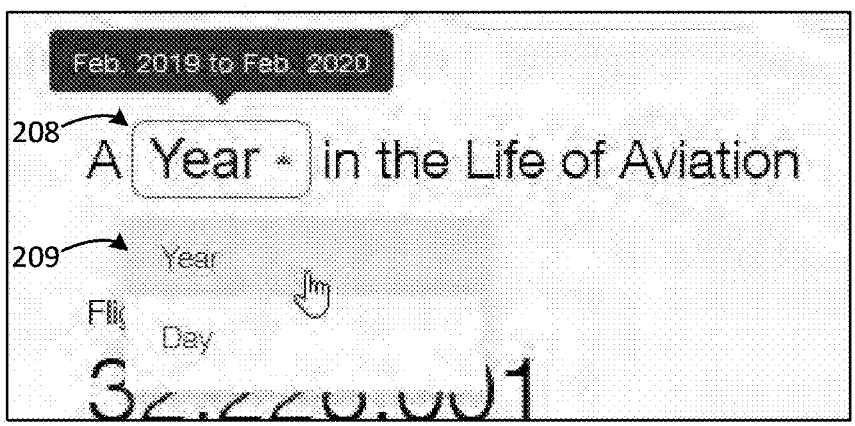
Figure 11D:
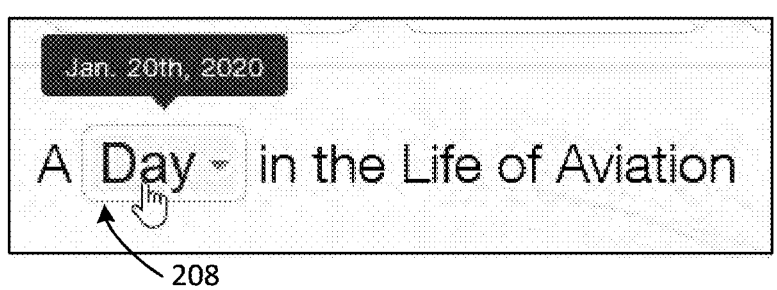

In some embodiments, the user-selectable time option 108 may be configured as shown in FIGS. 2A to 3B, where the text itself, e.g., "Year" or "Day," is a user selectable option. In other embodiments, for example, as shown in FIGS. 11A to 11D, the GUI 100 may include a user-selectable time option 208 that is configured as a button, icon, or other graphic and is further configured to display a drop-down menu 209 upon selection. For example, the time option 208 may include an arrow or other symbol to include the presence of the drop-down menu 209. As shown in FIG. 11C, the drop-down menu 209 can be configured to display or list a plurality of selectable time periods for changing or toggling the time period displayed in the map view, such as, e.g., a "Year" option and a "Day" option. Selecting one of the options causes the data displayed on the map view to change accordingly, as described above. Hovering over an option in the drop-down menu 209 may cause that option to be highlighted, as shown in FIG. 11C. Once the user selects one of the drop-down options, the menu 209 may automatically close or collapse and the newly selection option may be displayed in the time option 208 icon. In both embodiments, hovering over the time option 108/208 may cause the corresponding time period (e.g., the calendar dates corresponding to the selected time period) to be displayed above the time option 108/208, for example, as pop-up text, a comment bubble, or the like, as shown in the figures.

Figure 45:
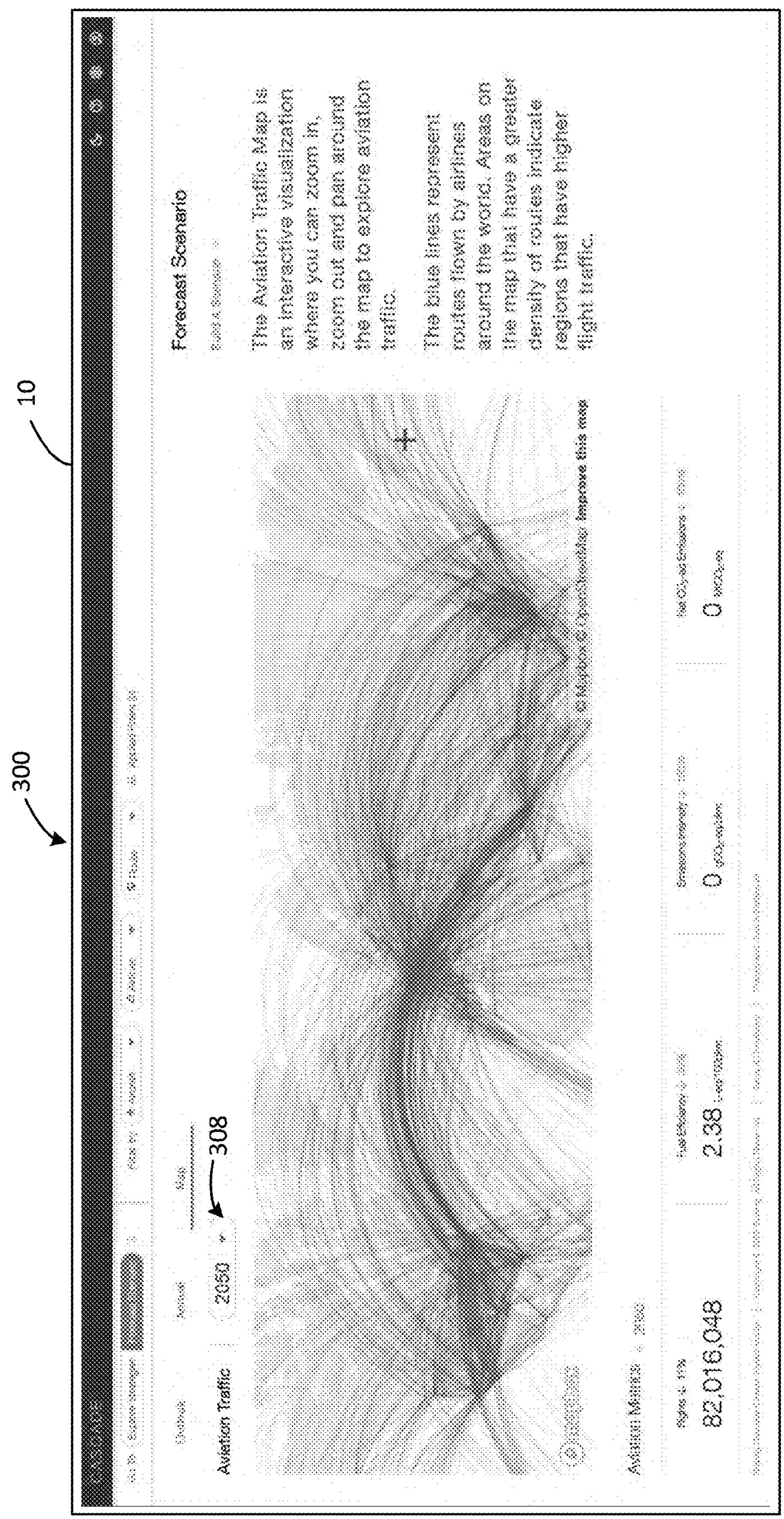
FIG. 45 is a screenshot of an exemplary map view included in the forecast scenarios view of FIG. 34A, the map view corresponding to the annual view shown in FIG. 44B, in accordance with certain embodiments.
Figure 46A:
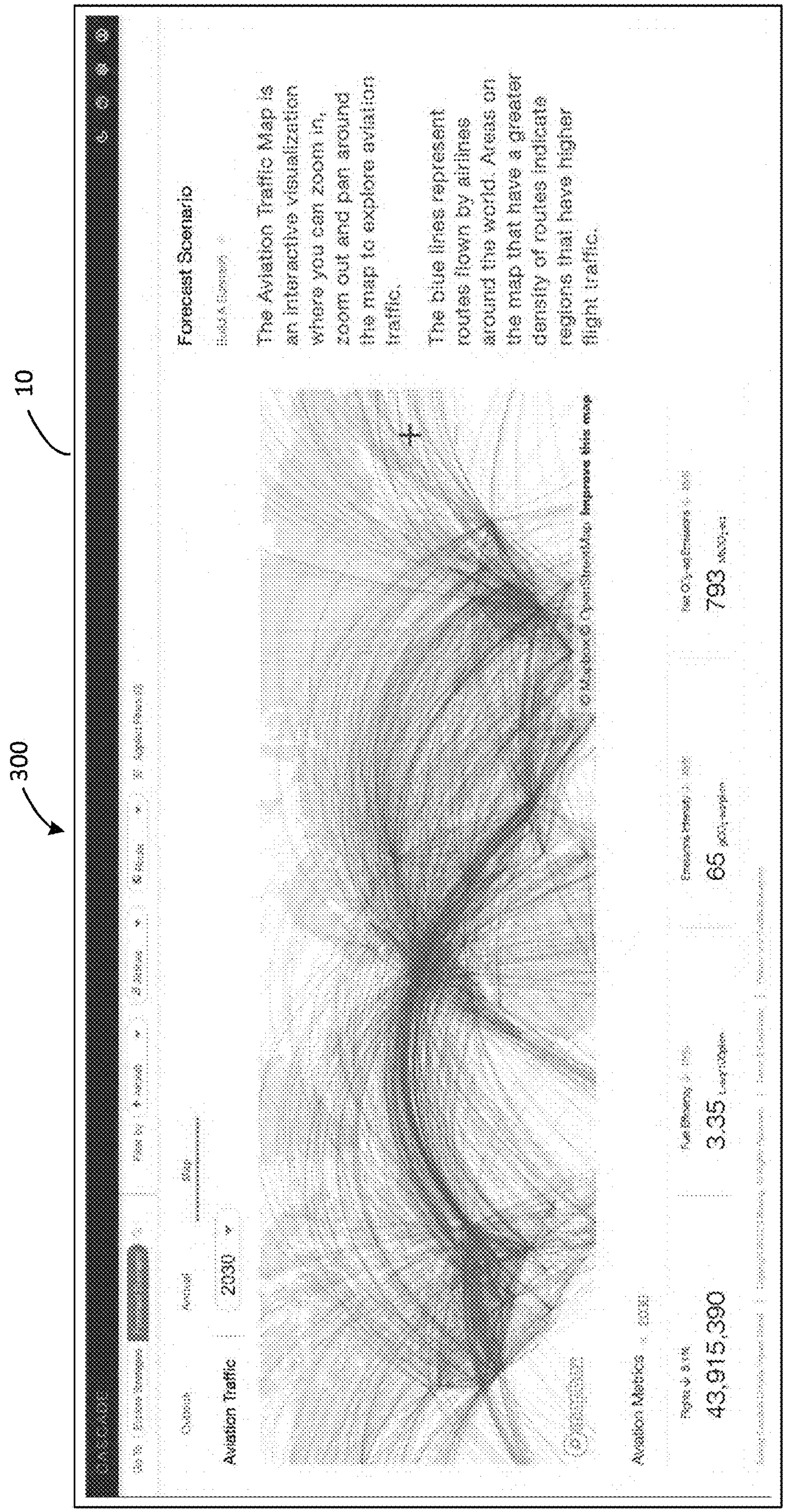
FIGS. 46A and 46B are screenshots of exemplary map and annual views, respectively, included in the forecast scenarios view of FIG. 34A and corresponding to a first user-selected year, in accordance with certain embodiments.
Figure 46B:
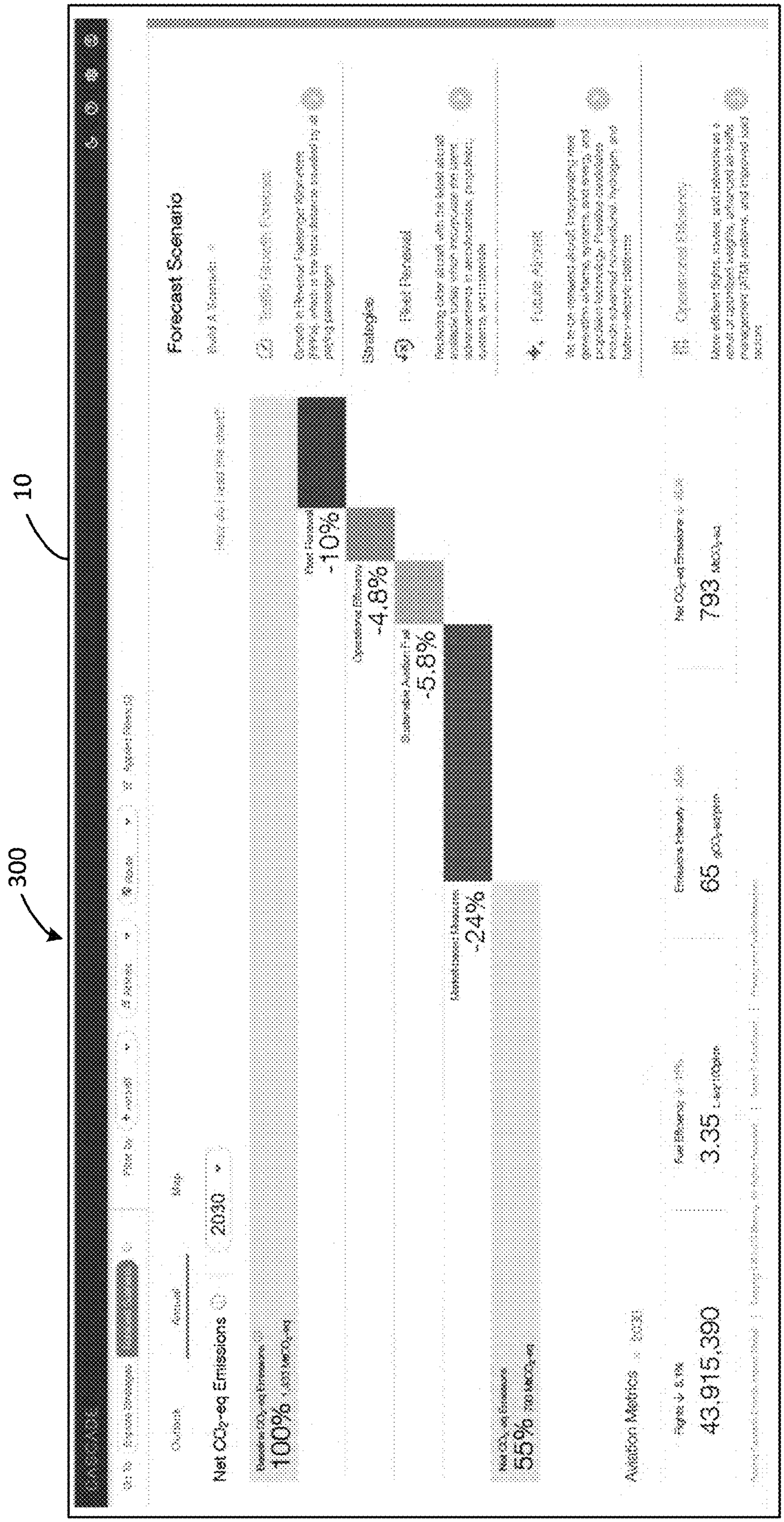

According to other embodiments, the GUI 300 includes a user selectable time option 308 that is configured to allow user selection of a particular time parameter, such as, e.g., a particular year from a list of years, as shown in FIG. 45. For example, in the illustrated embodiment, the year 2050 has been selected and is displayed within the time option 308. The time option 308 may include a drop-down menu that is similar to the menu 209 in FIG. 11C, but lists a number of user-selectable years (e.g., 2019, 2030, 2045, 2050, etc.).

Figure 4:
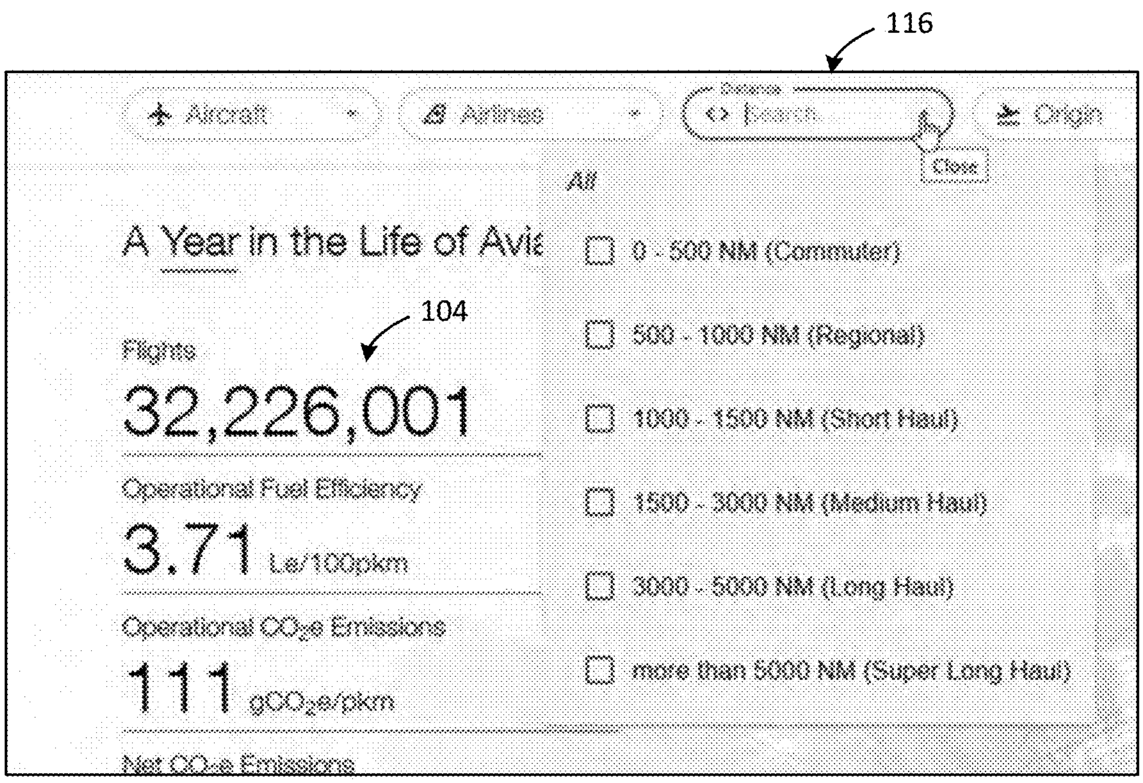
FIG. 4 is a close-up screenshot view of a first filter menu for changing a distance parameter of the flight paths shown in the map view of FIG. 1, in accordance with certain embodiments.
Figure 5:
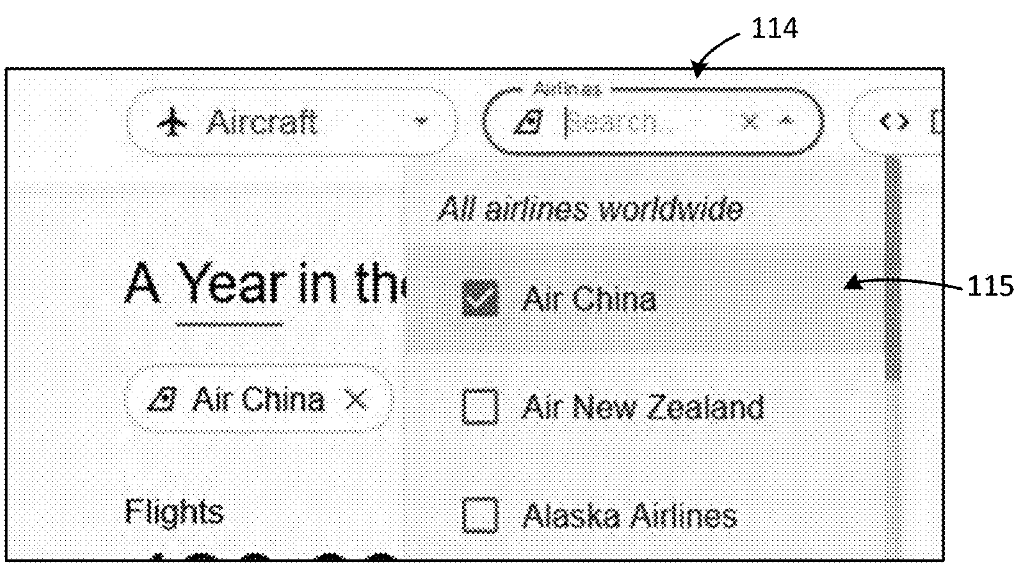
FIG. 5 is a close-up screenshot view of a second filter menu for changing an airline parameter of the flight paths shown in the map view of FIG. 1, in accordance with certain embodiments.

As shown in FIG. 1, the GUI 100 further includes a plurality of filter options 110 across a top of the GUI 100, above the map view. These filter options 110 may be used to adjust a scope of the data being displayed and therefore, the flight paths 102 depicted on the map and the metrics listed in the table 104. In the illustrated embodiment, the filter options 110 may include an aircraft filter 112 for selecting a particular type of aircraft (or multiple types), an airlines filter 114 for selecting a particular airline, or multiple airlines (e.g., as shown in FIG. 5), a distance filter 116 for selecting a particular distance, or distance range, for the flight paths 102 (e.g., as shown in FIG. 4), an origin filter 118 for selecting a particular origin or starting location for the flight paths 102, and a destination filter 120 for selecting a particular destination or ending location for the flight paths 102. FIG. 6 illustrates a filtered version of the map view after the distance filter 116 has been set to "regional" or a distance of 500 to 1000 NM. As shown, there are fewer flight paths 102 on display in the map and fewer number of flights listed in table 104 due to the filtering, or narrower scope of data. Other values displayed in the GUI 100 are also adjusted accordingly (e.g., other values in the table 104, etc.).

In some embodiments, for example, as shown in FIG. 5, the airlines filter 114 can include a search bar, or other text input area, for enabling a user to enter a search term or phrase, such as, e.g., the name of a particular airline that the user wants to use for filtering the data. If no text is entered in the search bar, a list of all existing airlines may be displayed below the airlines filter 114 (e.g., as a drop-down menu), for example, upon selecting, or otherwise activating, the airlines filter 114 icon or graphic. Each airline name may be displayed as a separate user-selectable option 115 that has, for example, a check box or other graphic configured to enable selection, or deselection, of the airline option 115. As the user enters the search term into the search bar, one or more matching airline options 115 may appear in a list or drop-down menu below the search bar. The user can select one or multiple airline options 115 for filtering purposes. The default filter setting may be selection of all airlines worldwide (i.e. no filtering). Thus, if none of the airline options 115 are selected, the data displayed in the map view will not be filtered. In some cases, all of the airlines options 115 may be pre-selected as a default filter setting, such that the user must de-select the airlines 115 that they do not wish to include in the displayed data.

Figure 12A:
FIGS. 12A to 12E are close-up views of a second filter menu for changing an airline parameter of flight paths shown in a map view, in accordance with certain embodiments.
Figure 12B:
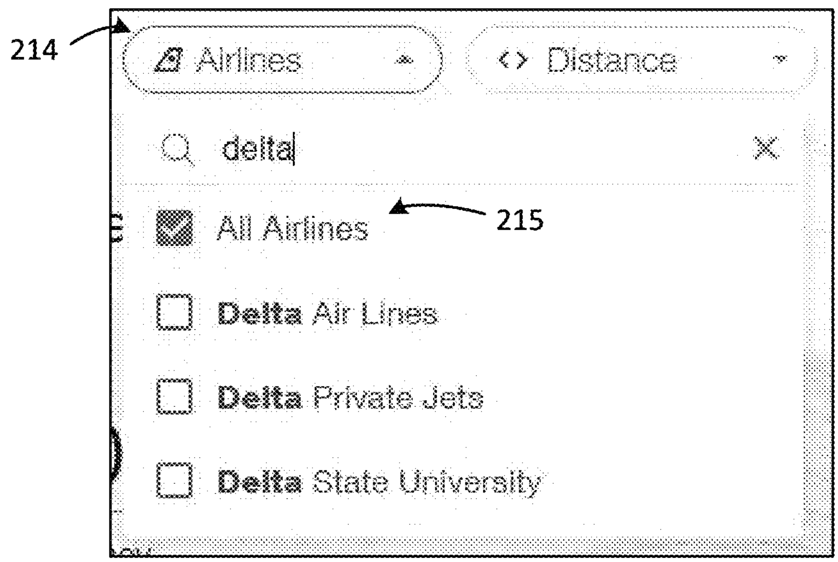

In other embodiments, for example, as shown in FIGS. 12A to 12E, the GUI 200 may be configured to include an airlines filter 214 that includes an "All Airlines" option 215 to allow easy selection, or deselection, of all airlines worldwide, in addition to a search bar for entering a search term or phrase, such as, e.g., the name of a particular airline. The All Airlines option 215 may be pre-selected as a default filter setting for the map view data, as shown in FIG. 12A. If the user wishes to filter by one or more specific airlines, the user can enter a search term and/or the airline's name in the search bar to pull up the specific airline(s). As the user types or enters the search term, a list of possible matches may be dynamically displayed below the All Airlines option 215, as shown in FIG. 12B. The possible matches (or proposals) may be configured as user-selectable options, like the plurality of airlines options 115 in FIG. 5 and/or the All Airlines option 215.

Figure 12C:
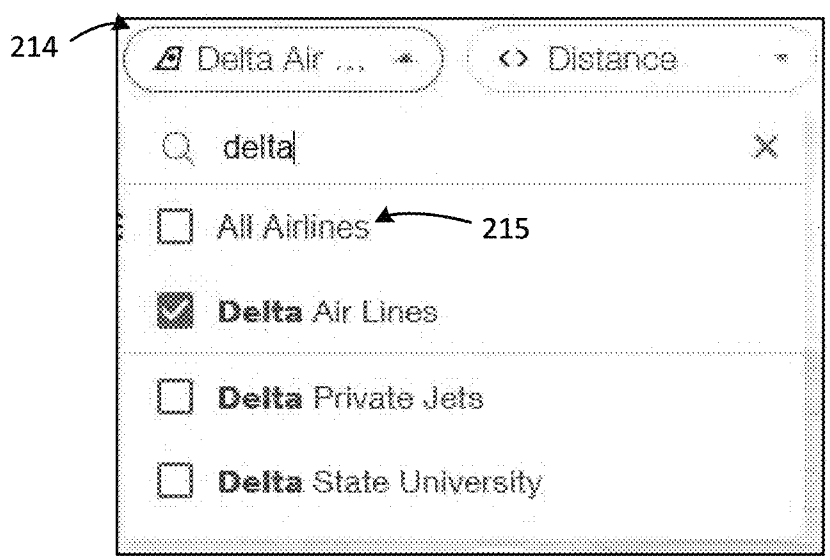
Figure 12D:
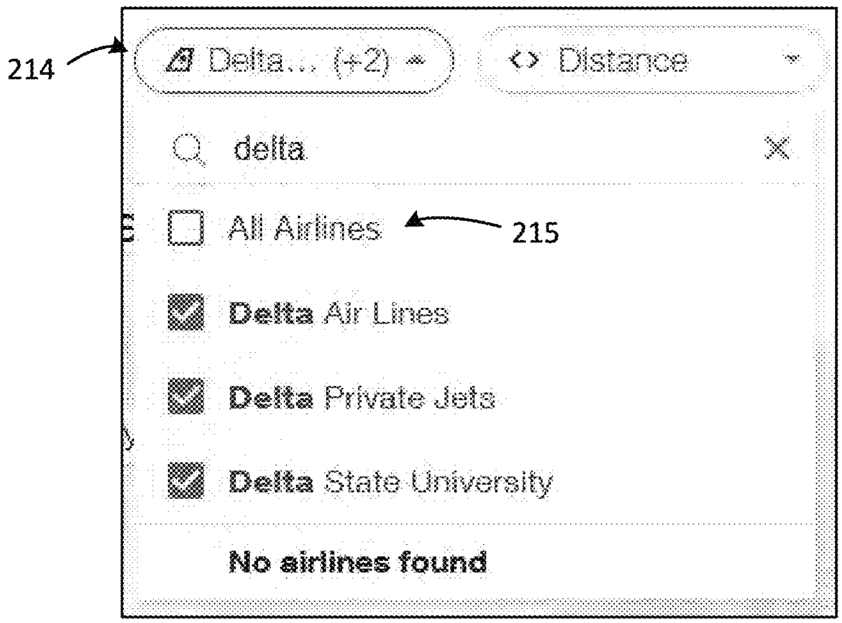

In embodiments, once the user selects one of the proposed options, the selected option may be moved from the proposals list to a selected list, such as, for example, the list just below the All Airlines option 215 in FIG. 12C. In addition, the All Airlines option 215 may be automatically deselected once a specific airlines option is selected, as shown in FIG. 12C. The number of airlines options included in the selected list may increase as more and more airlines are selected from the proposals list, or vice versa. If all of the proposed airlines are selected, the proposal area may become a blank space, or may be configured to state "No Airlines Found," as shown in FIG. 12D. Once specific airlines are selected, the text or description displayed in the airlines filter 214 area may be updated accordingly. For example, as shown in FIGS. 12C to 12D, the airlines filter 214 area may change from displaying "Airlines" to displaying the name of one or more of the selected airlines (e.g., "Delta . . . " in FIG. 12C) and/or an indication of how many other airlines are selected (e.g., "(+2)" in FIG. 2D).

Figure 12E:
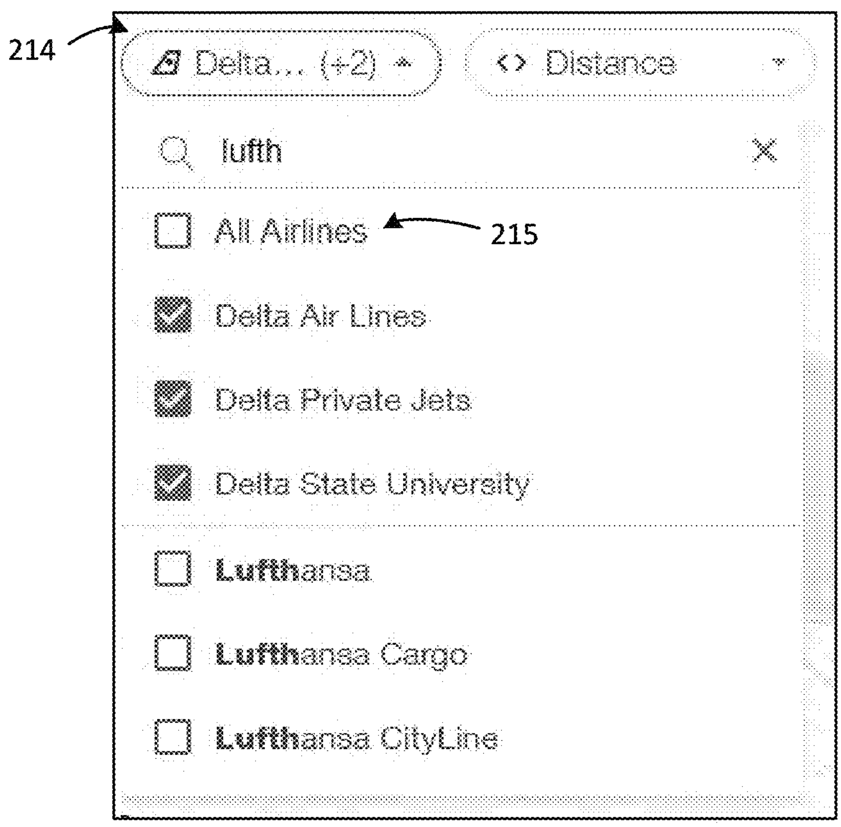

The selected list of airlines can be configured to stay as is until the options are manually deselected by the user, or the selected list is reset due to user selection of the All Airlines option 215. This enables the user to enter a new search term and add more airlines to the selected list, without affecting or deleting the previously selected list of airlines, if so desired. For example, as shown in FIG. 12E, a new search phrase may be entered into the search bar while keeping the selected list of airlines as is. If the user decides to clear the selected list and generate a new list of selections based on a new search term, the user can do that as well by selecting the All Airlines option 215 to reset the filter settings.

Figure 25A:
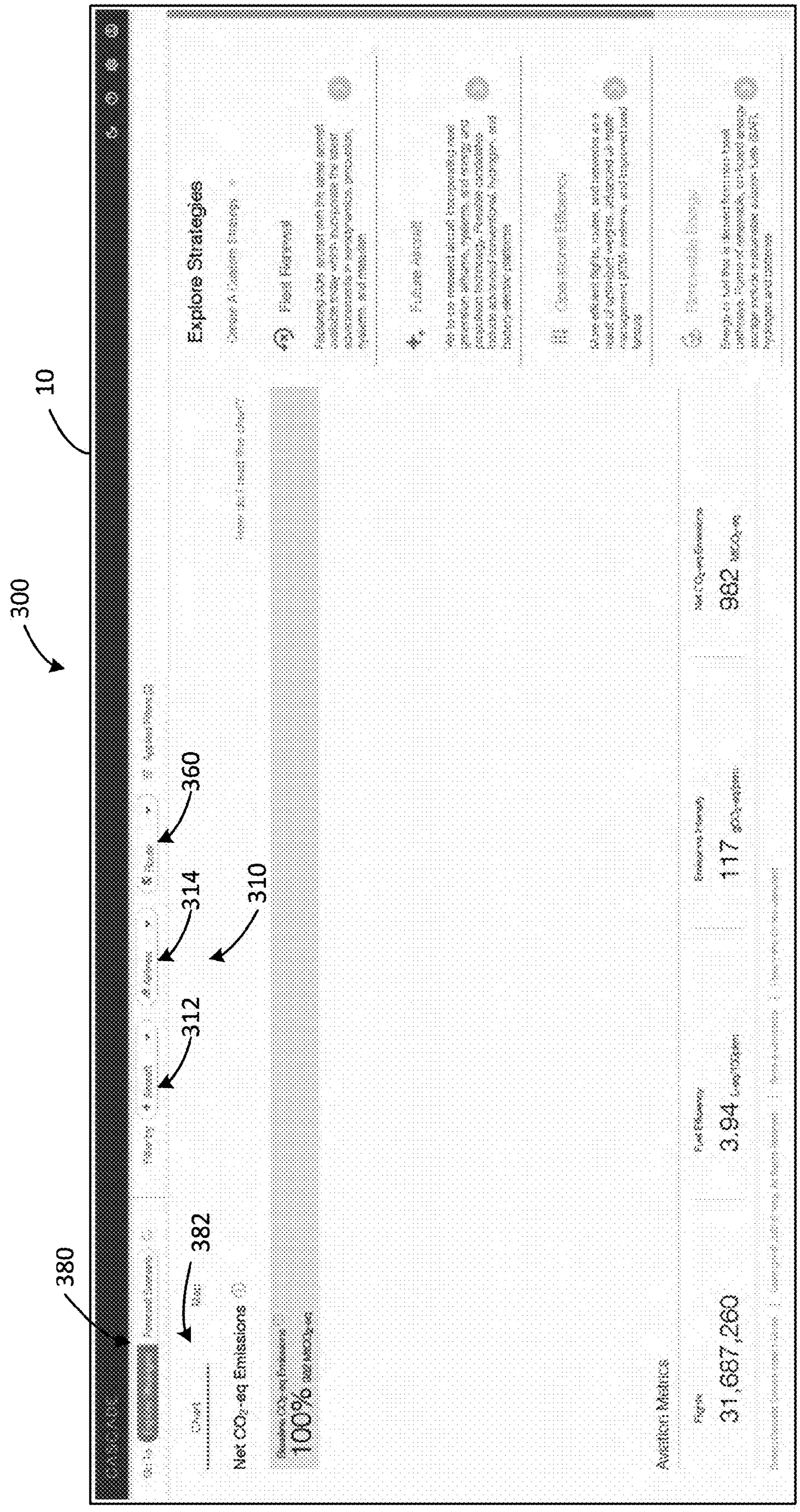
FIGS. 25A and 25B are screenshots of an exemplary graphical user interface for depicting an explore strategies view of the dynamic aviation emissions modeling tool shown in FIG. 23, in accordance with certain embodiments.
Figure 25B:
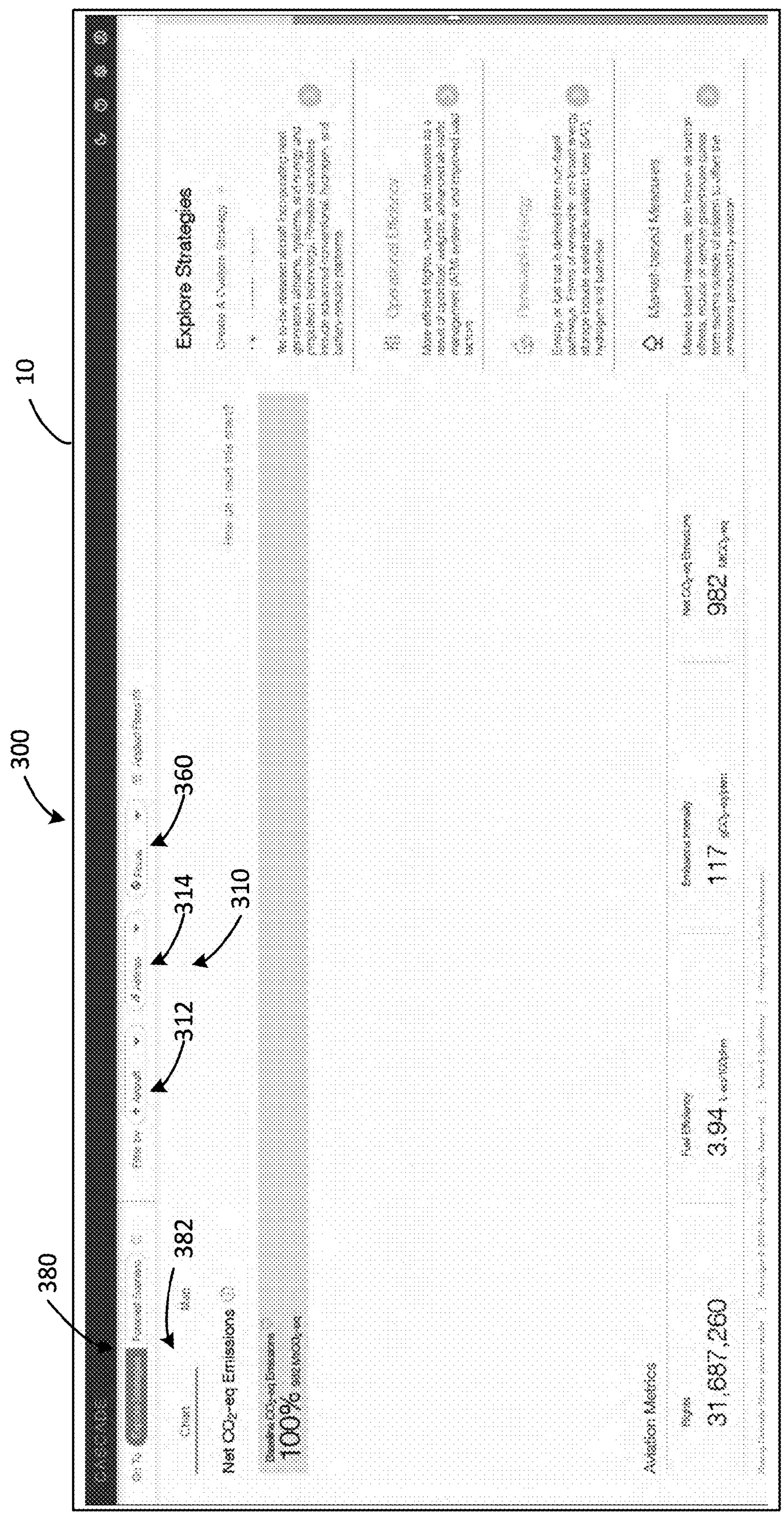
Figure 26:
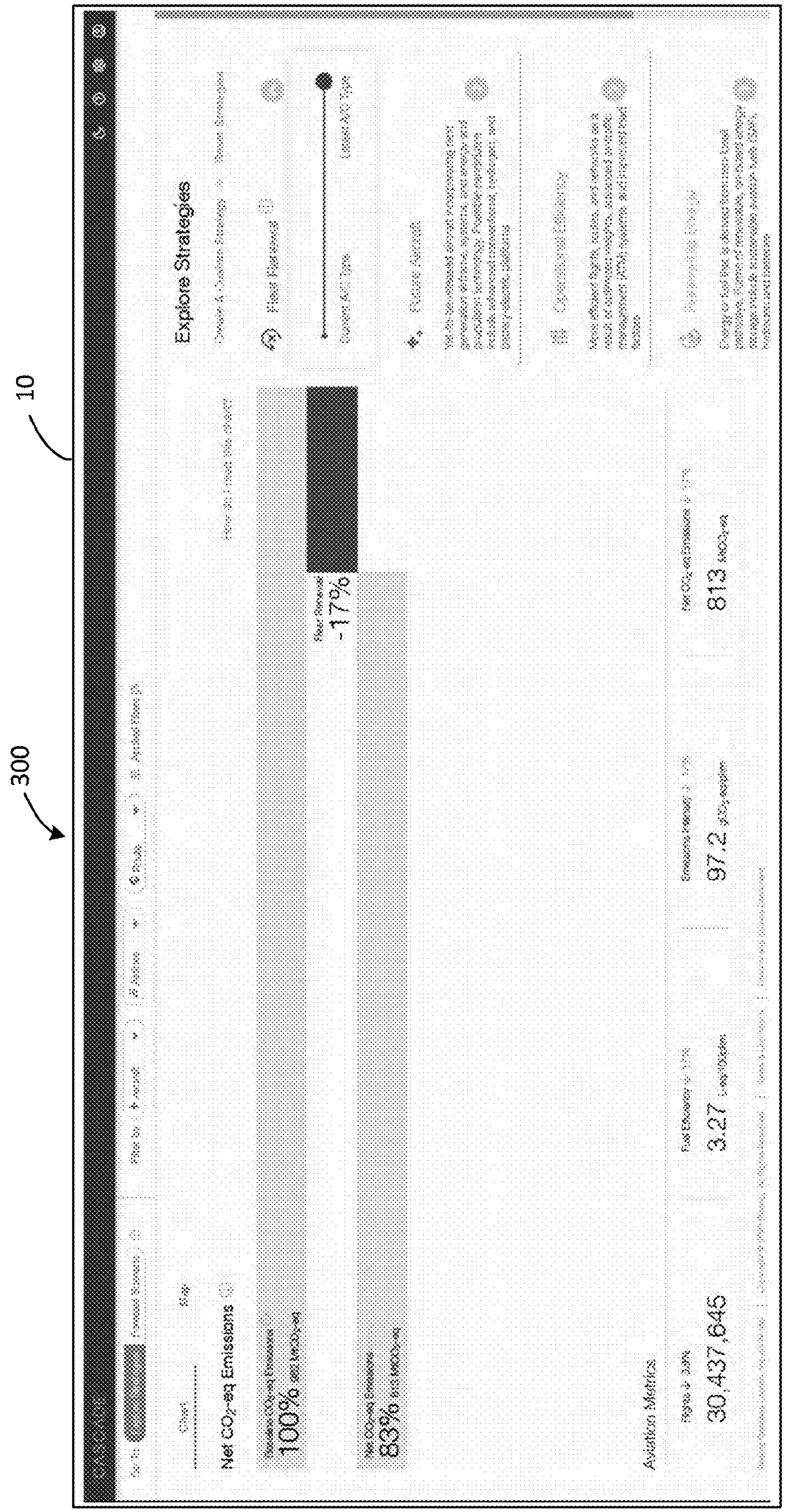
FIG. 26 is a screenshot of a first exemplary chart view included in the explore strategies view of FIG. 25A, the first chart view showing the CO2 emissions impact of a selected fleet renewal strategy, in accordance with certain embodiments.
Figure 27A:
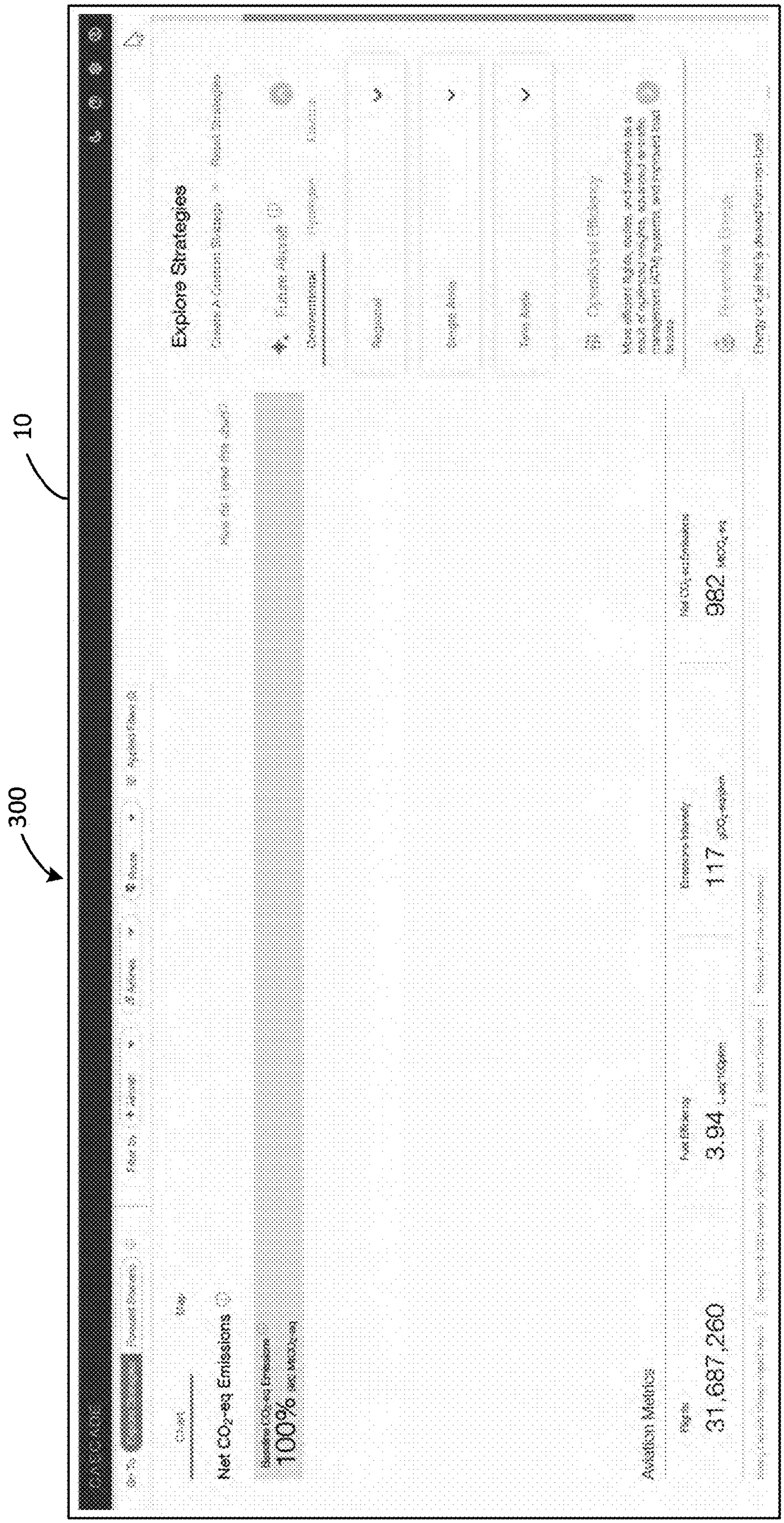
FIGS. 27A to 27H are screenshots of a second exemplary chart view included in the explore strategies view of FIG. 25A, the second chart view showing the CO2 emissions impact of various future aircraft strategies, in accordance with certain embodiments.
Figure 27B:
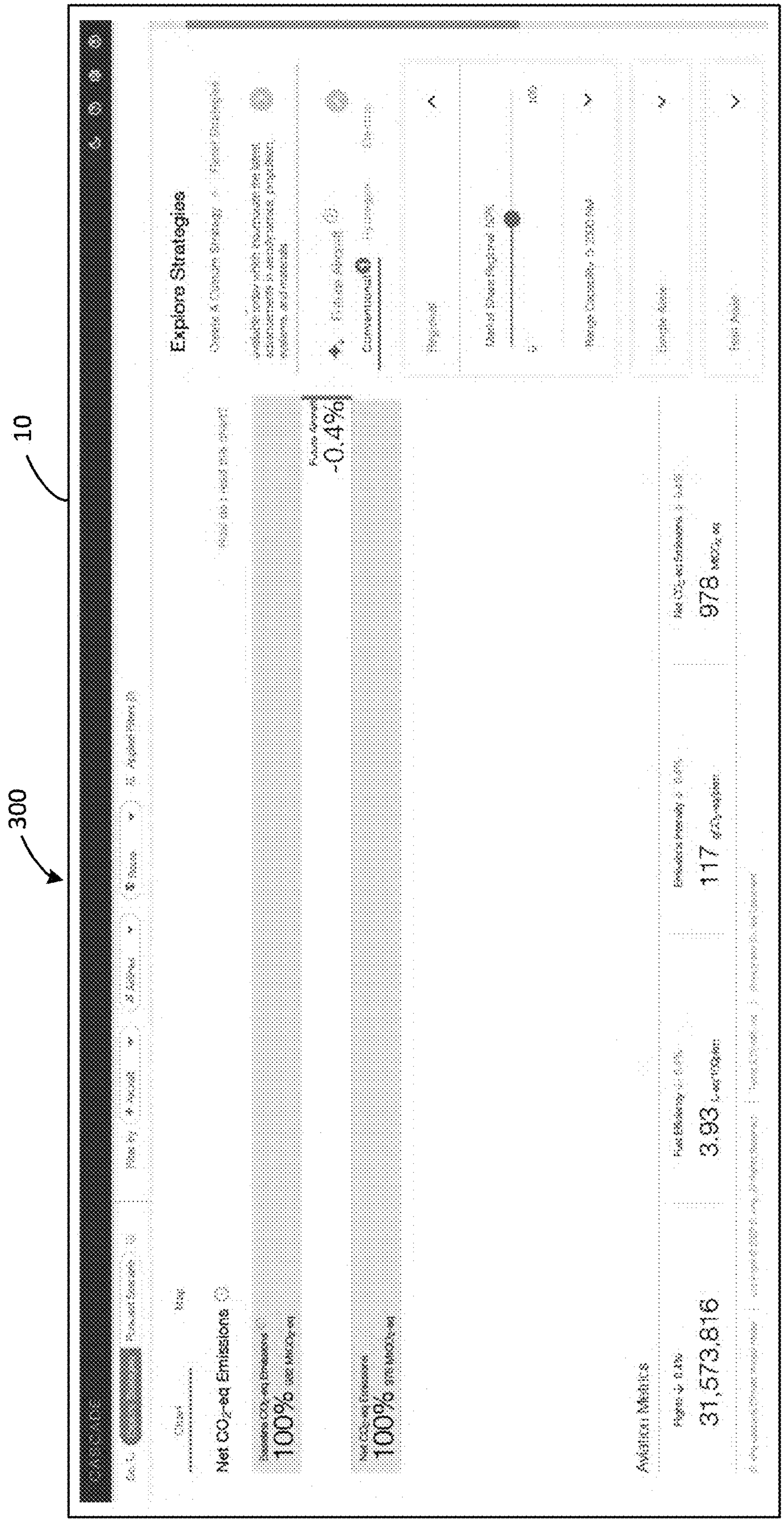
Figure 27C:
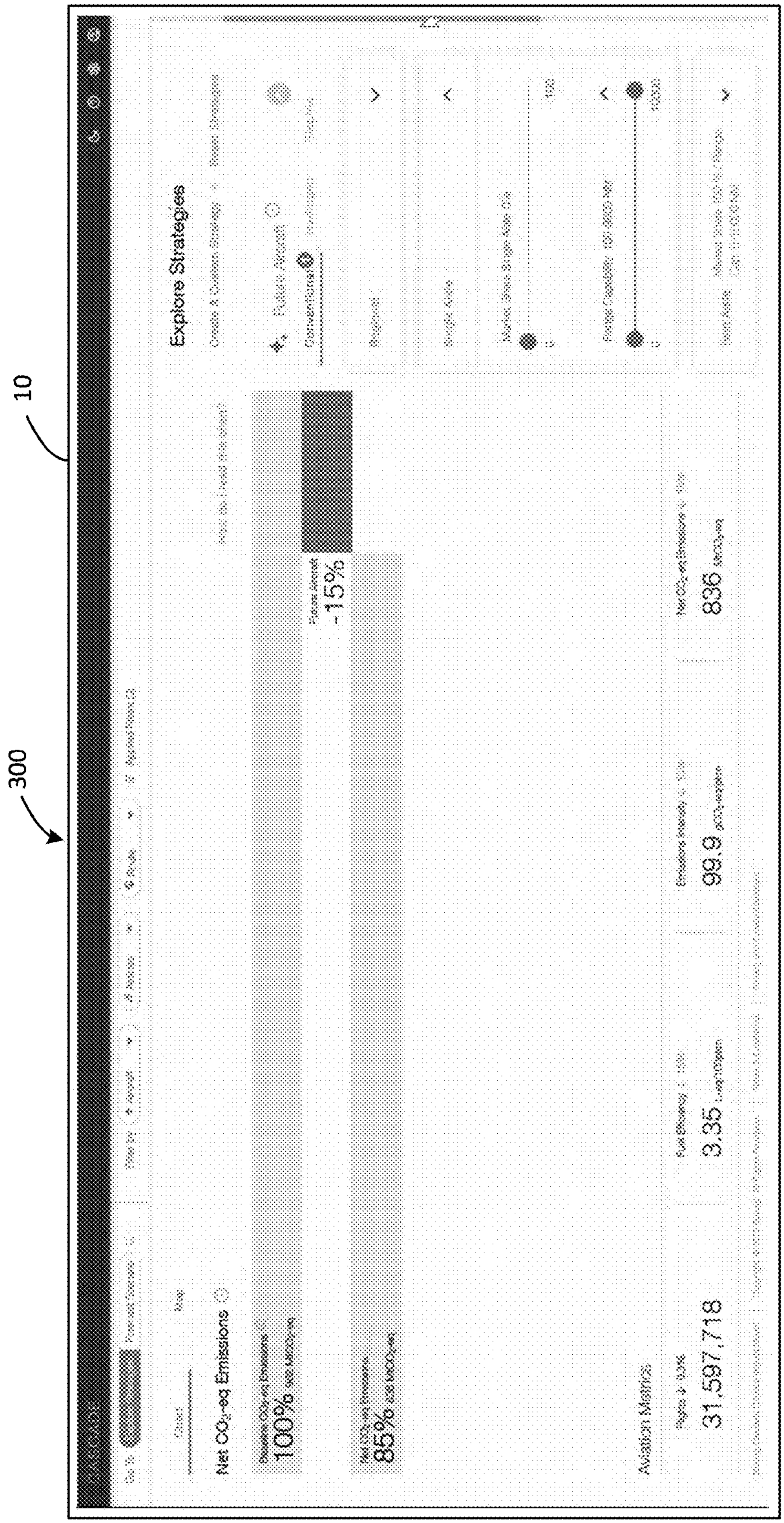
Figure 27D:
Figure 27E:
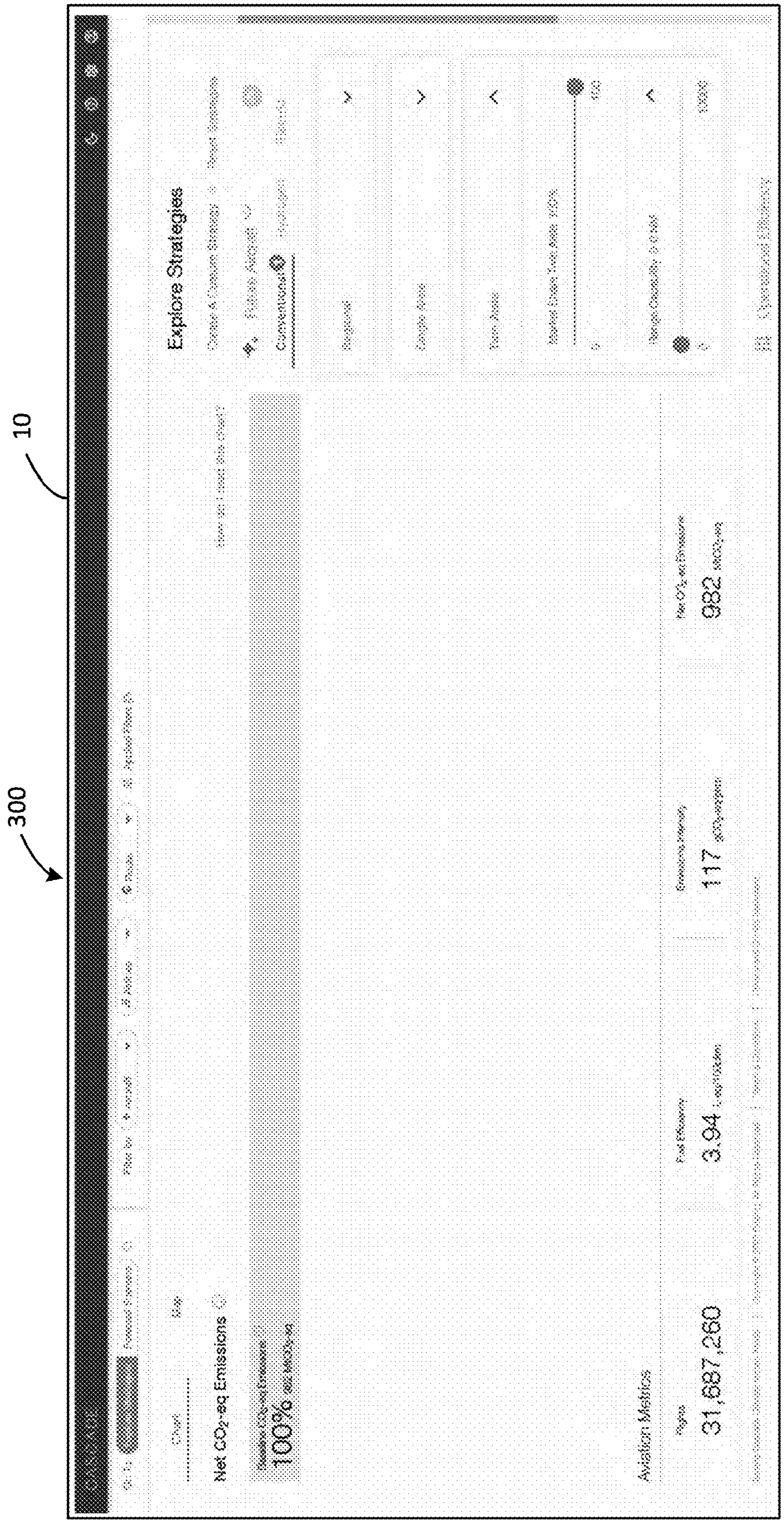
Figure 27F:
Figure 27G:
Figure 27H:
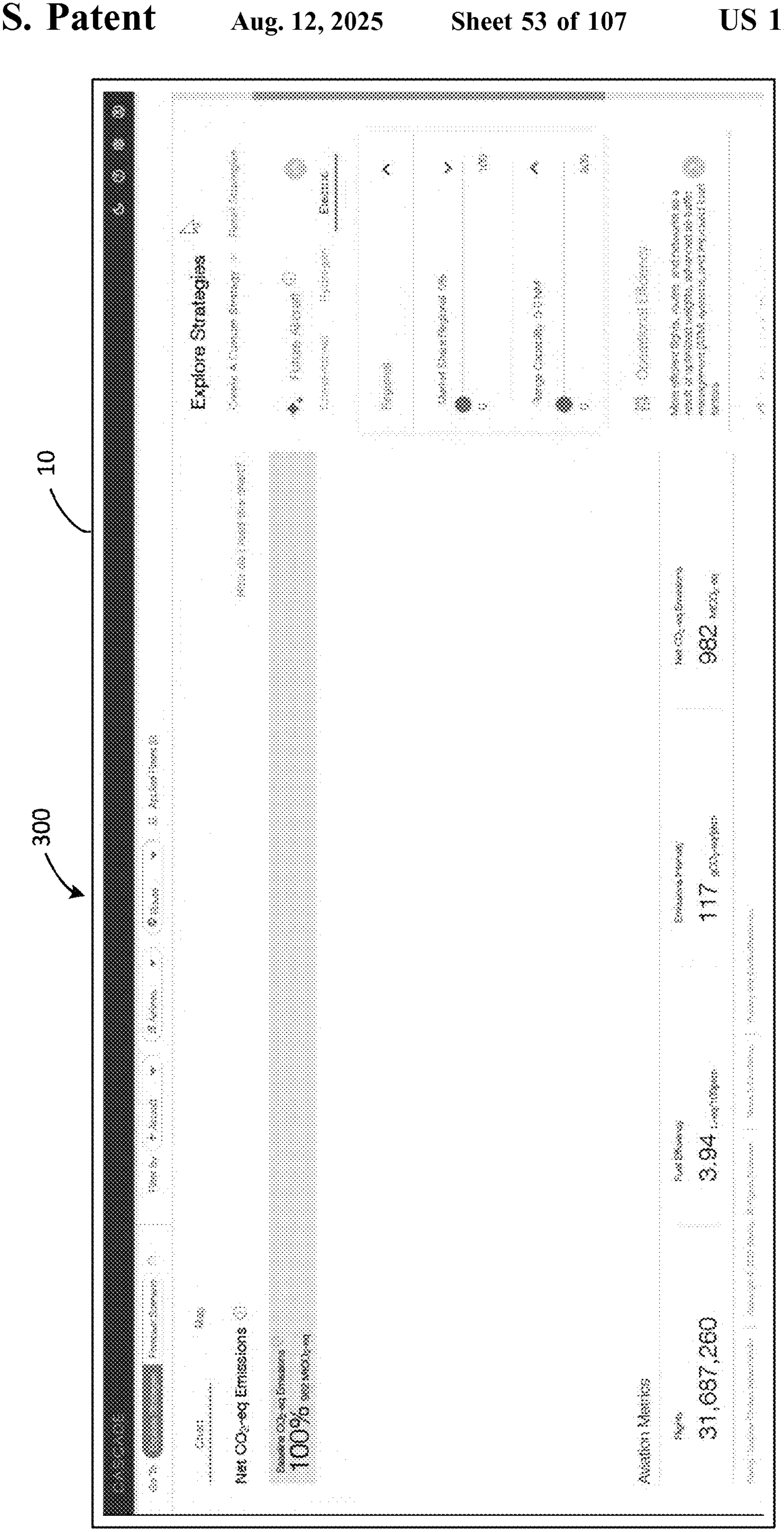
Figure 28A:
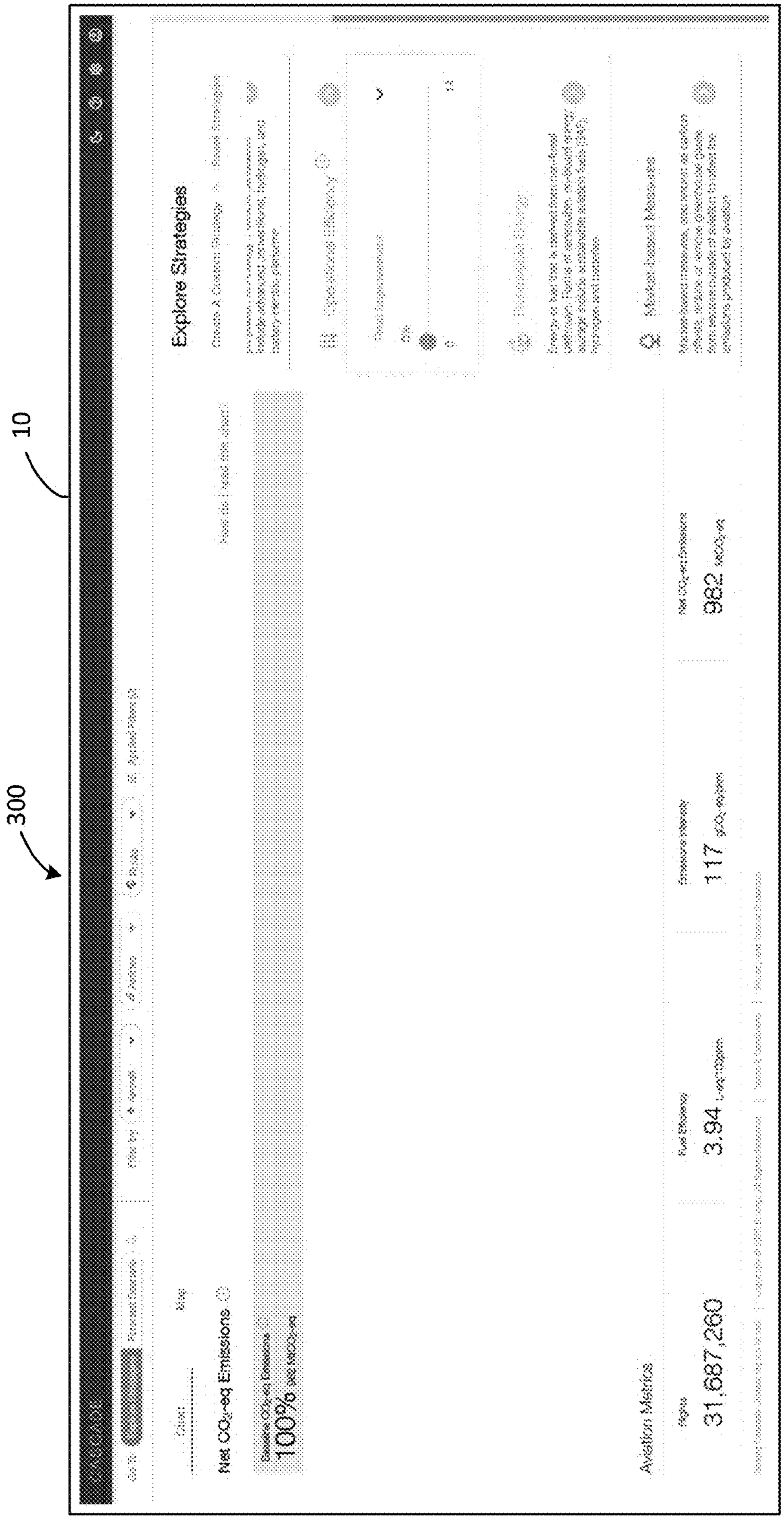
FIGS. 28A to 28B are screenshots of a third exemplary chart view included in the explore strategies view of FIG. 25A, the third chart view showing various options for selecting operational efficiency strategies that impact CO2 emissions, in accordance with certain embodiments.
Figure 28B:
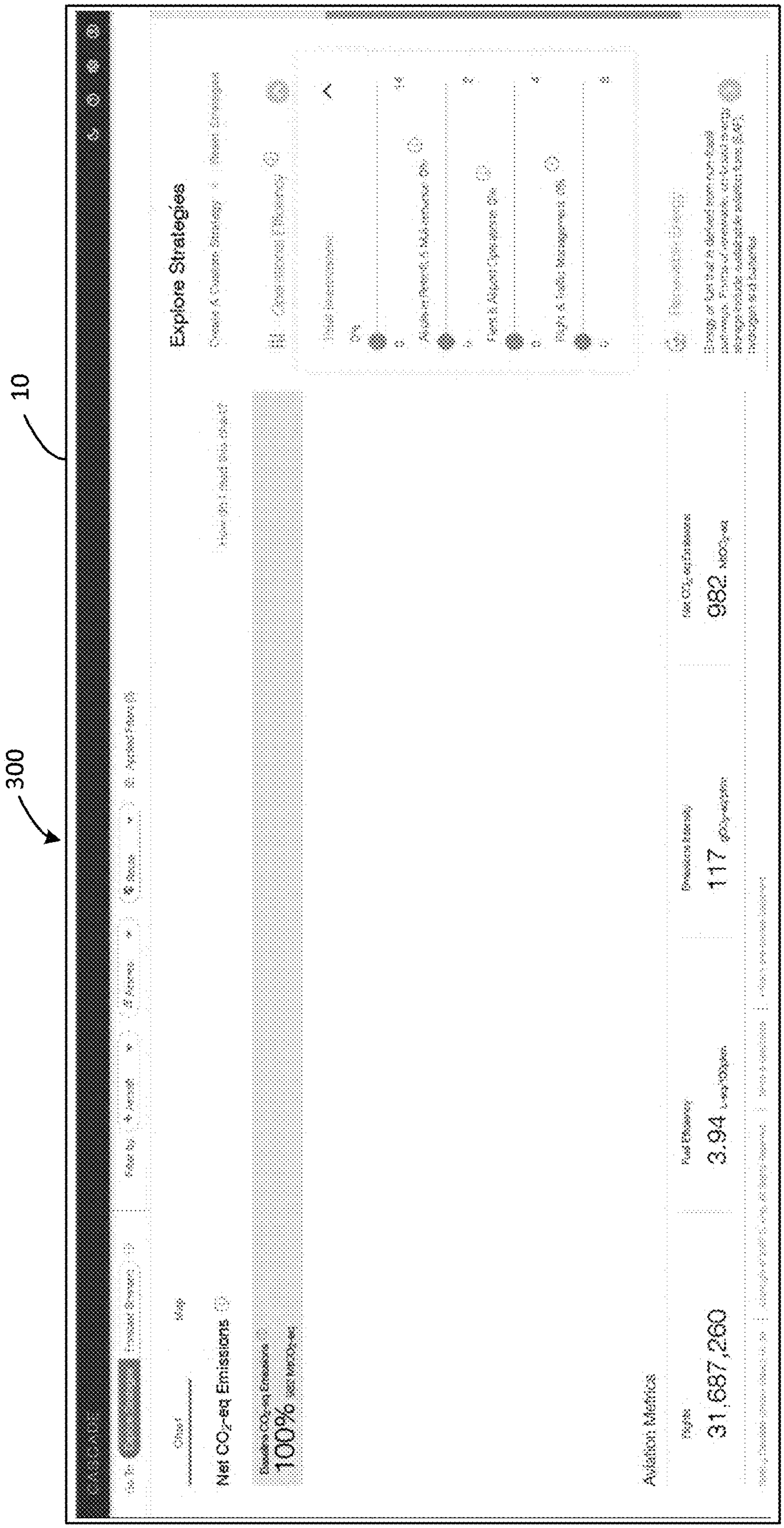
Figure 29A:
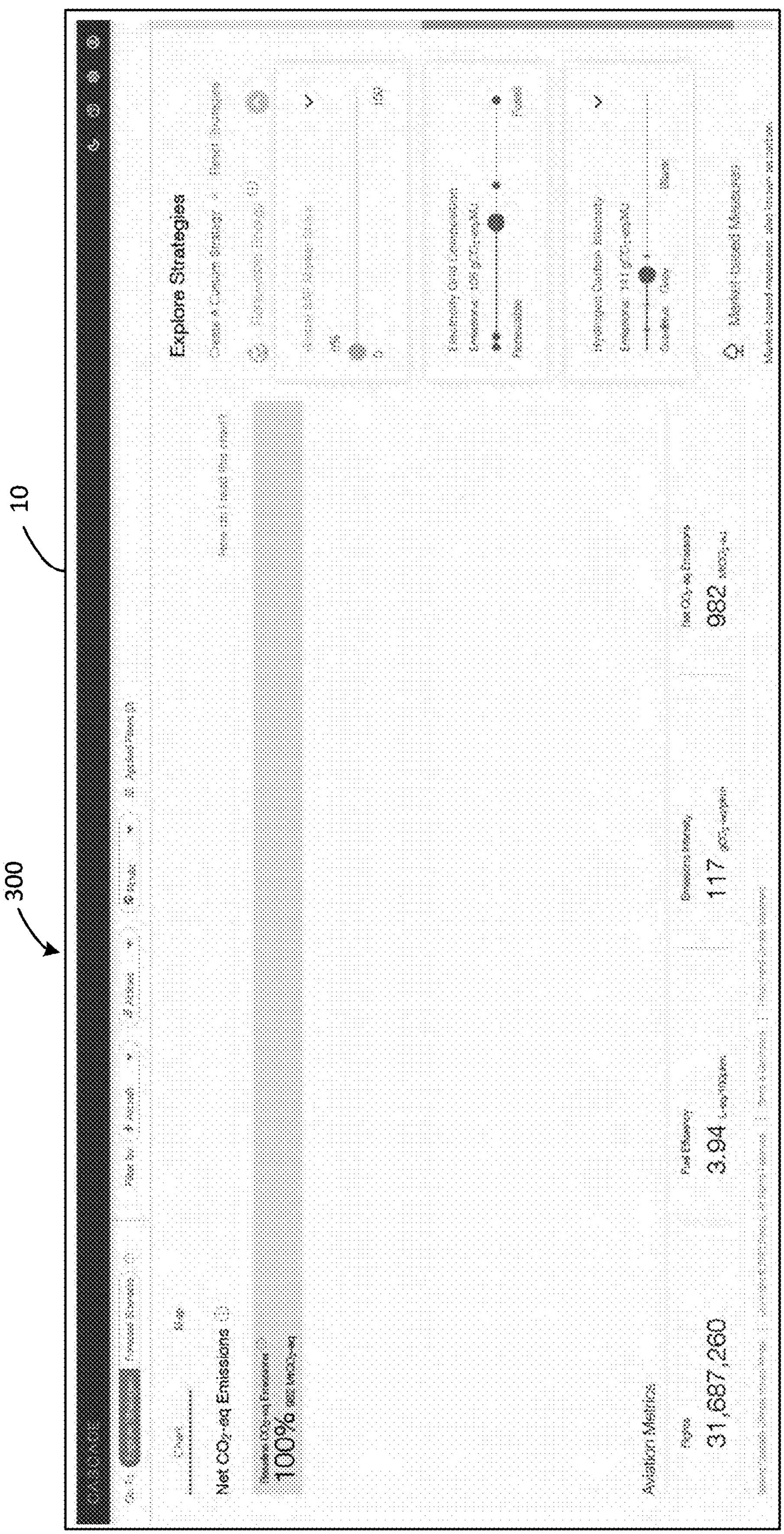
FIGS. 29A to 29C are screenshots of a fourth exemplary chart view included in the explore strategies view of FIG. 25A, the fourth chart view showing the CO2 emissions impact of various renewable energy strategies, in accordance with certain embodiments.
Figure 29B:
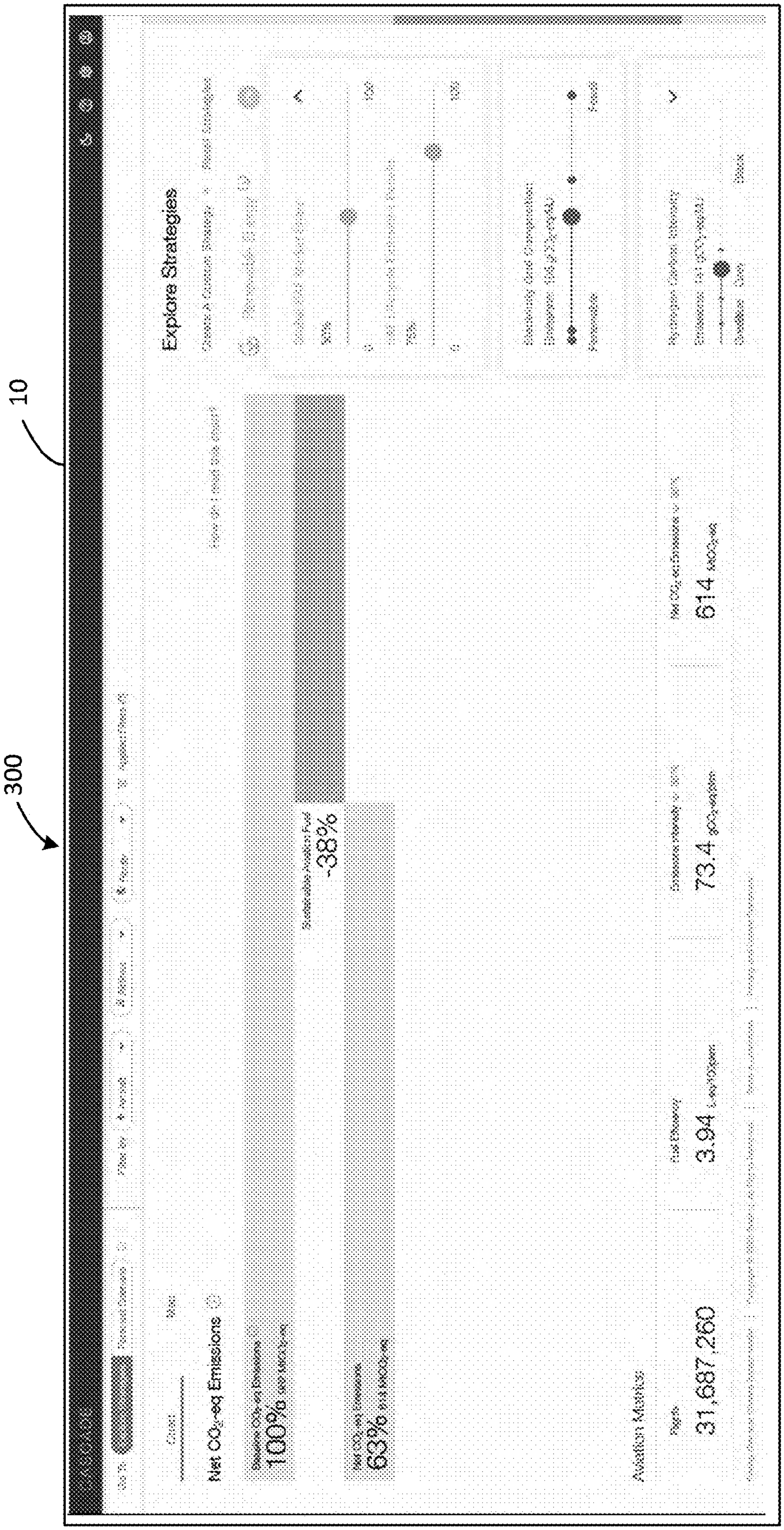
Figure 29C:
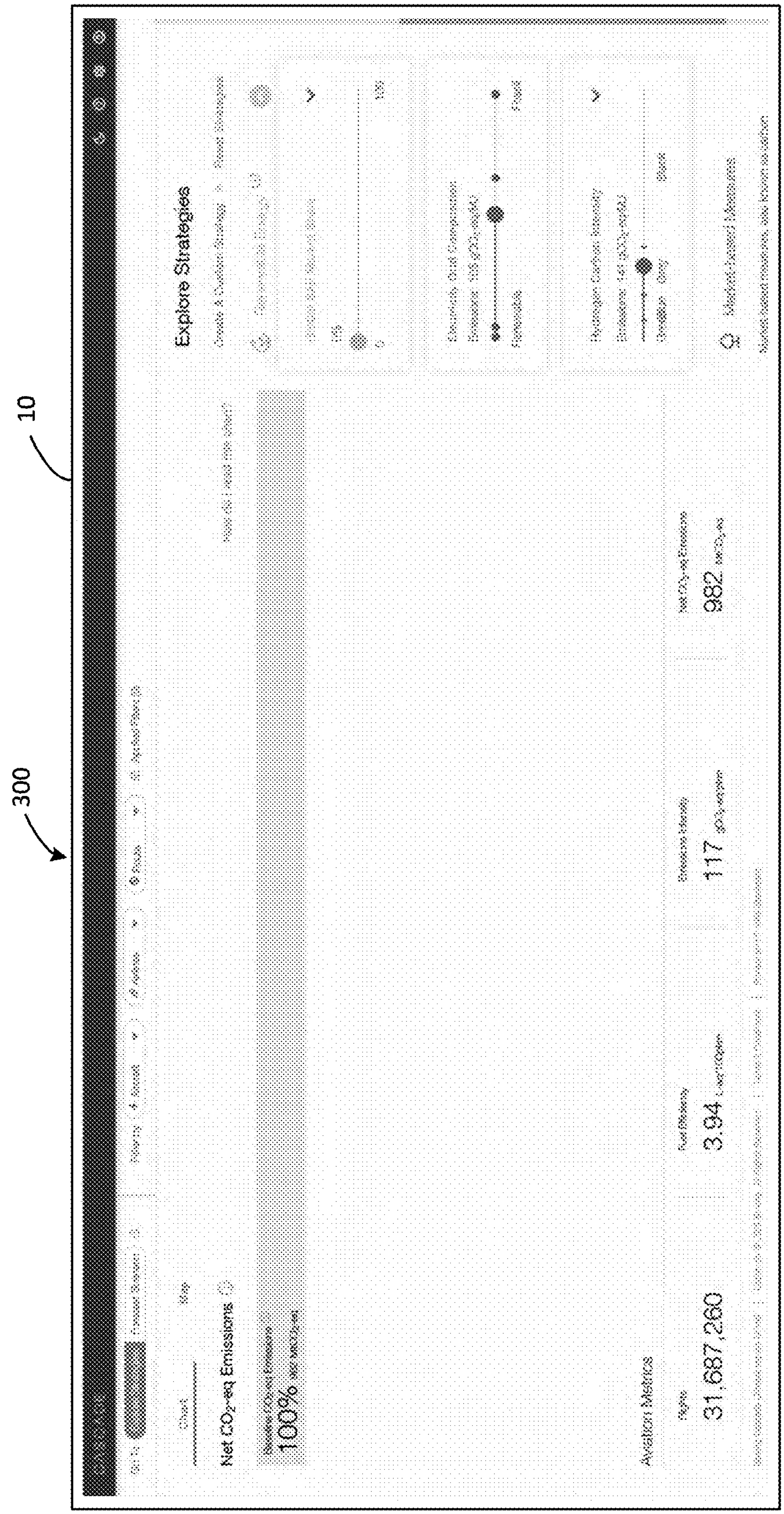
Figure 30A:
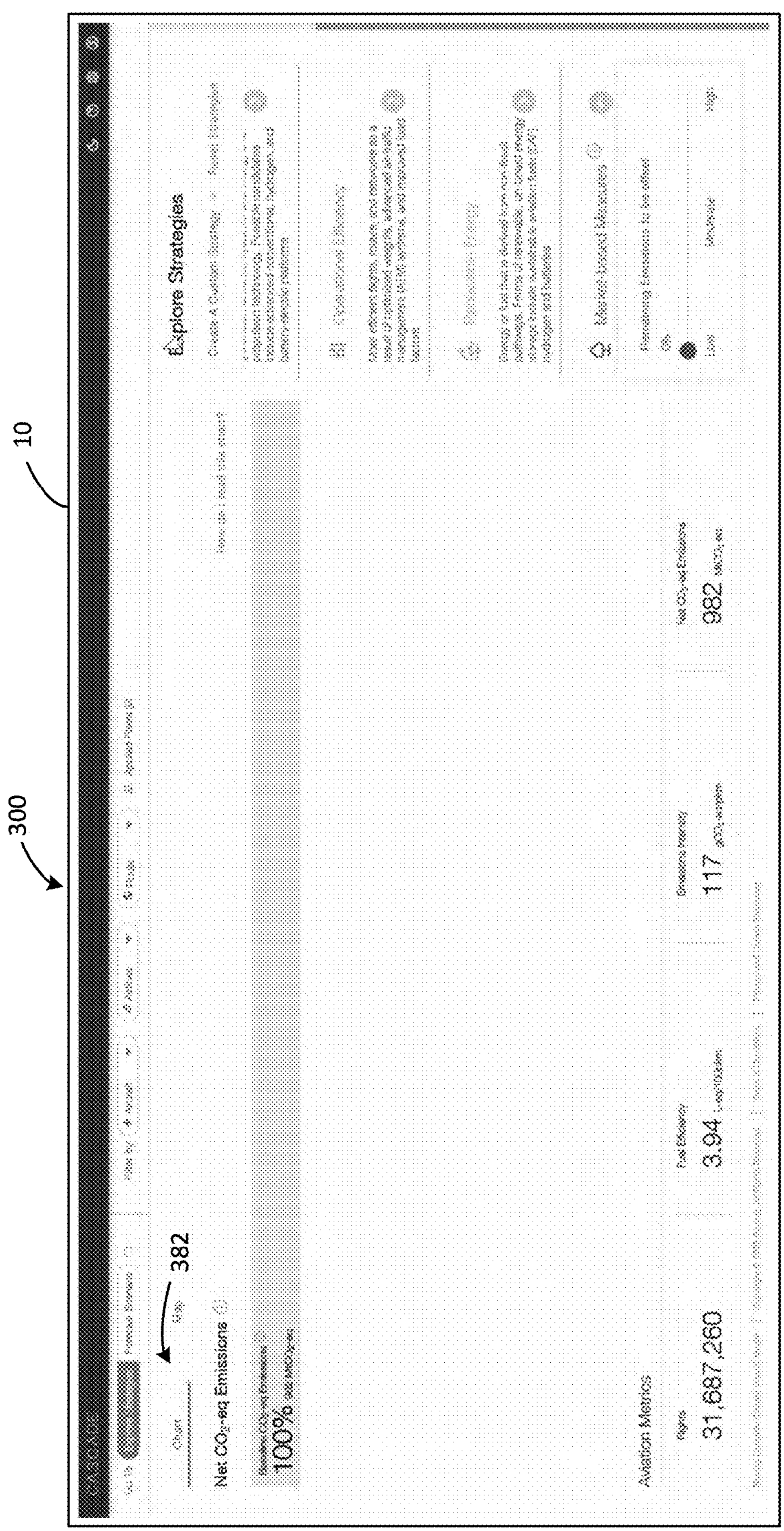
FIGS. 30A to 30C are screenshots of a fifth exemplary chart view included in the explore strategies view of FIG. 25A, the fifth chart view showing the CO2 emissions impact of various market-based measures strategies, in accordance with certain embodiments.
Figure 30B:
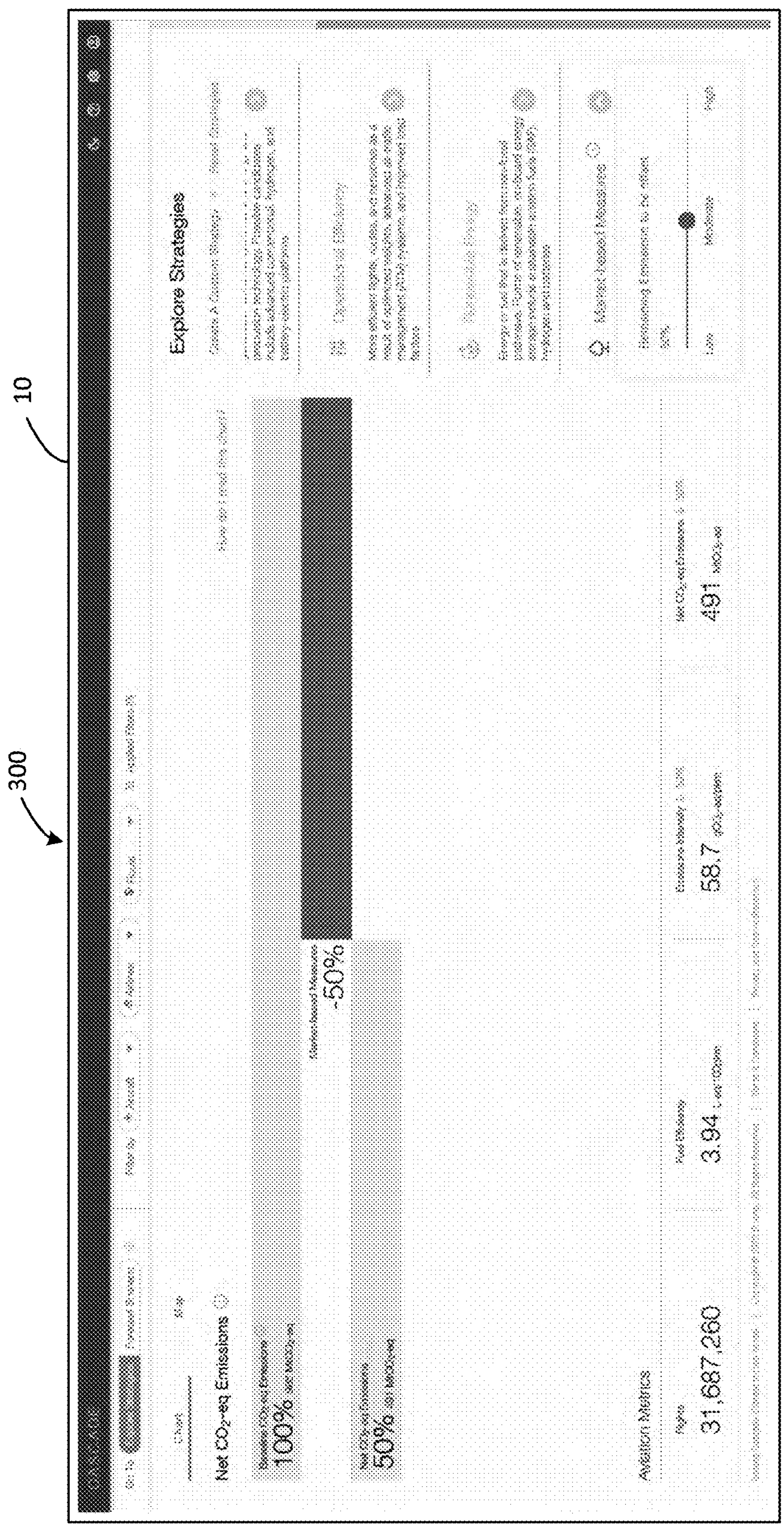
Figure 30C:
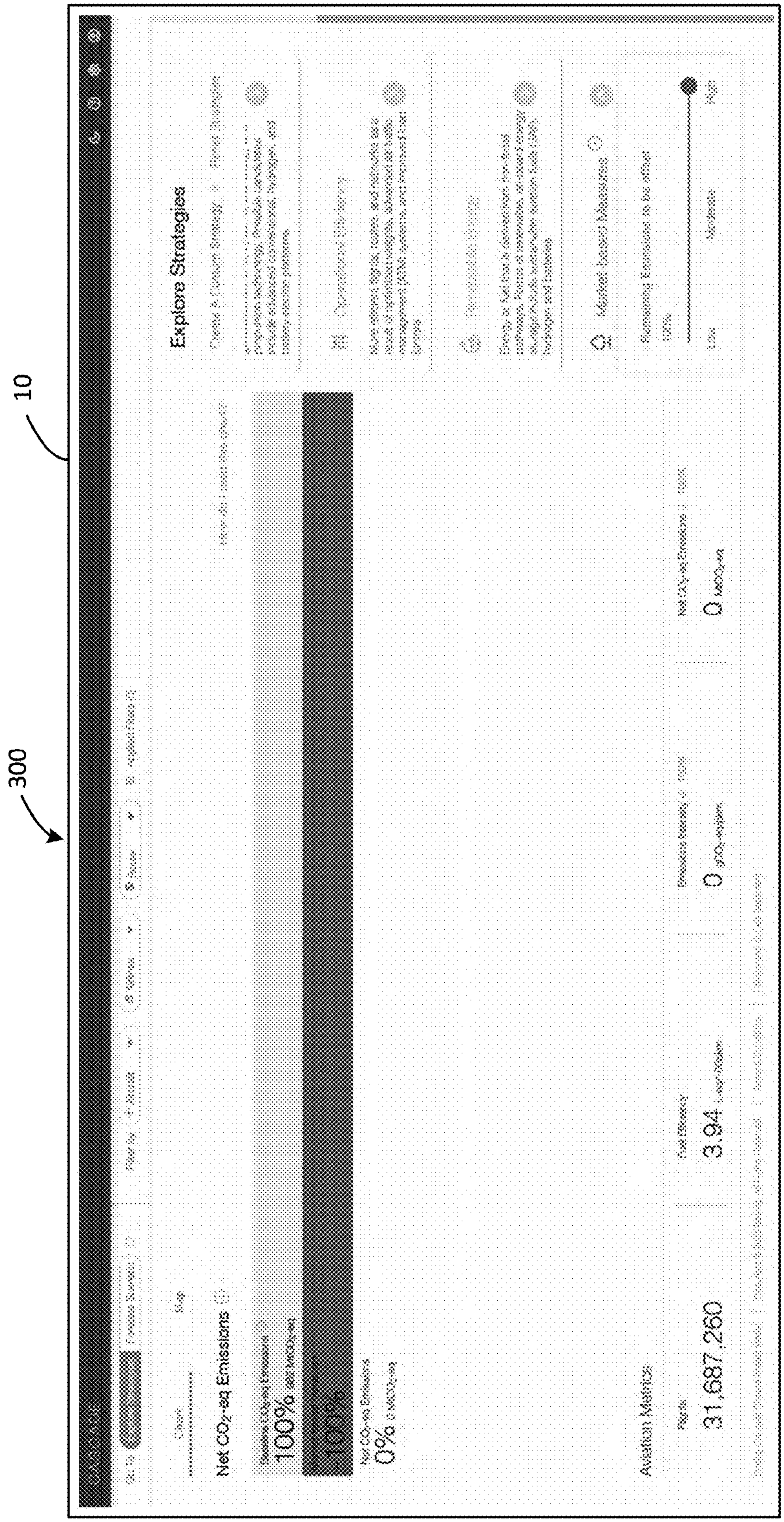
Figure 31A:
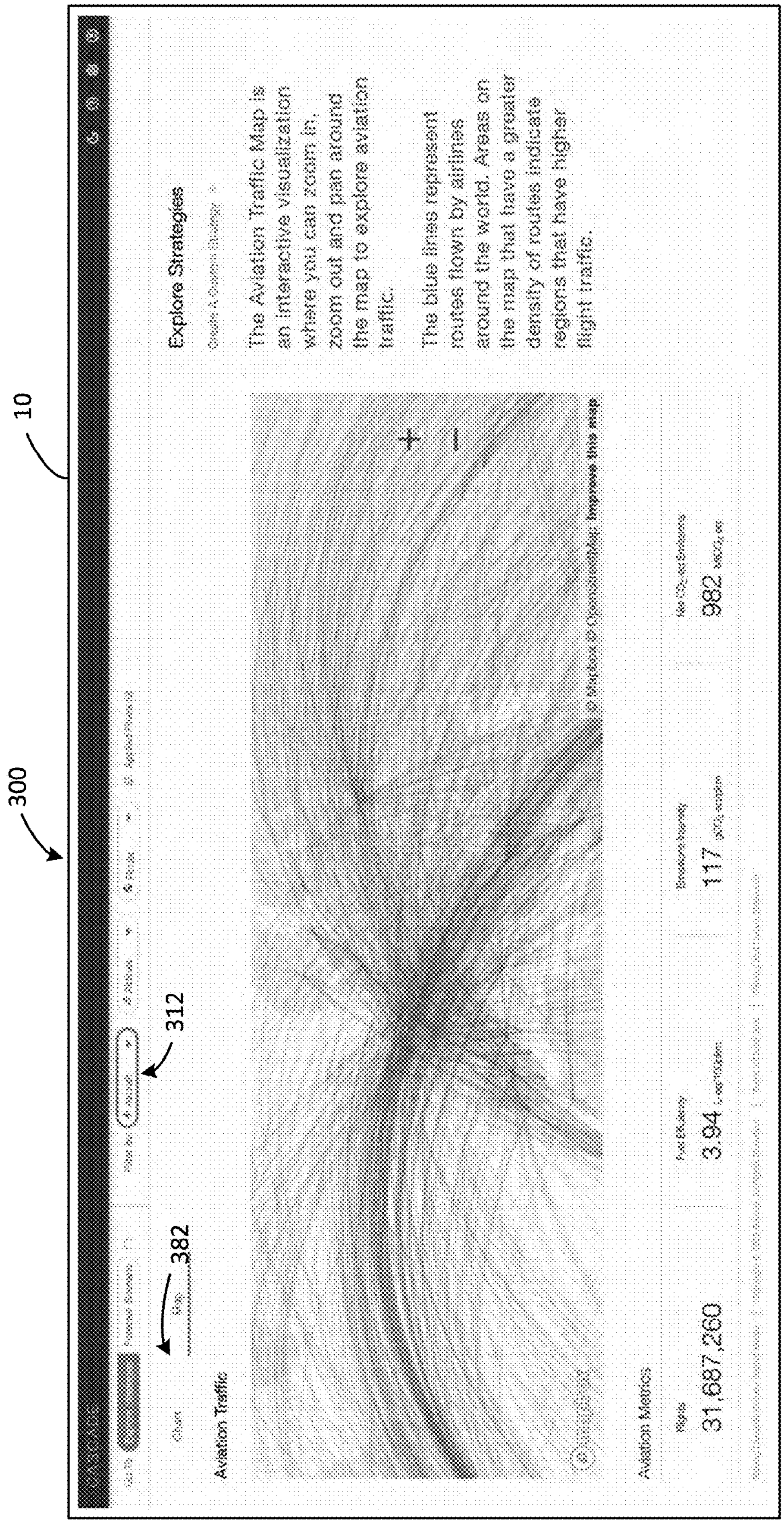
FIGS. 31A and 31B are screenshots of a first exemplary map view included in the explore strategies view of FIG. 25A, the first map view graphically depicting user selection of an aircraft filter option, in accordance with certain embodiments.
Figure 31B:
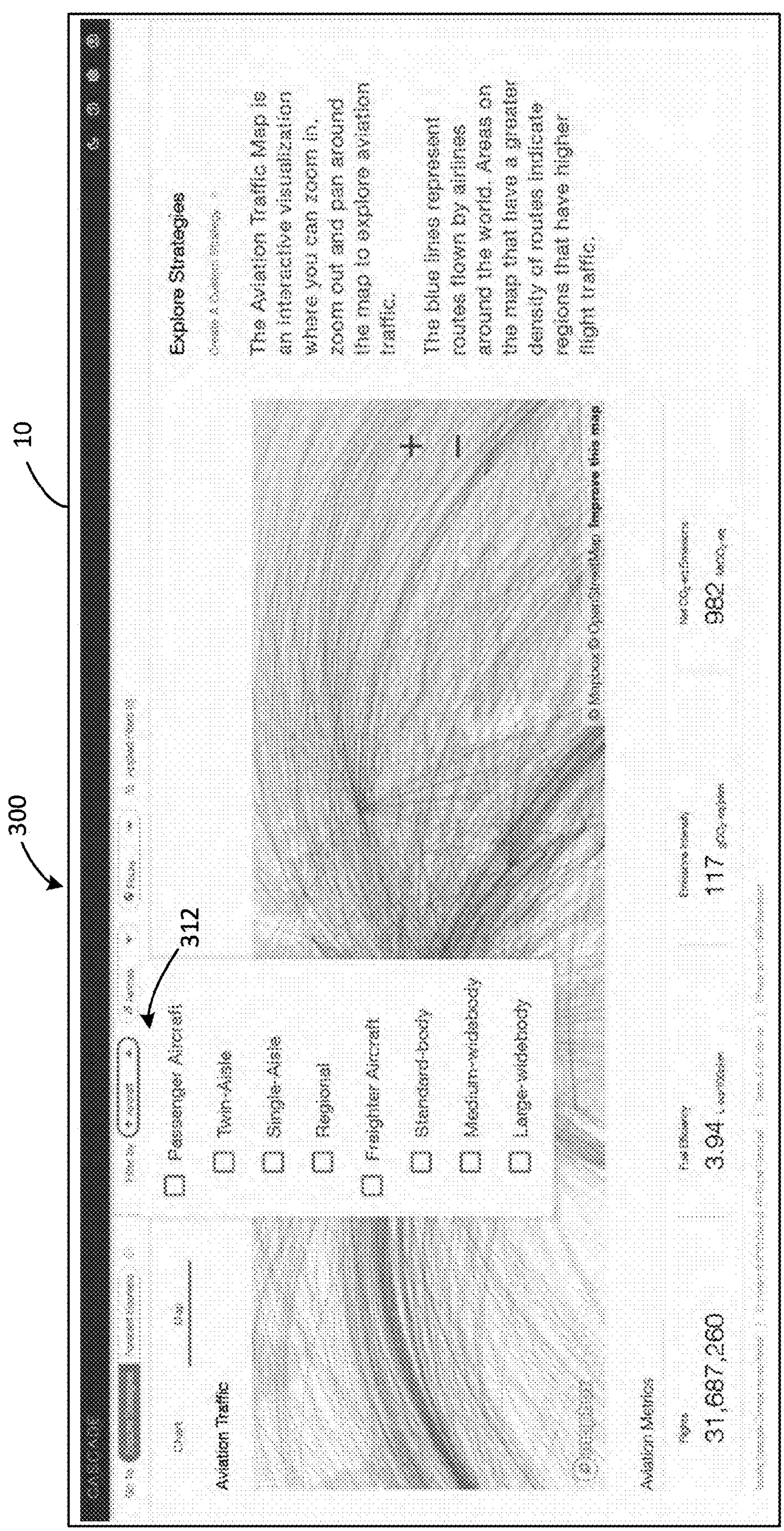
Figure 32A:
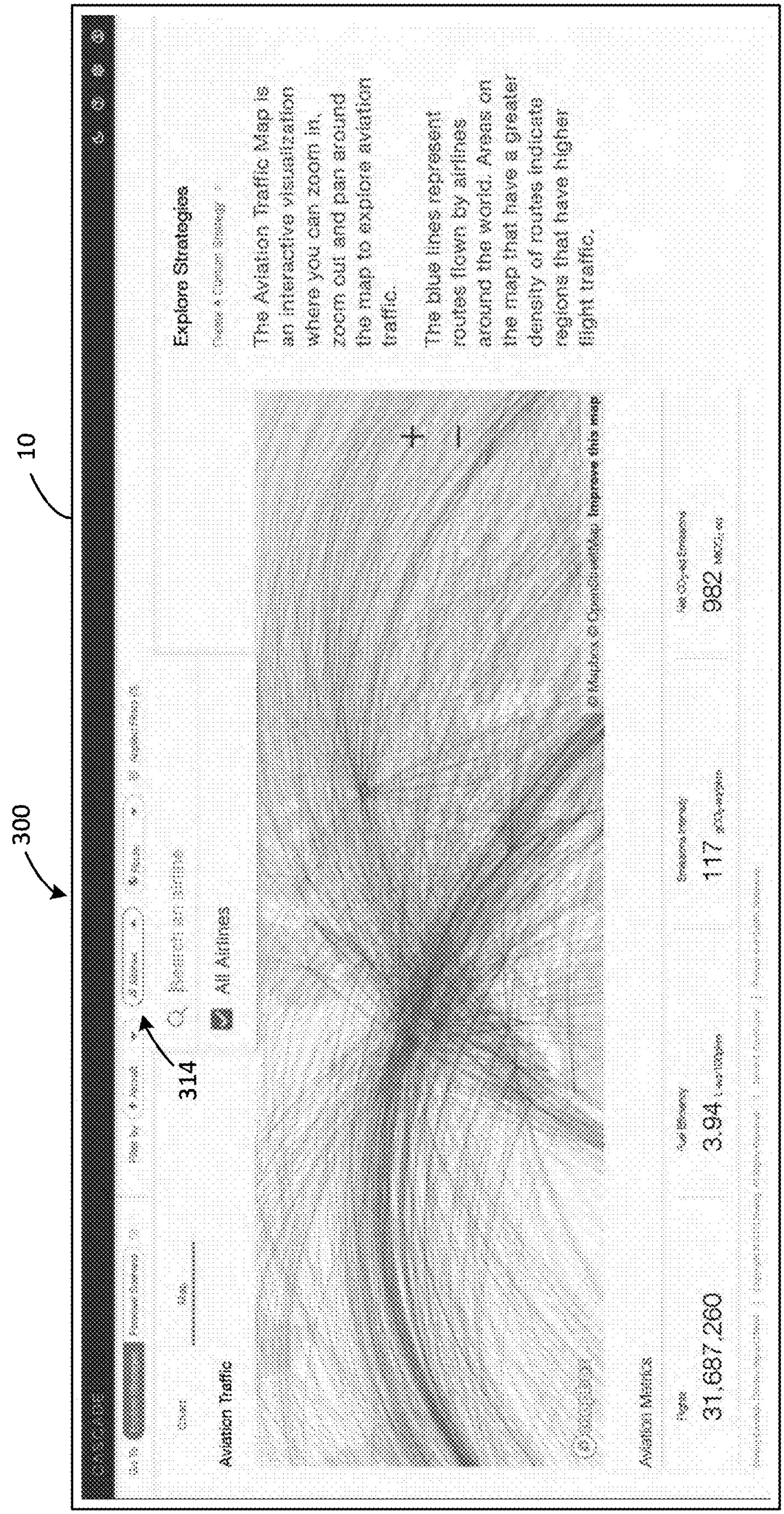
FIGS. 32A and 32B are screenshots of a second exemplary map view included in the explore strategies view of FIG. 25A, the second map view graphically depicting user selection of an airline filter option, in accordance with certain embodiments.
Figure 32B:
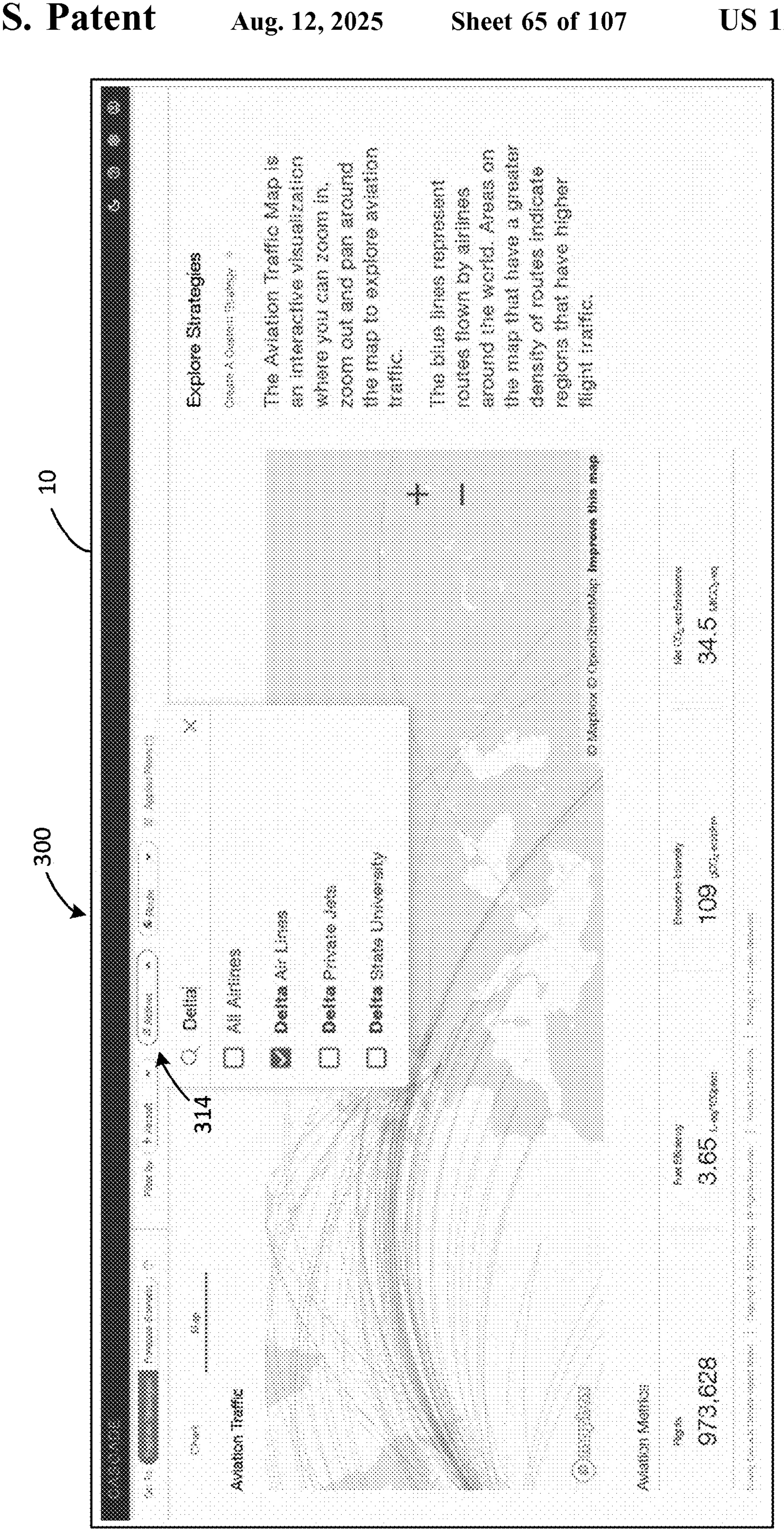

According to other embodiments, for example as shown in FIG. 25A, the GUI 300 may include a plurality of filter options 310 that are somewhat differ from the filter options 110. In particular, as shown in FIGS. 31A and 31B, the filter options 310 may include an aircraft filter 312 with a user-selectable option (e.g., drop-down menu) for selecting one or more types of aircrafts, like the aircraft filter 112. And as shown in FIGS. 32A to 32B, the filter options 312 may also include an airlines filter 314 with a user input area for enabling the user to enter a search term or phrase, such as, e.g., the name of a particular airline, and/or a list of user-selectable airlines options, like the airlines filter 114 and/or the airlines filter 214.

Unlike the filter options 110, however, the GUI 300 may include a route filter 360 for selecting a particular route or region for filtering the plurality of flight paths 102 shown on the map, as shown in FIGS. 33A to 33K. The route filter 360 may be included in place of, or in addition to, the distance filter 116, the origin filter 118, and/or the destination filter 120, for example. In the illustrated embodiment, upon user selection of the route filter 360, the GUI 300 is configured to provide (or display a drop-down menu comprising) two user-selectable options 362 for filtering the flight paths, such as, e.g., a first option 362*a* for selecting flights within, to, and from a single region, and a second option 362*b* for selecting flights between two specific regions.

Figure 33A:
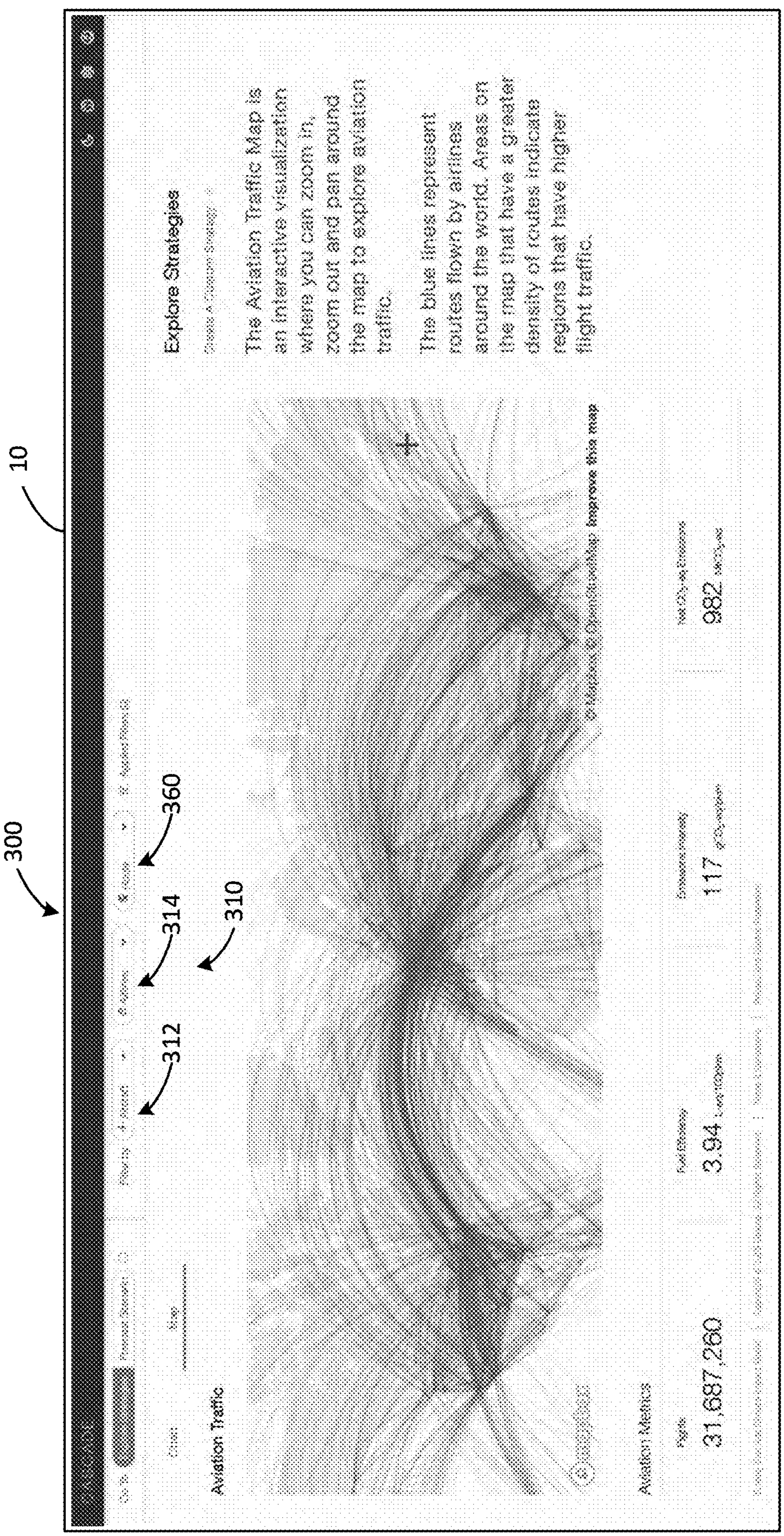
FIGS. 33A to 33K are screenshots of a third exemplary map view included in the explore strategies view of FIG. 25A, the third map view graphically depicting user selection of various route filter options, in accordance with certain embodiments.
Figure 33B:
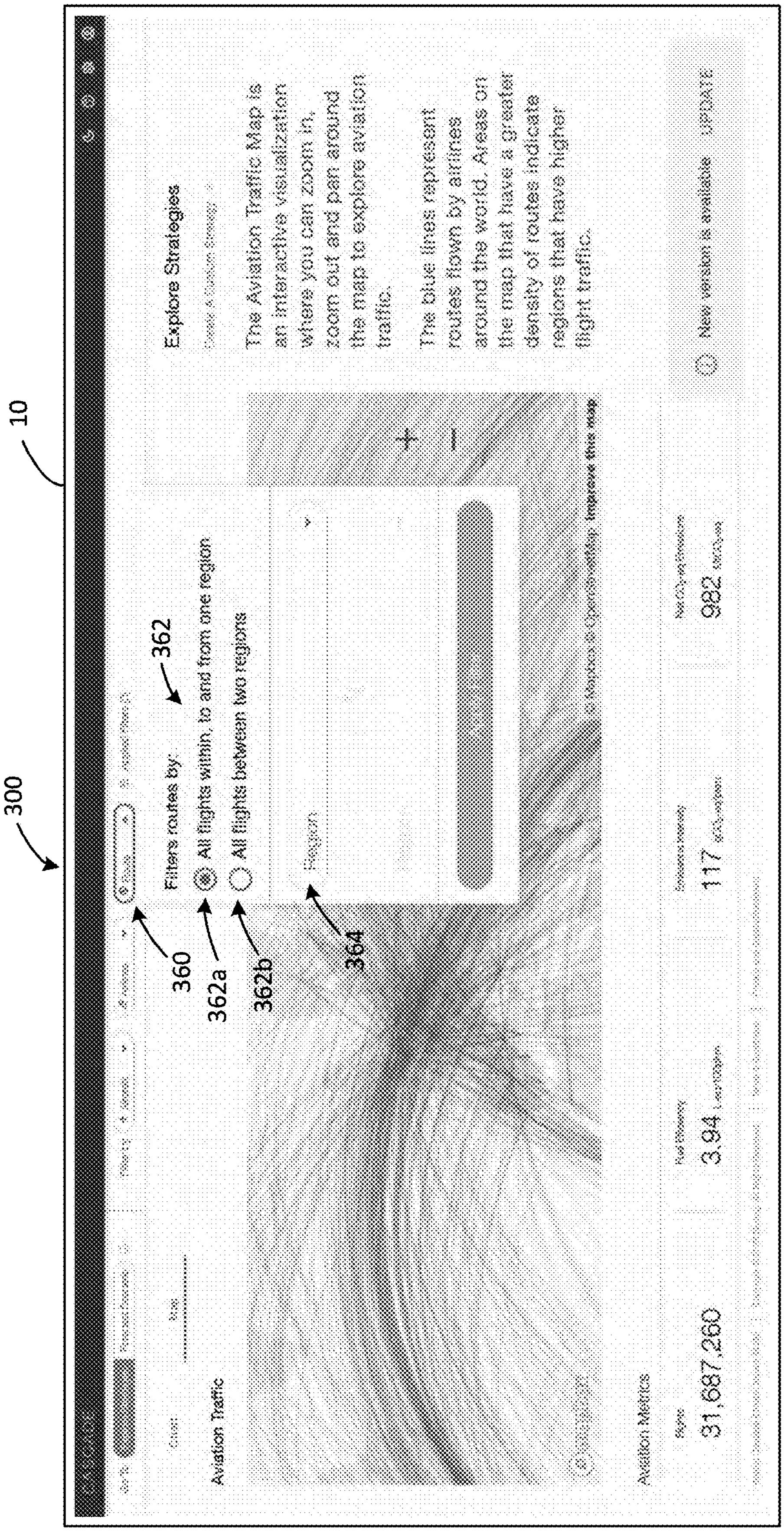
Figure 33C:
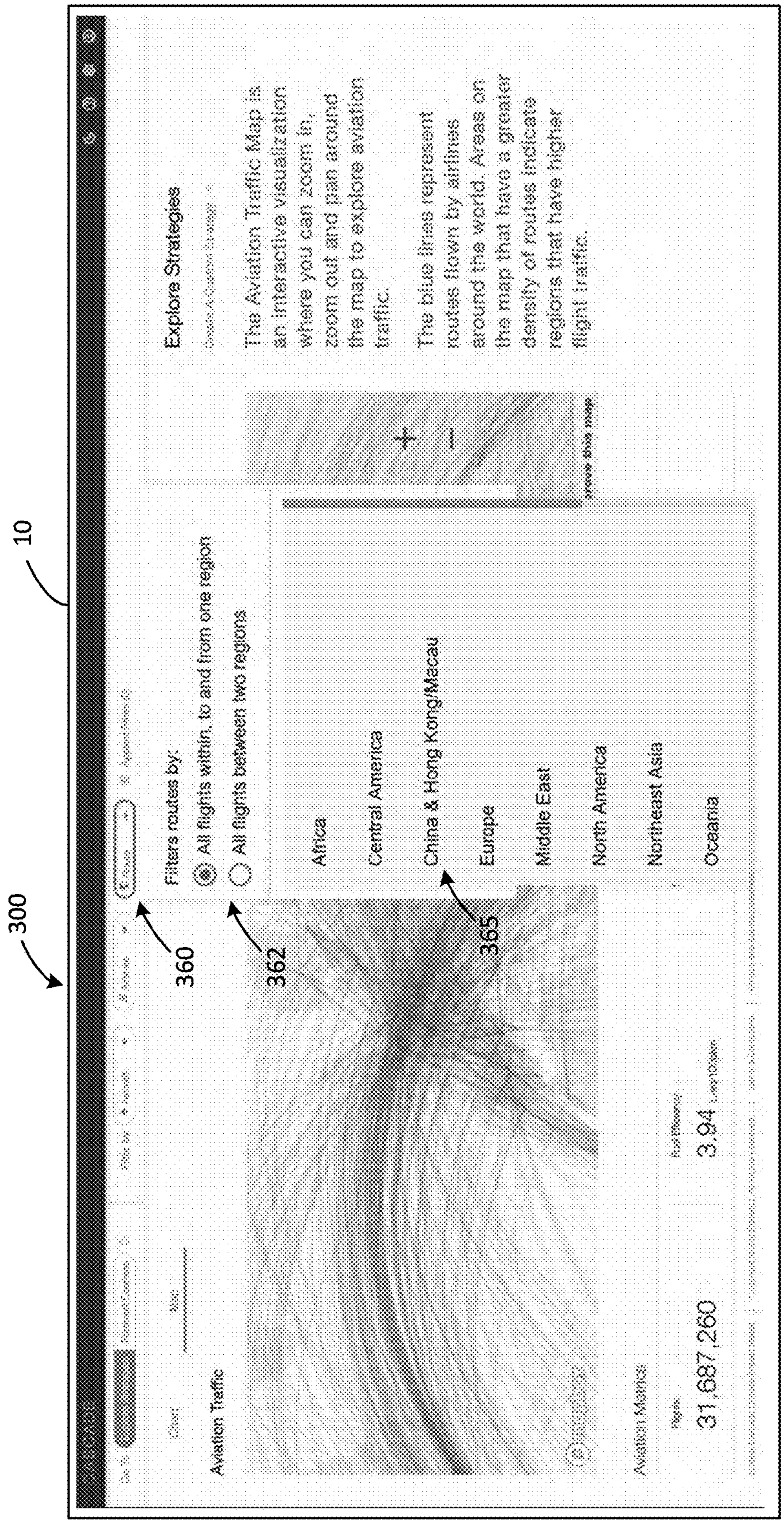
Figure 33D:
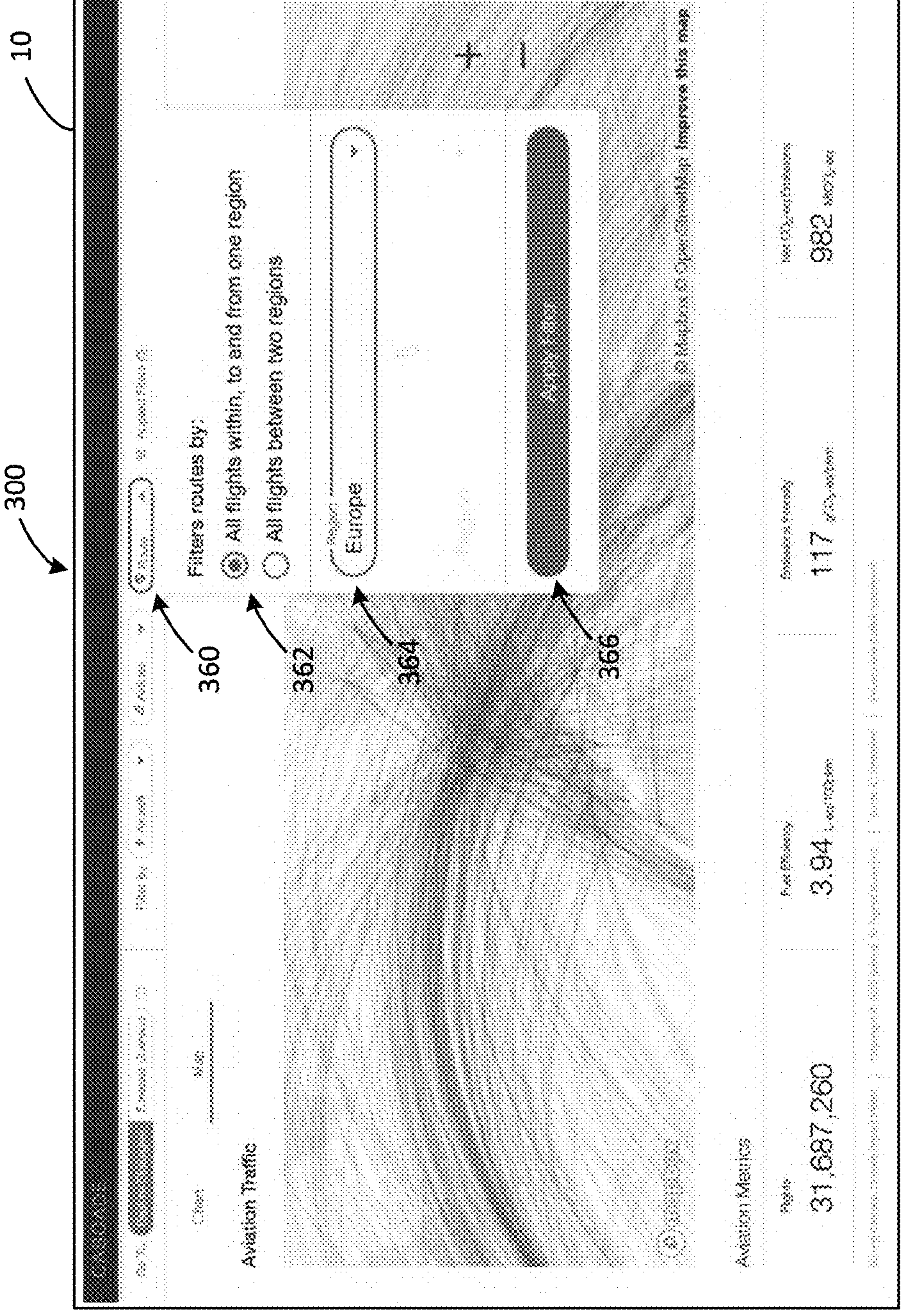

As shown in FIGS. 33B to 33D, user selection of the first option 362*a* causes a user-selectable region option 364 to appear, and selection or expansion of the region option 364 causes a list of user-selectable regions 365 to be displayed below the two options 362 and/or in place of, or on top of, the region option 364. Once a specific region is selected from the list of regions 365, the selected region may be displayed in the region option 364 and an "Apply Filter" option 366 may appear, or become activated (e.g., user-selectable), within the route filter 360.

Figure 33E:
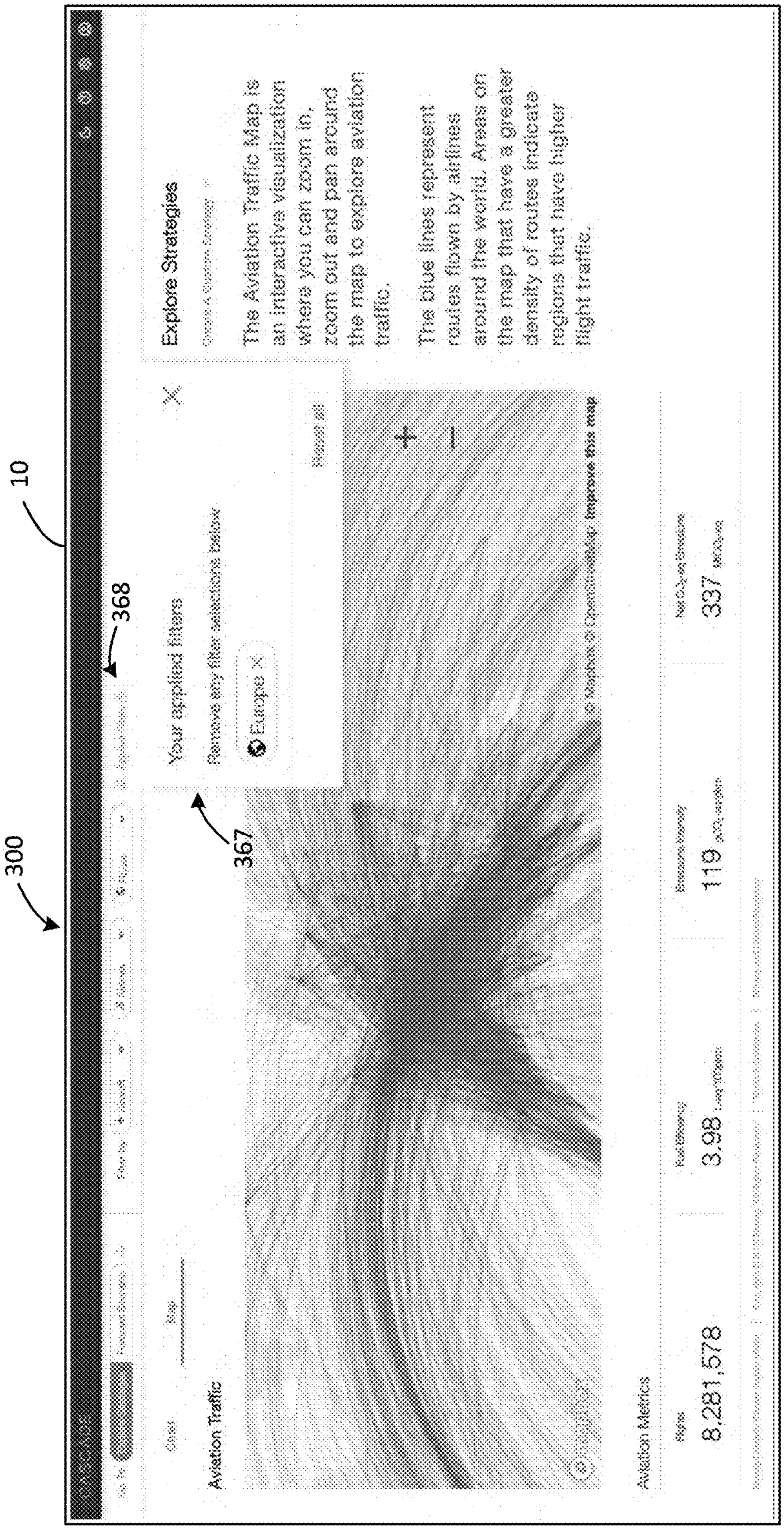
Figure 33F:
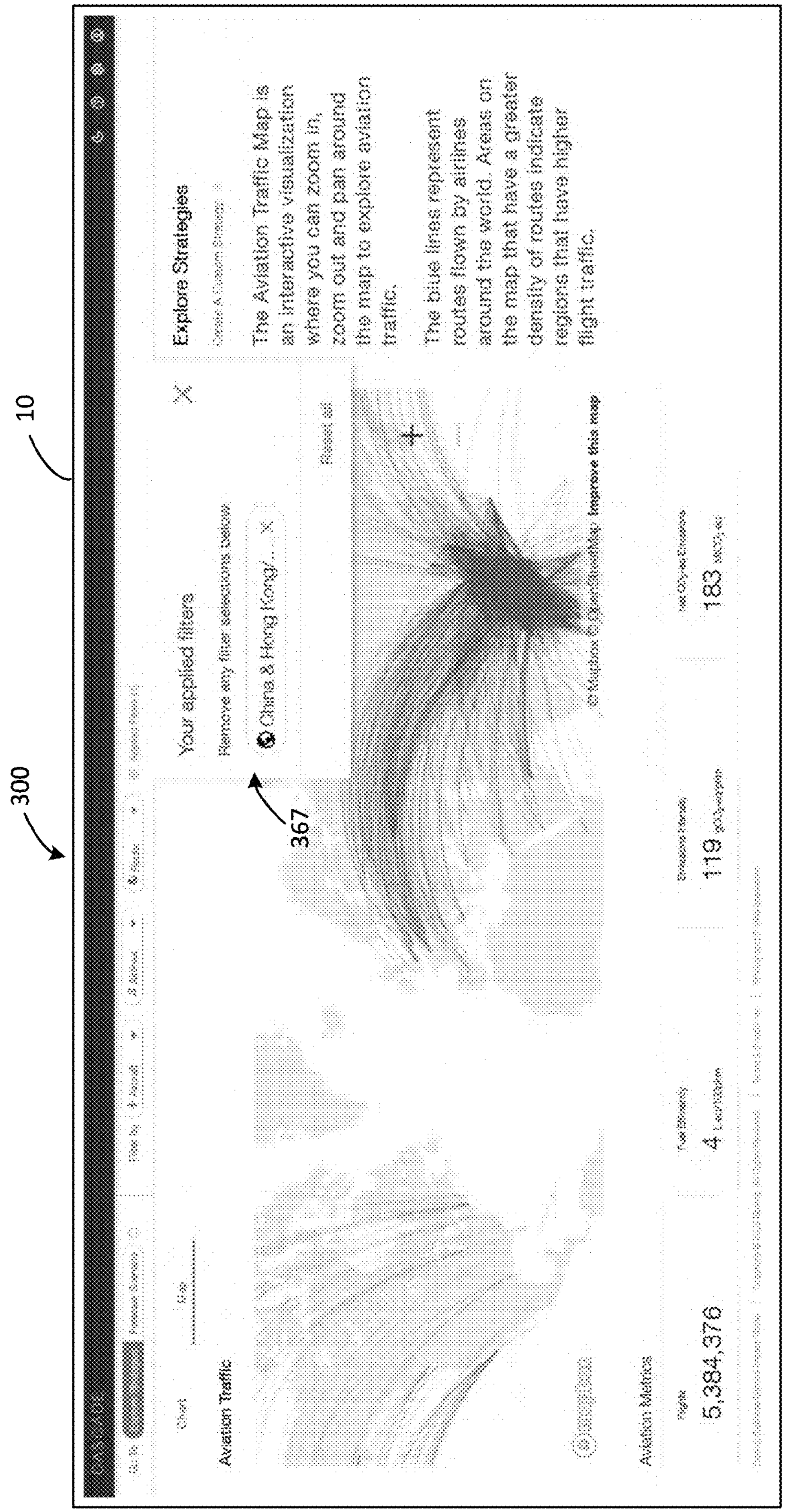

Once the route filter 360 is applied, the drop-down menu(s) may close and an applied filter window 367 may appear. As shown in FIG. 33E, the applied filter window 367 can be configured to display any applied filters and provide a user-selectable option to remove one of the applied filters, or reset all filters. As can be seen from FIGS. 33E to 33F, the flight paths 102 displayed on the map view may be adjusted based on the routes selected using the routes filter 360, e.g., so that only the flight paths 102 within the selected route are displayed on the map view.

Figure 33G:
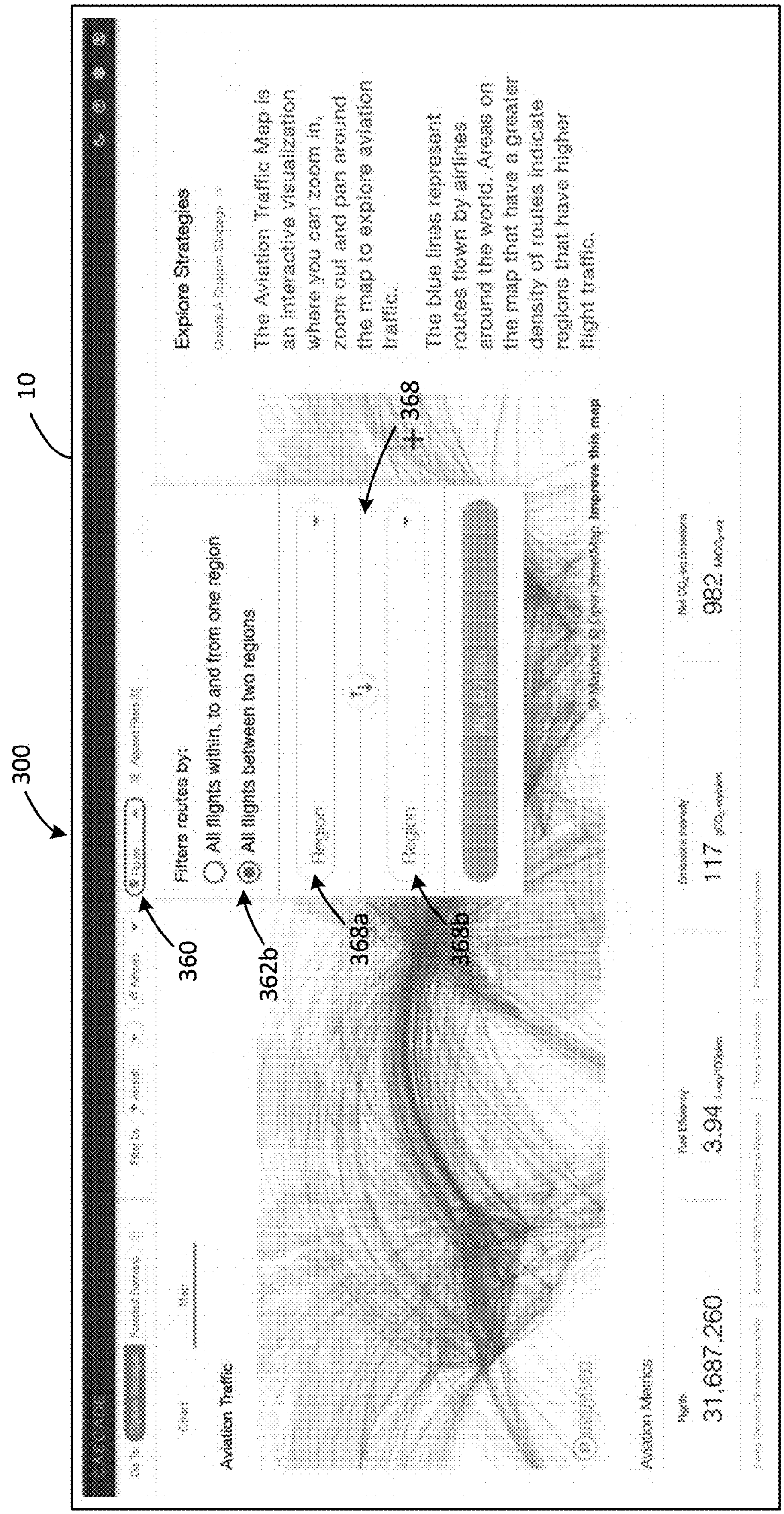
Figure 33H:
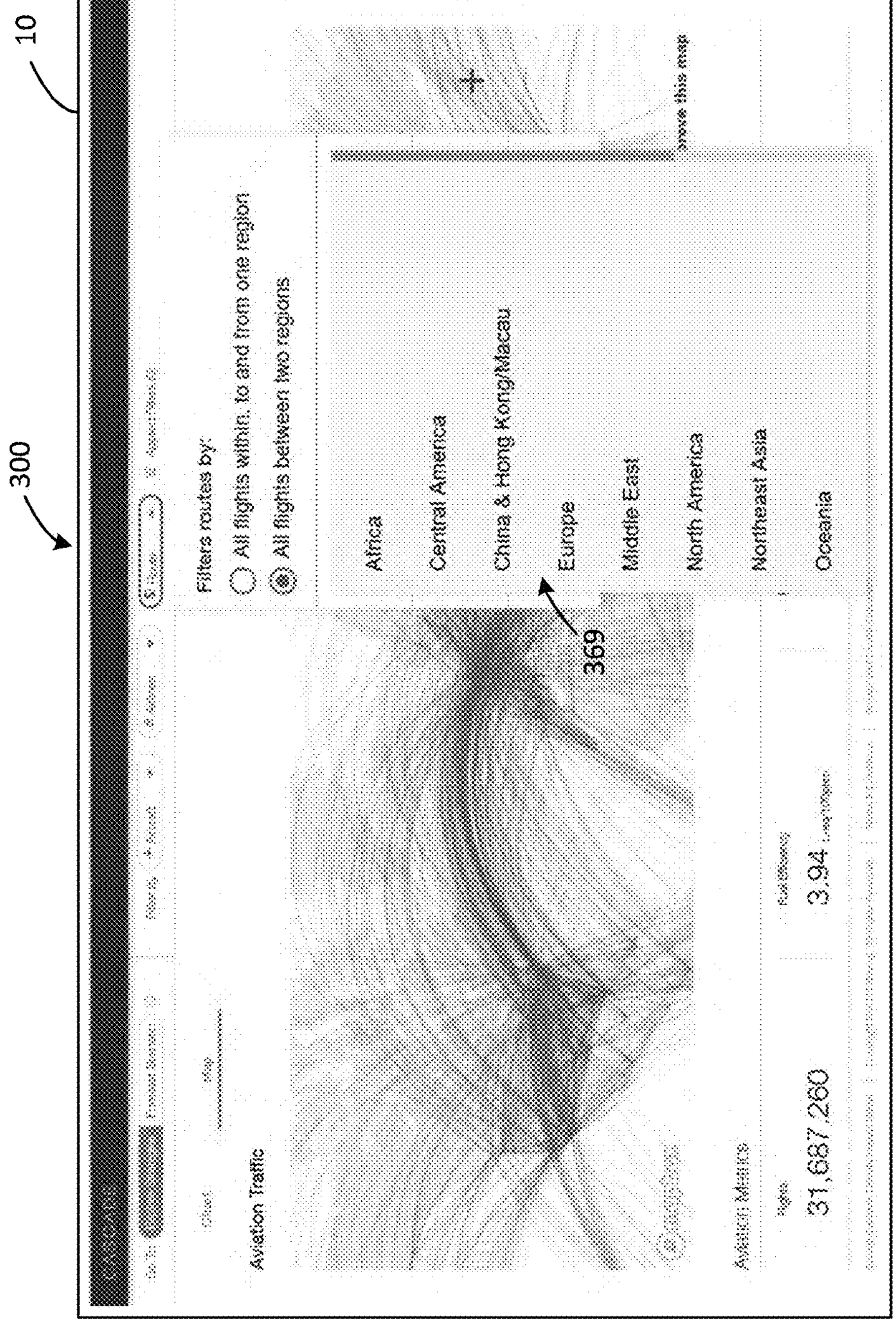
Figure 33I:
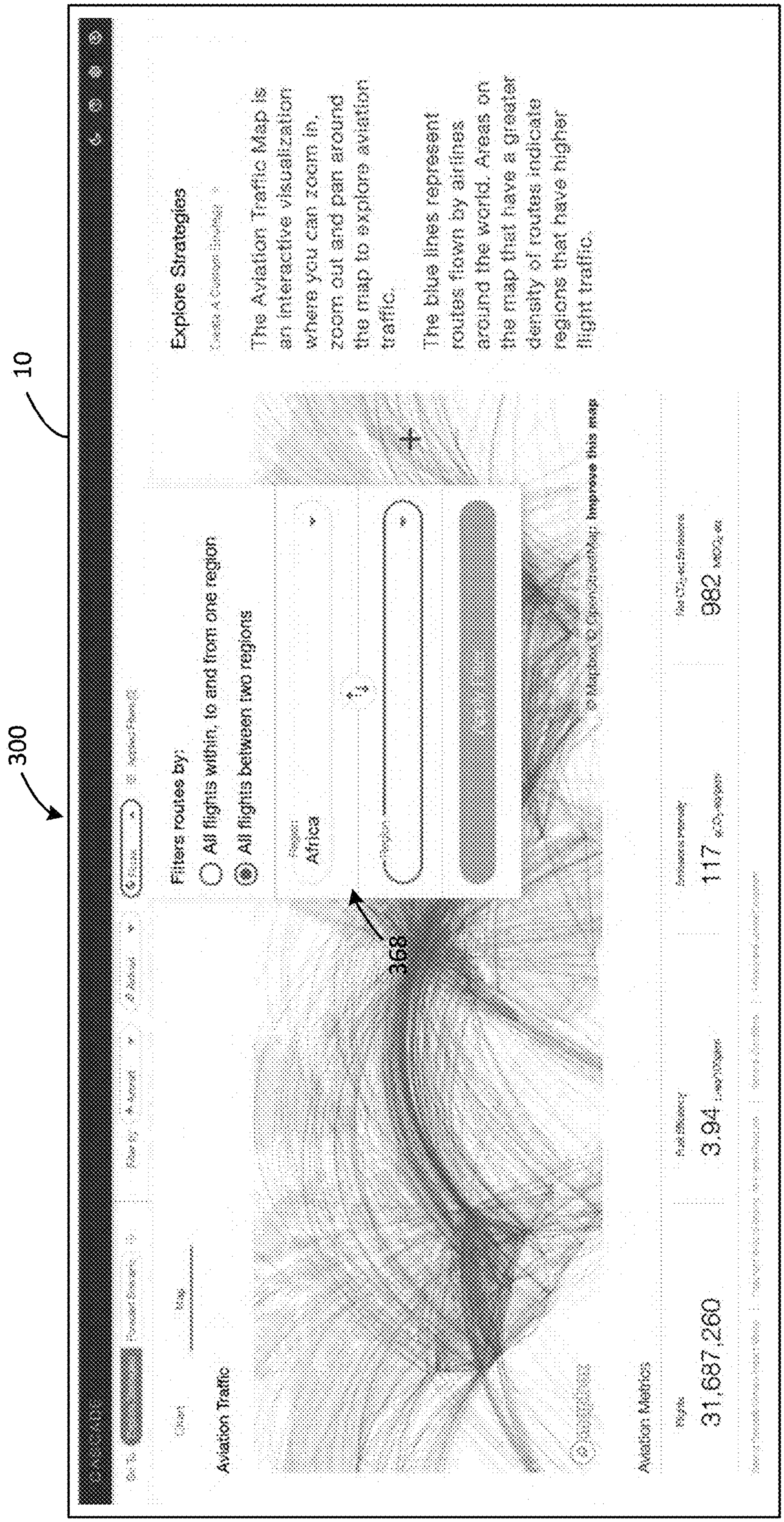
Figure 33J:
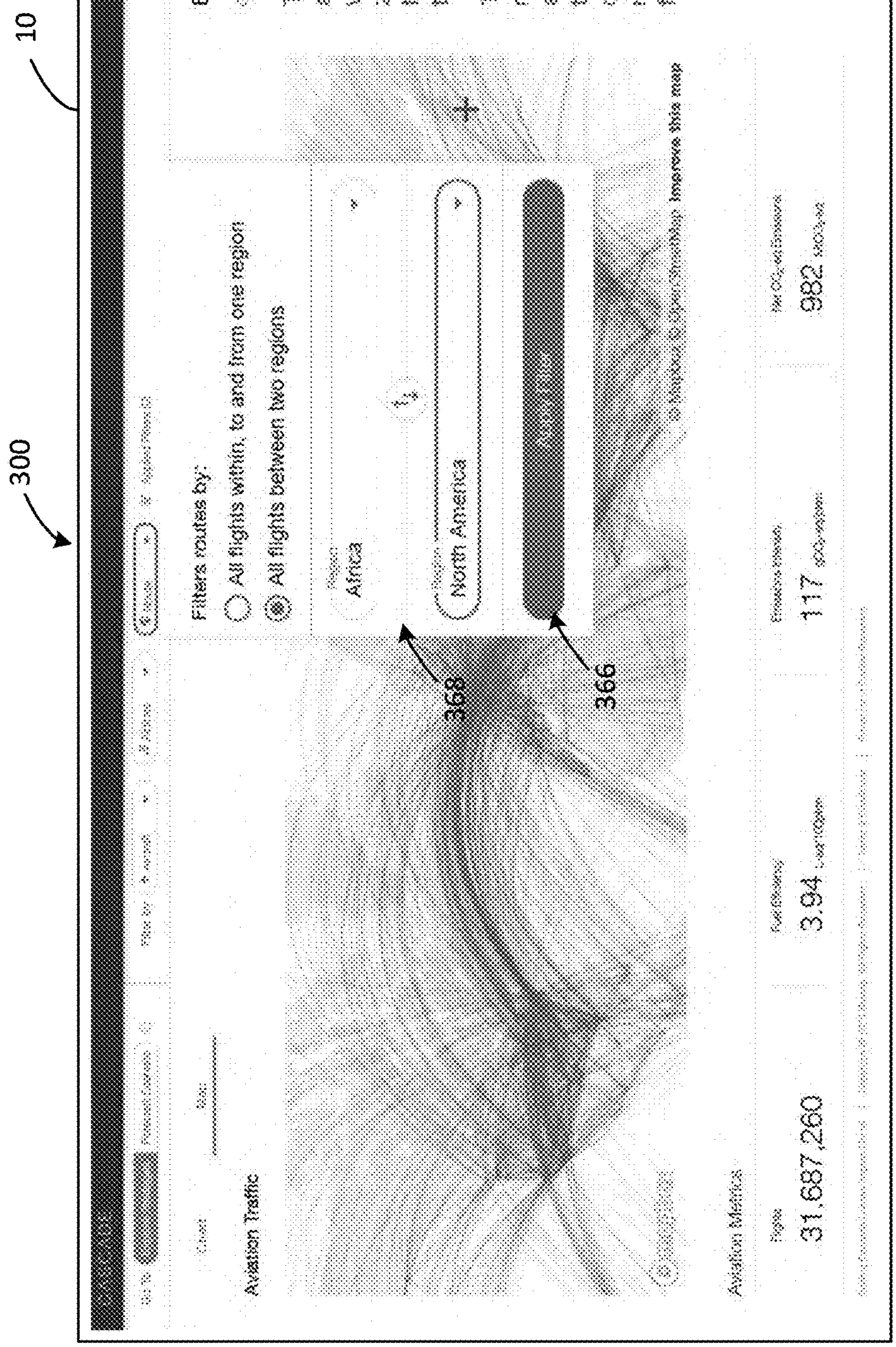
Figure 33K:
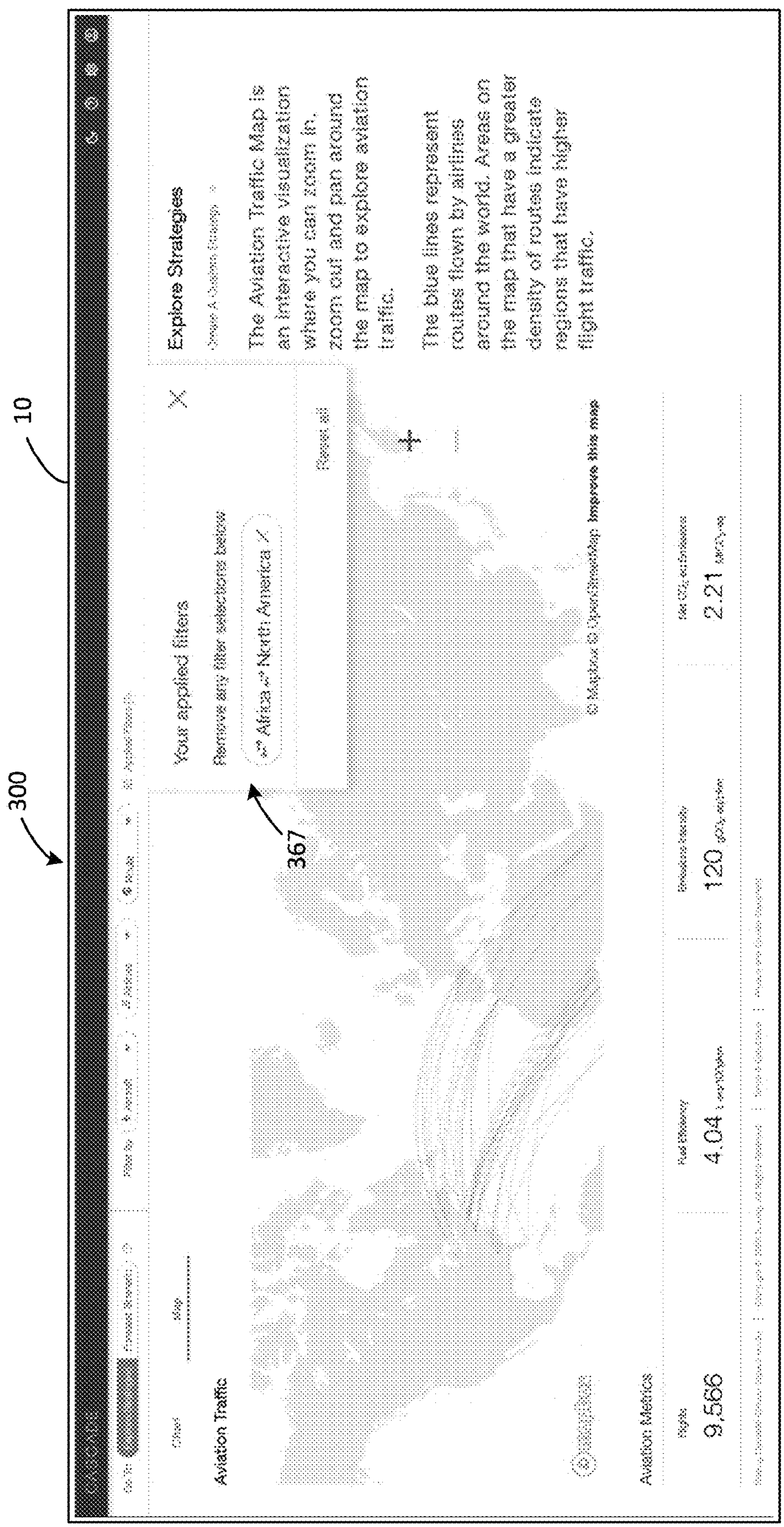

As shown in FIGS. 33G, user selection of the second option 362*b* causes two region options 368 to appear for selecting a particular range of geographical areas for flight path filtering purposes. User selection of either region option 368*a*, 368*b* causes a corresponding user-selectable list of regions 369 to appear (e.g., as a drop-down menu), for example, as shown in FIG. 33H. Once a region is selected from the list 369, the drop-down menu may close or collapse, and the selected region may be displayed in the corresponding region option 368*a*, 368*b*, for example, as shown in FIGS. 331 and 33J. Once both regions are selected or populated, the Apply Filter option 366 may be activated, selection of which may cause the flight paths 102 displayed on the map view to be correspondingly filtered and the applied filter window 367 to be displayed, as shown in FIG. 33K.

Figure 7:
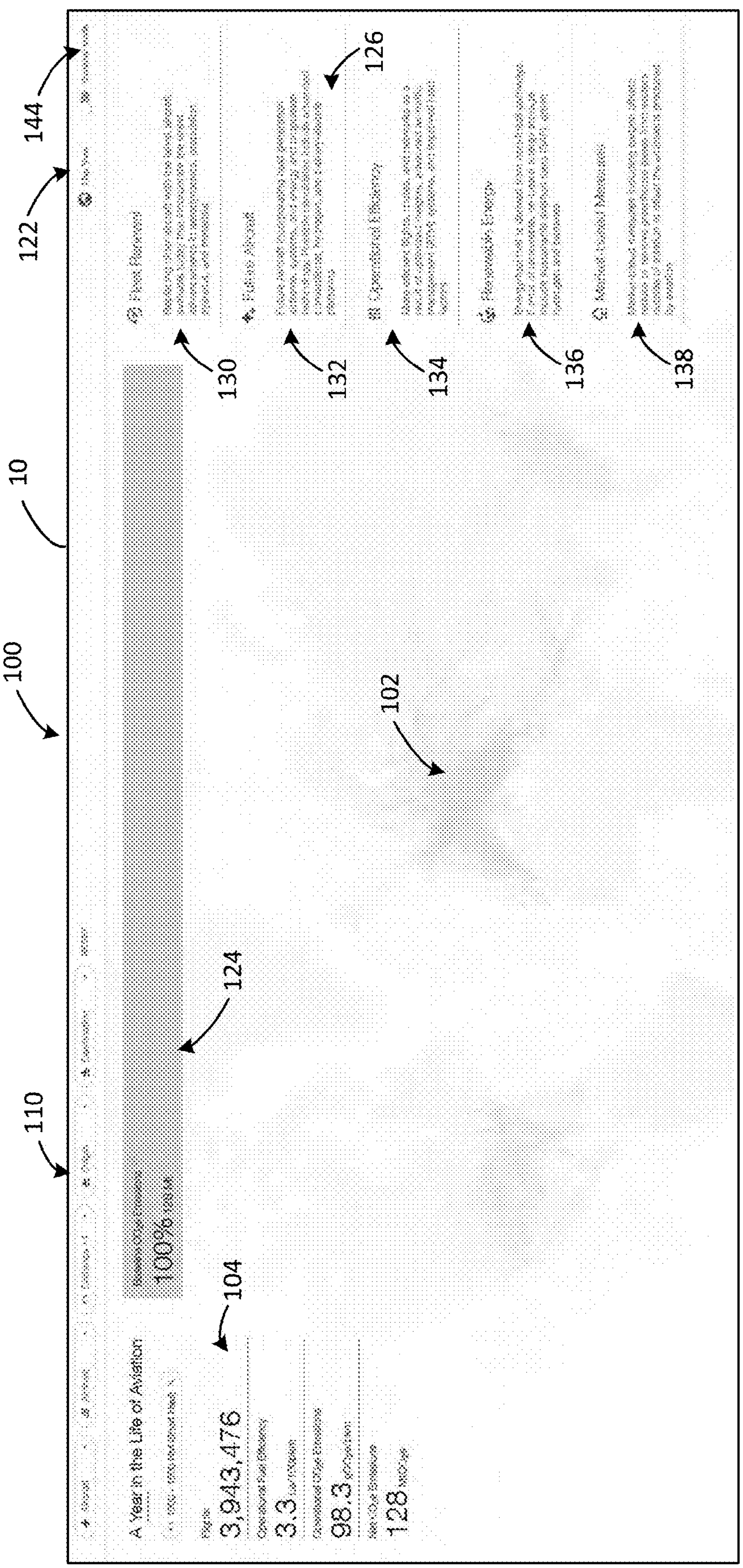
FIG. 7 is a screenshot of an exemplary graphical user interface for depicting a chart view of the dynamic aviation emissions modeling tool, the chart view including the flight paths shown in FIG. 6 along with the corresponding emissions data, in accordance with certain embodiments.

Referring back to FIGS. 1 and 6, the GUI 100 also includes a user-selectable view option 122 for changing the map view to a chart view. The user-selectable view option 122 may include one or more icons, text, or any combination thereof for representing its underlying function. In some cases, selection of the option 122 may cause the map view to fade to the background, so that the chart view can be displayed on top of the map view, for example, as shown in FIGS. 7-9. In other cases, the chart view may be displayed on the GUI 100 in place of the map view. As shown in FIG. 7, the view option 122 changes to "map view" when the GUI 100 is configured to display the chart view, such that selection of the view option 122 in FIG. 7 would cause the chart view to be replaced with the map view (i.e. switch back to FIG. 6).

As shown in FIG. 7, the chart view includes a baseline CO2 emissions graphic 124 that displays a baseline $CO_2e$ emissions percentage (i.e. 100%) for the flight paths 102 displayed in the map view and a numerical baseline value for the same emissions data (e.g., 128 Mt). In embodiments, the baseline graphic 124 is a static gray bar that extends full length, or across an assigned area of the GUI 100, and remains as shown, even as other parts of the chart view change dynamically, as described herein.

As also shown in FIG. 7, the chart view further includes a plurality of user-selectable strategy graphics 126 (also referred to as "levers") configured to enable the user to select and/or adjust respective sustainability strategies for reducing CO2 emissions of the flight paths 102 selected in the map view. The strategy graphics 126 are initially shown only as headlines with icons and short explanatory text below each. The chart view may display only the baseline graphic 124 and the initial headlines and/or text for the graphics 126 until the user selects one of the strategy graphics 126 or otherwise activates a given strategy.

As shown in FIG. 8, the chart view further includes a bar chart 128 (also referred to as a "waterfall chart") configured to graphically depict a predicted impact on CO2 emissions for each sustainability strategy selected using the strategy graphic 126. The bar chart 128 may include a one or more colored bars for visually representing the reduction in CO2 emissions caused by introduction of the corresponding sustainability strategy, as described herein. The bar chart 128 may appear once the user selects one of the strategy graphics 126 and/or adjusts a parameter of the selected graphic 126.

Once the bar chart 128 is displayed, a net emissions graphic 129 may be displayed below the bar chart 128 in order to show the overall remaining CO2 emissions, or net $CO_2$ emissions, after implementing the selected sustainability strategy. The net emissions graphic 129 may be presented as a gray bar, like the baseline graphic 124, with a length or size selected based on the net amount of emissions remaining after introduction of the selected strategy. For example, a length of the gray bar shown in the net emissions graphic 129 plus the lengths of any colored bars in the bar chart 128 may equal a total length of the gray bar shown in the baseline graphic 124. The net emissions graphic 129 may also include a textual display of a numerical percentage value and a total amount (in Mt) of the reduction. The GUI 100 may also dynamically display or depict the CO2 emissions impact of the selected strategies in other areas as well, such as, e.g., the metrics shown in the table 104.

In various embodiments, each of the strategy graphics 126 includes a slider for selecting and/or adjusting one or more parameters associated with the corresponding sustainability strategy. In general, the sliders are configured to provide visual indication of adjustable content associated with the reduction strategies and enable the user to increase or decrease the parameter values by moving the slider along a horizontal scale or track. In embodiments, each slider is associated with a corresponding bar of the bar chart 128, such that adjusting the sliders has a direct and dynamic effect on the bar chart 128. For example, each of the bars of the bar chart 128 may be configured to increase or decrease in size (or emissions reduction value) depending on the parameter value selected for the corresponding strategy using the associated slider. The bar chart 128 may also be configured to display the actual reduction in CO2 emissions caused by each strategy as a numeric percentage or other numeric value. In other embodiments, other input devices may be used in place of the sliders, such as, e.g., for example, user-selectable buttons, radio buttons, dials, drop-down menus, data entry fields, and more. Such input devices can be similarly linked to the bar chart 128 in order to directly and dynamically depict the CO2 emissions impact of each strategy.

Figure 9A:
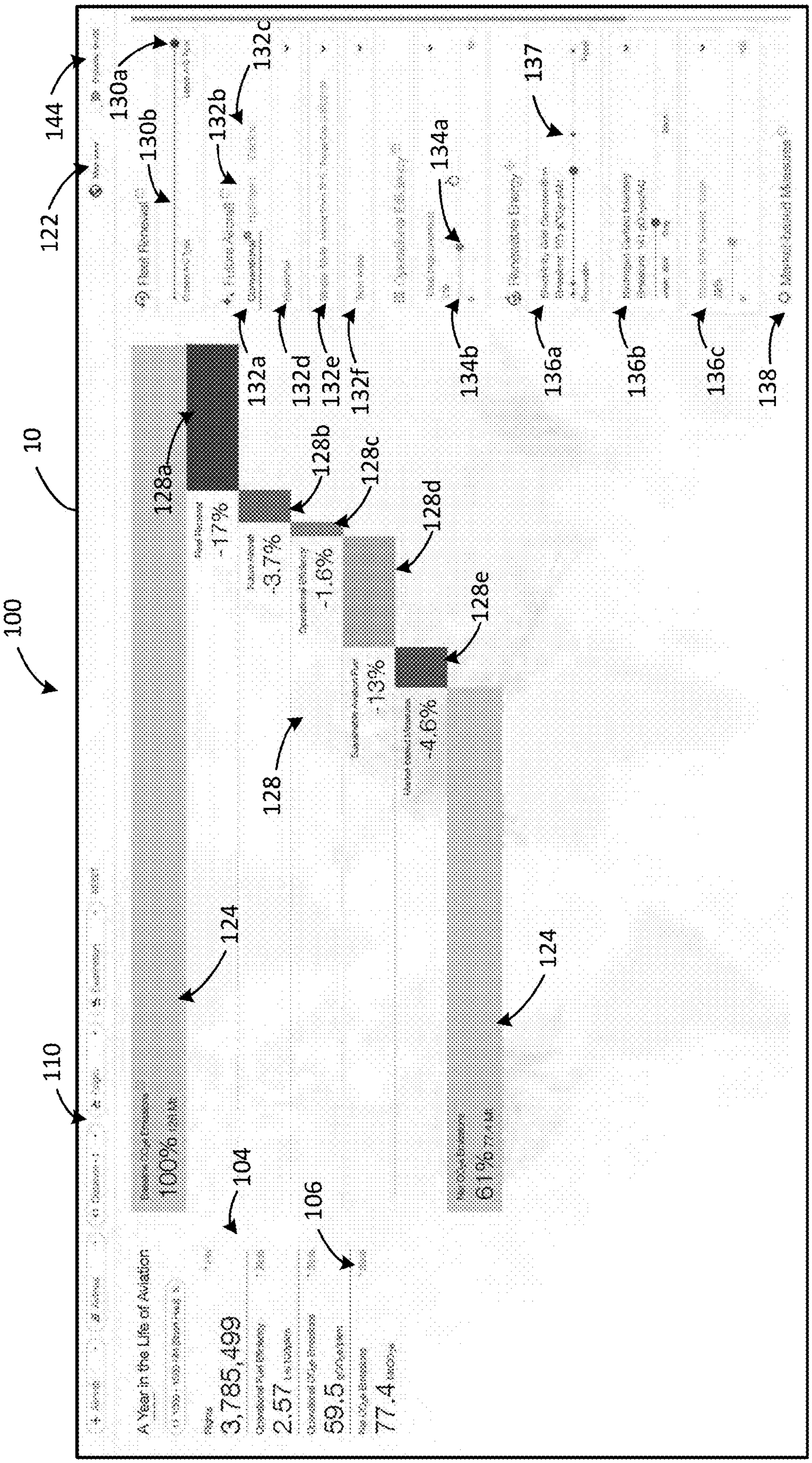
FIG. 9A is another exemplary modification of the chart view of FIG. 7 showing the CO2 emissions impact of a second set of sustainability strategies, in accordance with certain embodiments.
Figure 9B:
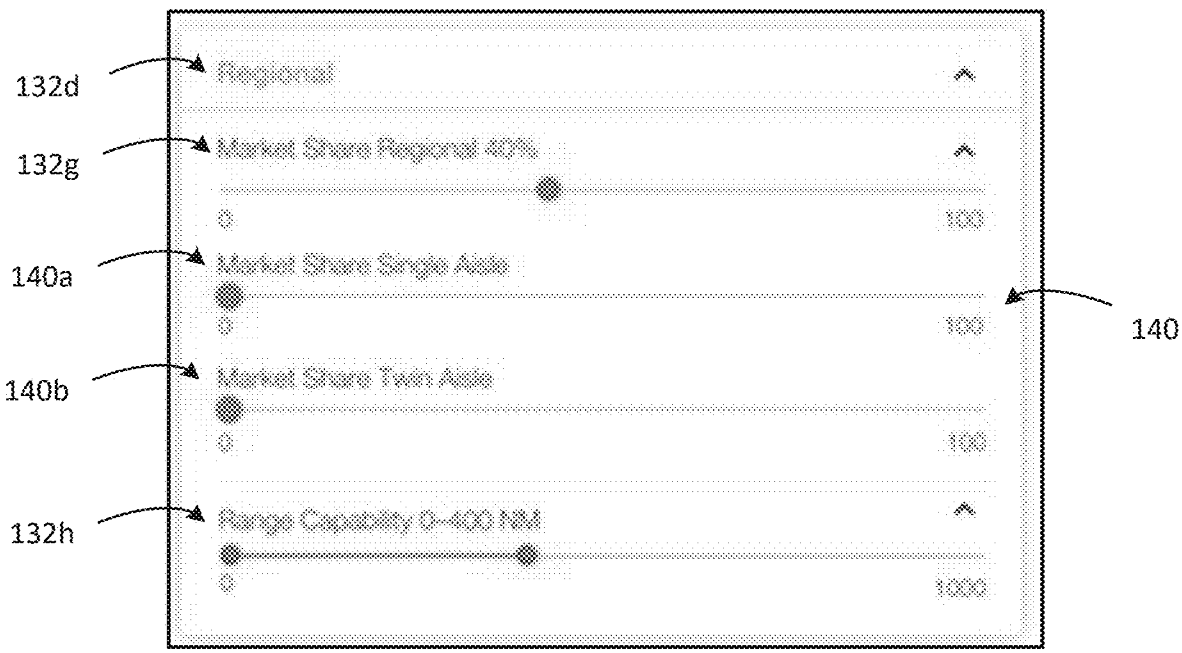
FIG. 9B is a close-up view of a portion of a future aircraft sustainability strategy graphic selected in FIG. 9A, in accordance with certain embodiments.

As shown in FIGS. 8, 9A, and 9B, the plurality of strategy graphics 126 and the bar chart 128 may be color coded, so that the impact of each strategy, or the connection between inputs and outputs in the chart view; is easily discernible to the user. For example, each strategy graphic 126 may be assigned a different color, and the sub-strategies belonging to the same category may be presented in the same color. While a specific color code may be shown in the figures, it should be appreciated that other colors, or color codes, may be used instead, in accordance with the principles described herein. In some embodiments, the GUI 100 may use shading instead of colors, or other types of codes for visually connecting the strategy selections to the emissions impacts.

In the illustrated embodiment, the plurality of strategy graphics 126 may include a fleet renewal graphic 130, a future aircraft graphic 132, an operational efficiency graphic 134, a renewable energy graphic 136, and a market-based measures graphic 138. In other embodiments, the strategy graphics 126 may include other and/or additional graphics for representing alternative and/or additional sustainability strategies.

According to embodiments, the fleet renewal graphic 130 may be configured to enable the user to see the emissions impact of replacing older aircraft (or "A/C") with the latest aircraft available, such as, e.g., aircraft that incorporates the latest advancements in aerodynamics, propulsion, systems, and materials. For example, as shown in FIG. 8, the fleet renewal graphic 130 may be configured to allow user-selection of a desired strategy for fleet renewal by providing a first user-selectable slider 130*a*, or other input device, that is movable along a first scale 130*b* having a first parameter value corresponding to current or older aircrafts (e.g., "current A/C type") and a second parameter value corresponding to newer or latest aircrafts (e.g., "latest A/C type"). The location of the fleet renewal slider 130*a* on the first scale 130*b* may indicate the amount of latest aircraft technology that will be part of the user's fleet renewal strategy. For example, placing the slider 130*a* at the first parameter value indicates no fleet renewal, while placing the slider 130*a* at the second parameter value (i.e. as shown in FIG. 8) indicates a complete fleet renewal. In some embodiments, moving the fleet renewal slider 130*a* to the middle of the scale 130*b* may indicate selection of a fleet that is comprised of about 50% current technology aircraft and about 50% latest technology aircraft.

As shown in FIG. 8, a first colored bar 128*a* of the bar chart 128 may be configured to display the CO2 emissions impact, or a reduction in the CO2 emissions percentage, that is caused by the fleet renewal strategy selected using graphic 130 (e.g., selection of current A/C, latest A/C, or a combination thereof). For example, the first bar 128*a* may have a size that directly correlates to, or represents, the amount of emissions reduction caused by the selected fleet renewal strategy. A numerical representation of the resulting reduction in CO2 emissions (e.g., percentage of reduction) may also be displayed, as illustrated. The first bar 128*a* may be colored a first color to match a first color of the fleet renewal graphic 130 (e.g., purple).

The future aircraft graphic 132 may be configured to enable the user to see the emissions impact of incorporating future or next generation airframe, systems, and energy and propulsion technology that may be more climate-friendly than existing technologies. According to embodiments, the graphic 132 may include a plurality of tabs for selecting different types of future technology. For example, in the illustrated embodiment, the future aircraft graphic 132 includes a conventional tab 132*a* for selecting advanced conventional aircraft technology, or aircraft that burn jet fuel for propulsion but with increased efficiency: a hydrogen tab 132*b* for selecting a hydrogen platform, or aircraft that burn hydrogen for propulsion; and an electric tab 132*c* for selecting a battery-electric platform, or aircraft that use electricity for propulsion.

The future aircraft graphic 132 also includes a plurality of drop-down or expandable options (or "cards") for specifying or selecting certain parameters associated with the selected technology tab 132*a*, 132*b*, or 132*c*. In the illustrated embodiment, the expandable options are for selecting aircraft types, such as, for example, a regional aircraft option 132*d*, a single-aisle aircraft option 132*e*, and a twin-aisle aircraft option 132*f*, e.g., as shown in FIGS. 8 and 9A. In some cases, one or more of the aircraft options will be removed if the selected technology tab does not support or have the aircraft option(s). For example, when the electric tab 132*c* is selected, only the regional aircraft option 132*d* may be shown, whereas all three options 132*d*, 132*e*, and 132*f* may be displayed for the conventional tab 132*a* and the hydrogen tab 132*b*.

Selecting one of the options 132*d*, 132*e*, or 132*f* may cause the GUI 100 to display additional sliders for selecting and/or adjusting specific parameter values associated with the selected aircraft type. For example, as shown in FIG. 9B, a market share slider 132*g* may be displayed and configured for selecting the percentage or number of older aircraft that will be replaced by the selected type and size of newer aircraft (e.g., 0 to 100%). A range capability slider 132*h* may also be displayed for indicating the distance that the selected aircraft can travel (e.g., 0) to 1000 NM). The values displayed on the scale associated with the range capability slider 132*h* may vary depending on the selected aircraft.

The dynamic tool may be configured to calculate the change in CO2 emissions due to the selected future aircraft strategy by determining the number of future aircraft flights that will be required to replace historic or current flights. This determination may take into account the seat count and flight frequency of current flights to determine how many future aircraft flights will be needed to replace the same number of seats. In addition, the number of historic seats that will be replaced may be computed based on the user-defined market share, i.e. as selected using market share slider 132*g*.

The above calculation assumes that current aircrafts of regional size will be replaced with future aircrafts of regional size. In order to allow the user to change the future aircraft size, the market share slider 132*g* may be associated with one or more sub-sliders 140 that may be displayed (or drop-down) upon expanding the market share slider 132*g*, for example, as shown in FIG. 9B. The sub-sliders 140 may be used to change the market share for the selected aircraft size, or the number of flights being carried out by the selected aircraft size, or other parameters associated therewith. In the illustrated embodiment, a first sub-slider 140*a* is for selecting a market share for single aisle aircraft, and a second sub-slider 140*b* is for selecting a market share for twin-aisle aircraft. The values selected using the sub-sliders 140*a* and/or 140*b* may be reflected in the future aircraft graphic 132 next to the corresponding option 132*d*, 132*e*, and/or 132*f*, for example, as shown in FIG. 9A.

As shown in FIGS. 8 and 9A, a second colored bar 128*b* of the bar chart 128 may be configured to display the CO2 emissions impact of the future aircraft strategy selected using graphic 132 (e.g., selection of conventional, hydrogen, or electric technology, and specific parameters for each). For example, the second bar 128*b* may have a size that directly correlates to, or represents, the amount of emissions reduction caused by the selected future aircraft strategy. A numerical representation of the resulting reduction in CO2 emissions (e.g., percentage of reduction) may also be displayed, as illustrated. The second bar 128*b* may be colored a second color to match a second color of the future aircraft graphic 132 (e.g., blue).

The operational efficiency graphic 134 may be configured to enable the user to see the emissions impact of having more efficient flights, routes, and networks as a result of optimized weights, advanced air-traffic management ("ATM") systems, and improved load factors, for example. As shown in FIG. 8, the operational efficiency graphic 134 may be configured to allow user-selection of a desired amount of total improvement by providing a second user-selectable slider 134*a*, or other input device, that is movable along a second scale 134*b* having a first parameter value corresponding to zero, or no improvement of current conditions, and a second parameter value corresponding to ten, or maximum improvement of current conditions. Thus, the location of the operational efficiency slider 134*a* on the second scale 134*b* may indicate the amount of operational efficiency improvement that will be part of the user's strategy.

As shown in FIG. 8, a third colored bar 128*c* of the bar chart 128 may be configured to display the CO2 emissions impact of the operational efficiency strategy selected using graphic 134 (e.g., the amount of improvement selected). For example, the third bar 128*c* may have a size that directly correlates to, or represents, the amount of emissions reduction caused by the selected operational efficiency strategy. A numerical representation of the resulting reduction in CO2 emissions (e.g., percentage of reduction) may also be displayed, as illustrated. The third bar 128*c* may be colored a third color to match a third color of the operational efficiency graphic 134 (e.g., red).

The renewable energy graphic 136 may be configured to enable the user to see the emissions impact of using energy and/or fuel that is derived from non-fossil pathways. Exemplary forms of renewable, on-board energy storage may include sustainable aviation fuels ("SAF"), green hydrogen, batteries, and/or others. As shown in FIG. 9A, the graphic 136 may include a plurality of user-selectable sliders disposed on respective scales for selecting parameter values for different types of renewable energy and/or fuel, such as, for example, an electricity grid composition slider 136*a* for selecting whether the electricity used is derived from all renewable resources, all fossil-based resources, or some combination thereof. The graphic 136 may also include a hydrogen carbon intensity slider 136*b* for selecting whether the hydrogen source is green, blue, gray, or black. The graphic 136 may also include a global SAF market share slider 136*c* for selecting a global or total market share (e.g., 0 to 100%) for aircraft that use sustainable aviation fuels.

Figure 22A:
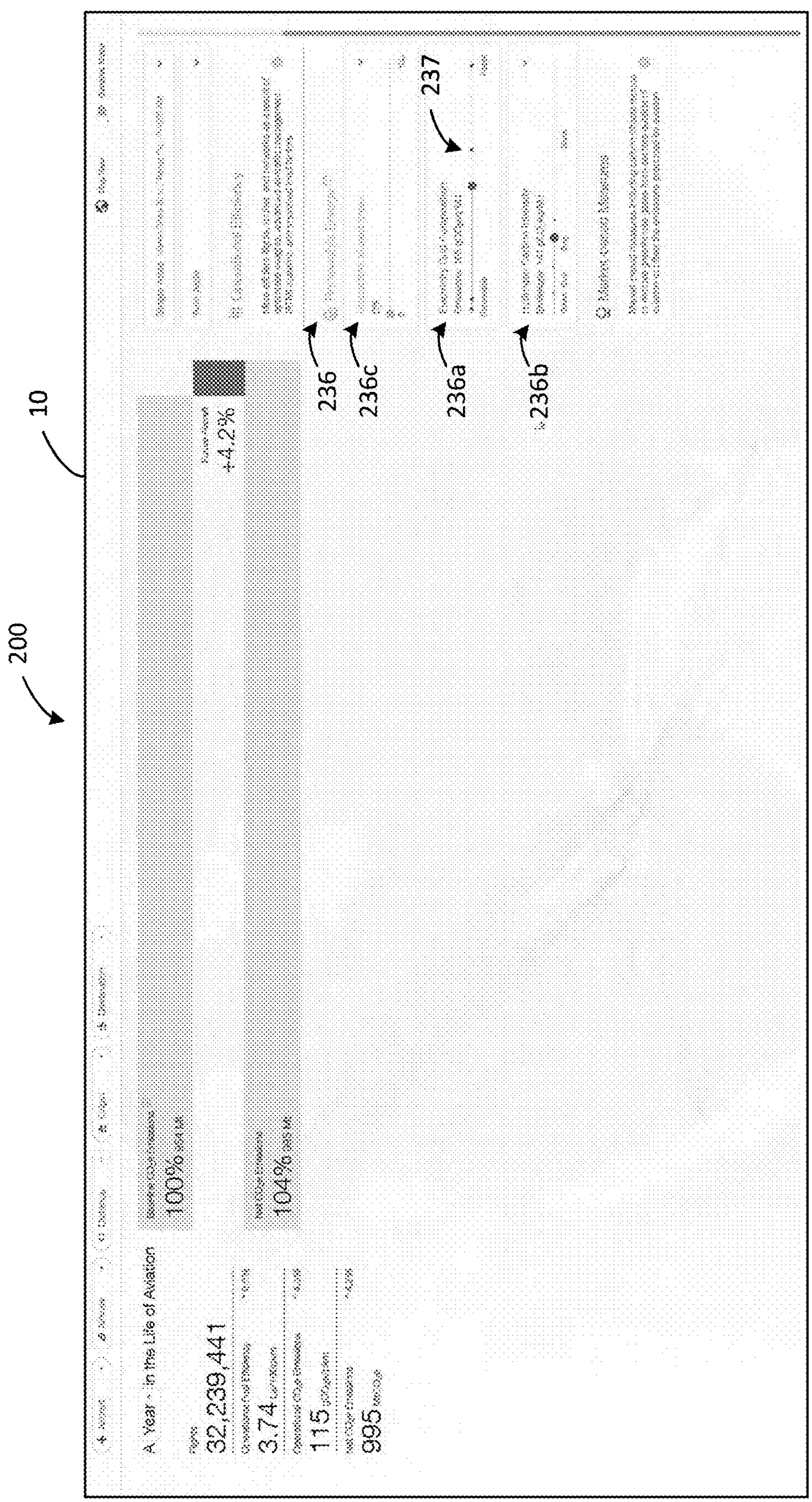
FIGS. 22A and 22B are screenshots of an exemplary graphical user interface for depicting another chart view of the dynamic aviation emissions modeling tool, the chart view including the selected flight paths shown in FIG. 15, along with the corresponding emissions data, accordance with certain embodiments.
Figure 22B:
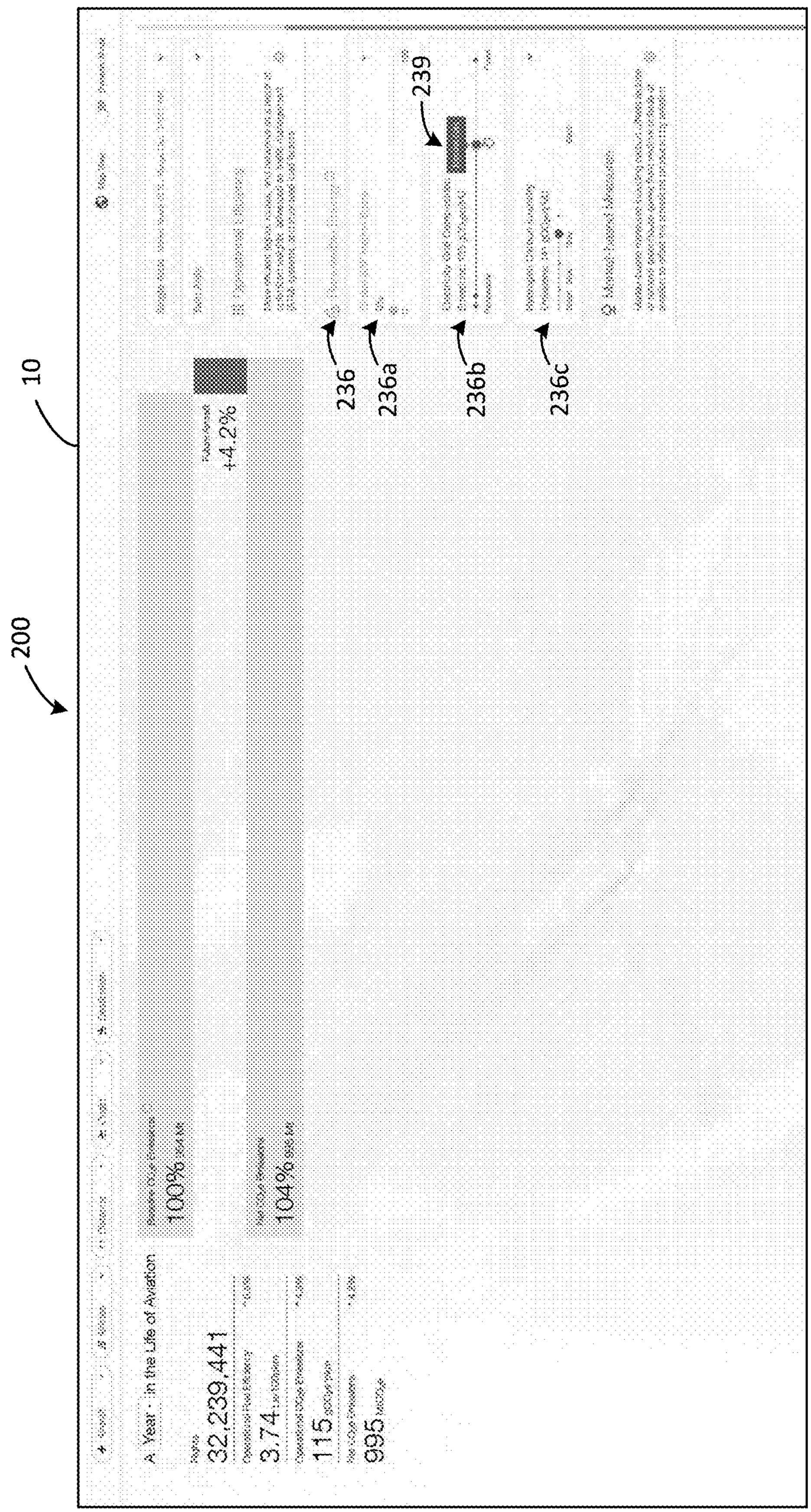

As shown in FIG. 9A, one or more of the sliders, such as, e.g., the electricity grid composition slider 136*a*, may include a plurality of markers 137 disposed at various locations along the scale for indicating certain parameters or values. In some embodiments, as shown in FIGS. 22A and 22B, the one or more sliders, such as, e.g., the electricity grid composition slider 236*a*, may be configured to display descriptive text 239 when the user hovers over a given marker 237, or moves the slider to the marker position. In FIG. 22B, the descriptive text 239 states "natural gas" to indicate that the slider 136*a* has been moved to the marker 237 corresponding to selection of natural gas as the renewable energy source.

As shown in FIG. 9A, a fourth colored bar 128*d* of the bar chart 128 and may be configured to display the CO2 emissions impact of the renewable energy strategy selected using graphic 136 (e.g., relative selections for renewable electric energy sources, green hydrogen, or SAF). For example, the fourth bar 128*d* may have a size that directly correlates to, or represents, the amount of emissions reduction caused by the selected renewable energy strategy. A numerical representation of the resulting reduction in CO2 emissions (e.g., percentage of reduction) may also be displayed, as illustrated. The fourth bar 128*d* may be colored a fourth color to match a fourth color of the renewable energy graphic 136 (e.g., yellow).

The market-based measures graphic 138 may be configured to enable the user to see the emissions impact of market-based measures, such as, for example, carbon offsets, which reduce or remove greenhouse gases from sectors outside of aviation to offset the emissions produced by aviation. In some cases, the carbon offsets may be due to implementing climate-friendly routing for a significant portion of the fleet in a short amount of time.

As shown in FIG. 9A, a fifth colored bar 128*e* of the bar chart 128 and may be configured to display the CO2 emissions impact of the market-based measures strategy selected using graphic 138. For example, the fifth bar 128*e* may have a size that directly correlates to, or represents, the amount of emissions reduction caused by the selected market-based measures strategy. A numerical representation of the resulting reduction in CO2 emissions (e.g., percentage of reduction) may also be displayed, as illustrated. The fifth bar 128*e* may be colored a fifth color to match a fifth color of the market-based measures graphic 138 (e.g., green).

In various embodiments, the dynamic display tool may be configured to depict dependency between a certain combination of sustainability strategies (or levers), such as, for example, dependency between fleet renewal and future aircraft, fleet renewal and sustainable aviation fuel, fleet renewable and operational efficiency, renewable energy and sustainable aviation fuel, renewable energy and future aircraft, and/or future aircraft and operational efficiency. For example, adjusting the future aircraft graphic 132 to include more latest aircraft technology may automatically change an outcome (e.g., amount of CO2 emissions) of the renewable energy graphic 136, as well as the percentage number displayed in association therewith, because of the dependency between the two strategies. In particular, using more latest technology aircraft may reduce the impact of electric aircraft or other future aircraft types at least because the latest technology aircraft may be more fuel efficient than the conventional aircraft that they are replacing. The dependencies may be shown as automatic changes to the CO2 emissions data being displayed on the GUI 100 (e.g., in the bar chart, as metrics, in sliders, etc.), or in any other suitable manner, as will be appreciated.

Figure 10:
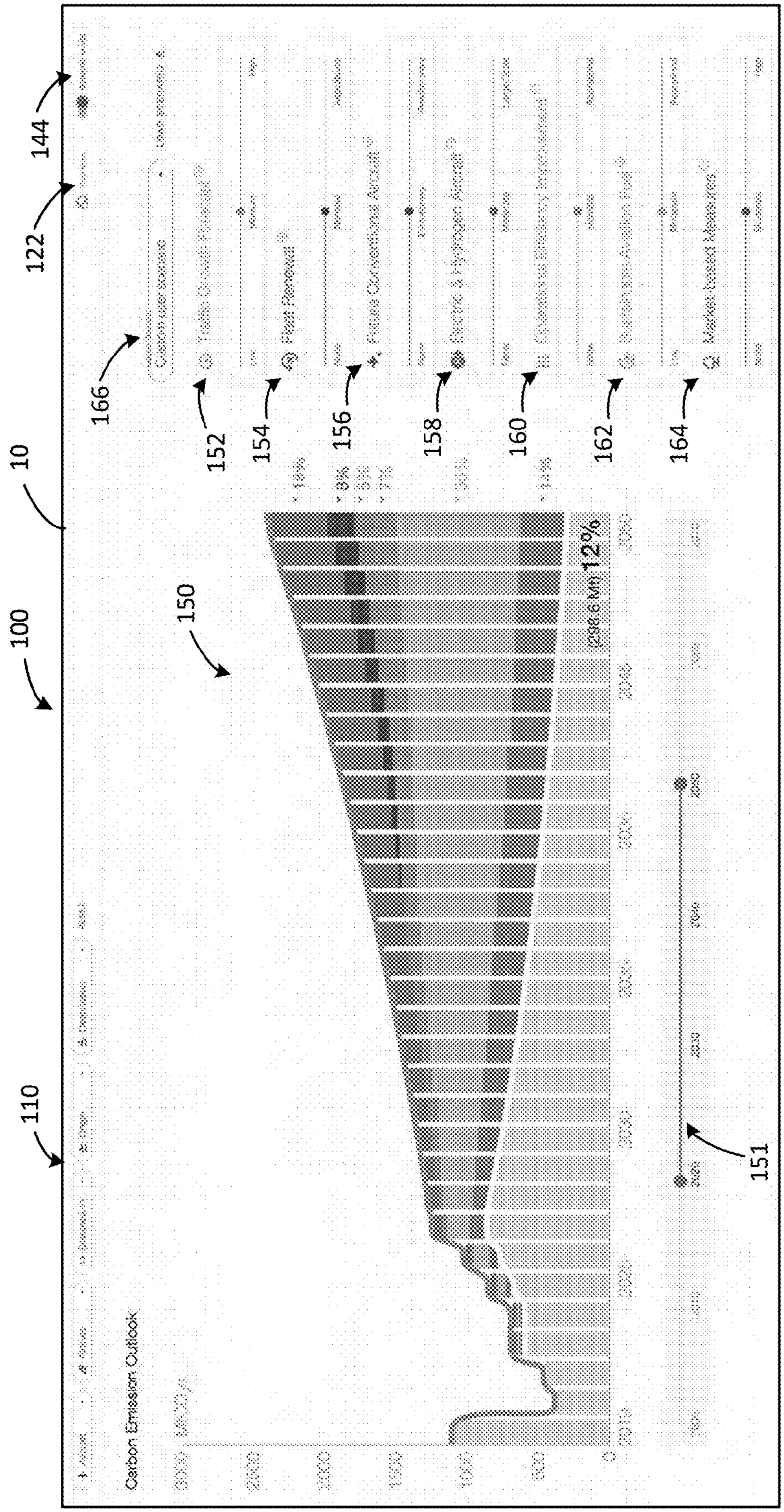
FIG. 10 is a screenshot of an exemplary graphical user interface for depicting a dynamic view of the dynamic aviation emissions modeling tool, the dynamic view including emissions data over a select period of time for the flight paths shown in FIG. 6, in accordance with certain embodiments.

In various embodiments, the GUI 100 further includes a dynamic mode option 144 for changing from the map view or chart view to a dynamic mode of the GUI 100, for example, as shown in FIG. 10. The dynamic mode option 144 may be a slider-type button or other input device for toggling or turning the dynamic mode on and off. When the dynamic mode is selected (e.g., option 144 is slid to the right), the map view/chart view may be replaced with a carbon emission outlook graph 150, as shown in FIG. 10. When the dynamic mode is unselected (e.g., option 144 is slid to the left), the graph 150 may be replaced with the chart view or the map view, depending on which view was last selected via the view option 122 and/or which view is currently reflected by the view option 122 (e.g., the map view in FIG. 10).

As shown in FIG. 10, the carbon emissions outlook graph 150 graphically depicts the impact of various measures, or sustainability strategies, on the reduction of carbon emissions, or CO2 emissions, over a select period of time. The measures may be based on preselected and/or user-selected scenarios, and their impact may be depicted using stacked colored bars for each year. The colored bars may be stacked on top of a gray bar that represents the remaining CO2 emissions for that year. The select period of time may be pre-selected or user-selected, for example, using a time-select slider 151 as shown in FIG. 10, and may include past and/or future time periods. Thus, the graph 150 can be configured to graphically and dynamically depict the emissions trend, or outlook, over a number of years for selected scenarios.

In various embodiments, the graph 150 may be configured to display carbon emissions information for measures that are the same as, similar to, based on, or otherwise associated with the sustainability strategies shown in the chart view, and may use the same, or similar, color coding as the chart view for consistency and ease of connection. The measures depicted in the graph 150 may be represented by a corresponding lever that operates like the levers shown in FIG. 9A, and described herein, to adjust or configure one or more parameters associated with the underlying measure. While the levers are shown as sliders in the depicted embodiments, it should be appreciated that other input mechanisms may be used to enable user configuration of the sustainability strategies and measures described herein.

As shown in FIG. 10, the GUI 100 may include, for example, a traffic growth forecast lever 152 that may be set to low, medium, or high using a traffic growth slider: a fleet renewal lever 154 that may be associated with the fleet renewal graphic 130 and may be set to none, nominal, or aspirational using a fleet renewal slider: a future conventional aircraft lever 156 that may be associated with the conventional aircraft option 132*a* and may be set to none, evolutionary, or revolutionary using a conventional slider: an electric and hydrogen aircraft lever 158 that may be associated with the electric aircraft option 132*c* and the hydrogen aircraft option 132*b* and may be set to none, moderate, or large-scale using an electric and hydrogen slider: an operational efficiency improvement lever 160 that may be associated with the operational efficiency graphic 134 and may be set to none, nominal, or aspirational using an efficiency slider: a sustainable aviation fuel lever 162 that may be associated with the global SAF market share slider 136*c* and may be set to low, moderate, or aspirational using an SAF slider; and a market-based measures lever 164 that may be associated with the market-based measures graphic 138 and may be set to none, moderate, or high using a market slider.

In some embodiments, the GUI 100 may also include, in the dynamic mode, a master scenario option 166 configured to allow the user to select a particular scenario for which carbon emissions data is displayed on the graph 150. Each scenario includes specified selections, or slider settings, for each of the levers (or underlying measures) and/or certain parameters associated therewith. The scenarios may be manually entered by the user or uploaded from a saved file (e.g., using the "load scenario" option). In FIG. 10, the depicted measures have been configured according to a custom user scenario that sets median values, or slider settings, for each of the levers. When a new scenario is entered via adjustment of a measure or parameter value, or other change in data scope, the carbon emissions data may be re-calculated and the graph 150 updated accordingly.

In other embodiments, each of the depicted measures, or strategies, may have a master lever for limited configuration of the corresponding measure, and a number of the master levers may have one or more corresponding detailed levers, or sliders, for more nuanced configuration of the corresponding measure, as shown by GUI 200 in FIGS. 13A to 21. The GUI 200 can be configured to include an overview 201 that displays or lists all available master levers, as best seen in FIG. 13B. In the illustrated embodiments, the GUI 200 includes six master levers, namely: a traffic growth forecast lever 252, fleet renewal lever 254, future aircraft lever 256, operational efficiency lever 258, renewable energy lever 260, and market-based measures lever 262, similar to the corresponding levers of GUI 100. In other embodiments, the GUI 200 may include more or fewer master levers, as will be appreciated.

Figure 15:
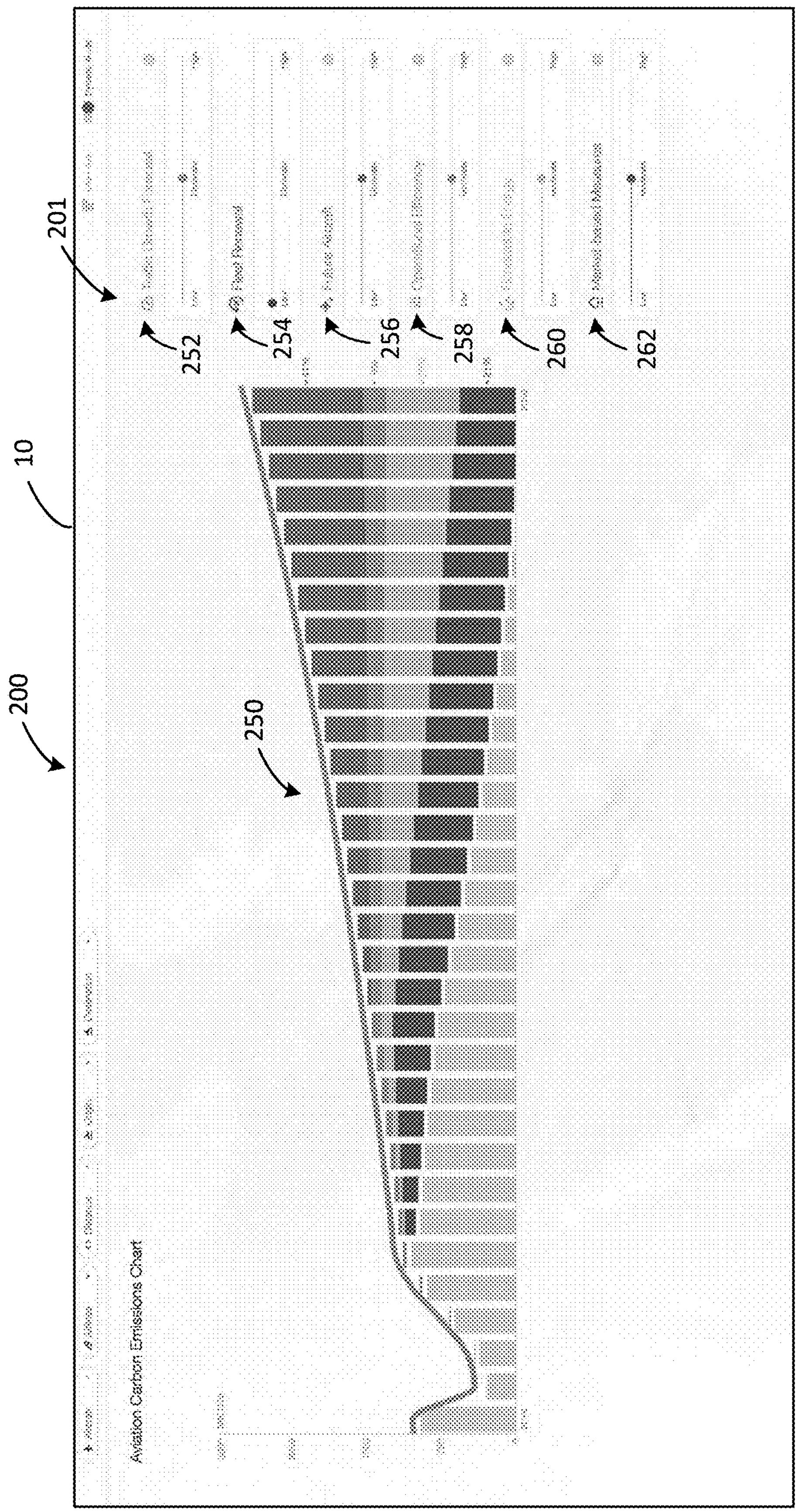
FIG. 15 is another screenshot of the exemplary dynamic view of FIG. 13A depicting a change in selection for a Fleet Renewal lever, in accordance with certain embodiments.

As shown in FIGS. 16A to 20E, one or more of the master levers may be configured to display a detailed view, or corresponding detailed lever(s), upon user selection of the master lever, or other aspect of the GUI 200. In some embodiments, for example, as shown in FIG. 13B, each master lever with more settings can be configured to display a user-selectable "more options" or "detail settings" icon 259 that is placed adjacent to, or above, the corresponding slider, and is configured to display the detailed levers in response to user selection of the icon 259. For example, selection of the icon 259 for a given master lever may cause the master lever to expand into or otherwise reveal detailed levers. In some cases, the detailed levers may be displayed in place of, or below, the master lever, and may cause the other master levers to shift down or up, as needed, to accommodate the detailed levers, as shown in FIGS. 16A, 17A, 18A, 19A, and 20A, for example. In other cases, selection of the icon 259 may cause display of a drop-down menu that includes the detailed levers and at least partially overlaps with one or more other levers. The detailed levers may be arranged vertically, or stacked on top of each other, for example, as shown in FIG. 20B, or in any other suitable arrangement. In the illustrated embodiment, for example as best seen in FIG. 13B, all of the levers except the fleet renewal lever 254 include the icon 259 because the fleet renewal lever 254 does not have associated detailed levers. As shown in FIG. 15, the fleet renewal lever 254 can be adjusted using the corresponding slider displayed in the lever overview menu 201. In other embodiments, the fleet renewal lever 254 may also be configured to include one or more detailed levers and thus, may include the icon 259.

Figure 20A:
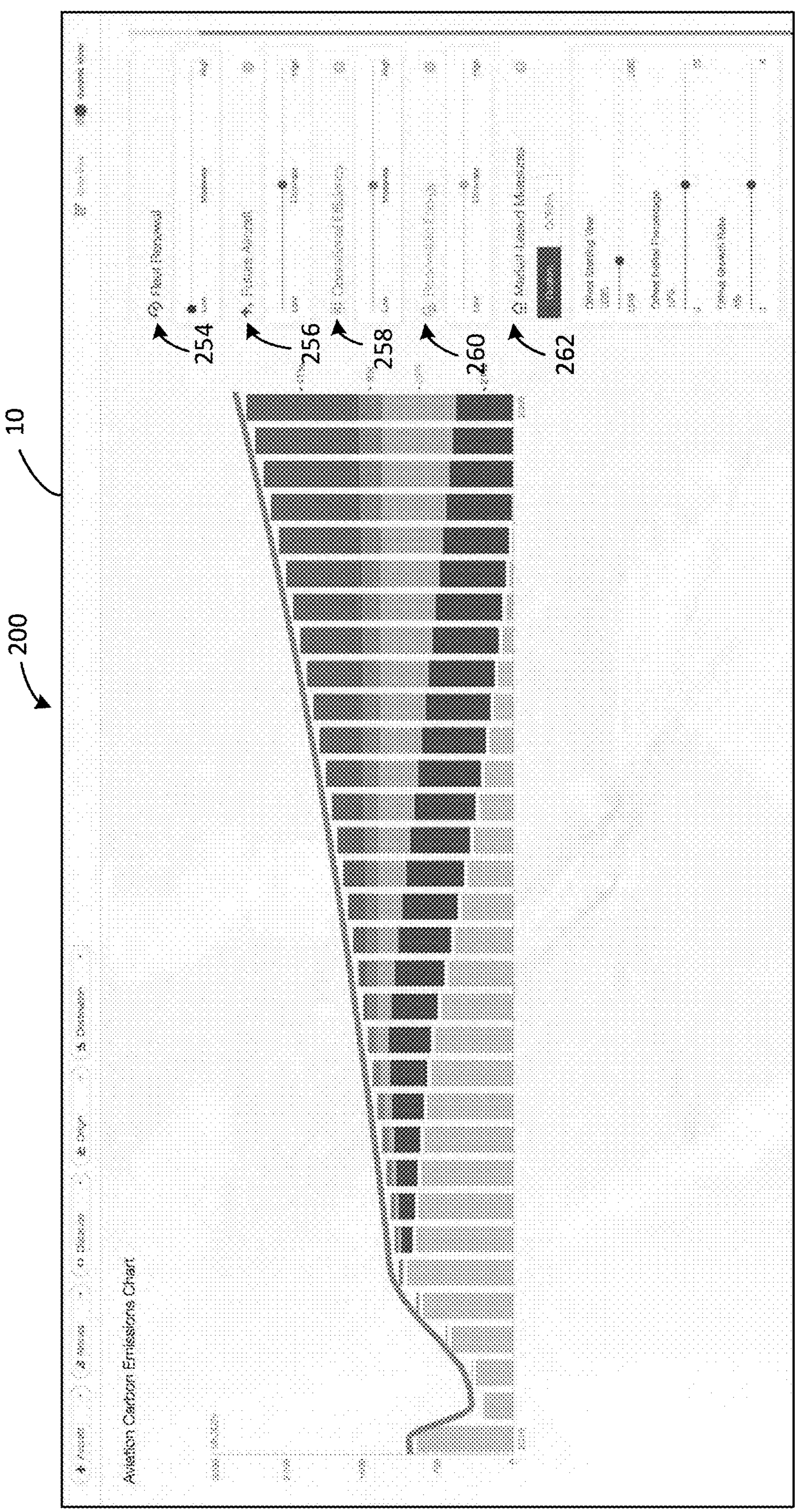
FIG. 20A is another screenshot of the exemplary dynamic view of FIG. 15 depicting an expanded state of the Market Based Measures lever only, in accordance with certain embodiments.
Figure 20B:
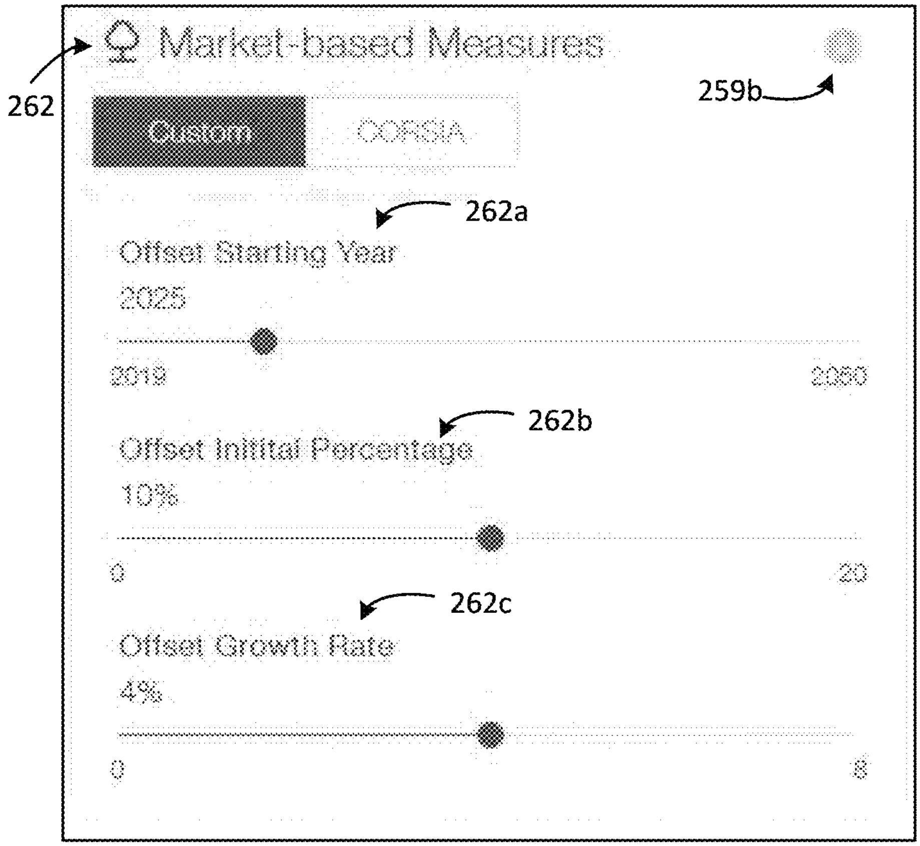
FIG. 20B is close-up view of the expanded Market Based Measures lever shown in FIG. 20A, in accordance with certain embodiments.
Figure 20C:
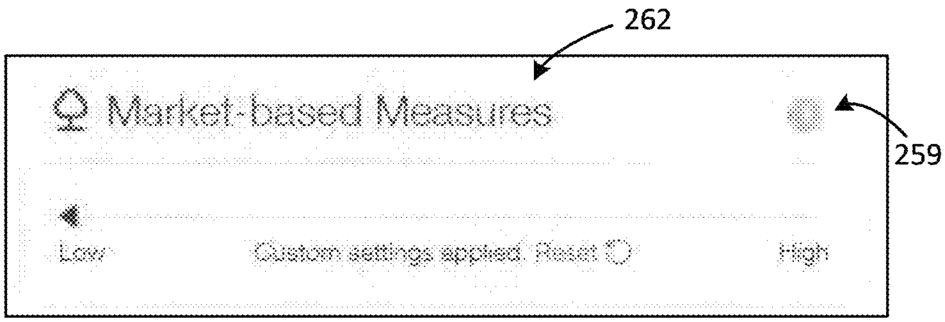
FIG. 20C is a close-up view of the Market Based Measures lever in a collapsed state, in accordance with certain embodiments.
Figure 20D:
FIGS. 20D and 20E are close-up views of the Market Based Measures levers shown in FIGS. 20B and 20C, respectively, with descriptive text displayed for a more options icon, in accordance with certain embodiments.
Figure 20E:
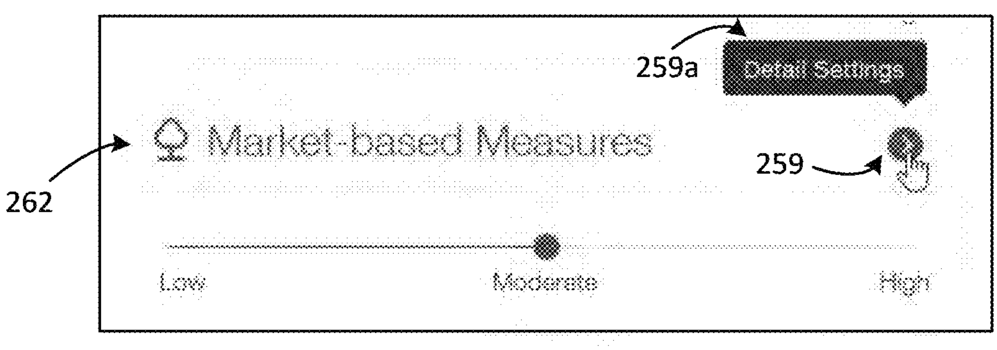

For improved usability, hovering over the more options icon 259 may cause descriptive text 259*a*, such as, e.g., "Detail Settings," to be displayed above or adjacent to the icon 259, for example, as shown in FIG. 20E. When in the detailed levers view, the more options icon 259 may be replaced with a return icon 259*b* for enabling the user to return back to the master overview 201, for example, as shown in FIG. 20D. As also shown, descriptive text 259*c*, such as, e.g., "Back to Master," may be displayed above or adjacent the icon 259*b*, for example, when the user hovers over the icon 259*b*. As another example, according to embodiments, the GUI 300 may be configured to display explanatory text in a pop-up window, or other appropriate interface, when the user hovers over a given prompt, such as, e.g., "How do I read this chart?" in FIG. 39B.

Figure 13A:
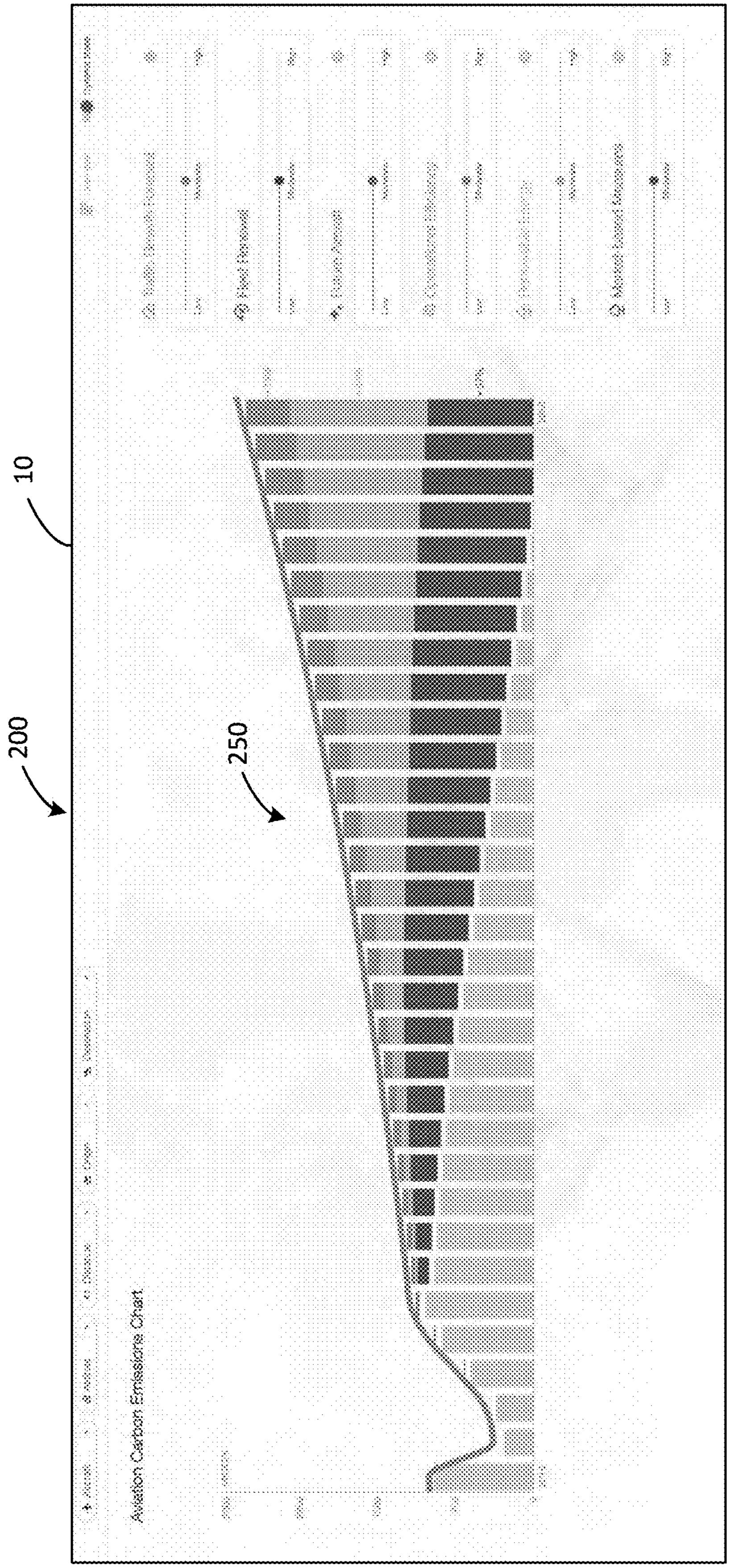
FIG. 13A is a screenshot of another exemplary graphical user interface for depicting another dynamic view of the dynamic aviation emissions modeling tool, the dynamic view including a carbon emissions chart showing emissions data over a select period of time and for a select group of flight paths, in accordance with certain embodiments.
Figure 13B:
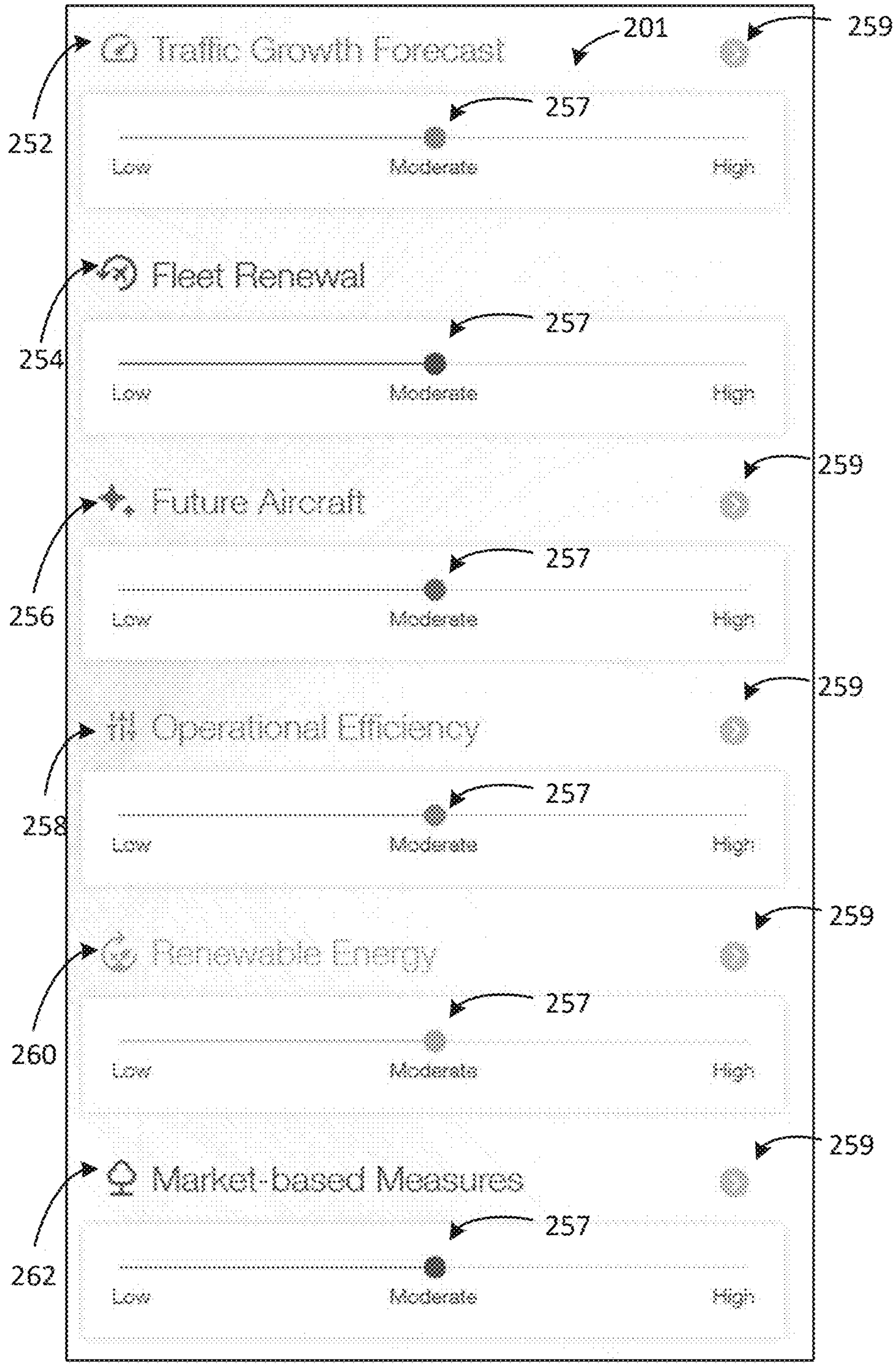
FIG. 13B is a close-up view of a plurality of levers shown in the dynamic view of FIG. 13A, in accordance with certain embodiments.

The master lever can be configured to enable the user to assess the impact of the corresponding strategy based on generalized settings, such as, e.g., "Low," "Moderate," and "High," as shown by GUI 200 in FIG. 13A. In the illustrated embodiment, all of the master levers are set to "Moderate," or other median value, as a default setting. From there, the user may move a slider of a given master lever left towards the "Low" setting, or right towards the "High" setting, as desired. In this manner, the master levers can be manipulated by novice or inexperienced users without needing detailed knowledge about the underlying logic to understand and use the sliders.

Figure 16A:
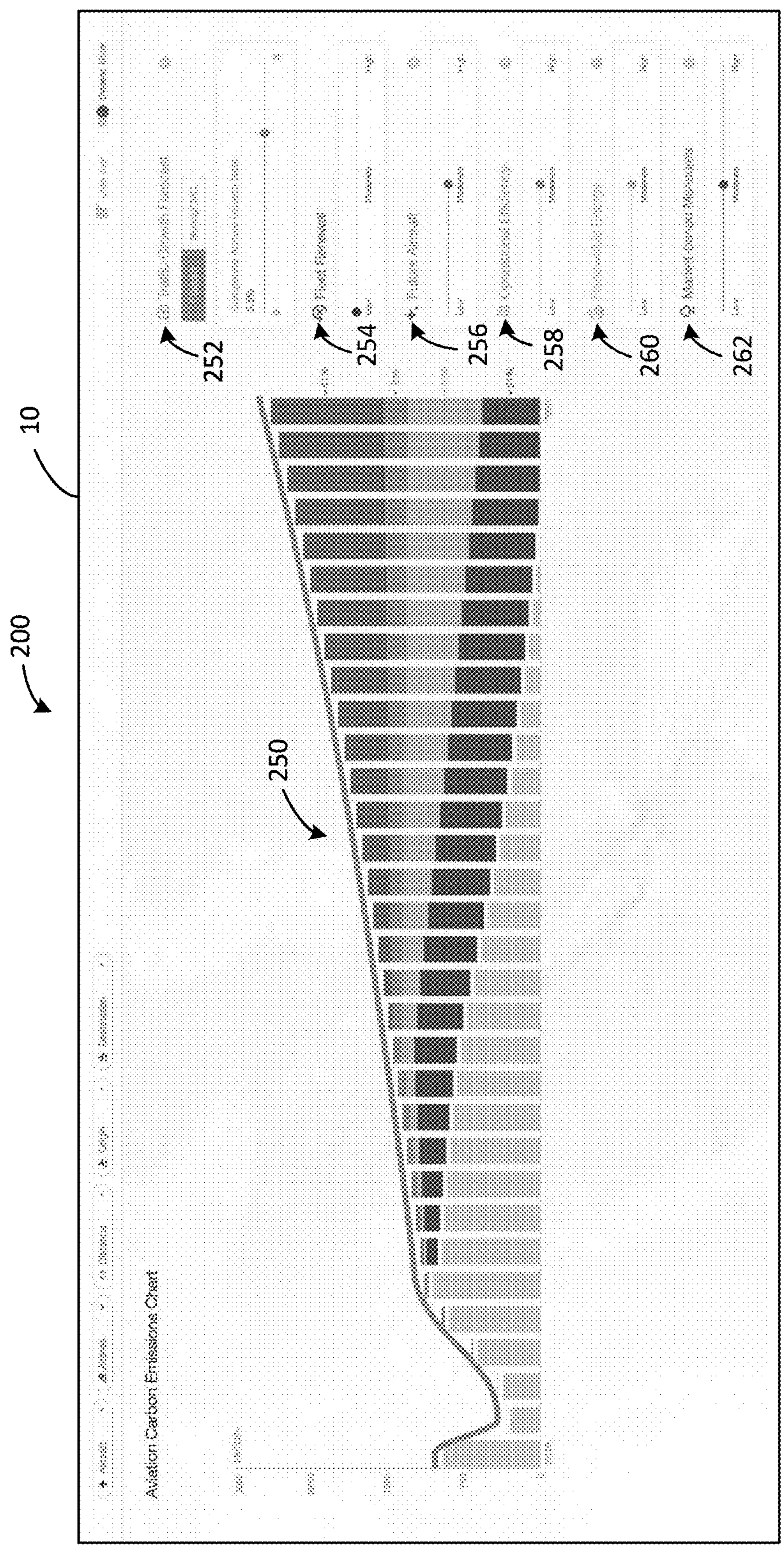
FIG. 16A is another screenshot of the exemplary dynamic view of FIG. 15 depicting an expanded state of a Traffic Growth Forecast lever, in accordance with certain embodiments.
Figure 16B:
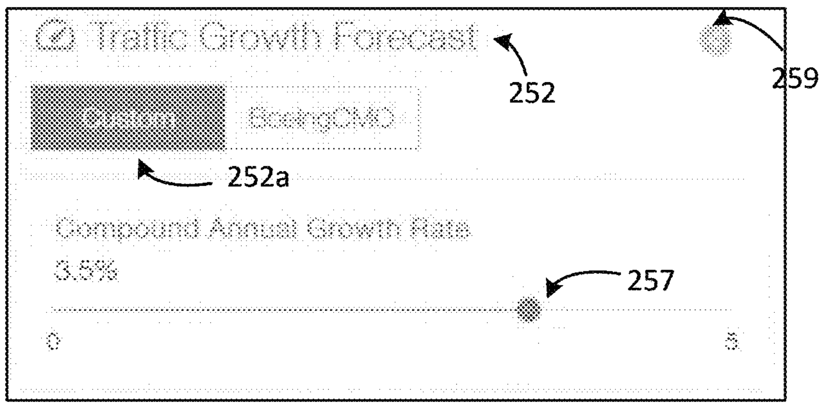
FIGS. 16B and 16C are close-up views of the expanded Traffic Growth Forecast lever shown in FIG. 16A depicting different selections for a scenario setting of the lever, in accordance with certain embodiments.
Figure 16C:
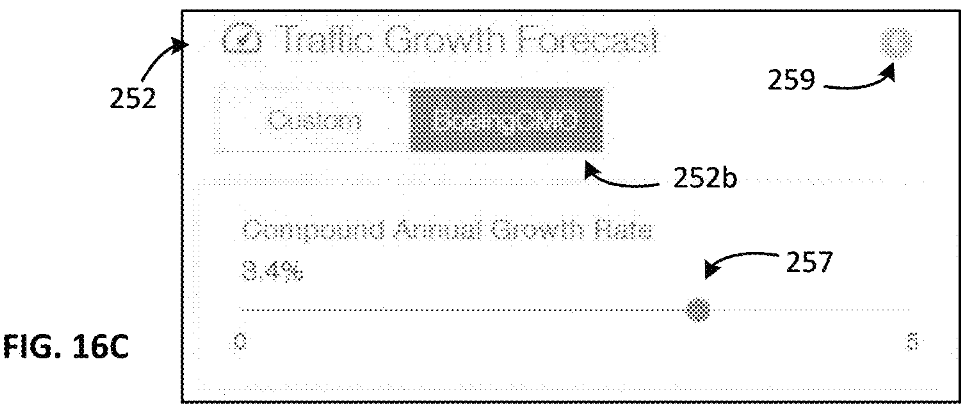
Figure 17B:
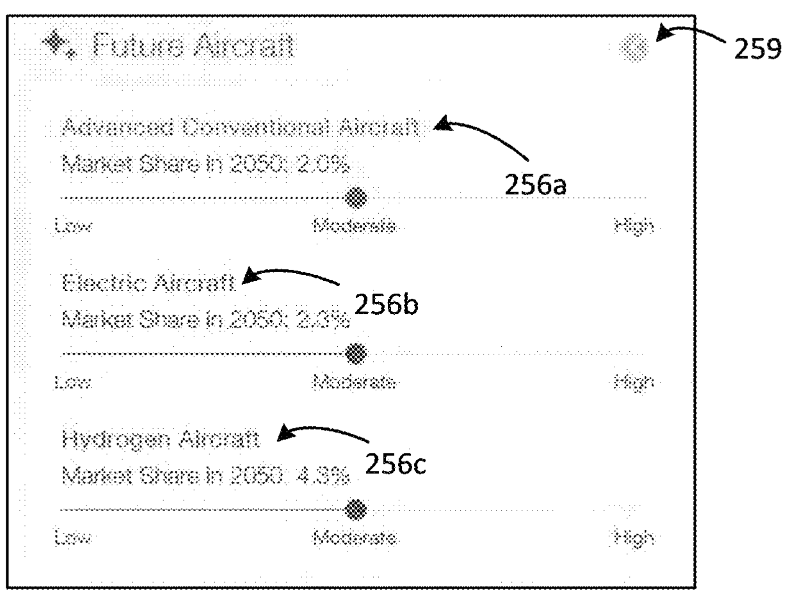
FIG. 17B is a close-up view of the expanded Future Aircraft lever shown in FIG. 17A, in accordance with certain embodiments.
Figure 17A:
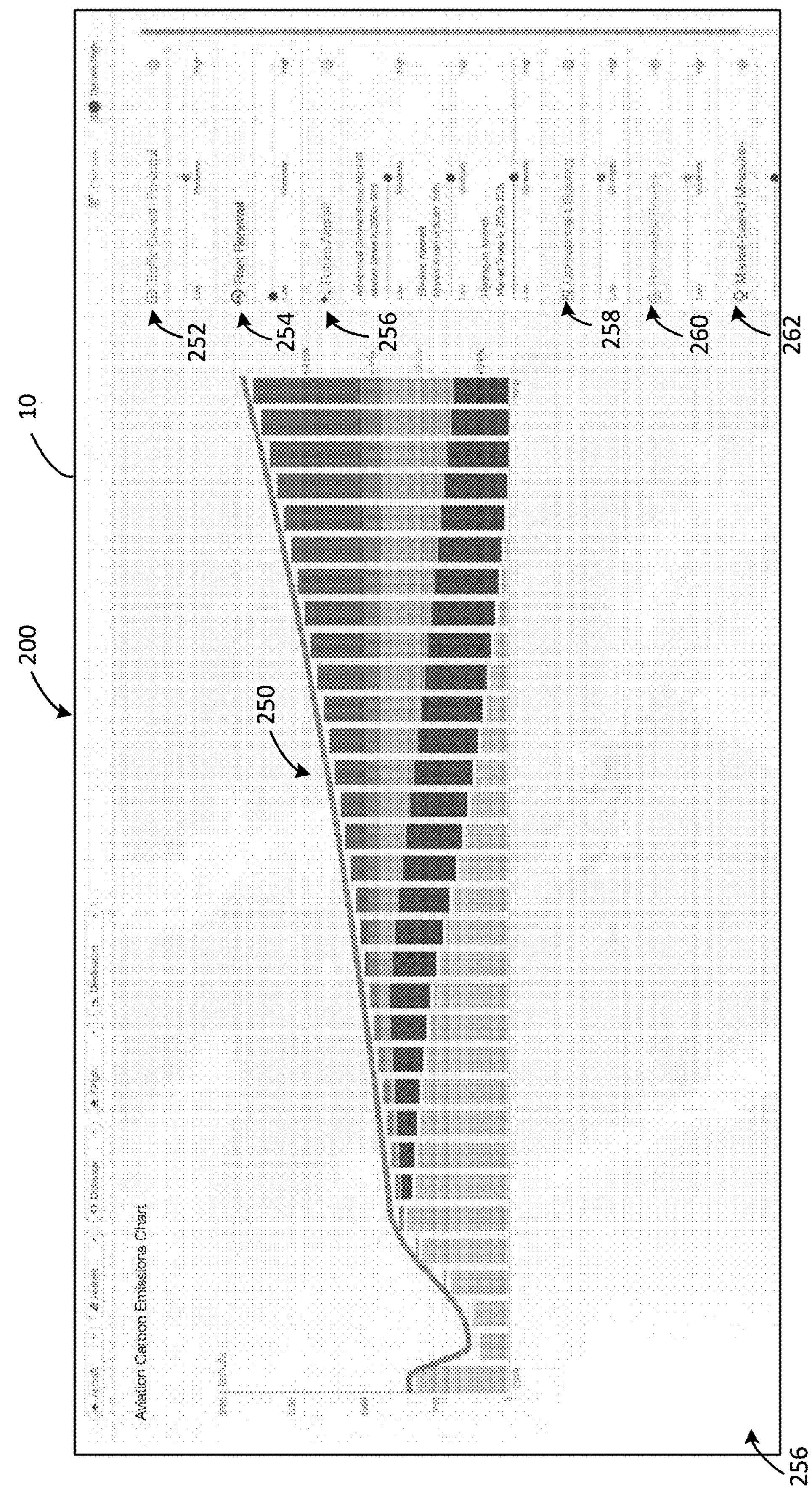
FIG. 17A is another screenshot of the exemplary dynamic view of FIG. 15 depicting an expanded state of a Future Aircraft lever, in accordance with certain embodiments.
Figure 18A:
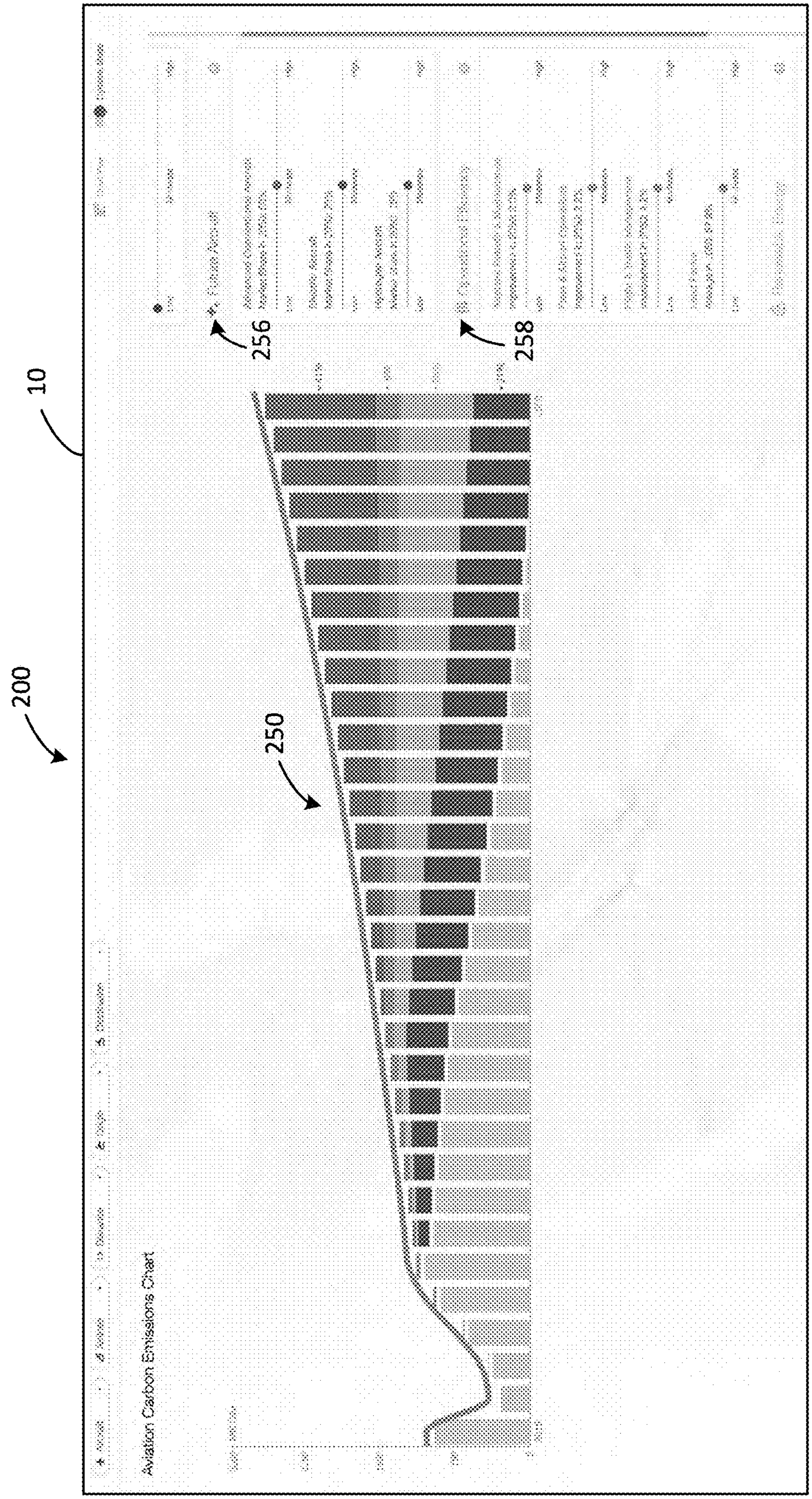
FIG. 18A is another screenshot of the exemplary dynamic view of FIG. 15 depicting an expanded state of the Future Aircraft lever and an Operational Efficiency lever, in accordance with certain embodiments.
Figure 18B:
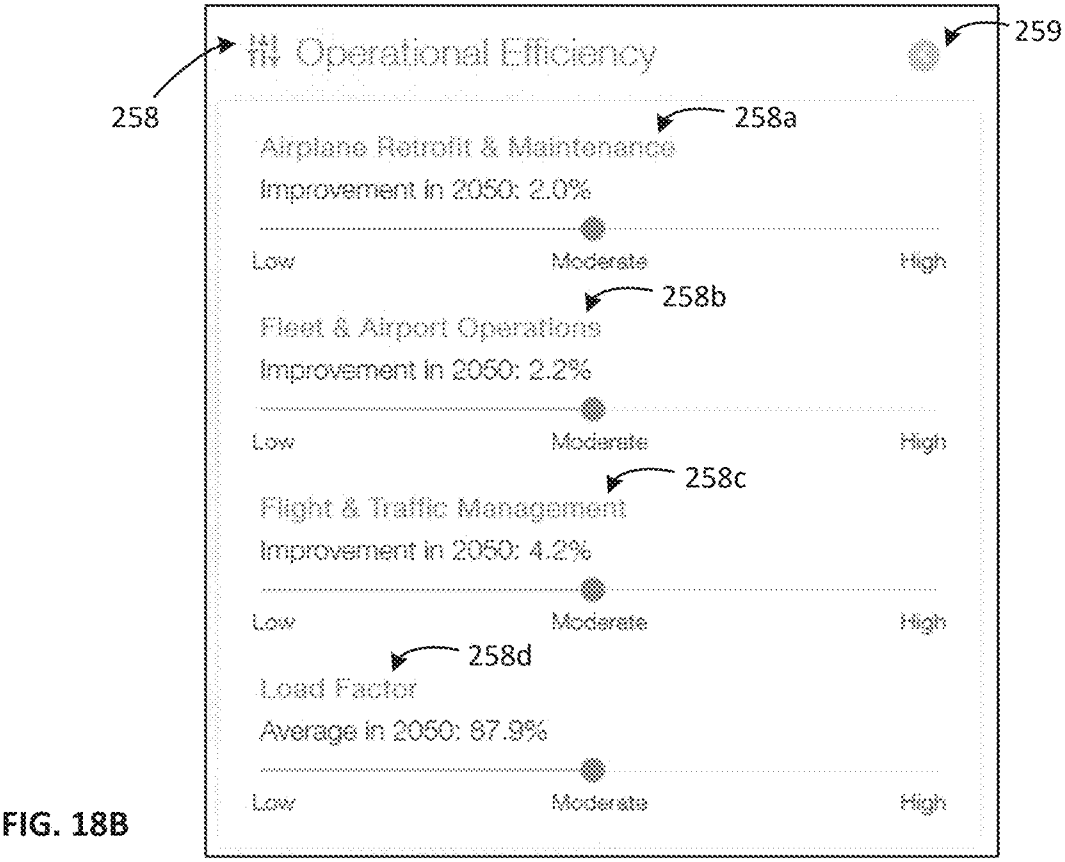
FIG. 18B is a close-up view of the expanded Operational Efficiency lever shown in FIG. 18A, in accordance with certain embodiments.
Figure 19B:
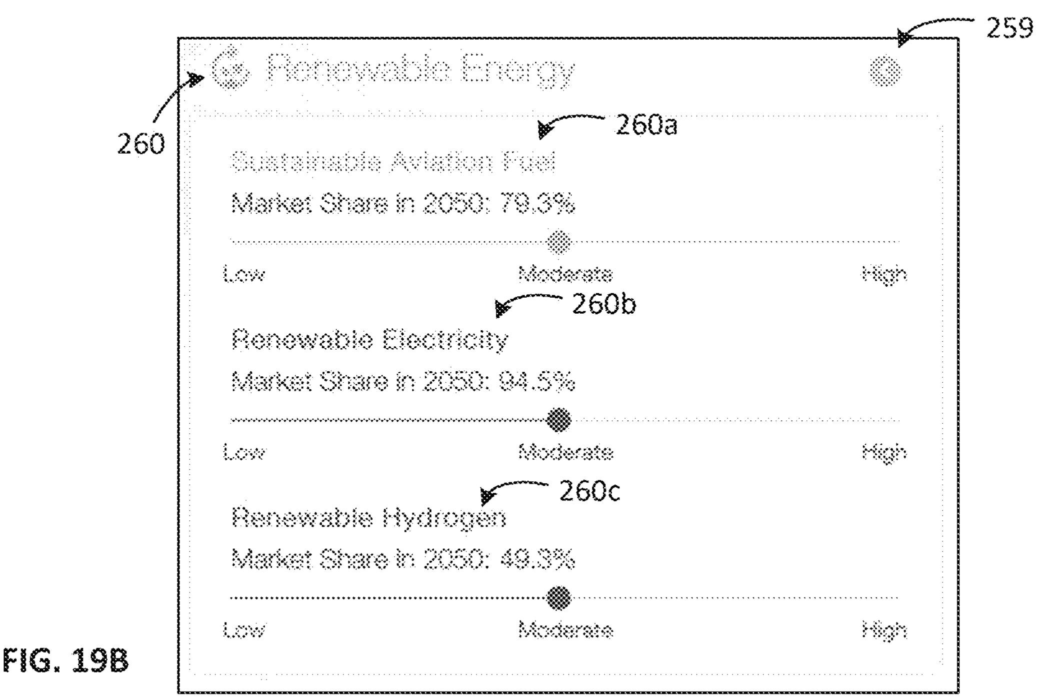
FIG. 19B is a close-up view of the expanded Renewable Energy lever shown in FIG. 19A, in accordance with certain embodiments.
Figure 19A:
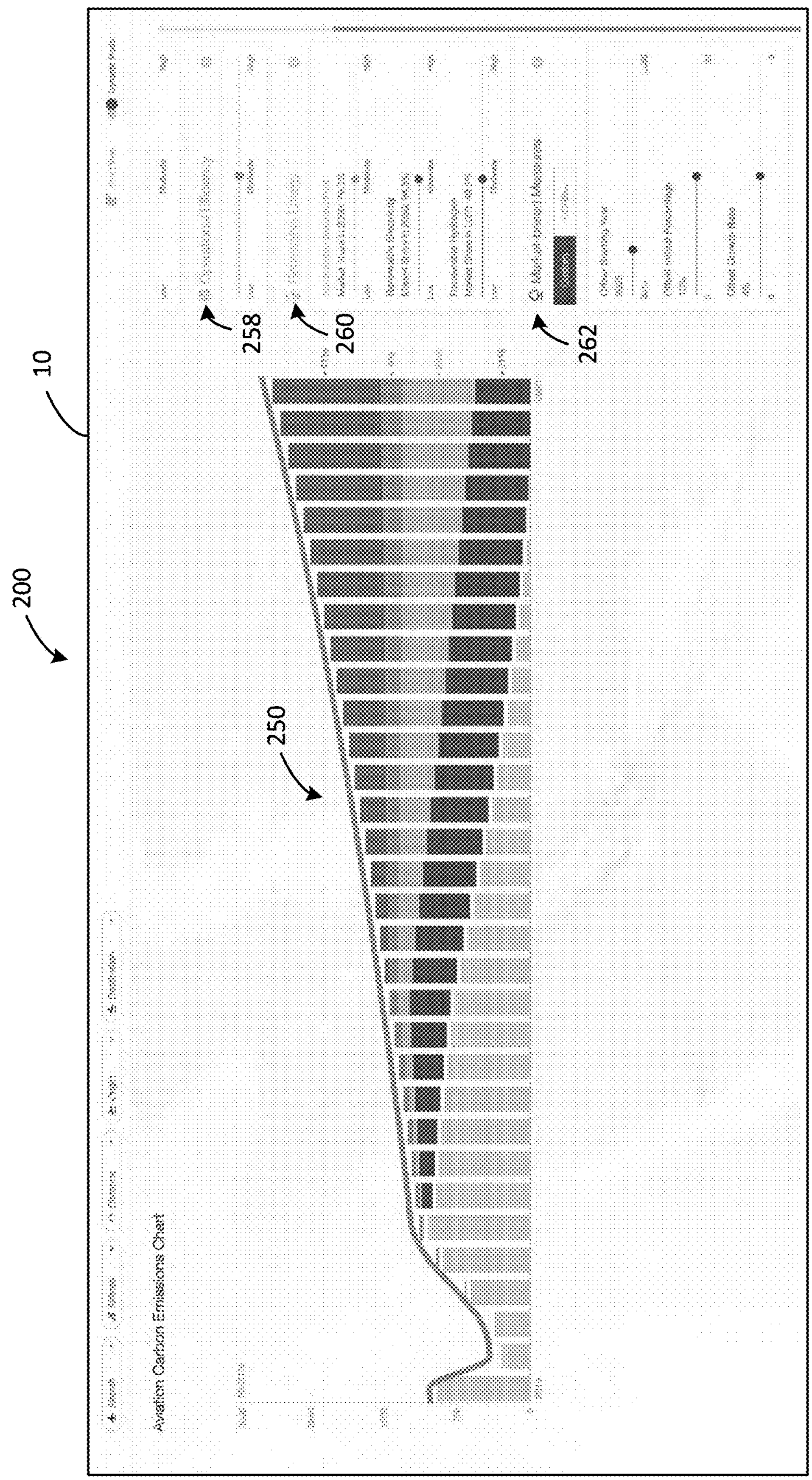
FIG. 19A is another screenshot of the exemplary dynamic view of FIG. 15 depicting an expanded state of a Renewable Energy lever and a Market Based Measures lever, in accordance with certain embodiments.

In some embodiments, the master levers may be mapped to the detailed levers to enable more experienced, or expert, users to customize one or more advanced settings for the corresponding measure. In some cases, the detailed levers enable user selection of a specific numerical value or range, while the corresponding master lever has generic or categorical settings (e.g., Low, Moderate, High), for example, as shown in FIGS. 17A and 17B. As shown in FIGS. 16A to 20B, the exact type of detailed lever(s) provided for each master lever may vary depending on the type of measure represented by the corresponding master lever.

In some embodiments, the detailed-levers view may include tabs or other user-selectable options for switching between different scenarios or modes of calculation, such as, e.g., a custom scenario (e.g., via selection of "Custom" option 252*a* in FIG. 16B), a fixed or precomputed scenario (e.g., via selection of "BoeingCMO" option 252*b* in FIG. 16C, or "CORSIA" option in FIG. 20B), and/or one or more other scenarios, such as, e.g., a scenario that displays a different set of detailed levers, other proprietary scenario, a user's preset forecast or scenario, etc. As shown in FIGS. 20B and 20D, for example, when the custom mode is selected, the detailed levers 262*a*, 262*b*, and 262*c* can be configured to enable a user to customize the settings of the selected scenario, or otherwise create a new scenario, for example, by allowing adjustment of one or more of the detailed levers. As shown in FIG. 16C, for example, when the precomputed mode is selected, the detailed levers may be set to preselected values that correspond to a preset sustainability scenario and may be configured to prevent the user from adjusting the lever settings further (e.g., as shown by the grayed out, or unselectable, slider in FIG. 16C).

Figure 36A:
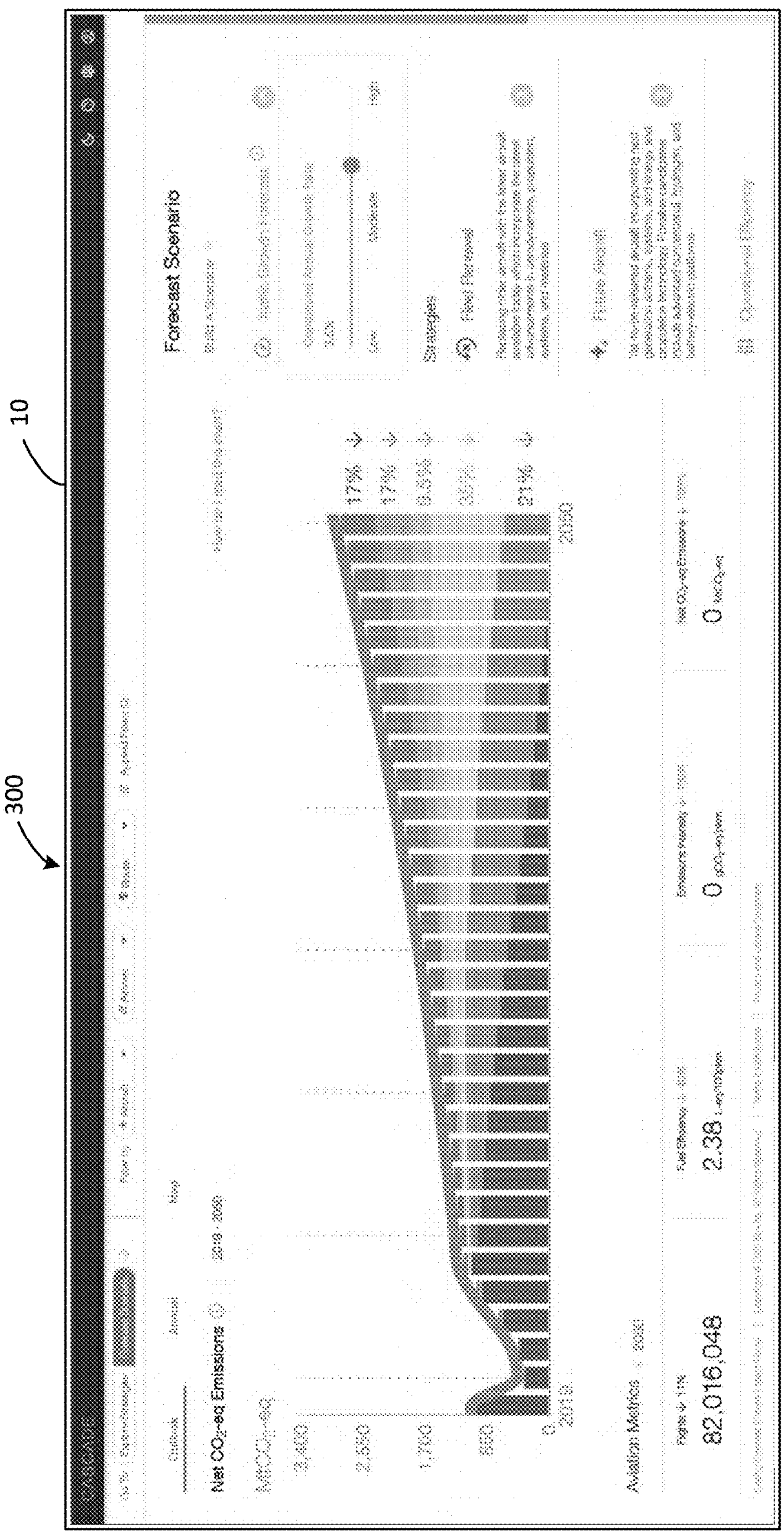
FIGS. 36A to 36E are screenshots of a second exemplary outlook view included in the forecast scenarios view of FIG. 34A, the second outlook view graphically depicting user selection of various traffic growth forecast options, in accordance with certain embodiments.
Figure 36B:
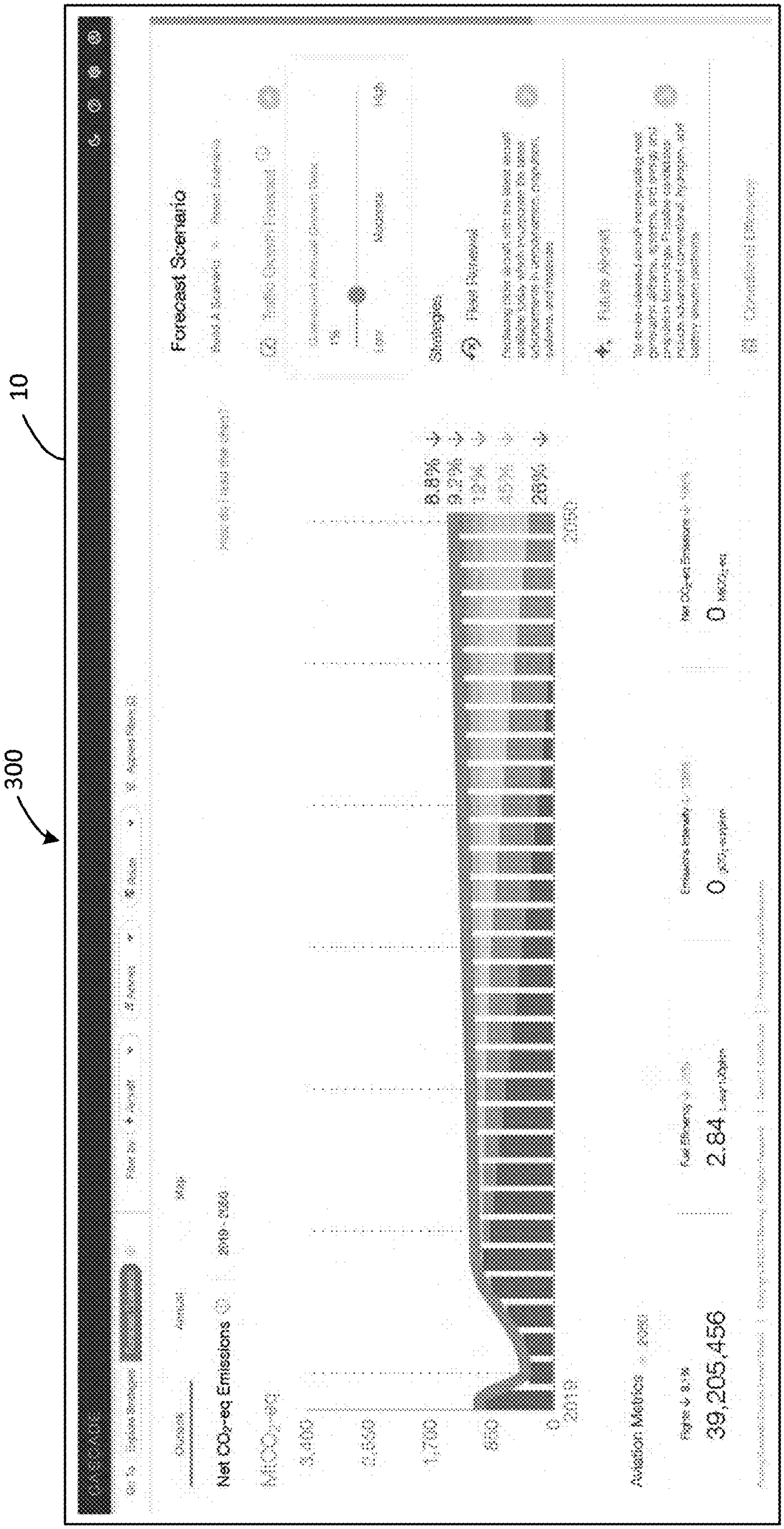
Figure 36C:
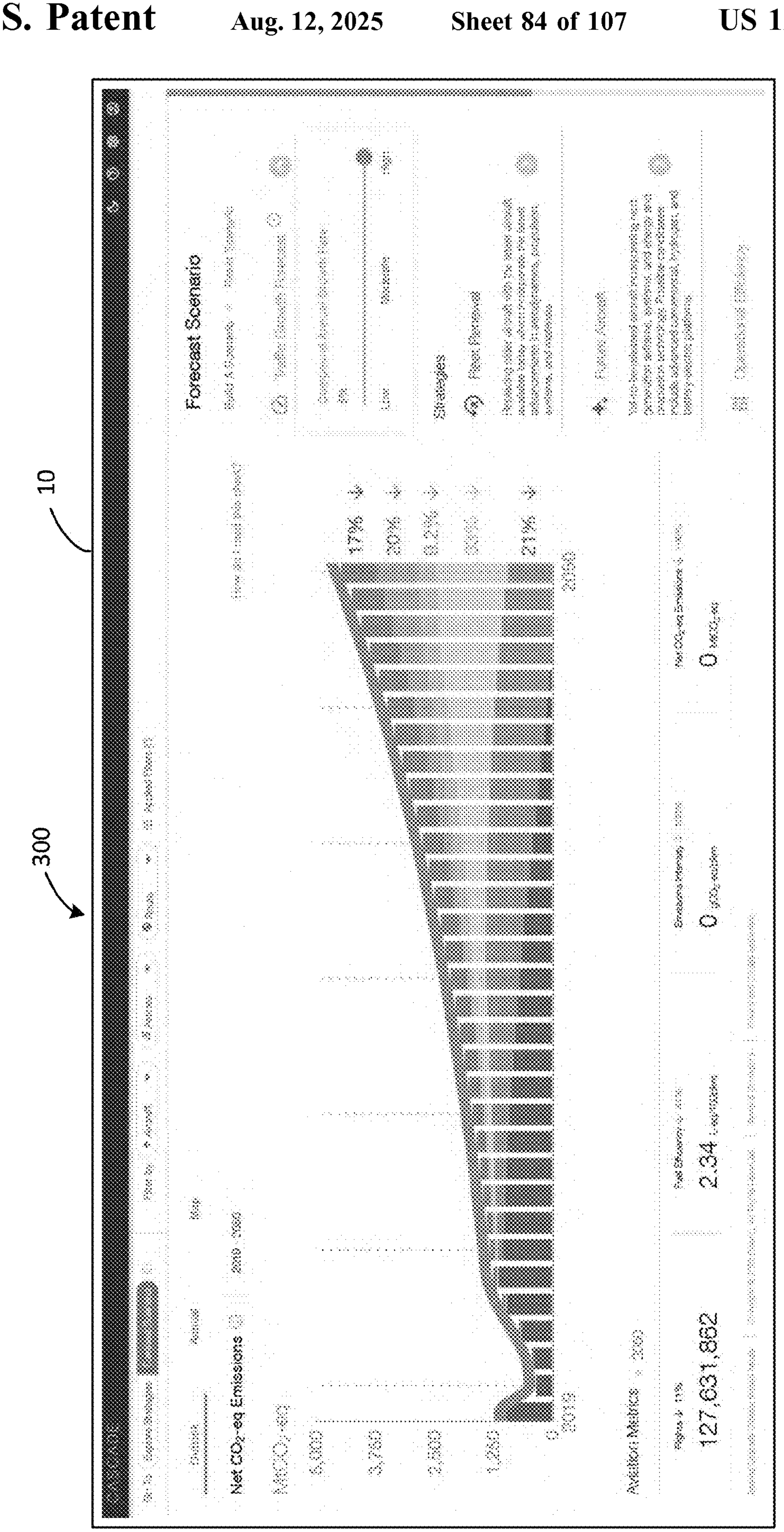

In some embodiments, each detailed lever may be configured to enable the user to adjust the corresponding setting across its full range (e.g., 0 to 100%), while each master lever may be configured to enable user adjustment of the corresponding measure within a limited range (e.g., 20 to 80%). For example, the master lever scale may have a smaller numerical range than the scale(s) of its detailed lever(s). Such configuration may facilitate and improve a user's understanding of the carbon emissions outlook graph 150 and related materials, for example, by reducing the number of tick marks shown on the scales in the master overview 201. However, since the detailed levers have a wider range than the underlying master lever, the scale of a given master lever may not encompass the values selected for its corresponding detailed lever(s). In such cases, the master lever may be configured to indicate an out-of-bounds selection on its slider, for example, by including an arrow on a far left end of the slider scale, as shown in FIG. 20C. As also shown, a given master lever may include a reset option that is displayed on or near the slider for resetting the master lever to a default value. According to some embodiments, for example, as shown in FIG. 36B, the GUI 300 may include a master reset option (or "Reset Scenario") configured to enable the user to reset all sliders or strategies to default values. In such cases, the reset option may remain inactive or grayed out when no filter options are selected or activated, and may change to colored and/or selectable format after one or more filter options are selected or implemented.

In some cases, the arrow may be displayed on the left-side of the master slider when one or more of its detailed levers is below a lower boundary of the corresponding master lever. In other cases, the out-of-bounds arrow may be displayed on a far right end of the slider scale, for example, to indicate selection of custom settings that go beyond the high end of the master lever range. In cases where the detailed levers are a mix of in-range and out-of-range values, the GUI 200 may be configured to determine which of the detailed levers has the largest impact on the corresponding measure, or is the most dominate factor, and may use the location of that detailed lever to select a corresponding location for the slider of the master lever.

Figure 14A:
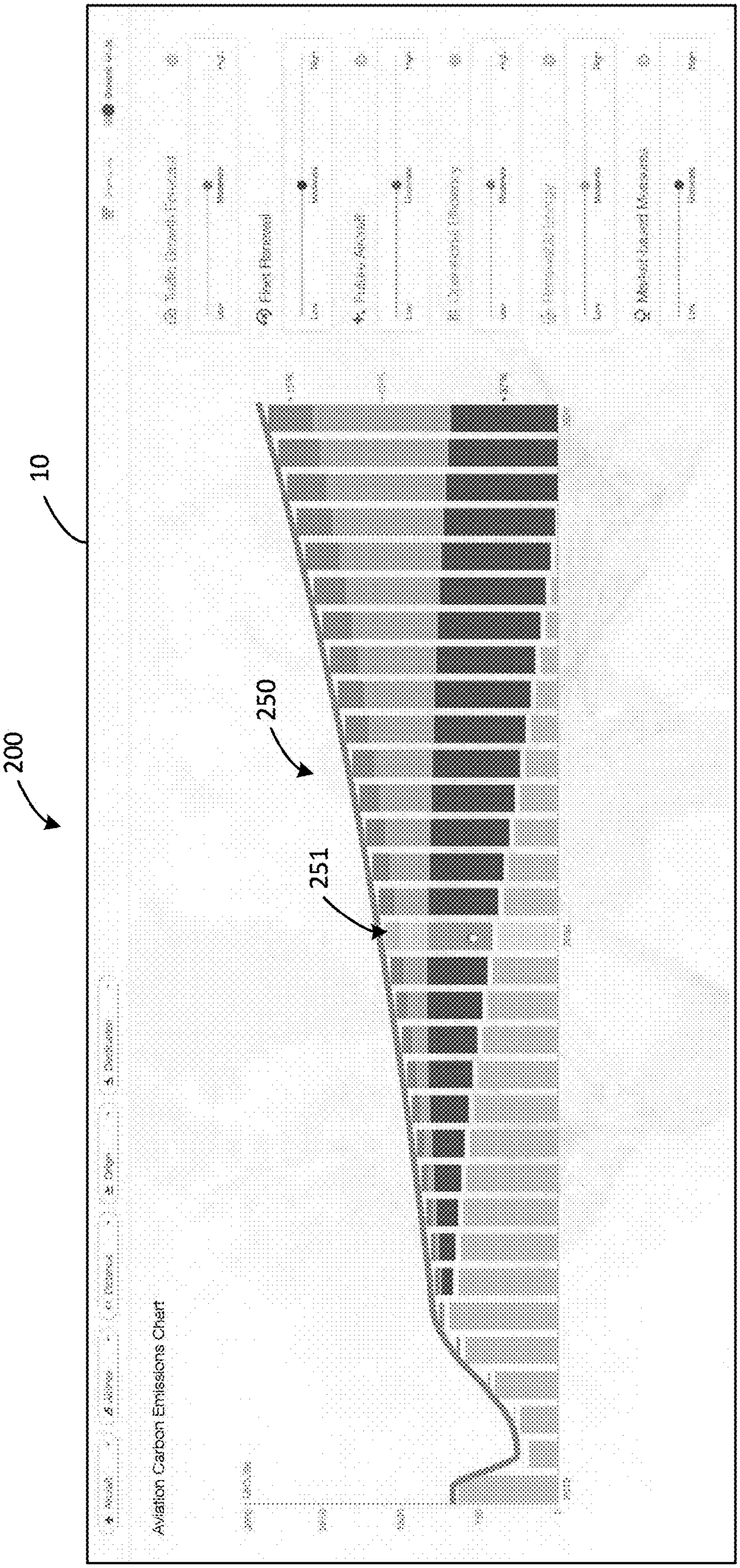
FIGS. 14A to 14C are additional screenshots of the exemplary dynamic view of FIG. 13A depicting an exemplary flow upon selecting a year in the carbon emissions chart, in accordance with certain embodiments.
Figure 14B:
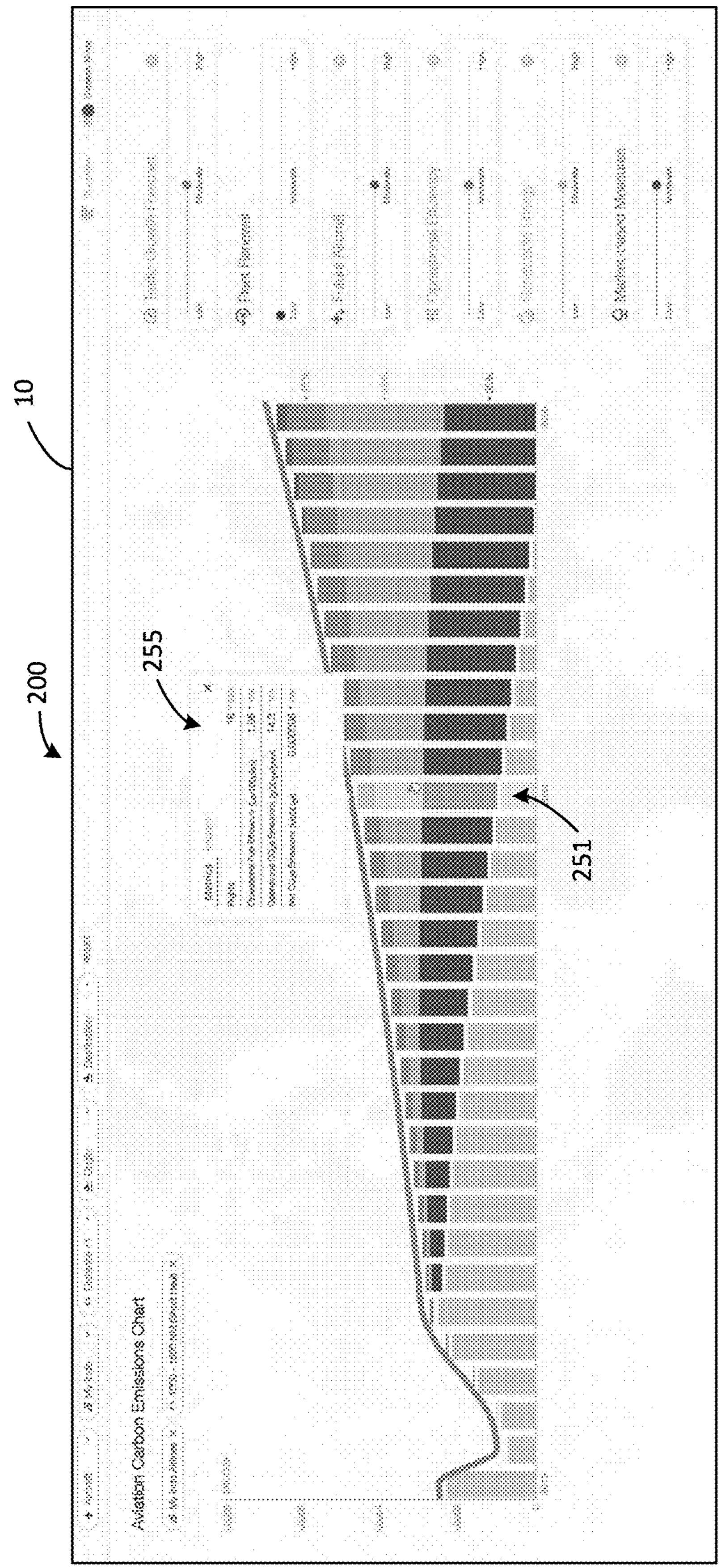
Figure 14C:
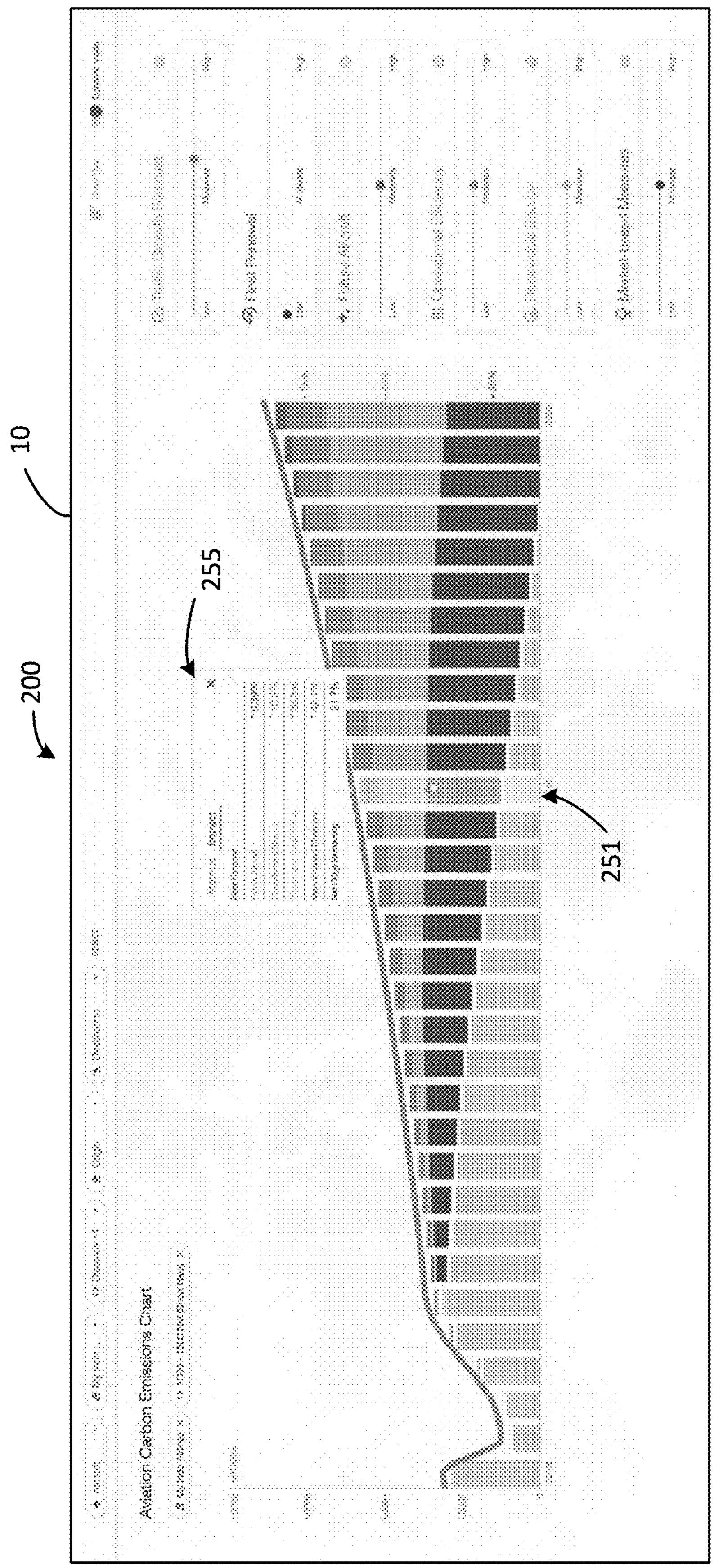
Figure 14D:
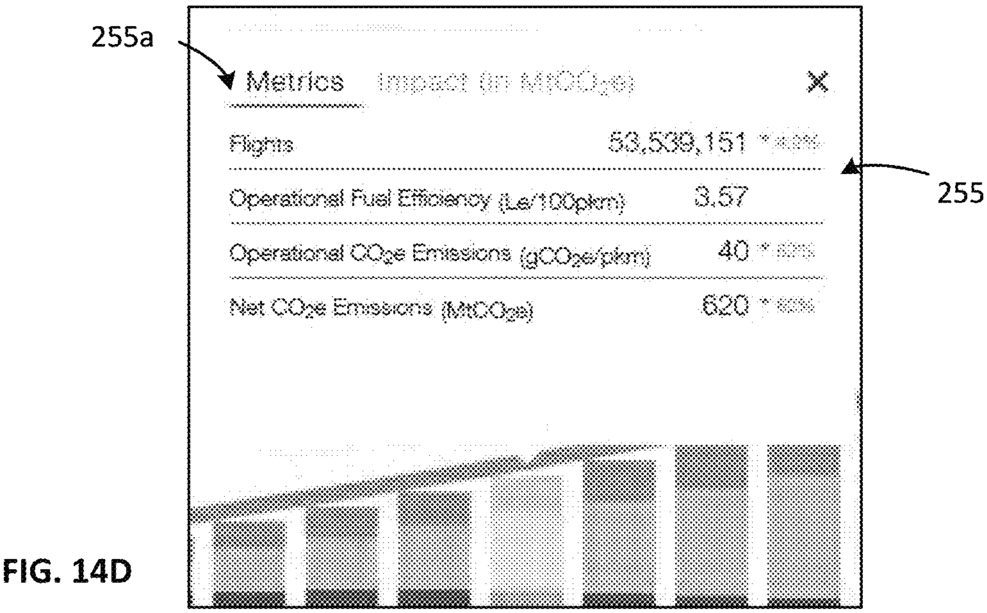
FIGS. 14D and 14E are close-up views of an exemplary pop-up window displayed in FIGS. 14B and 14C, respectively, in accordance with certain embodiments.
Figure 14E:
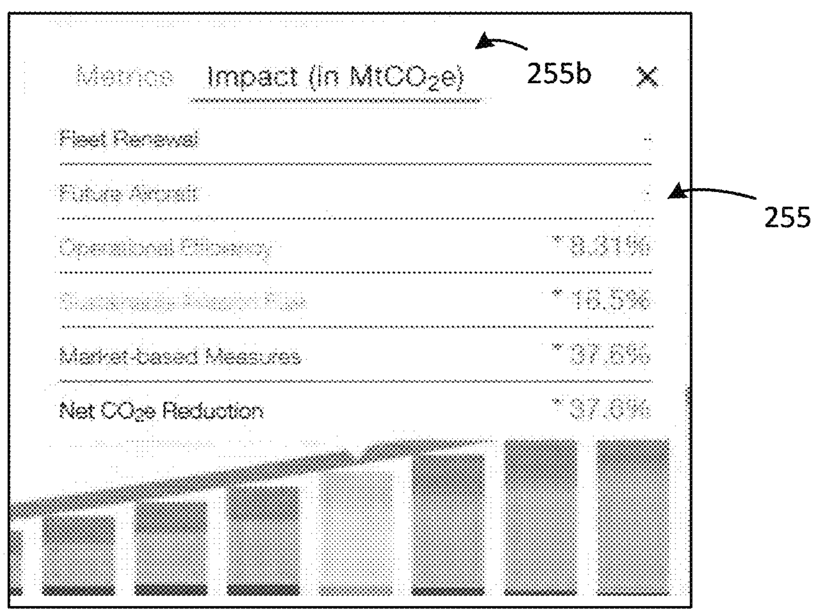

Referring now to FIGS. 14A to 14E, shown is an exemplary carbon emissions chart 250 configured to graphically display data for a select number of years using the techniques described herein. The chart 250 comprises a plurality of vertical columns or bars 251, each column 251 corresponding to a particular year. In some embodiments, hovering over, or otherwise selecting, a given column 251 causes that column 251 to become grayed out (as shown in FIG. 14A), and causes a pop-up window 255 to be displayed on top of, or at least partially overlapping the chart 250 (as shown in FIG. 14B). The pop-up window 255 displays data specific to the selected year, for example, as shown in FIG. 14D. The displayed data may include, for example, performance indicators that show the impact of the current master lever settings on emissions (in $MtCo_2e$) and/or operational metrics (e.g., number of flights, fuel efficiency, etc.) for the selected year. In the illustrated embodiment, the pop-up window 255 also includes a number of tabs for toggling between different sets of data for the selected year, such as, e.g., a "Metrics" tab 255*a* and an "Impact" tab 255*b*, as shown by the flow from FIG. 14B to 14C (see also, FIGS. 14D and 14E for close-up views of the window 255). The pop-up window 255 enables the user to see year-specific information and jump from year to year, all while viewing the larger carbon emissions chart 250.

Figure 37:
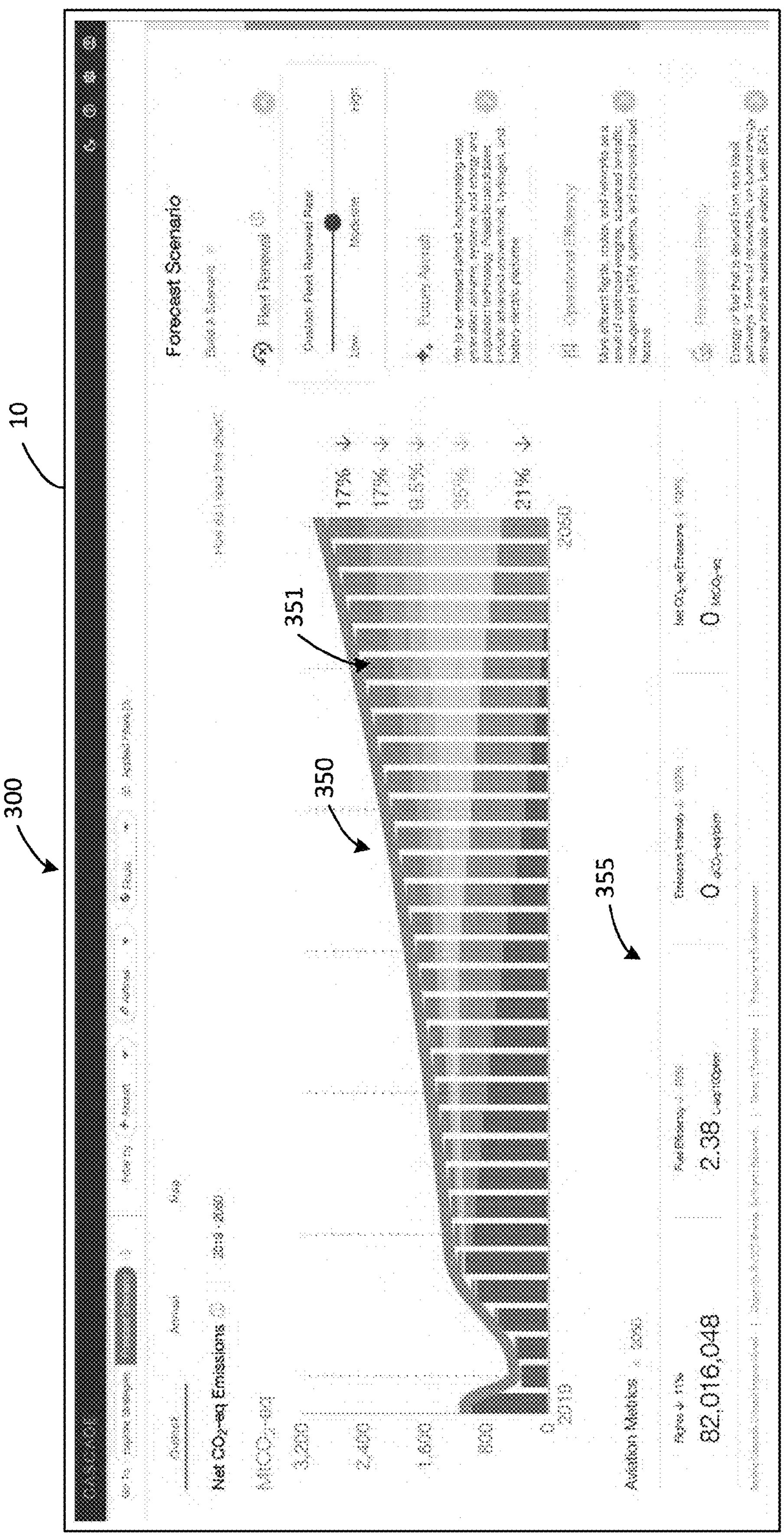
FIG. 37 is a screenshot of a third exemplary outlook view included in the forecast scenarios view of FIG. 34A, the third outlook view graphically depicting a fleet renewal option, in accordance with certain embodiments.
Figure 38A:
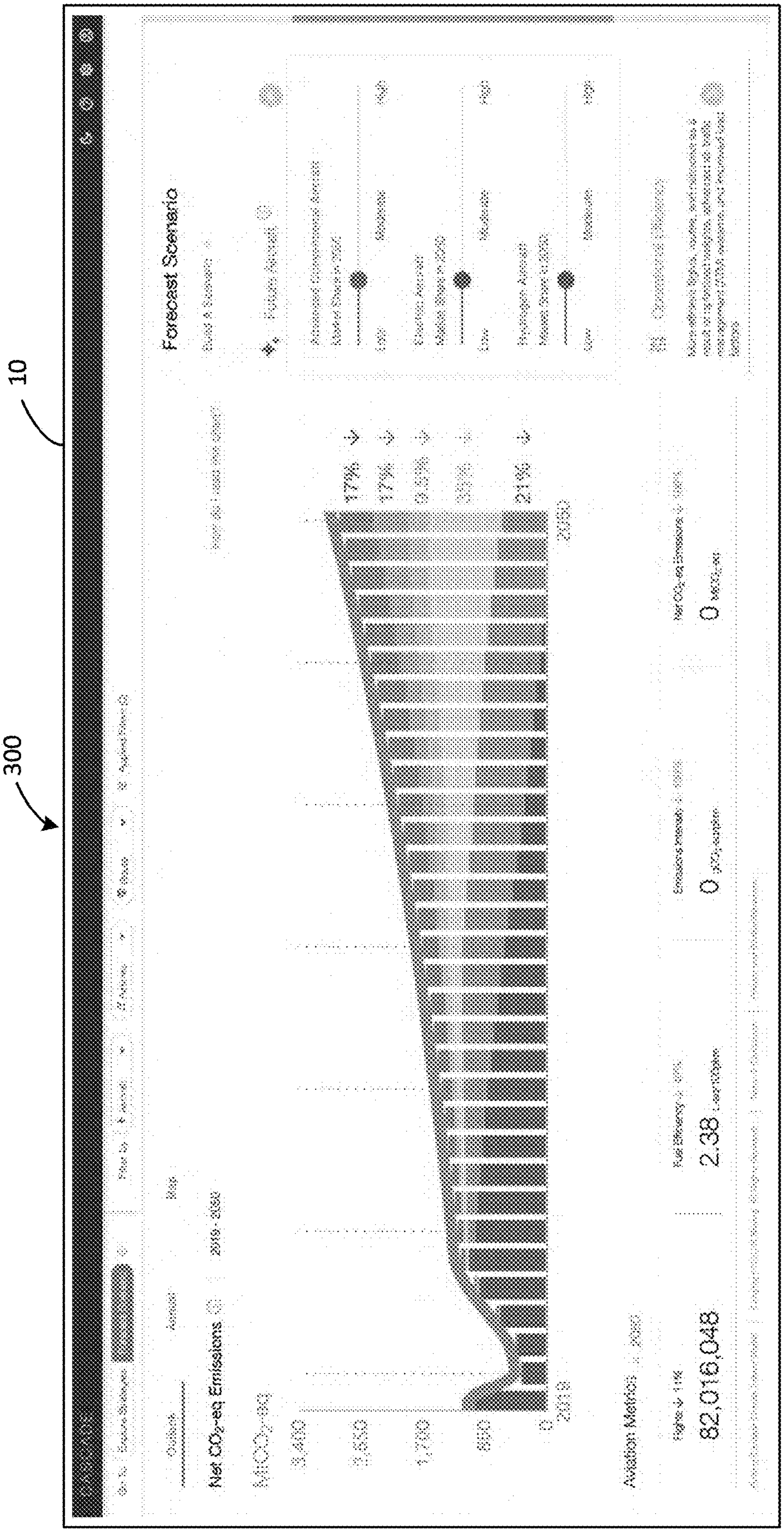
FIGS. 38A and 38B are screenshots of a third exemplary outlook view included in the forecast scenarios view of FIG. 34A, the third outlook view graphically depicting user selection of various future aircraft options, in accordance with certain embodiments.
Figure 38B:
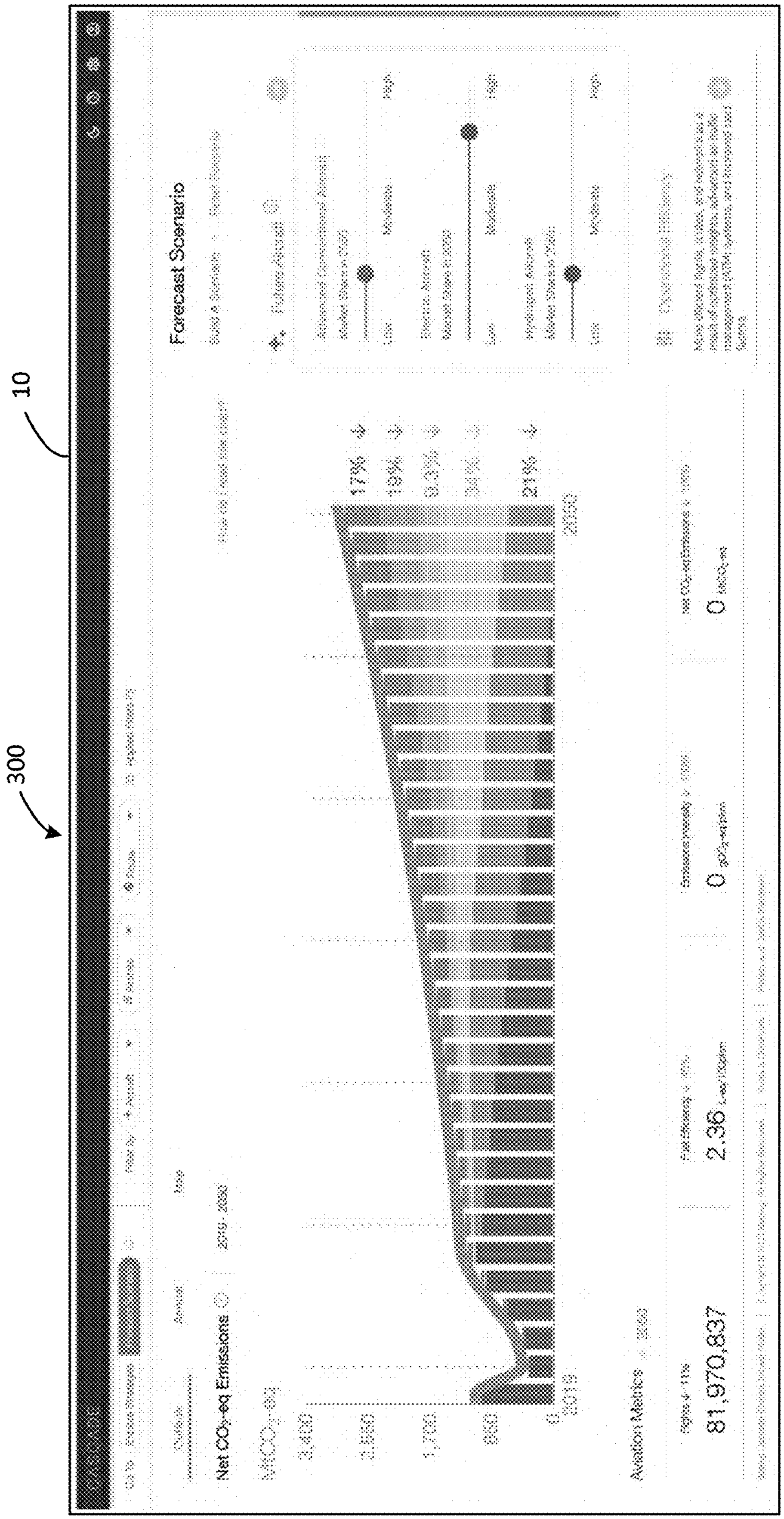
Figure 39A:
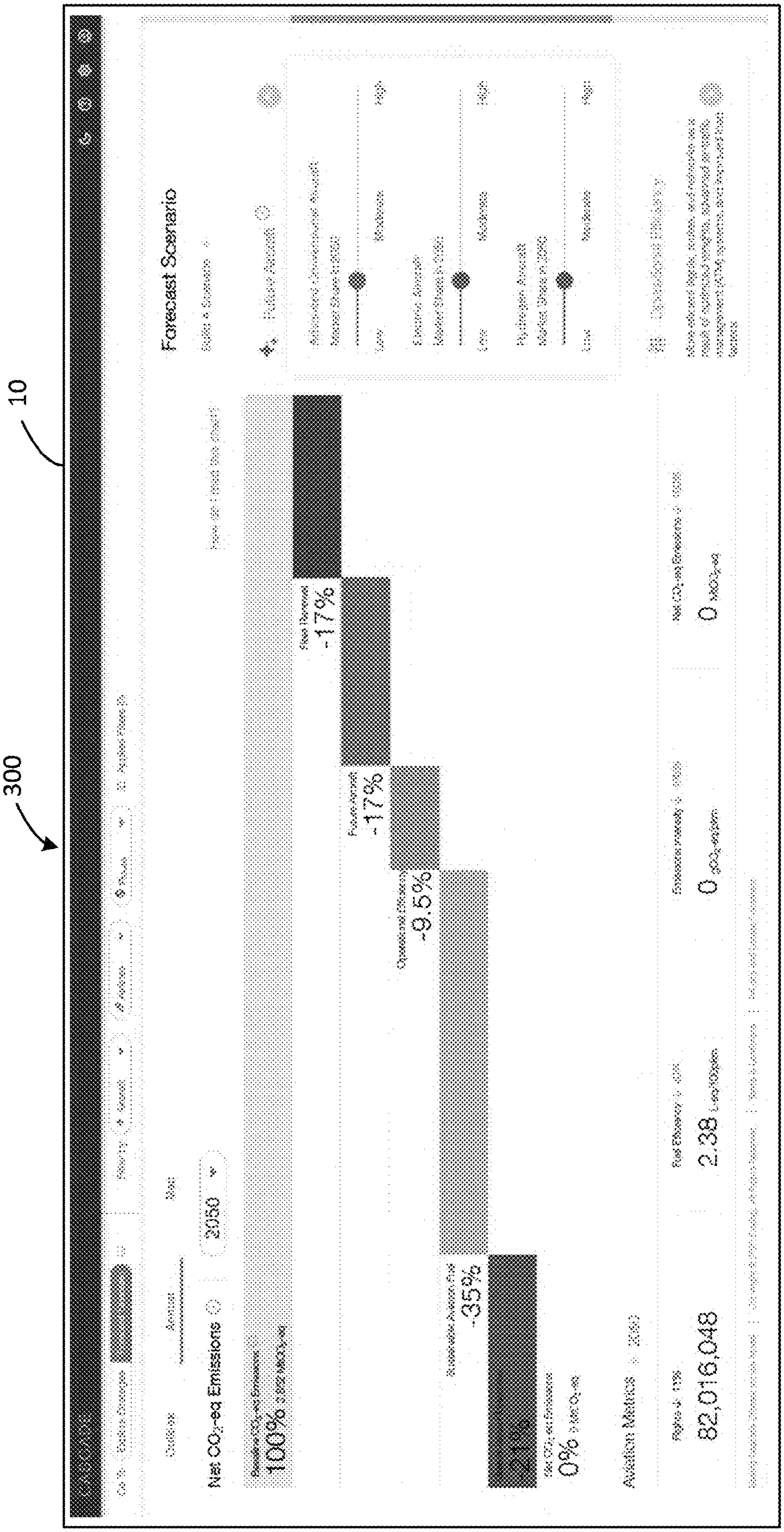
FIGS. 39A and 39B are screenshots of an exemplary annual view included in the forecast scenarios view of FIG. 34A, the annual view corresponding to the outlook view shown in FIG. 38A, in accordance with certain embodiments.
Figure 39B:
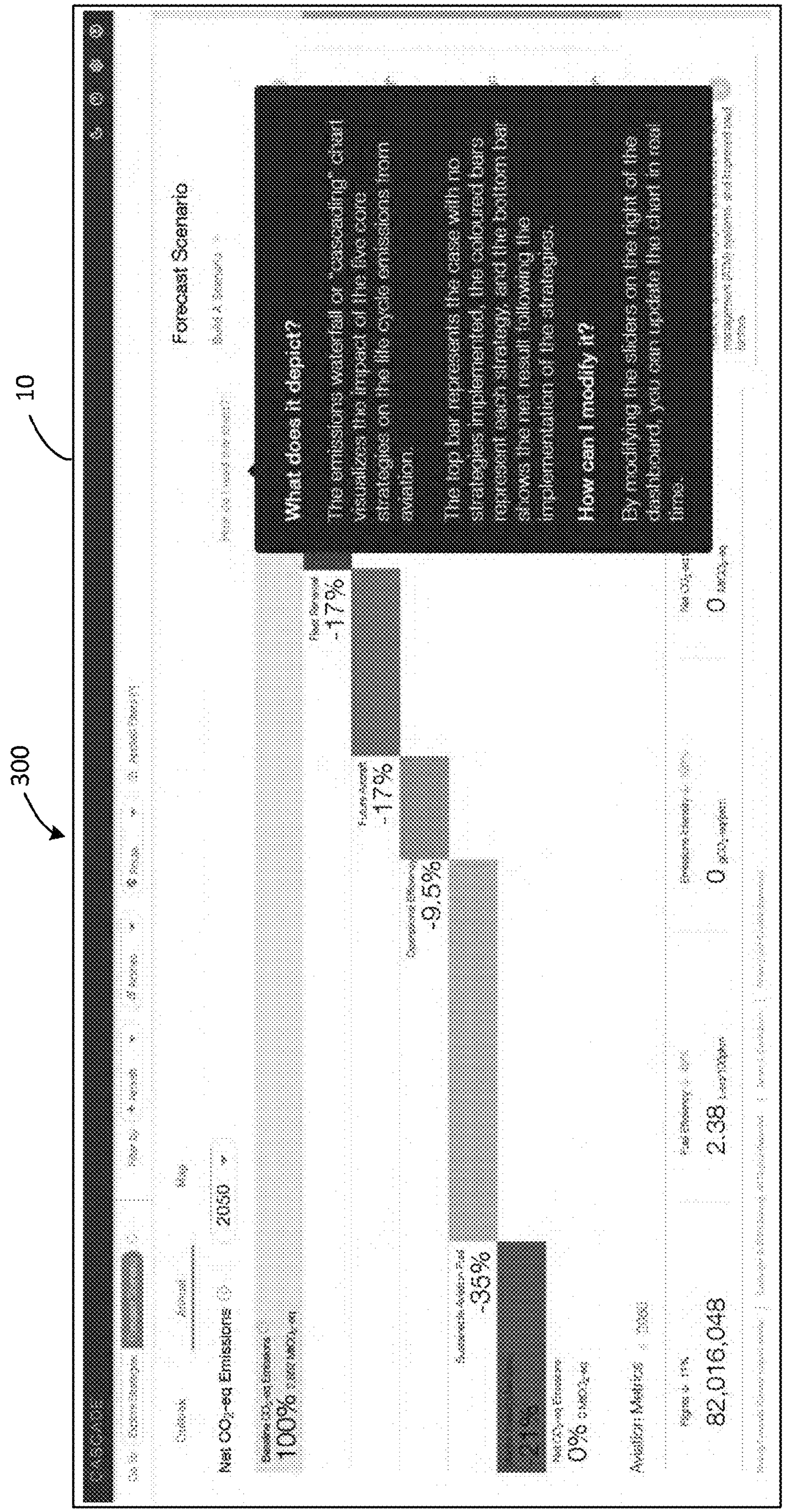
Figure 40A:
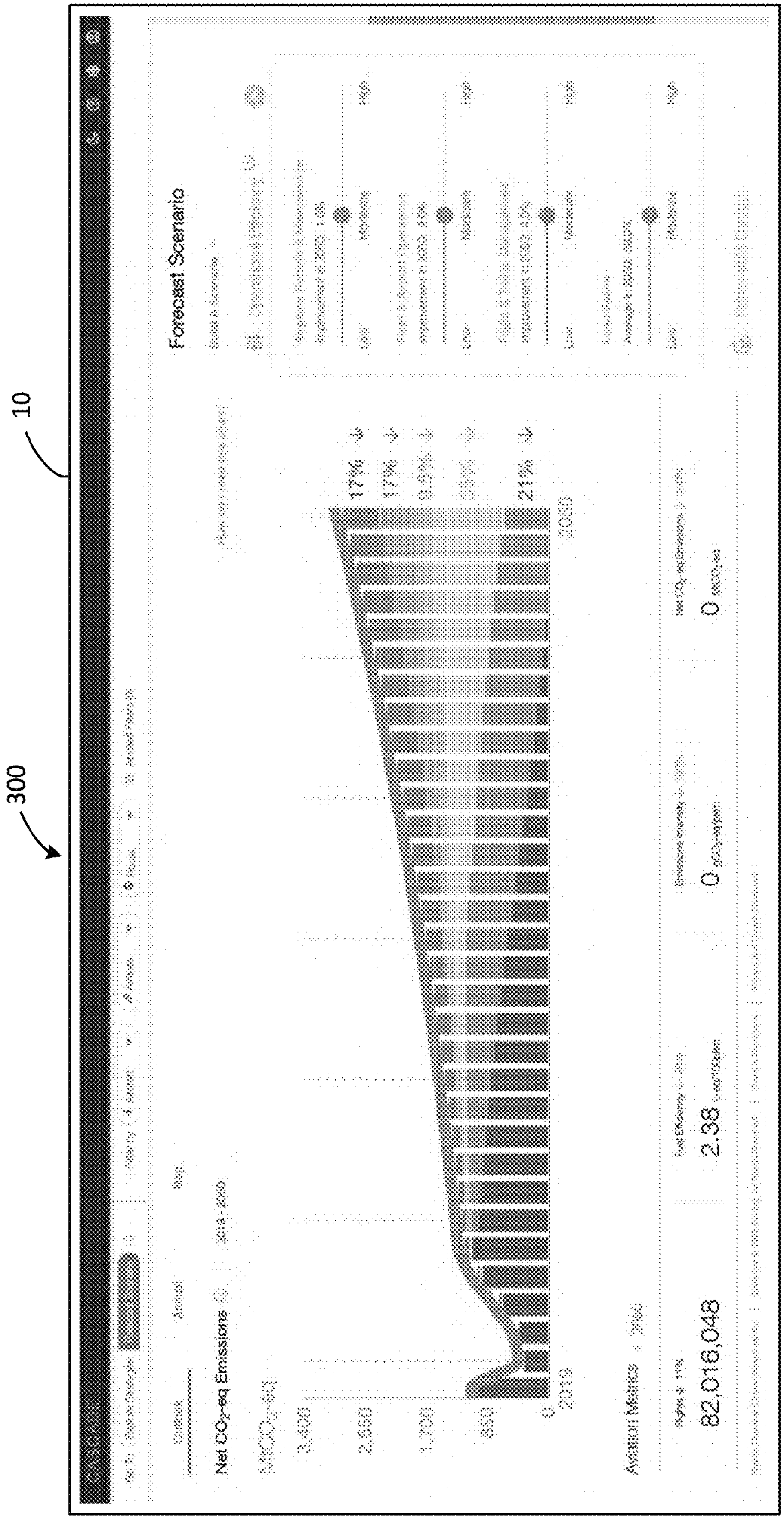
FIGS. 40A and 40B are screenshots of a fourth exemplary outlook view included in the forecast scenarios view of FIG. 34A, the fourth outlook view graphically depicting user selection of various operational efficiency options, in accordance with certain embodiments.
Figure 40B:
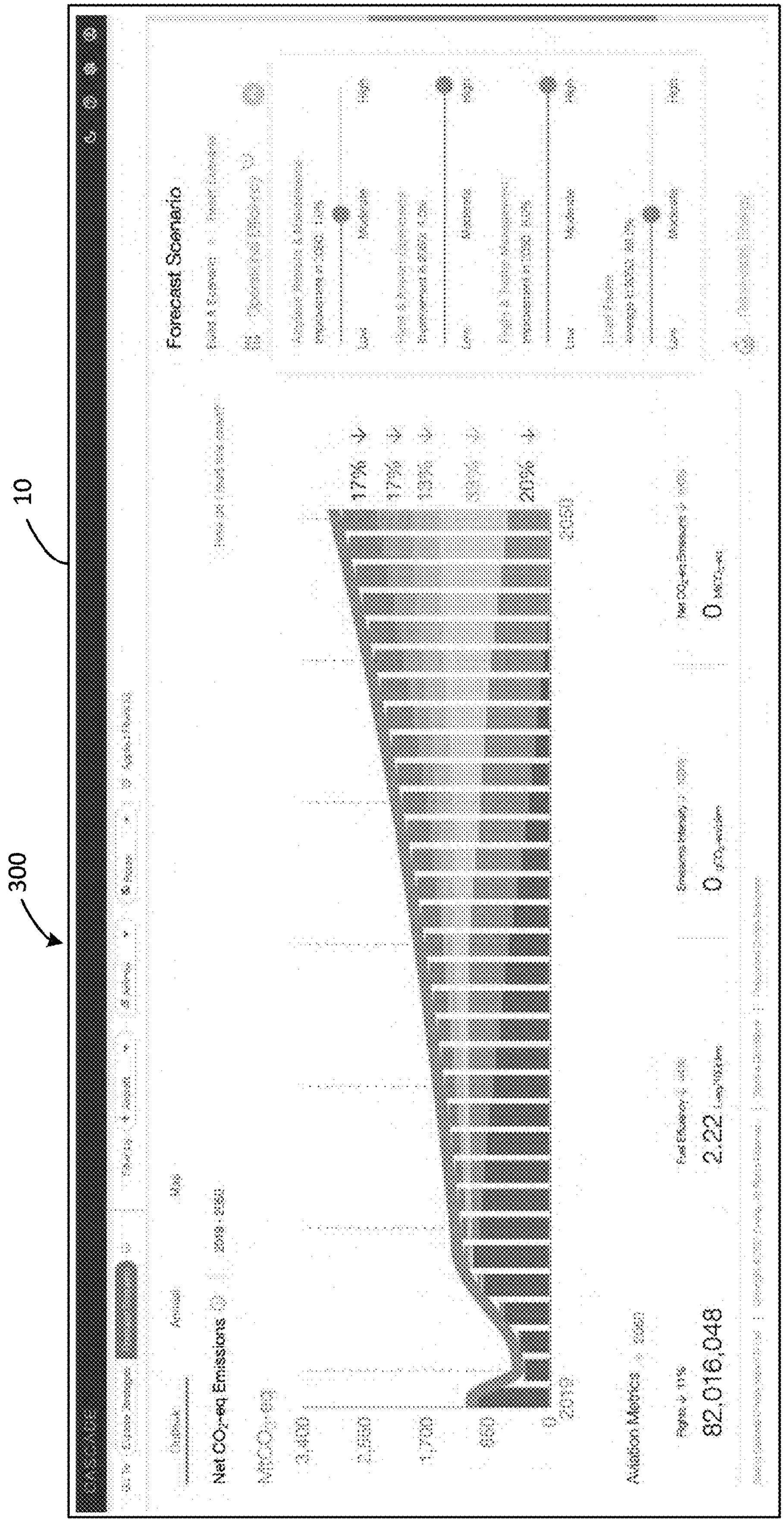
Figure 41A:
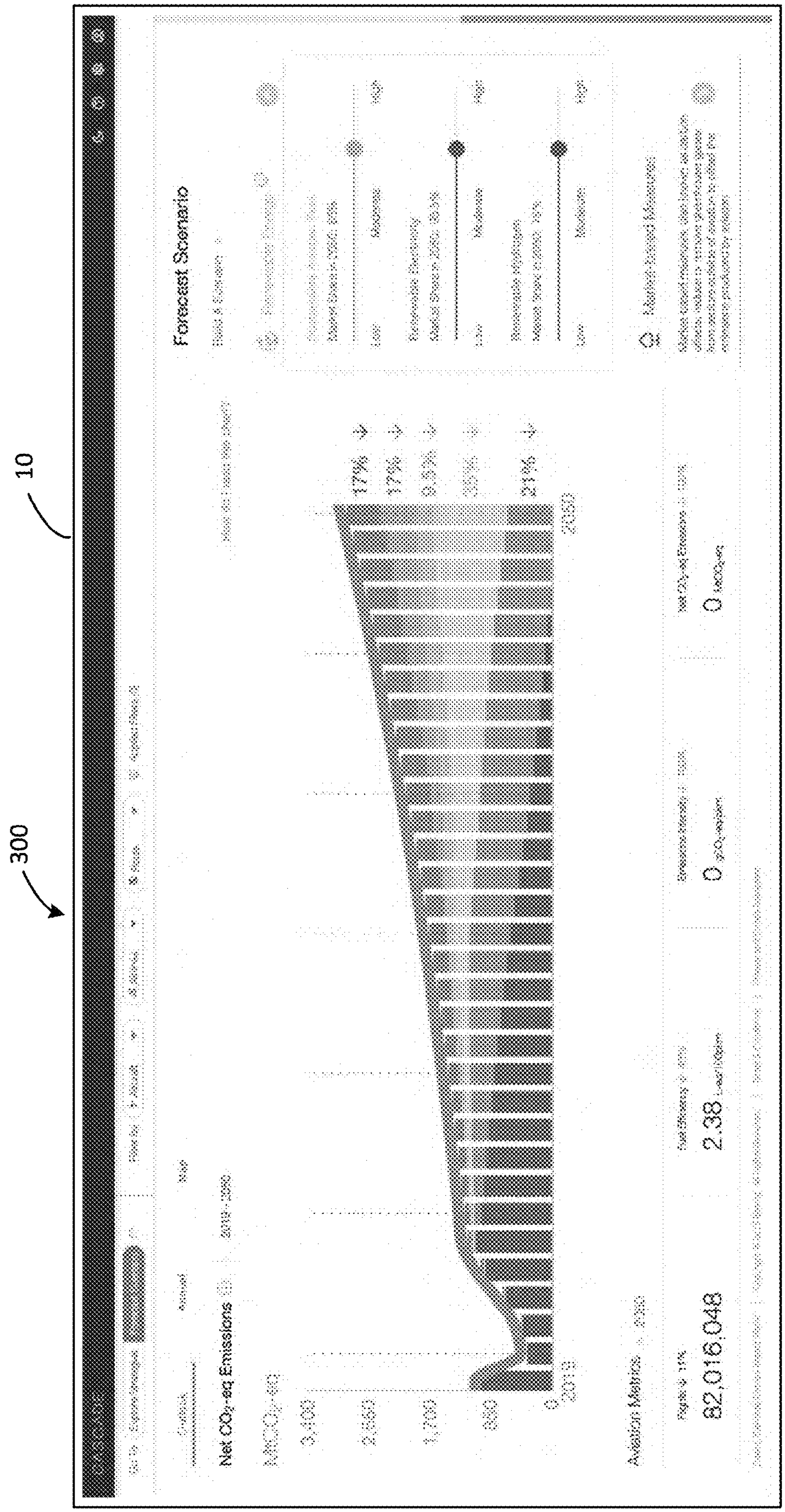
FIGS. 41A and 41B are screenshots of a fifth exemplary outlook view included in the forecast scenarios view of FIG. 34A, the fifth outlook view graphically depicting user selection of various renewable energy options, in accordance with certain embodiments.
Figure 41B:
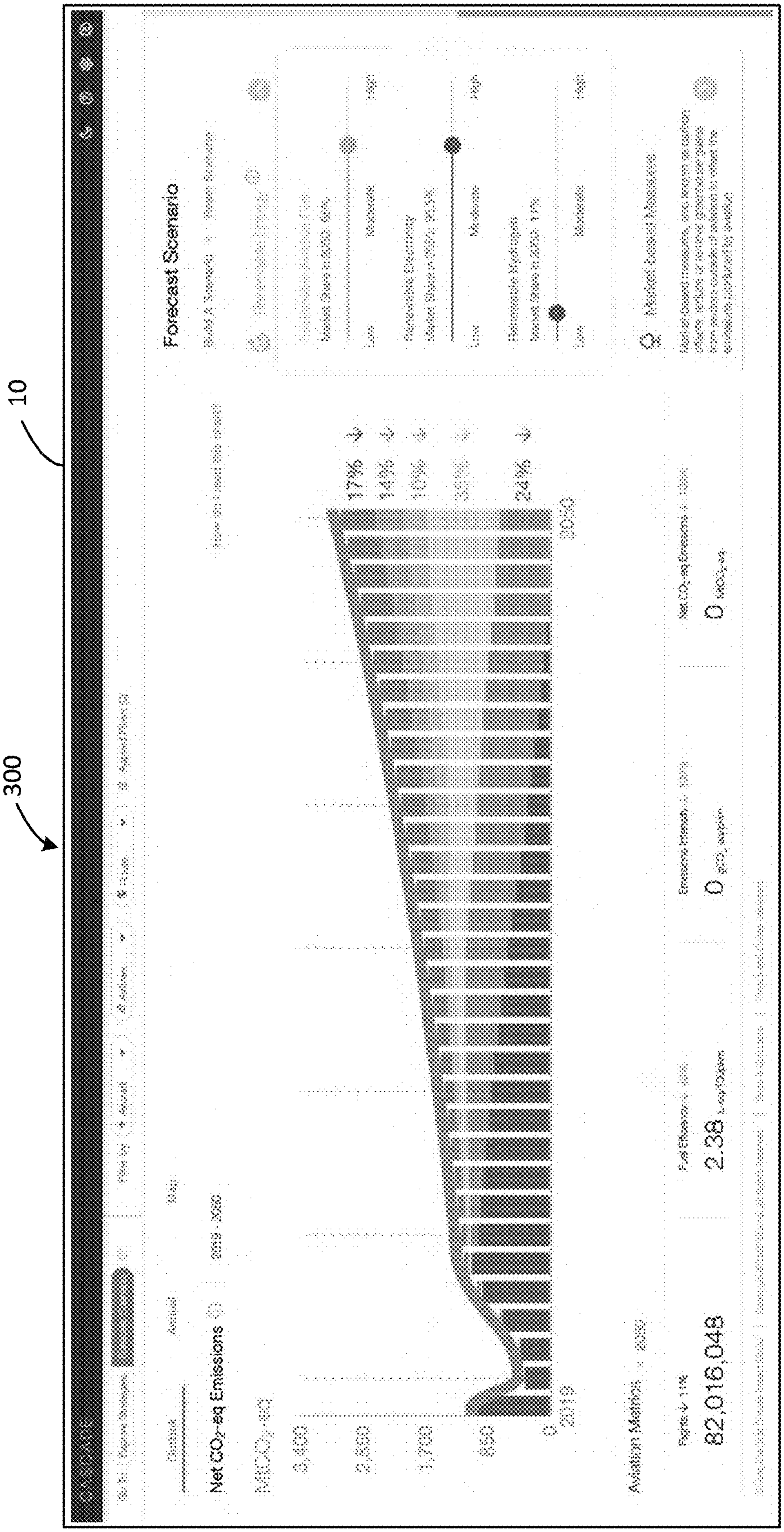
Figure 42A:
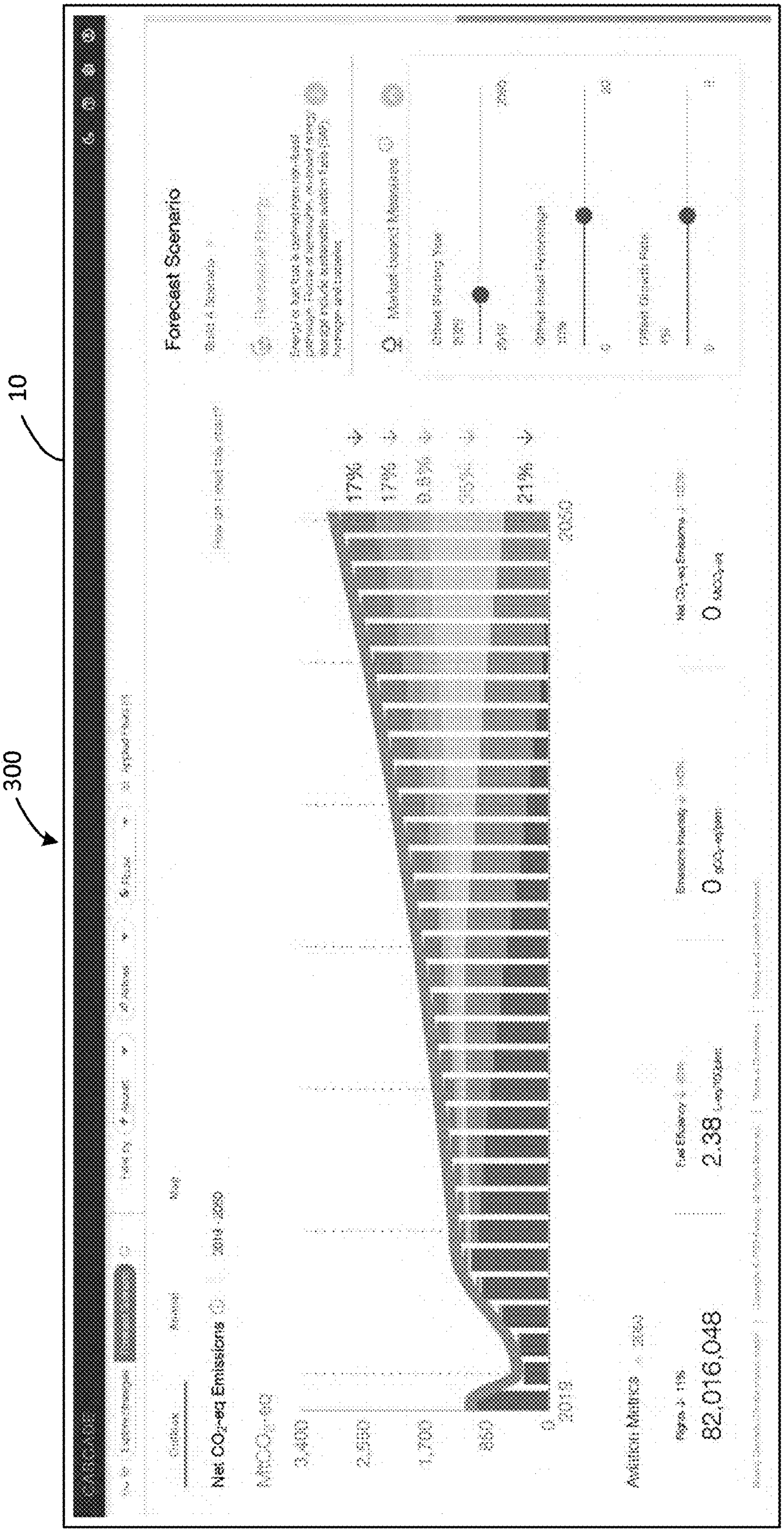
FIGS. 42A and 42B are screenshots of a sixth exemplary outlook view included in the forecast scenarios view of FIG. 34A, the sixth outlook view graphically depicting user selection of various market-based measures options, in accordance with certain embodiments.
Figure 42B:
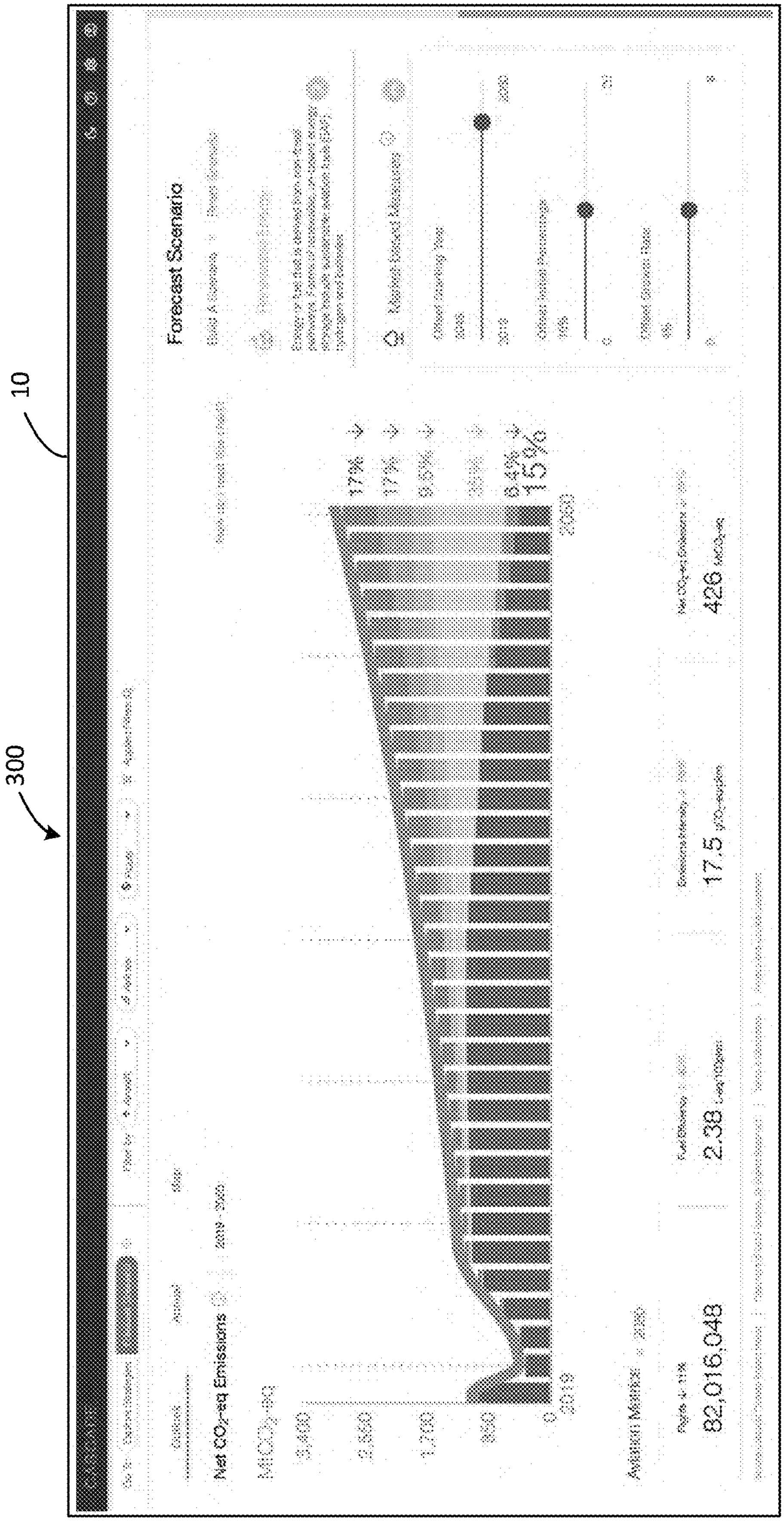
Figure 43:
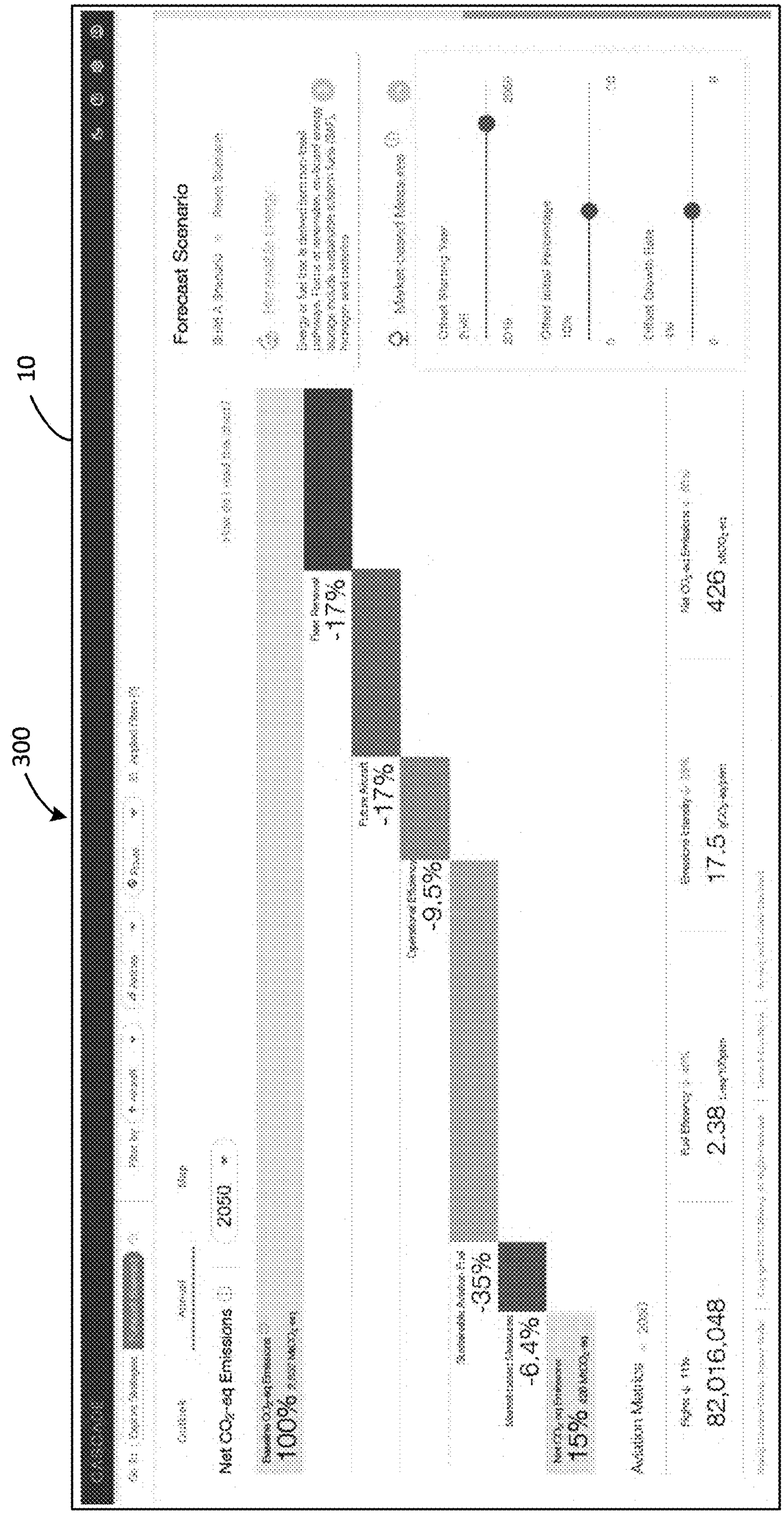
FIG. 43 is a screenshot of a second exemplary annual view included in the forecast scenarios view of FIG. 34A, the second annual view corresponding to the outlook view shown in FIG. 42B, in accordance with certain embodiments.

According to other embodiments, the GUI 300 may be configured to display detailed data, or aviation metrics, for a selected year in a summary table 355 that is presented below a carbon emissions chart 350 of an outlook view presented in the forecast scenario view, for example, as shown in FIG. 37. That is, instead of displaying the pop-up window 255 on top of the chart 250, the GUI 300 can display the same, or similar data, in a fixed table that does not overlap with, and possibly block view of, the carbon emissions chart 350. The data displayed in the summary table 355 may be automatically updated each time a new year is selected, e.g., using one of the user-selectable bars 351 of the chart 350.

Figure 21:
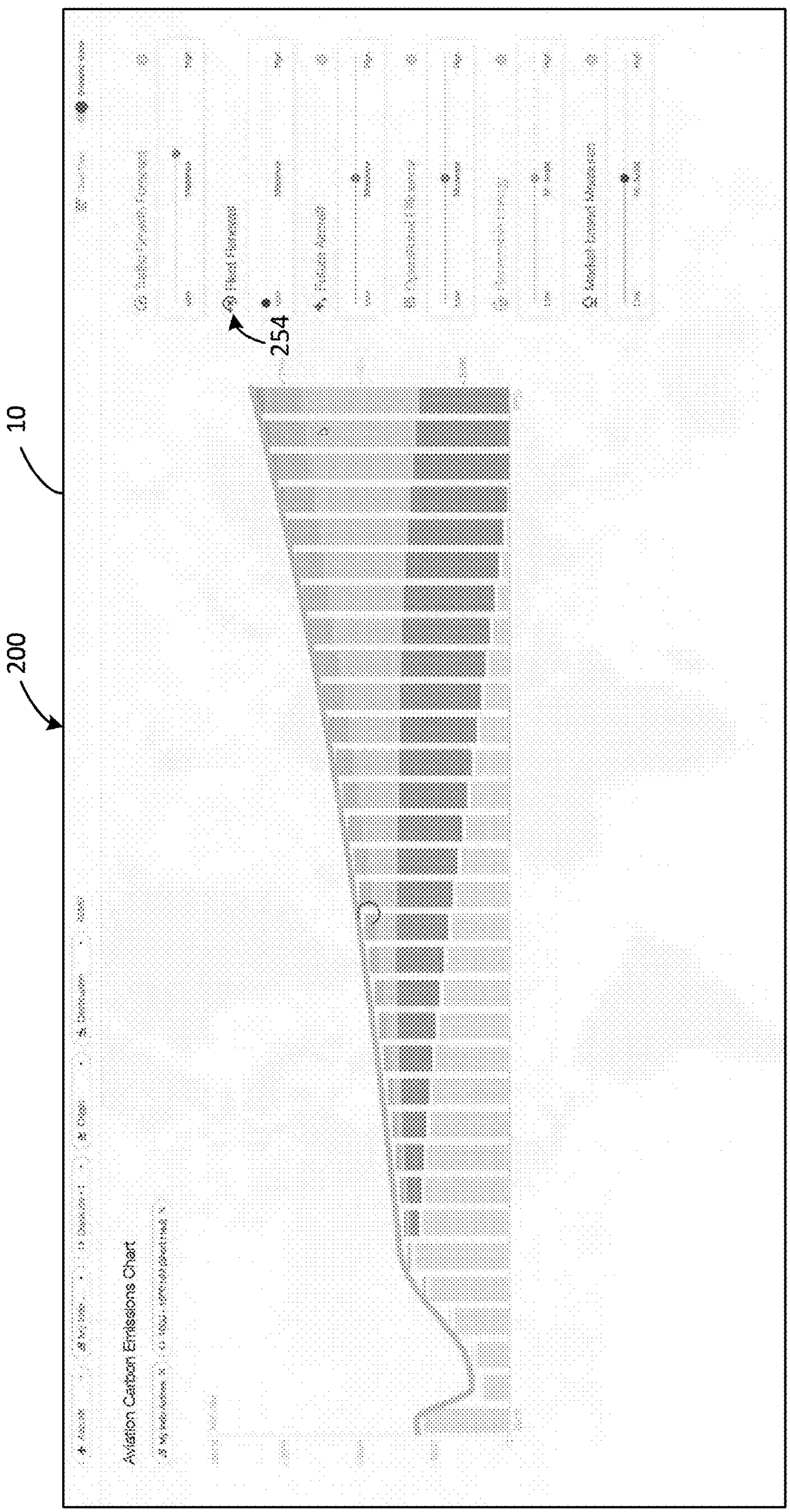
FIG. 21 is another screenshot of the exemplary dynamic view of FIG. 15 depicting a loading state, in accordance with certain embodiments.
Figure 36D:
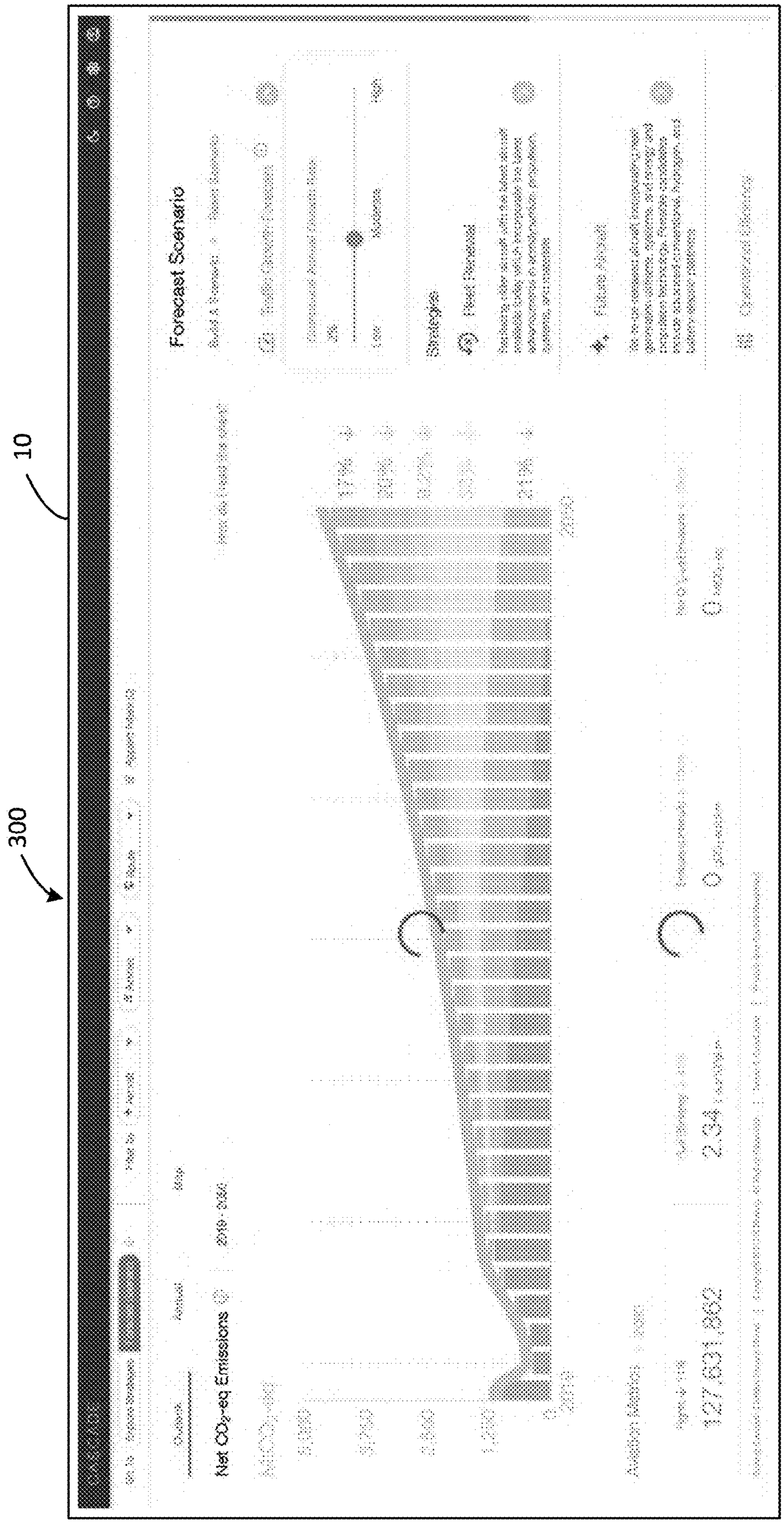
Figure 36E:
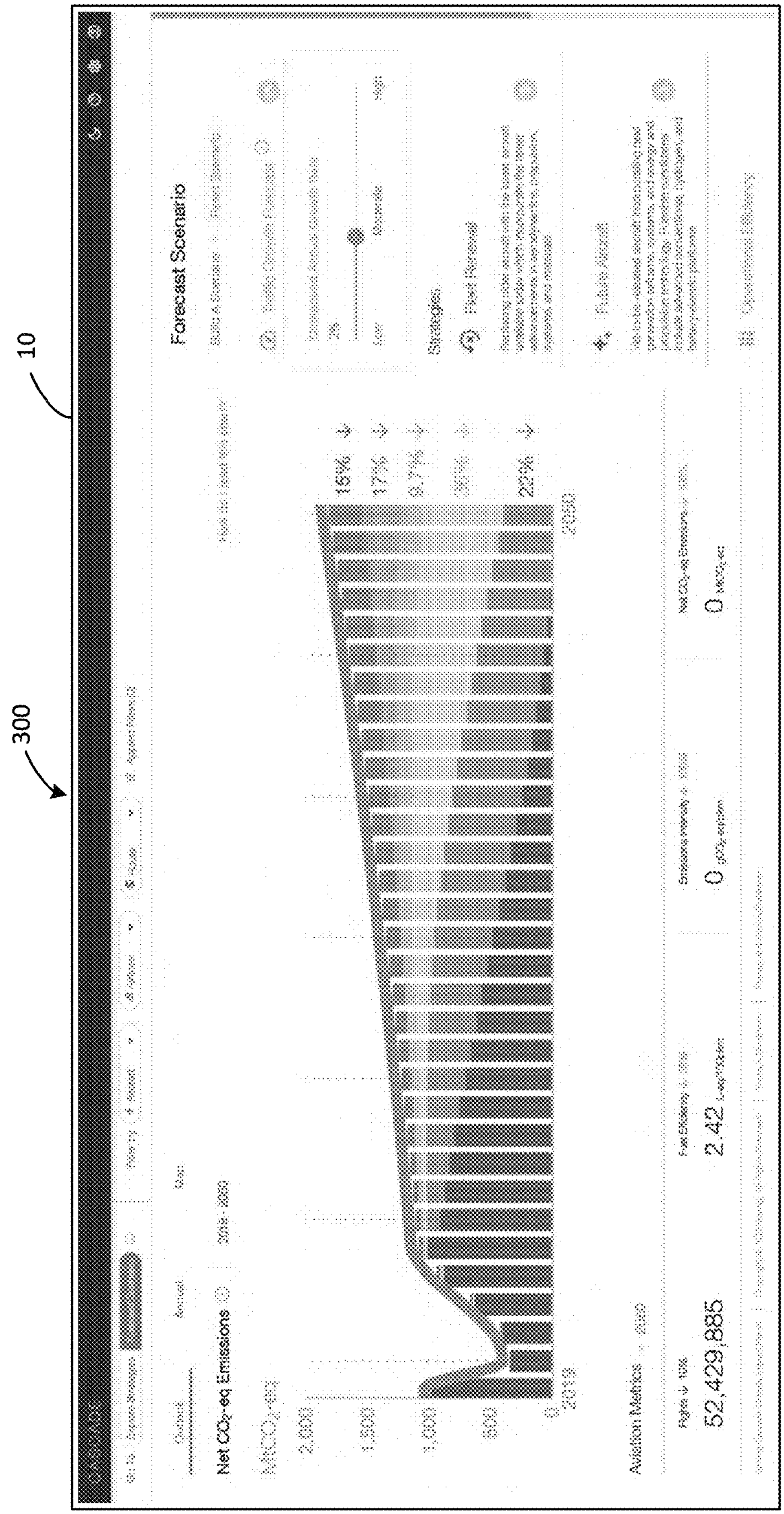

FIG. 21 shows an exemplary screenshot of the GUI 200 while data is loading onto the display device. As shown, the carbon emissions chart 250 may be at least slightly grayed out while the data is being loaded. Once that upload is complete, the chart 250 may return to its full color. As an example, the grayed-out chart 250 shown in FIG. 21 may be an intermediary view that is displayed after the user moves the Fleet Renewal lever 254 from the moderate setting to the low setting, or otherwise represents the GUI 200 transitioning from the chart 250 shown in FIG. 13A, where all of the levers have default settings, to the chart 250 shown in FIG. 15, where the slider for the Fleet Renewal lever 254 is in the low setting. In some embodiments, for example as shown in FIG. 36D, an icon for indicating "loading" or processing" may also be displayed on top of the grayed out information while the display data is loading. In other embodiments, only the icon may be displayed to indicating loading and the rest of the screen may remain in full color (e.g., not be grayed out).

Figure 23:
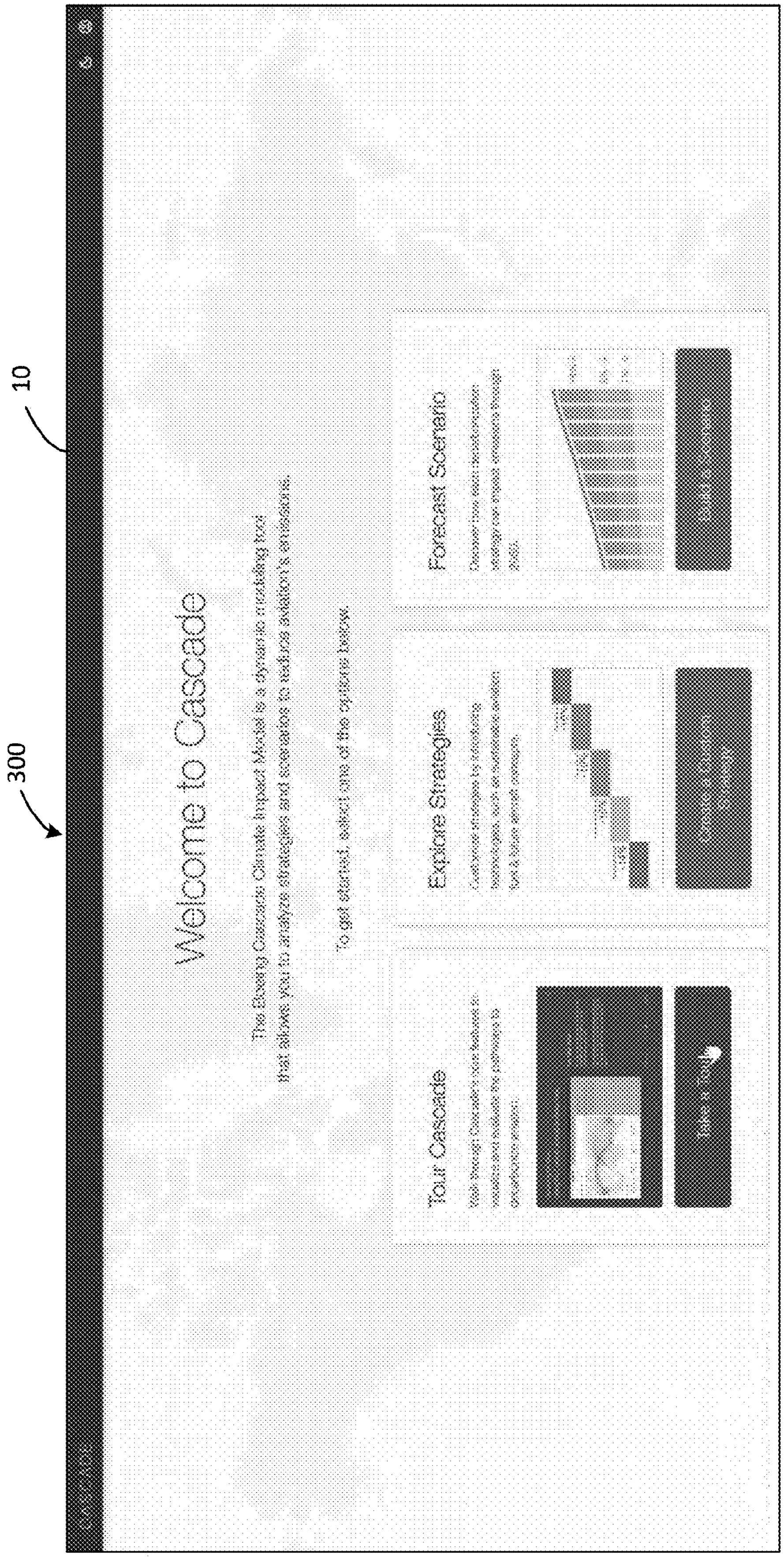
FIG. 23 is a screenshot of an exemplary graphical user interface for depicting a welcome screen of the dynamic aviation emissions modeling tool, the welcome screen comprising various user-selectable options for interacting with the tool, including taking a tour, exploring strategies, and forecasting scenarios, in accordance with certain embodiments.
Figure 24A:
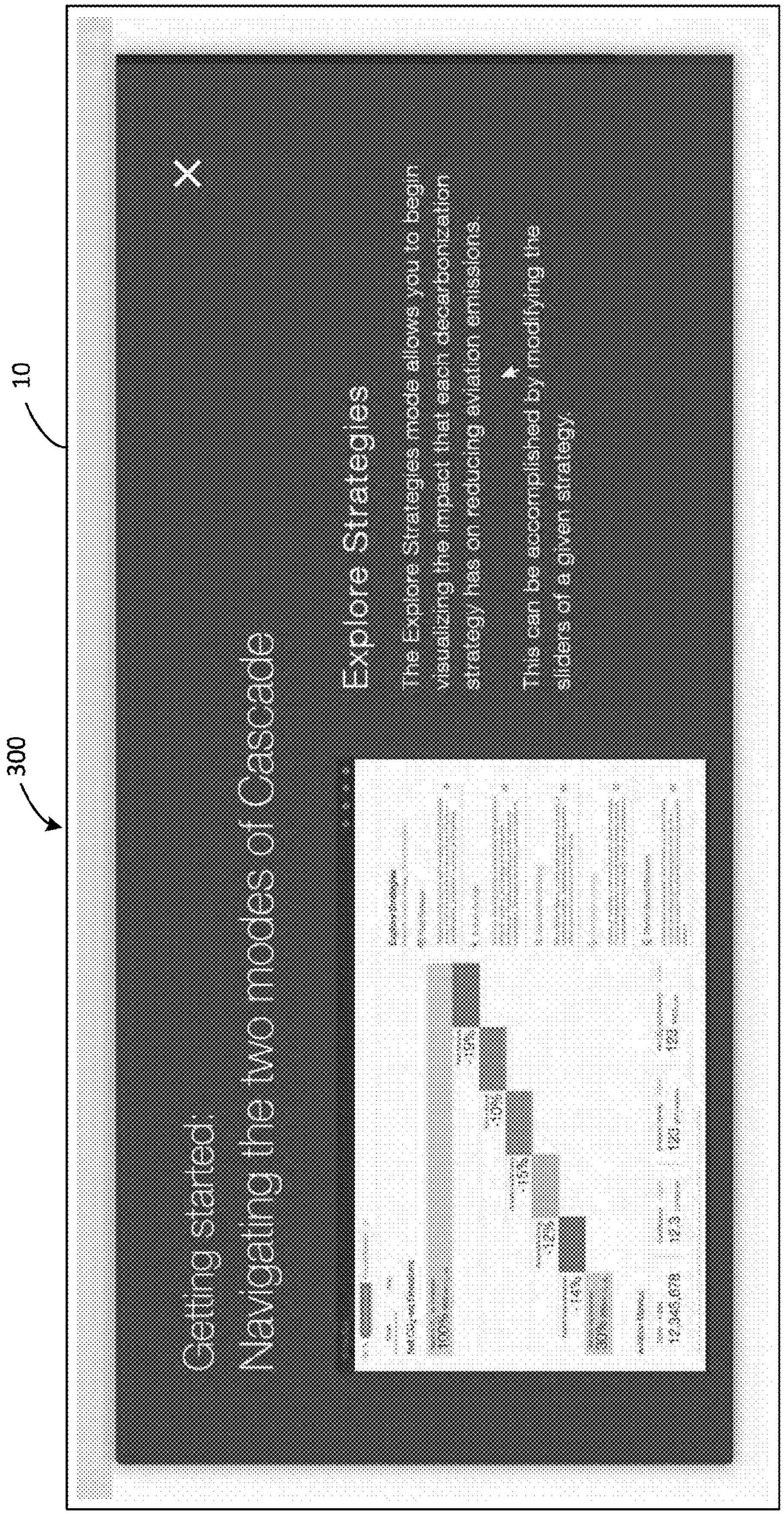
FIGS. 24A to 24J are screenshots of an exemplary graphical user interface for depicting a tour view of the dynamic aviation emissions modeling tool shown in FIG. 23, in accordance with certain embodiments.
Figure 24B:
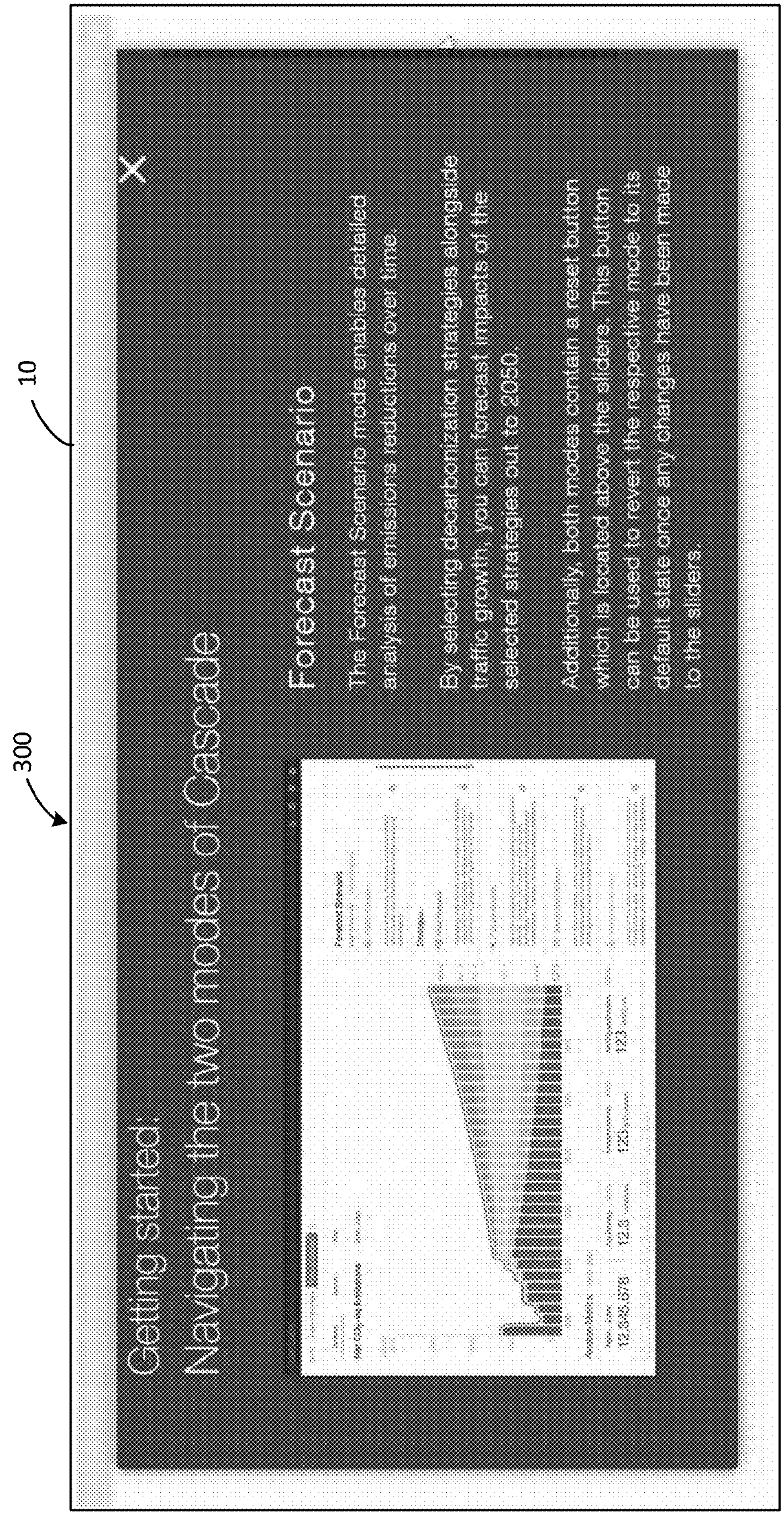
Figure 24C:
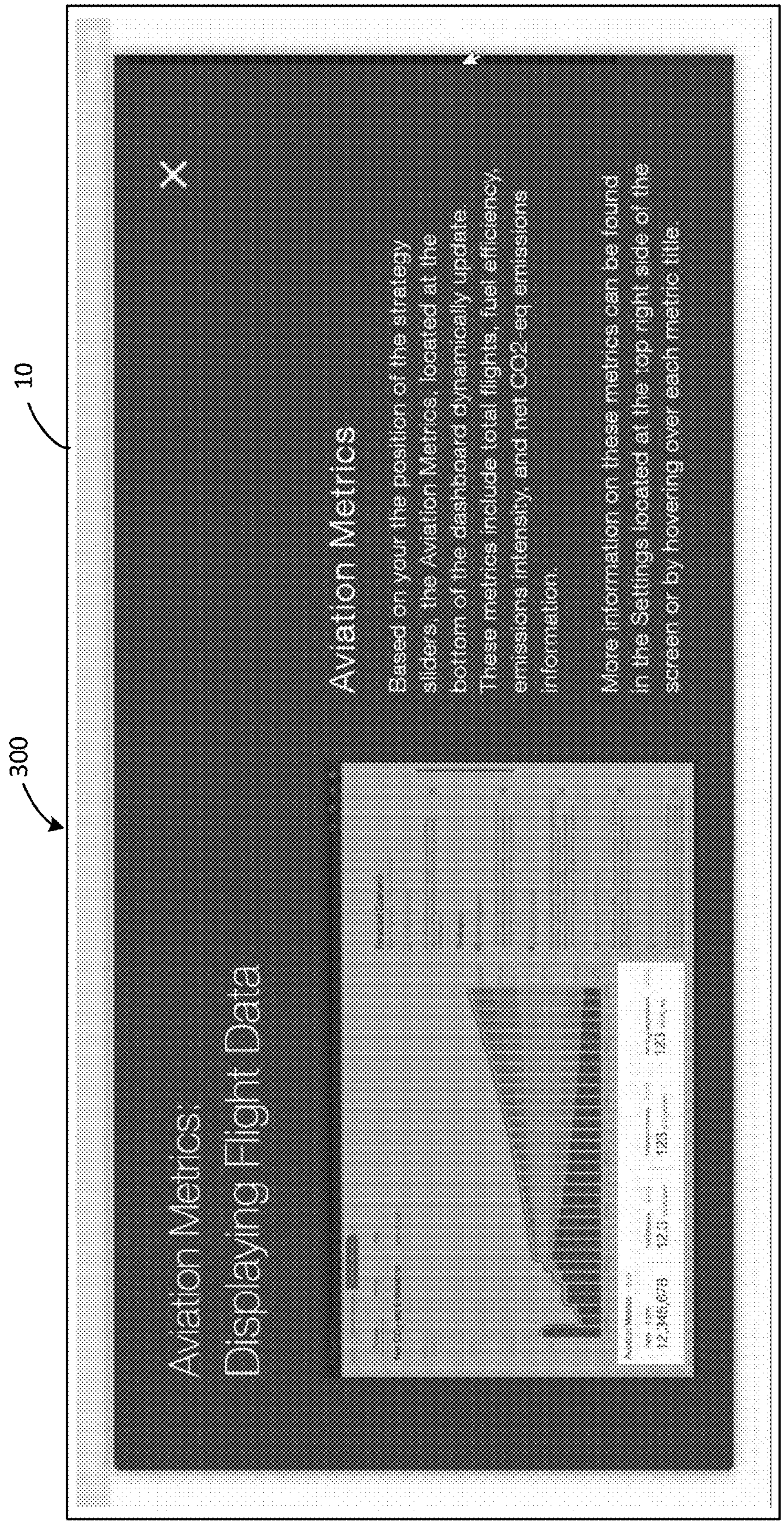
Figure 24D:
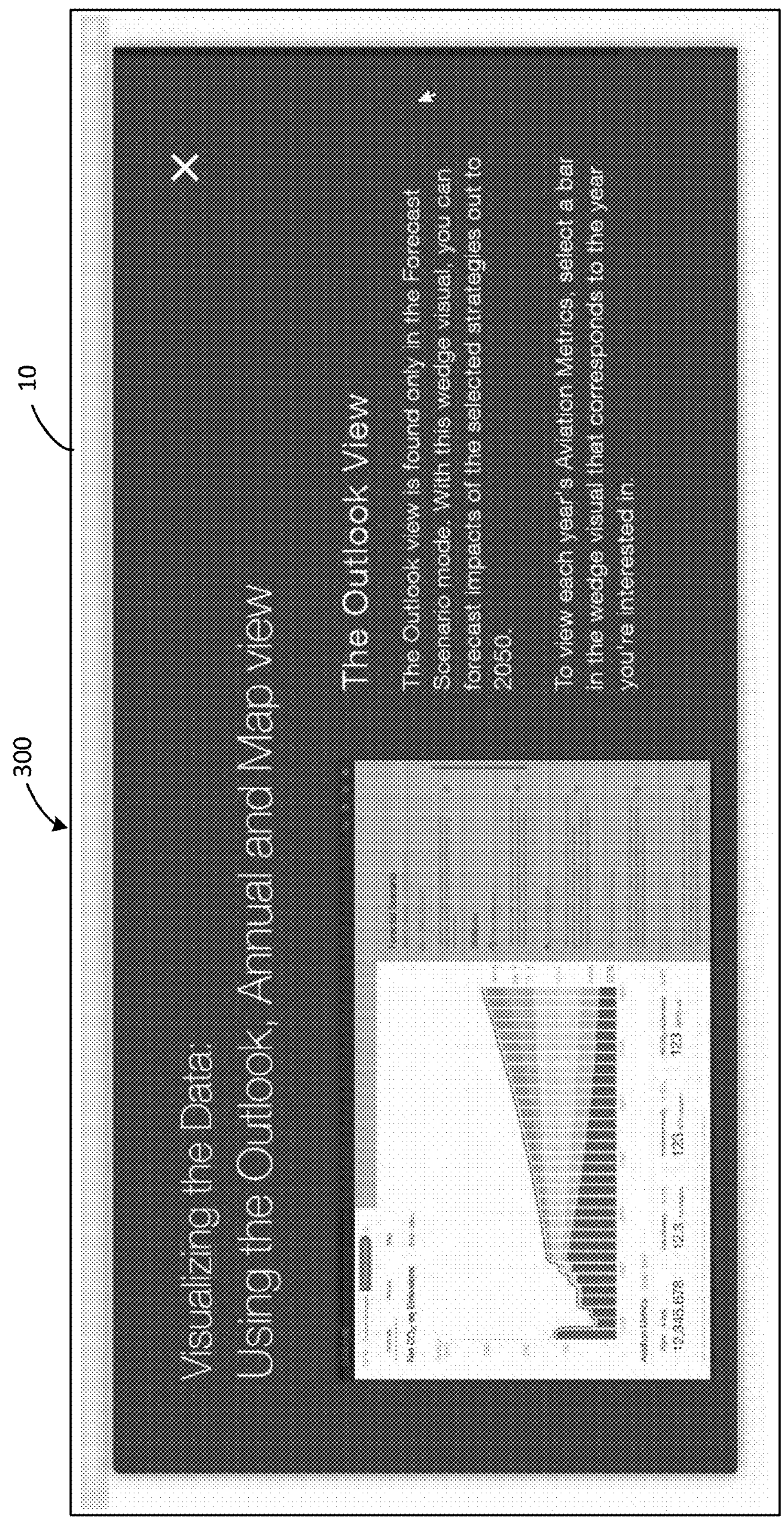
Figure 24E:
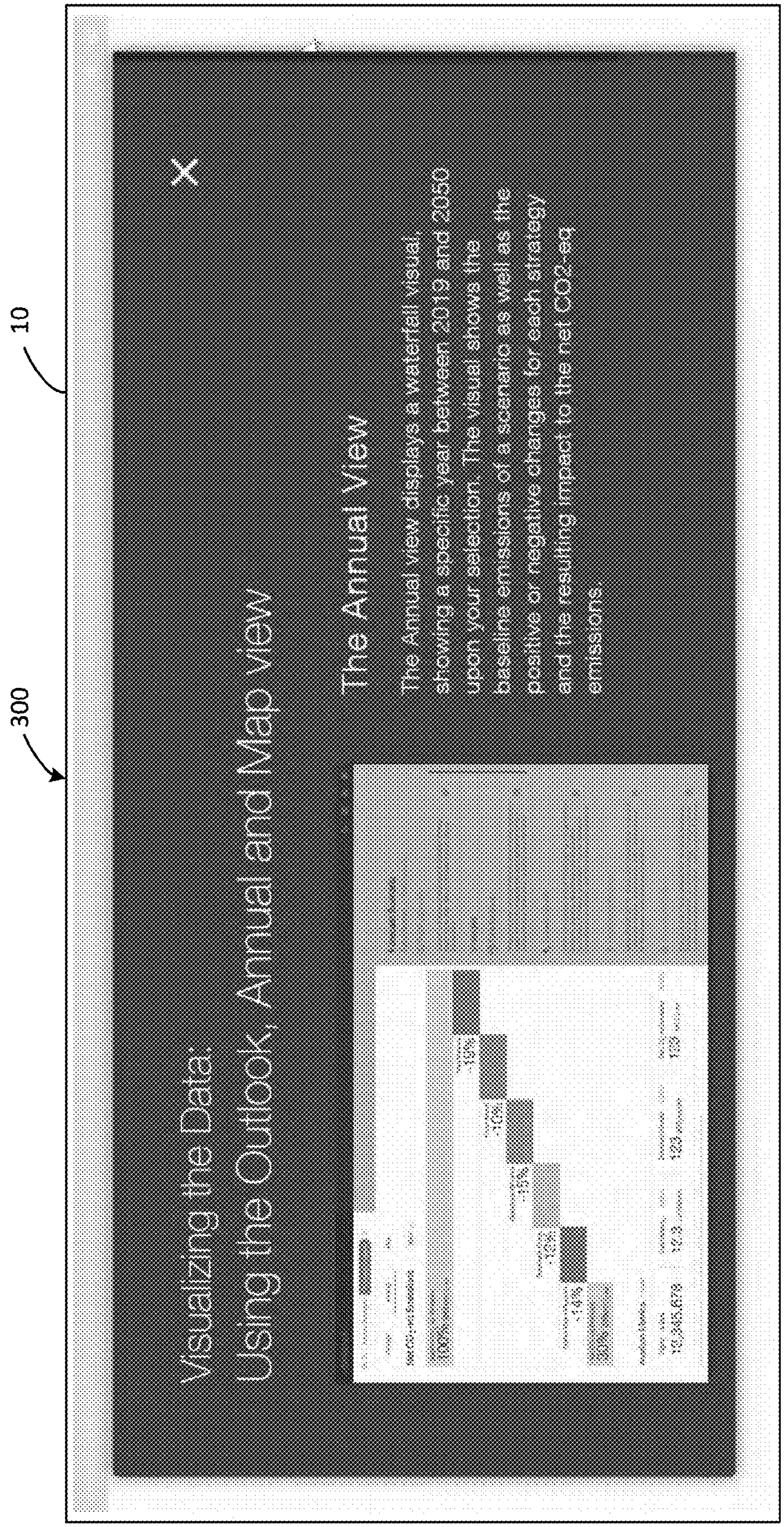
Figure 24F:
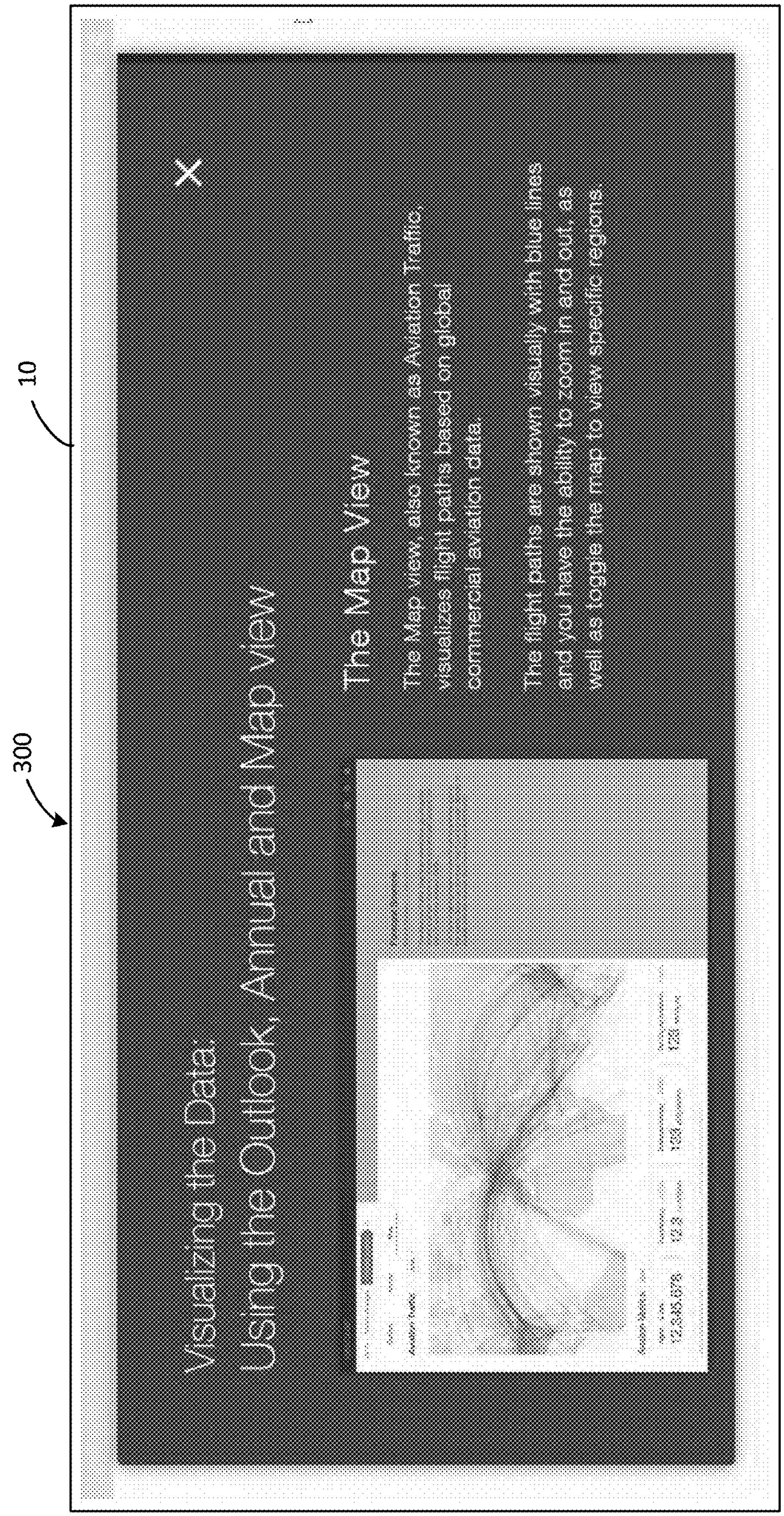
Figure 24G:
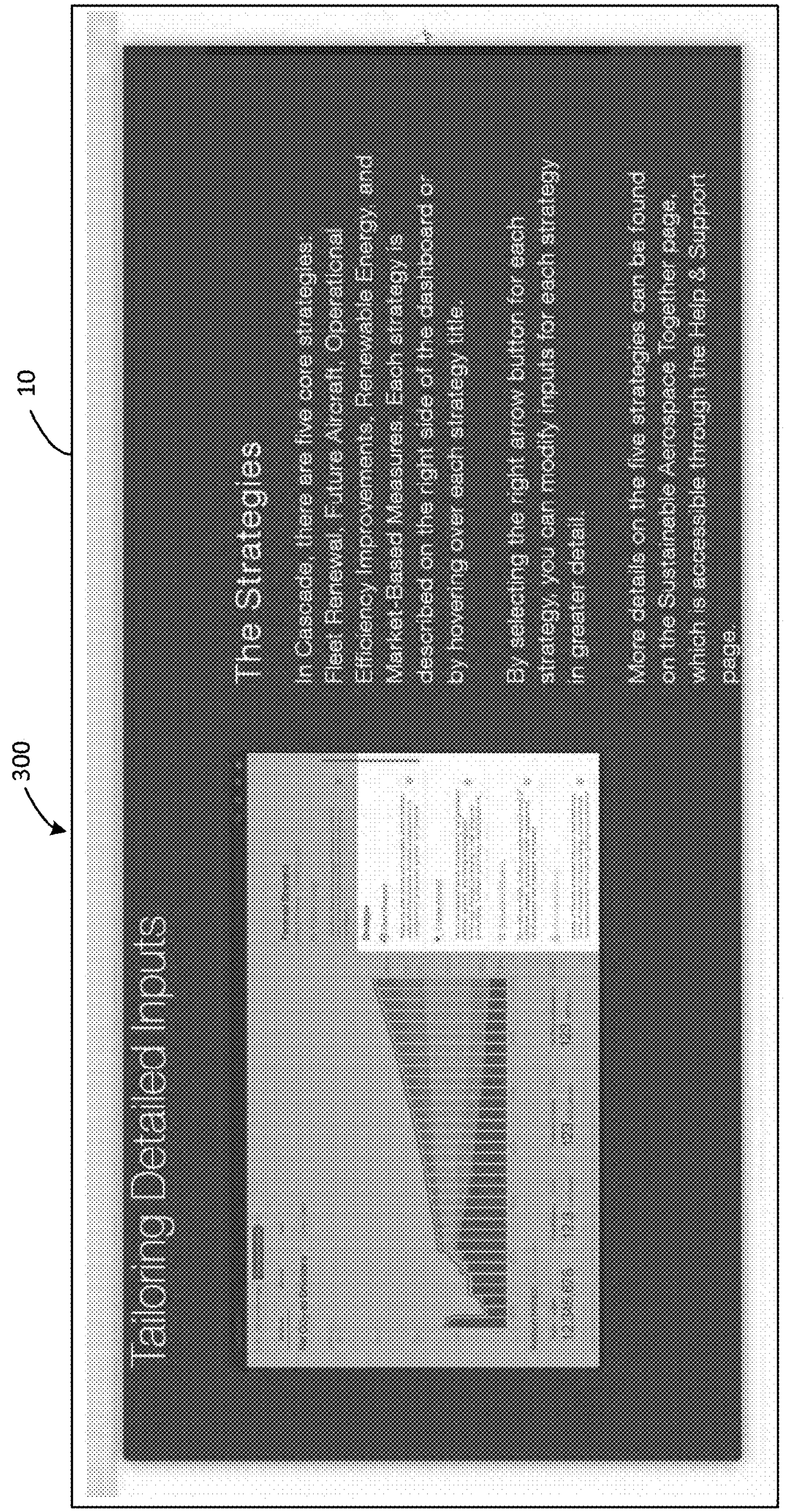
Figure 24H:
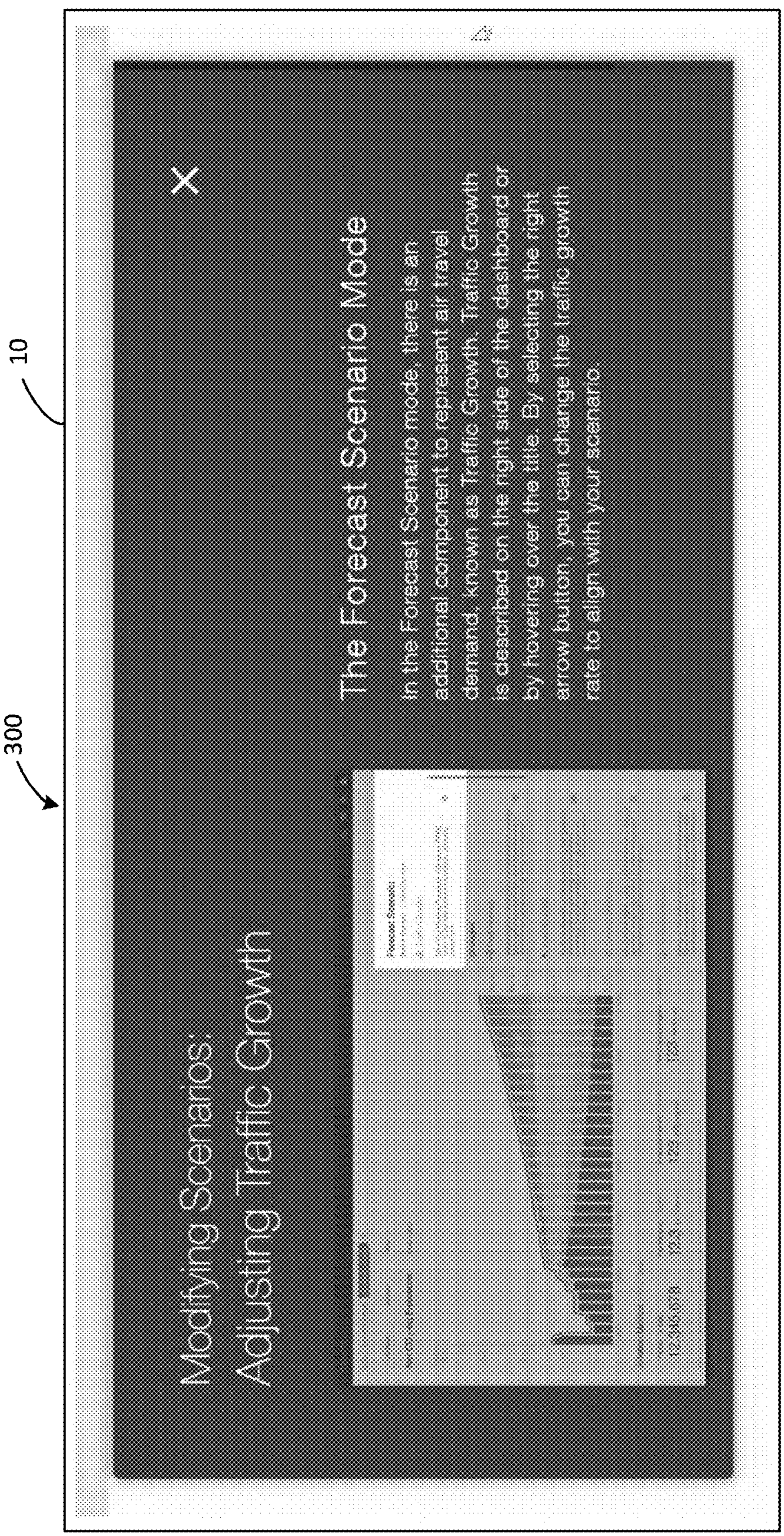
Figure 24I:
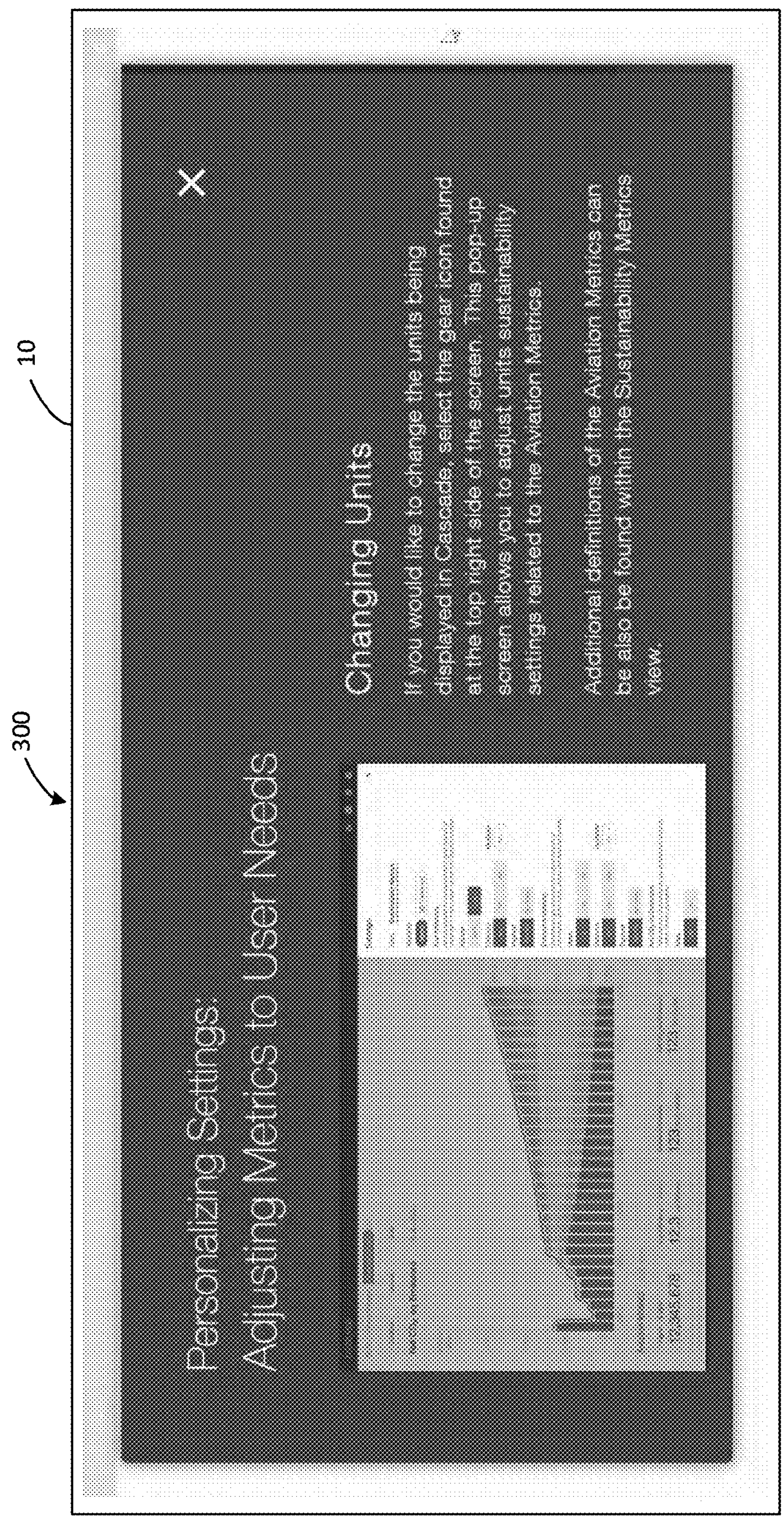
Figure 24J:
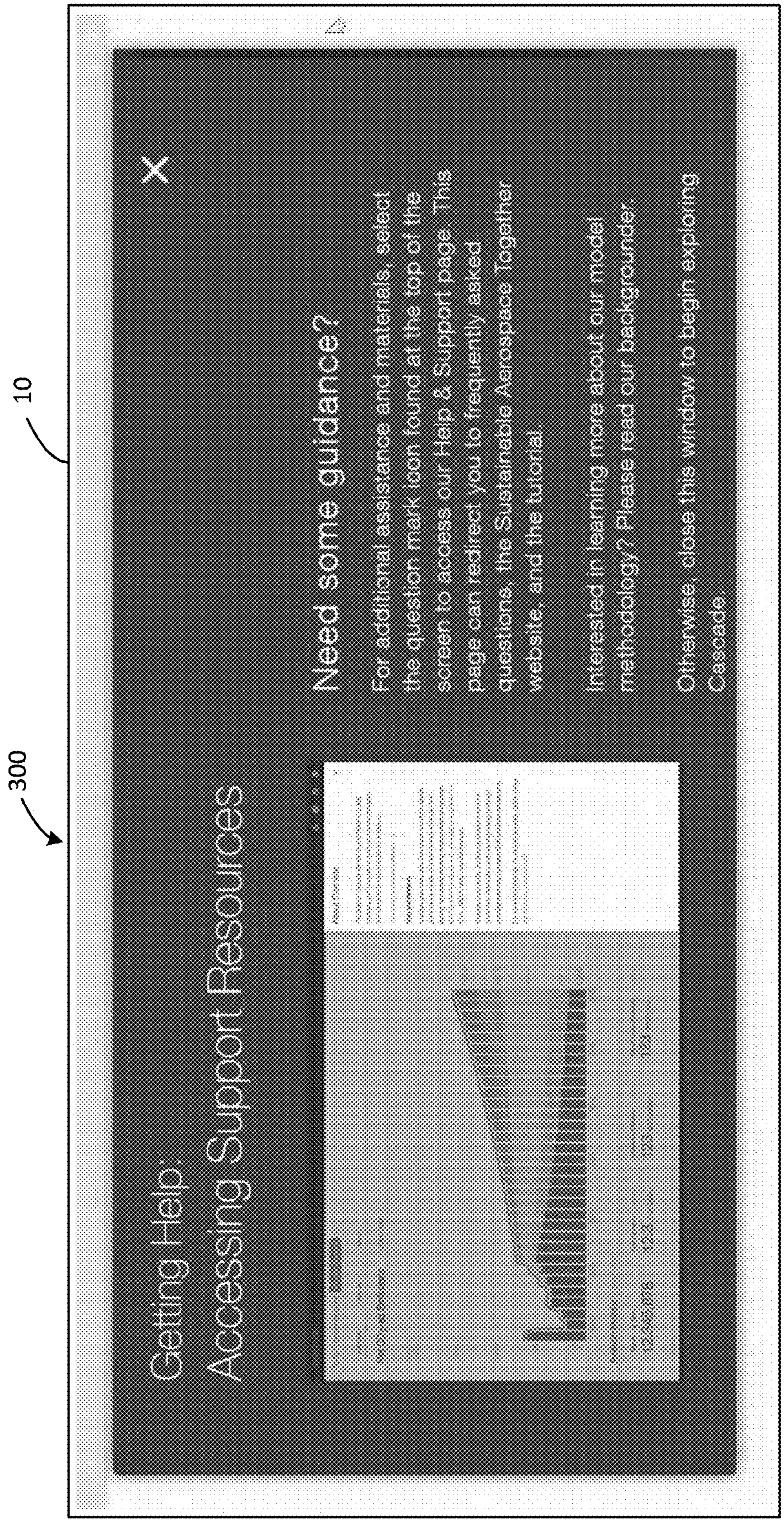

Referring now to FIG. 23, the GUI 300 may include a welcome screen with one or more user-selectable options to help the user navigate the dynamic aviation emissions modeling tool. For example, user selection of a tour option, or "Take a Tour," opens or initiates a graphical user interface for displaying a virtual tour of the dynamic display tool that includes a description of the tool's unique features and how to use the tool, as shown in FIGS. 24A to 24J. As another example, user selection of a strategies option, or "Explore Strategies," opens a graphical user interface for creating a custom sustainability strategy, or otherwise exploring sustainability strategies, as shown in FIGS. 25A to 33K. The welcome screen also includes, for example, a forecast option, or "Forecast Scenario," user selection of which opens a graphical user interface for building a scenario and seeing its impact on emissions through 2050, as shown in FIGS. 34A to 47C.

As shown in FIG. 25A, the GUI 300 may include user-selectable navigation options 380 for switching between, or selecting either of, an explore strategies view and a forecast scenario view, to allow the user to easily transition between the two sections of the GUI 300, without going back to the welcome screen, for example.

As also shown in FIG. 25A, the explore strategies view of the GUI 300 may include user-selectable view options 382 for toggling between, or respectively selecting, a chart view and a map view that corresponds to the chart view (or vice versa). For example, the chart view shown in FIG. 30A corresponds to the map view shown in FIG. 31A, and the user may move or toggle between the two views by selecting the appropriate view option 382. According to embodiments, FIGS. 25A to 30C illustrate exemplary chart views of the GUI 300 that are at least somewhat similar in operation and design to the chart views shown in FIGS. 7 to 9A and/or FIGS. 22A and 22B, while FIGS. 31A to 33K illustrate exemplary map views of the GUI 300 that are at least somewhat similar in operation and design to the map views shown in FIGS. 1, 6, and 7, as will be appreciated.

Figure 34A:
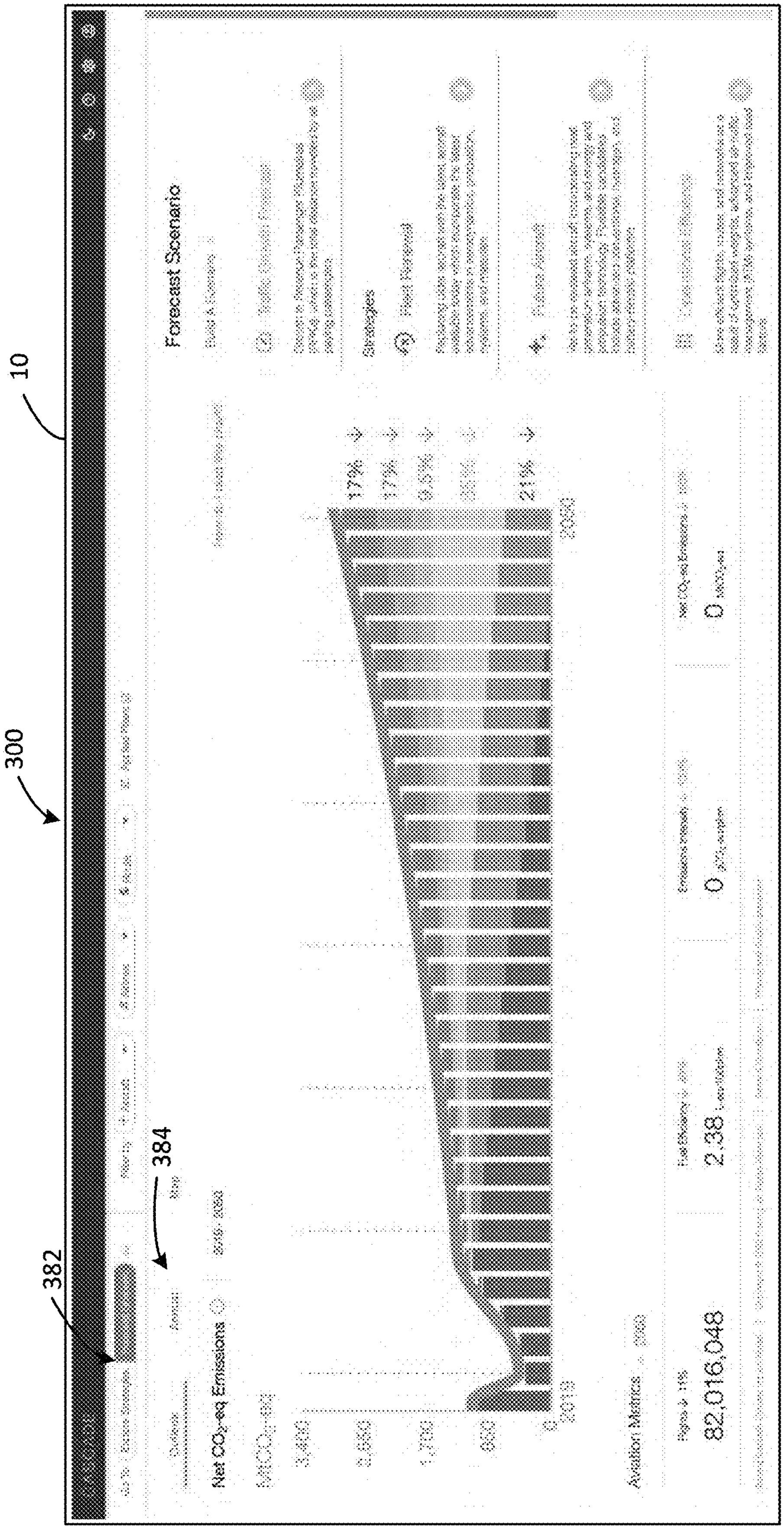
FIGS. 34A and 34B are screenshots of an exemplary graphical user interface for depicting a forecast scenarios view of the dynamic aviation emissions modeling tool shown in FIG. 23, in accordance with certain embodiments.

As shown in FIG. 34A, the forecast scenario view of the GUI 300 may include a second set of user-selectable view options 384 for toggling between, or respectively selecting, an outlook view, an annual view, and a map view that corresponds to the annual view (or vice versa). For example, the annual view shown in FIG. 47B corresponds to the map view shown in FIG. 47C, and the user may move or toggle between the two views by selecting the appropriate view option 384. In embodiments, the outlook view may be configured to show CO2 emissions and other related data for a plurality of years (e.g., 2019 to 2050), while the annual and map views may be configured to show the same types of data for an individual year. The user may select the year that is displayed in the map view and/or the annual view by clicking or otherwise selecting a desired year in the outlook view.

Figure 47A:
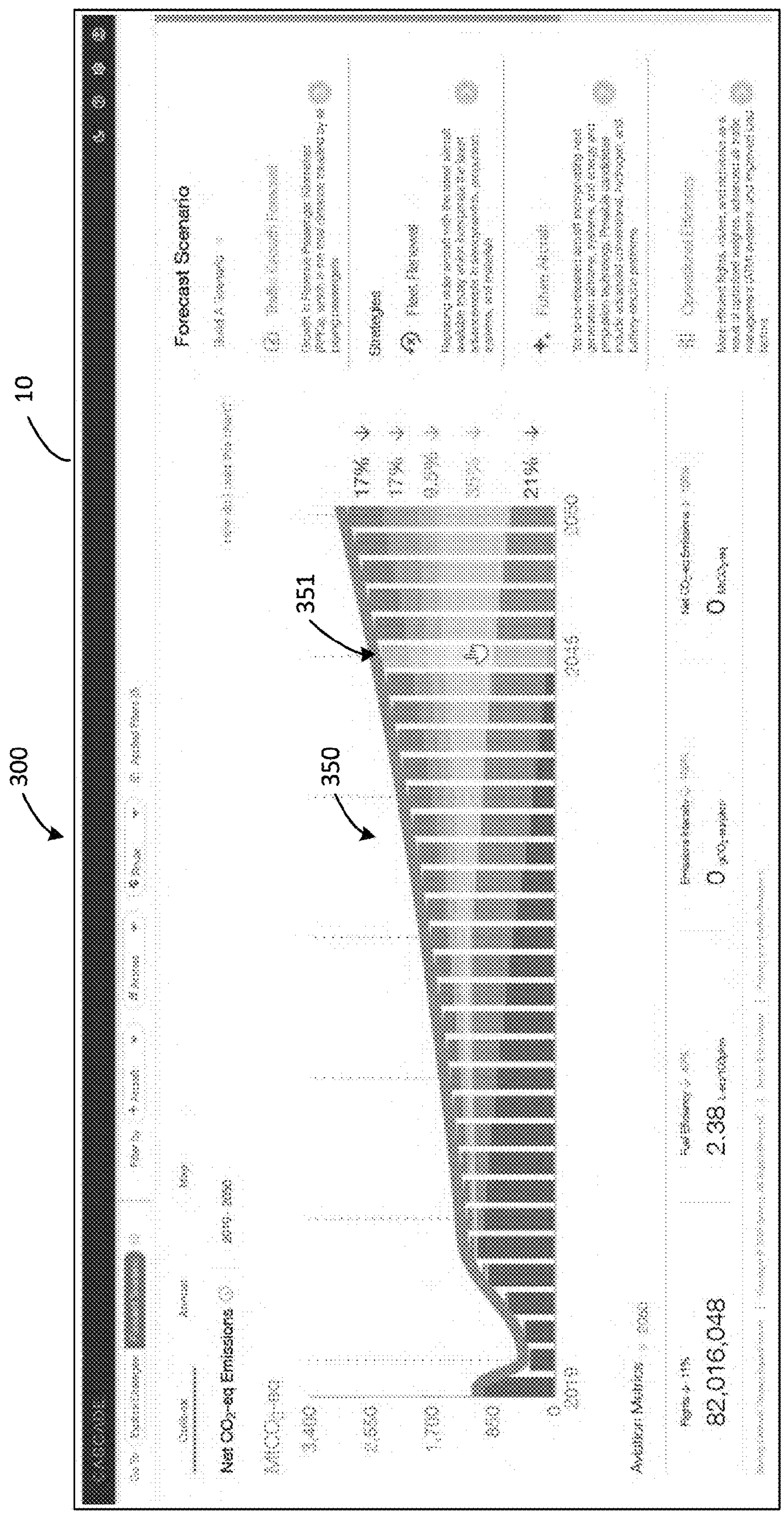
FIGS. 47A to 47C are screenshots of exemplary outlook, annual, and map views, respectively, included in the forecast scenarios view of FIG. 34A, the annual and map views corresponding to a second user-selected year and the outlook view graphically depicting user selection of the second year, in accordance with certain embodiments.
Figure 47B:
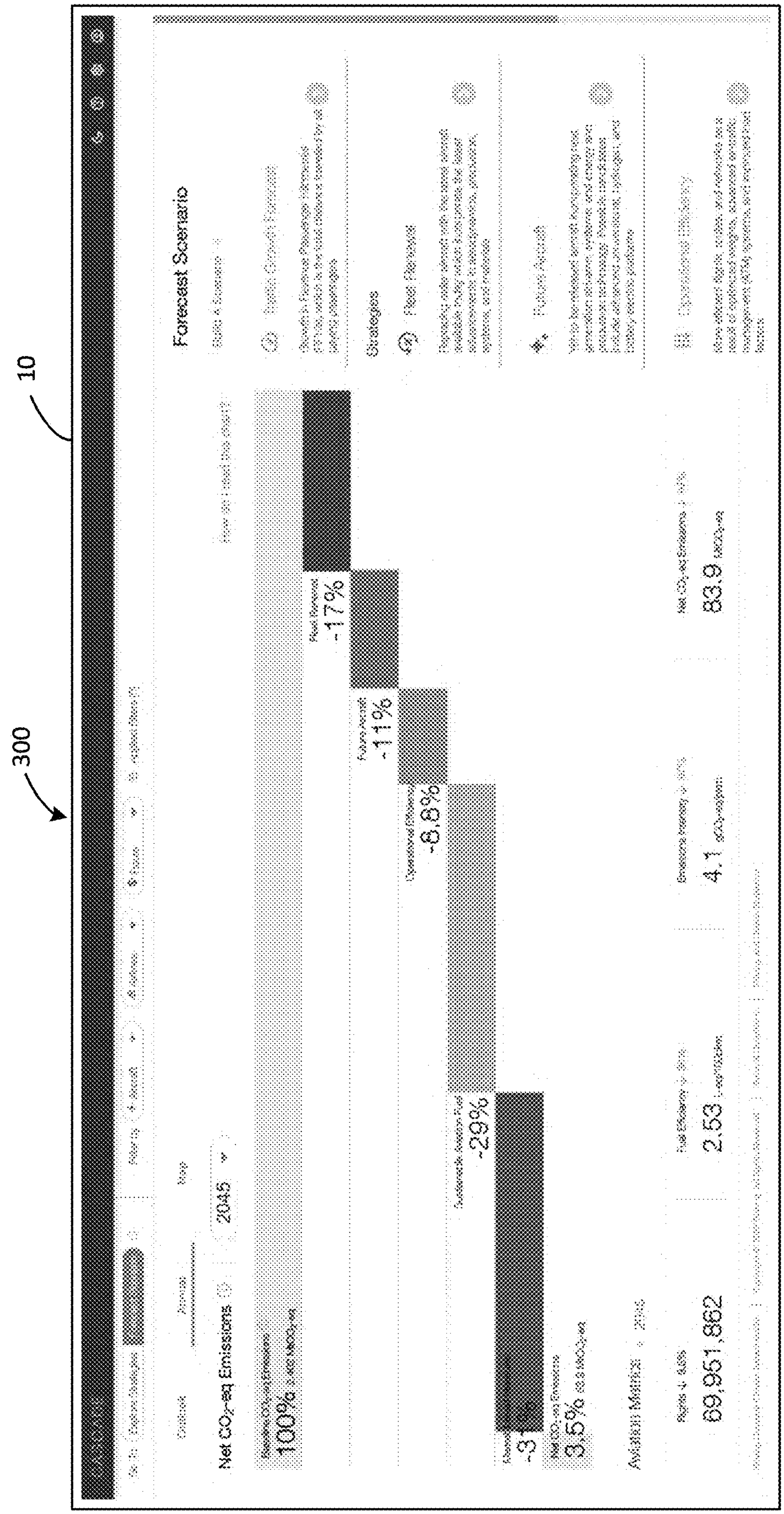
Figure 47C:
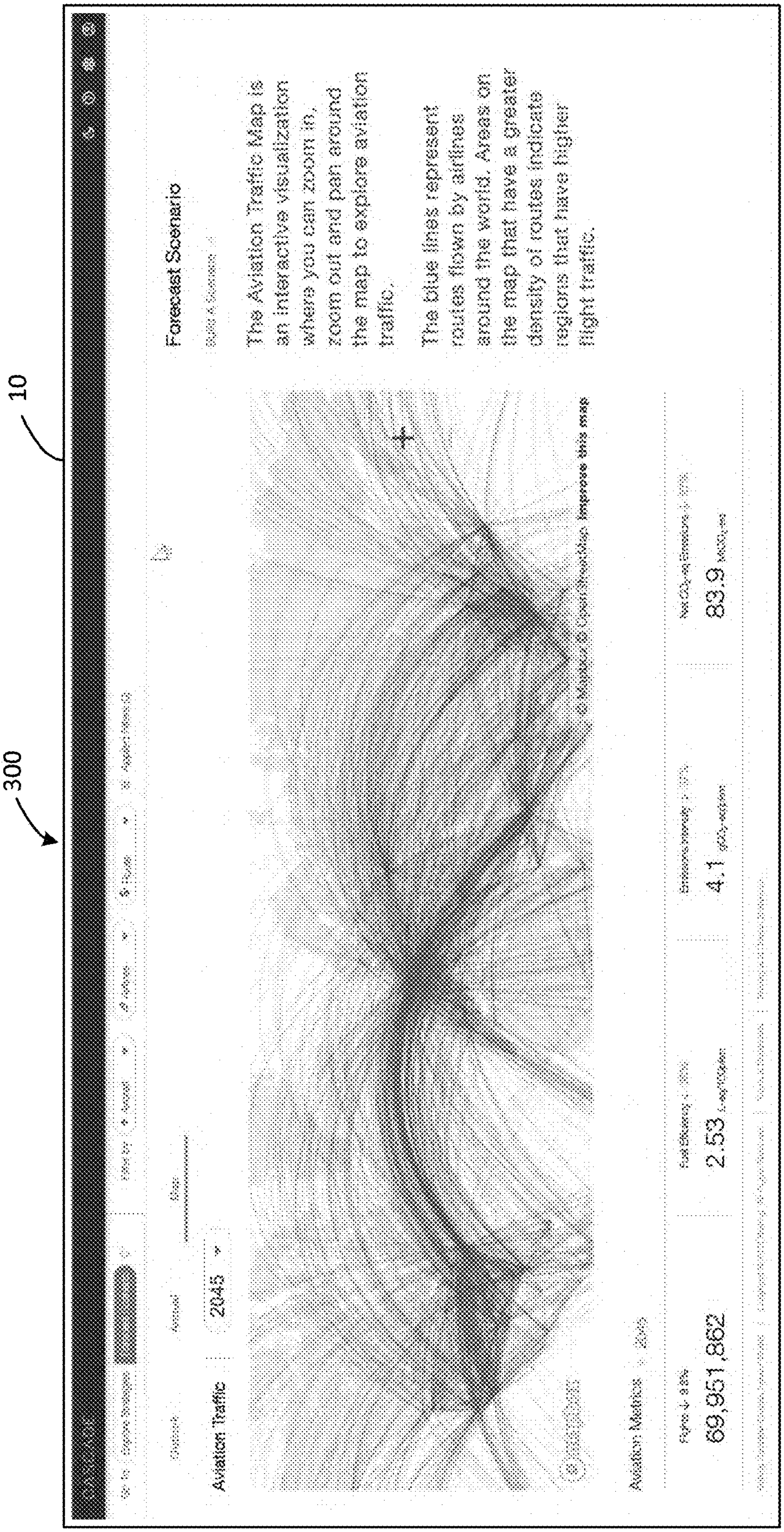

For example, as shown in FIG. 47A, the GUI 300 may be configured to display, in the outlook view, a carbon emissions chart 350 comprised of a plurality of vertical bars 351, or columns, similar to the carbon emissions chart 250 shown in FIG. 14A, for example. Each bar 351 may be configured to graphically represent CO2 emissions data for a respective one of the years represented in the chart 350 (e.g., from 2019 to 2050). In addition, each of the bars 351 may be configured to be user-selectable in order to allow the user to view more detailed information about the corresponding year upon hovering over, clicking on, or otherwise selecting the bar 351. For example, in the illustrated embodiment, user selection of the bar 351 representing the year 2045 causes the GUI 300 to switch from the outlook view shown in FIG. 47A to the annual view shown in FIG. 47B, which displays CO2 emissions data for the year 2045, as well as other related information.

Figure 48:
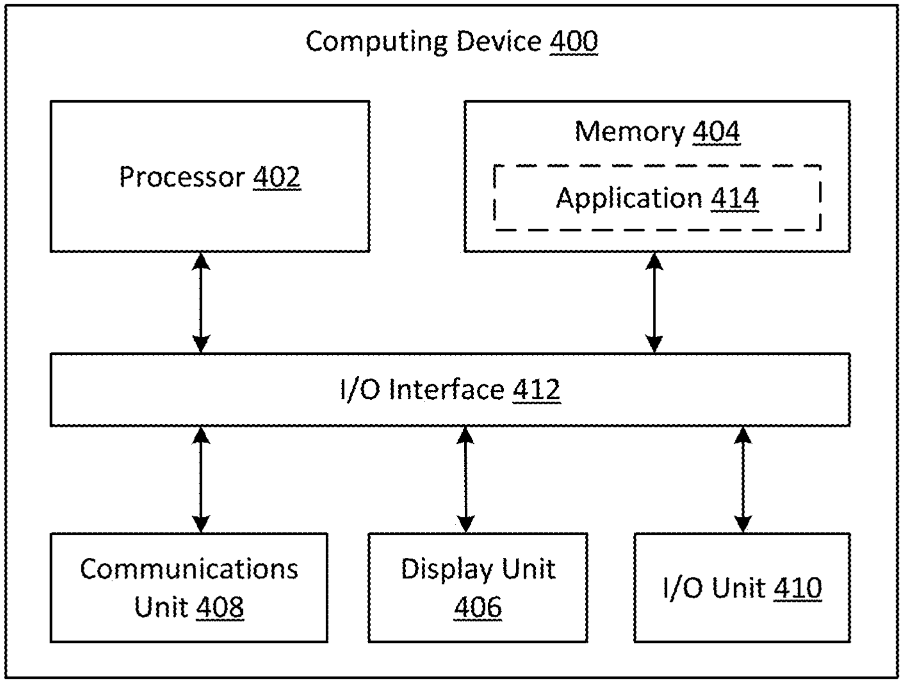
FIG. 48 is a block diagram of an exemplary system capable of implementing aspects of the embodiments described herein.

FIG. 48 illustrates an exemplary computing device 400 that may be used to carry out one or more aspects of the techniques described herein. In some cases, the computing device 400 can be configured to perform a variety of functions or acts, such as those described in this disclosure (and shown in the accompanying drawings), including generating, displaying, or otherwise providing one or more graphical user interfaces to the user, using the techniques provided herein. For example, the computing device 400 may be used to implement a client device of the user that is configured to generate and/or display the graphical user interfaces described herein. In some cases, the computing device 400 may be used to communicate with a remote server (not shown) or other device that provides backend services for supporting one or more aspects of the techniques described herein. In some cases, the computing device 400 may be used to implement the remote server or other backend device that is in communication with a client device of a user. In some cases, one or more computing devices like computing device 400 may be combined to form a networked system (e.g., a client device in communication with a remote server over a network) that may be used to implement various embodiments.

The computing device 400 may be any type of electronic device capable of displaying the graphical user interfaces described herein and, as needed, interfacing with a network and/or remote server, including, for example, a mobile communication device (e.g., a smart phone or portable telephone) or any other type of mobile computing device (e.g., a tablet or PDA), and a personal computer (e.g., laptop or desktop). It should be appreciated that FIG. 48 is only exemplary and therefore, may be modified as needed, and is not intended to assert or imply any limitation with respect to the environments in which different embodiments may be implemented. In addition, FIG. 48 may include other components than what is shown, or fewer components, as will be appreciated.

The computing device 400 can include various components, including for example, one or more processors 402, memory 404, display unit 406, communications unit 408, and input/output (I/O) unit 410, all communicatively coupled by an I/O interface 412, which may include a system bus, network, or other connection mechanism. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, one or more features of the computing device 400 may be physically remote and may be communicatively coupled to the computing device 400, via the communications unit 408, for example.

Processor 402 can be configured to execute software instructions stored in memory 404 and control operation of the computing device 400. Processor 402 may include a general purpose processor (e.g., data processor) and/or a special purpose processor (e.g., graphics processor or digital signal processor (DSP)). Processor 402 may be any suitable processing device or set of processing devices for processing, inputting, outputting, manipulating, storing, or retrieving data, such as, but not limited to, a central processing unit, a microprocessor, a microcontroller-based platform, an integrated circuit, one or more field programmable gate arrays (FPGAs), and/or one or more application-specific integrated circuits (ASICs).

Memory 404 may be any type of hardware that is capable of storing information on a temporary or permanent basis. Memory 404 may include one or more of a data storage device, an electronic memory, a nonvolatile random access memory (e.g., RAM), flip-flops, a non-transitory computer-writable or computer-readable storage medium or media, a magnetic or optical data storage device, or other electronic device for storing, retrieving, reading, or writing data. In some cases, memory 404 includes multiple kinds of memory, particularly volatile memory and non-volatile memory.

Memory 404 can store one or more computer program modules, computer executable instructions, or other software, such as, e.g., one or more software applications 414 as shown in FIG. 48, for execution by processor 402. In embodiments, memory 404 is configured to store one or more sets of instructions or software that, when executed by processor 402, cause the processor 402 to implement one or more techniques of the present disclosure. For example, the instructions may embody one or more of the methods or other operations described herein for providing the dynamic aviation emissions modeling tool described herein, or otherwise presenting aviation emissions information in a dynamic and interactive manner (such as, e.g., method 500 shown in FIG. 49). In some cases, the instructions may reside completely, or at least partially, within any one or more of memory 404, separate computer readable medium, and/or within the processor 402 during execution of the instructions.

Figure 49:
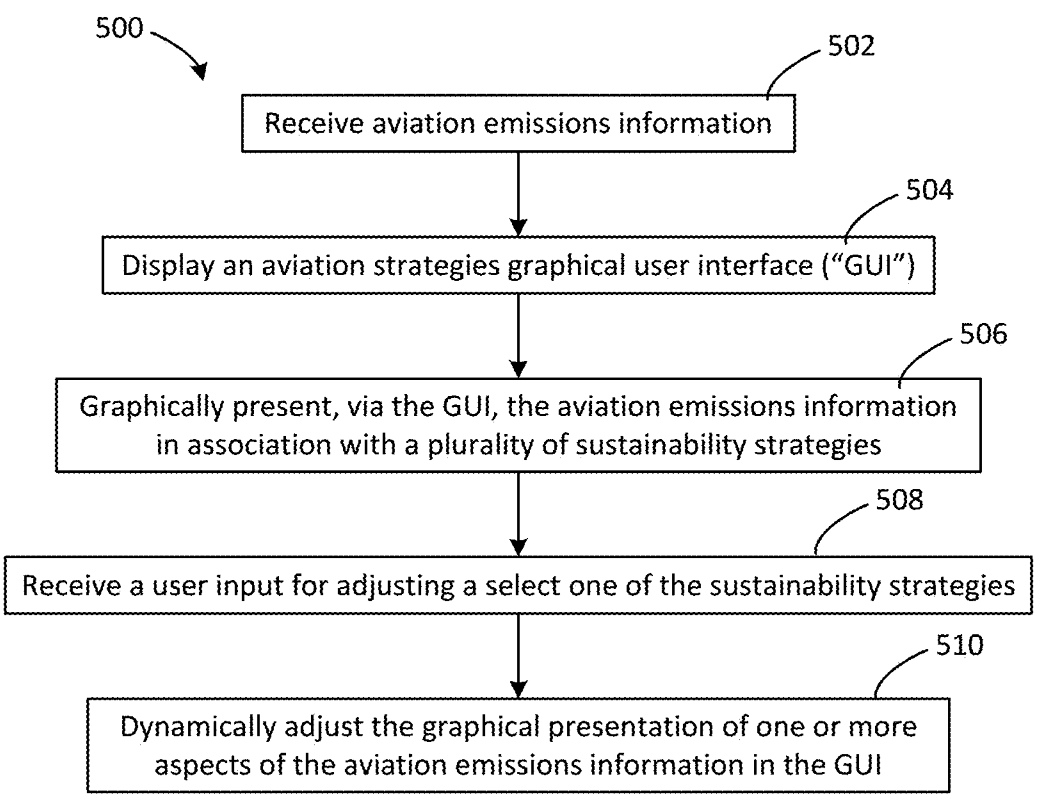
FIG. 49 is a flowchart depicting an exemplary method for dynamically and interactively presenting aviation emissions information, in accordance with embodiments.

In embodiments, the one or more software applications 414 may include a dynamic aviation emissions modeling application configured to implement the methods or operations described herein, such as, for example, the method 500 of FIG. 49. In some embodiments, the dynamic emissions modeling application may reside on multiple devices, such as, e.g., a client device and a remote server (not shown). The one or more software applications 414 may also include one or more software interfaces or computer programs tailored to interact and exchange data with one or more other components (e.g., a remote server), or with the dynamic aviation emissions modeling application, such as, e.g., a mobile application that can be executed on a smart phone, tablet, or other mobile device, or a web application that can be executed on a desktop computer or laptop.

Communications unit 408 allows the computing device 400 to communicate with one or more devices (or systems) according to one or more protocols. For example, communications unit 408 may comprise one or more radio transceivers configured for communicating with a cellular network, a wireless local area network, a wide area network, a Bluetooth® network, and/or other personal area networks (e.g., RFID, NFC, etc.). Though not shown, communications unit 408 may further include antennas, modems, and other wireless communication circuitry for carrying out wireless communications.

Display unit 406 can be configured to display a visual output on the computing device 400. The visual output may include, for example, the aviation strategies graphical user interface described herein, other graphical user interfaces described herein, and/or other information (e.g., text, icons, objects, video, or any combination thereof). Display unit 406 may include LCD (liquid crystal display) technology, LPD (light emitting polymer display) technology, LED (light emitting diode) technology, or other display technologies. Display unit 406 may be integrated into the computing device 400 or functionally coupled to the device 400 using a wired or wireless connection, as will be appreciated. In some embodiments, the display unit 406 may be used to implement the display screen 10 shown in various other figures.

I/O unit 410 can be configured to facilitate interaction between a user and the computing device 400, as well as allow for input and output of data with other devices connected to the computing device 400. I/O unit 410 may include input components, such as, for example, a keyboard, a keypad, a mouse, a microphone, and a video capture device or camera, and output components, such as, for example, a haptic feedback system and an audio output system or speaker. Some components of the I/O unit 410 may be internal to, or included in, the computing device 400, while others may be externally located and connected to the computing device 400 using a wireless connection or a wired connection (e.g., Universal Serial Bus ("USB") cable or the like). In some cases, the I/O unit 410 further includes a data port (such as, e.g., a USB port, a mini-USB port, a Lightening connector port, etc.) for receiving data from and/or transmitting data to an external data source or other device coupled to the data port. In some embodiments, the I/O unit 410 further includes a touch sensitive surface disposed over, or on top of, at least a portion of the display unit 406 to collectively form a touchscreen, or touch-sensitive display system. In such cases, the display unit 406 may operate as an output interface between the user and the computing device 400, while the touch-sensitive surface may operate as an input interface between the user and the computing device 400.

FIG. 49 illustrates an example process or method 500 for graphically displaying sustainability strategies for an aviation industry, in accordance with embodiments. The method 500 can be carried out by a computing device, alone or in combination with one or more other computing devices, such as, e.g., computing device 400 shown in FIG. 48. The functionalities of the method 500 can be implemented, at least in part, by a processor of the computing device (e.g., processor 402 shown in FIG. 48) executing a software application stored in a memory (e.g., memory 404 shown in FIG. 48). In embodiments, the software application may be the dynamic aviation emissions modeling application, or a portion thereof, as described with reference FIG. 48. In some embodiments, the application may be a computer program stored on a non-transitory computer readable medium that is executable by a processor of the device.

To further carry out the operations of method 500, the computing device can interact or interface with one or more external devices communicatively coupled thereto, such as, for example, a remote server (not shown), as well as employ one or more internal devices, such as, e.g., a display unit (e.g., display unit 406 shown in FIG. 48). For example, upon carrying out the method 500, the processor can cause the display screen to display one or more graphical user interfaces, including the aviation strategies graphical user interface (e.g., one or more of the graphical user interfaces shown in FIGS. 1 through 47C). As another example, the data associated with, or presented by, the graphical user interfaces can be retrieved from the remote server and/or one or more databases (not shown).

The method 500 can begin at step 502 with receiving aviation emissions information for a plurality of flights and a select period of time. The information may be received at a computing device from a remote server, database, or other backend service in communication with the computing device, a memory of the computing device, or any other component. The aviation emissions information can comprise measured aviation emissions information collected for a past portion of the select time period and forecasted aviation emissions information determined based on projections for a future portion of the select time period. The select period of time may be user-selected, for example, using slider 151 shown in FIG. 10. The plurality of flights may also be user-selected or configured, for example, using one or more filters 110 as shown in FIG. 1. In some embodiments, the method 500 further comprises graphically presenting the plurality of flights on a geographic map user interface included in the aviation strategies graphical user interface (such as, e.g., flights 102 shown in GUI 100 of FIG. 1).

Figure 34B:
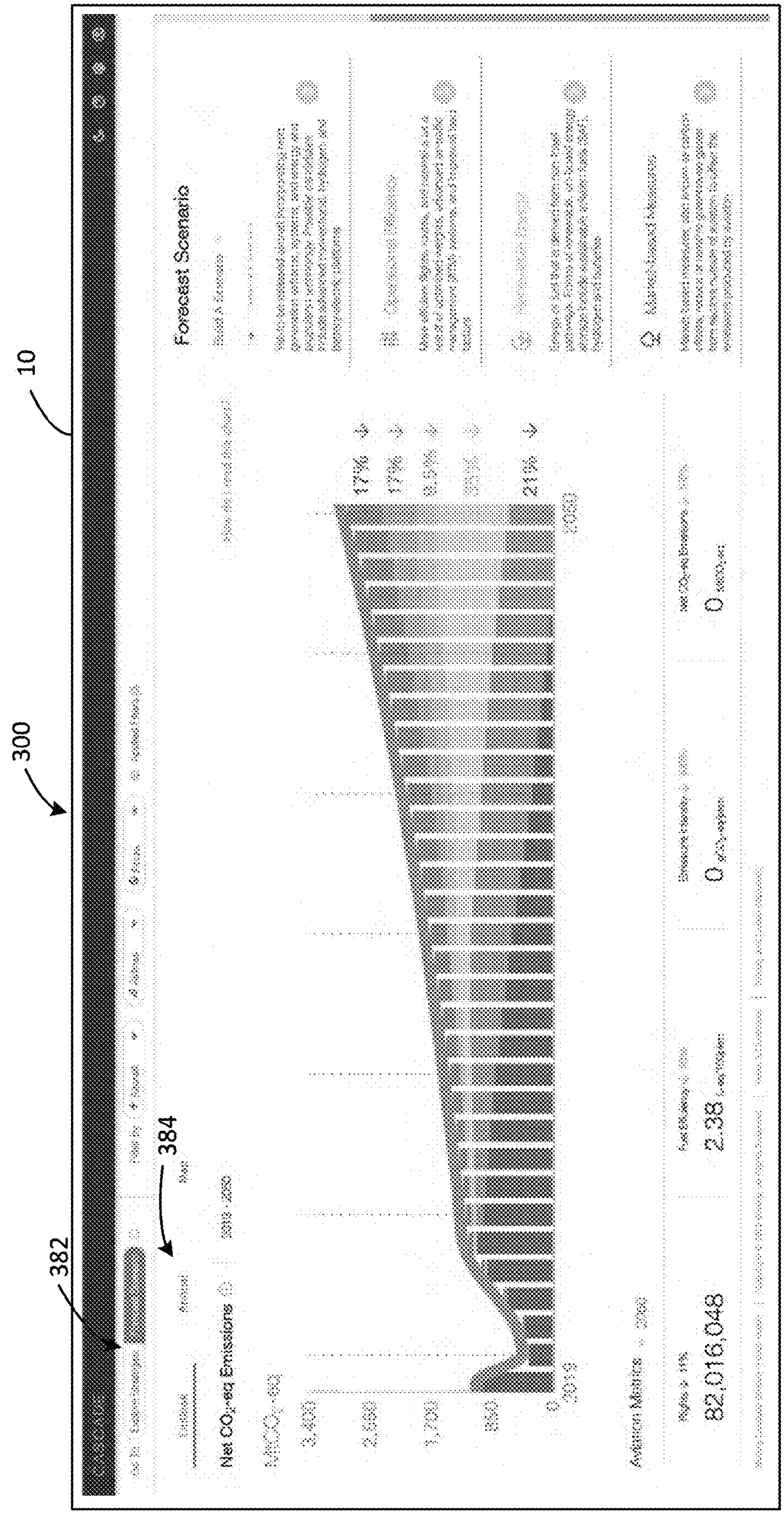

At step 504, the method 500 includes displaying, on a display device (e.g., display screen 10, or display unit 406 of FIG. 48), an aviation strategies graphical user interface (such as, e.g., GUI 200 in FIG. 22A). At step 506, the method 500 includes graphically presenting, via the aviation strategies graphical user interface, the aviation emissions information in association with a plurality of sustainability strategies (such as, e.g., strategy graphics 126 shown in FIG. 7). In some embodiments, step 506 comprises graphically presenting the aviation emissions information forecasted for a future portion of the select time period using a carbon emissions outlook user interface included in the aviation strategies graphical user interface (such as, e.g., carbon emission outlook graph 150 shown in FIG. 10). In some embodiments, step 506 comprises assigning a different color to each of the plurality of sustainability strategies, and presenting the aviation emissions information associated with each sustainability strategy in the assigned color (e.g., as shown in FIGS. 34A and 34B).

At step 508, the method 500 includes receiving, via one or more input devices of the aviation strategies graphical user interface, a user input for adjusting a select strategy of the plurality of sustainability strategies. As shown and described herein, the one or more input devices may include user-selectable graphical elements such as, e.g., sliders, toggle buttons, drop down menus, and more.

At step 510, the method 500 includes based on the user input, dynamically adjusting the graphical presentation of one or more aspects of the aviation emissions information in the aviation strategies graphical user interface (e.g., as shown in FIGS. 36A to 36E). In some embodiments, step 510 comprises adjusting a dimension of one or more graphical elements configured to visually represent the one or more aspects of the aviation emissions information (such as, e.g., the bars 128*a*-128*e* of the bar chart 128 shown in FIG. 9A). In some embodiments, step 510 comprises adjusting, based on the user input, a first graphical element configured to visually represent the select strategy of the sustainability strategies, and in response to adjustment of the select strategy, automatically adjusting one or more other graphical elements configured to visually represent one or more other strategies of the sustainability strategies, the one or more other strategies configured to be dependent on the select strategy, thus demonstrating a dependency between two different strategies (e.g., as shown in FIG. 9A and described herein).

Thus, a dynamic display tool is described herein for enabling a user to define various scenarios for reducing CO2 emissions through introduction of one or more sustainability strategies, analyze the impact of those scenarios on emissions, and understand the dependencies between select strategies.

Figure 35B:
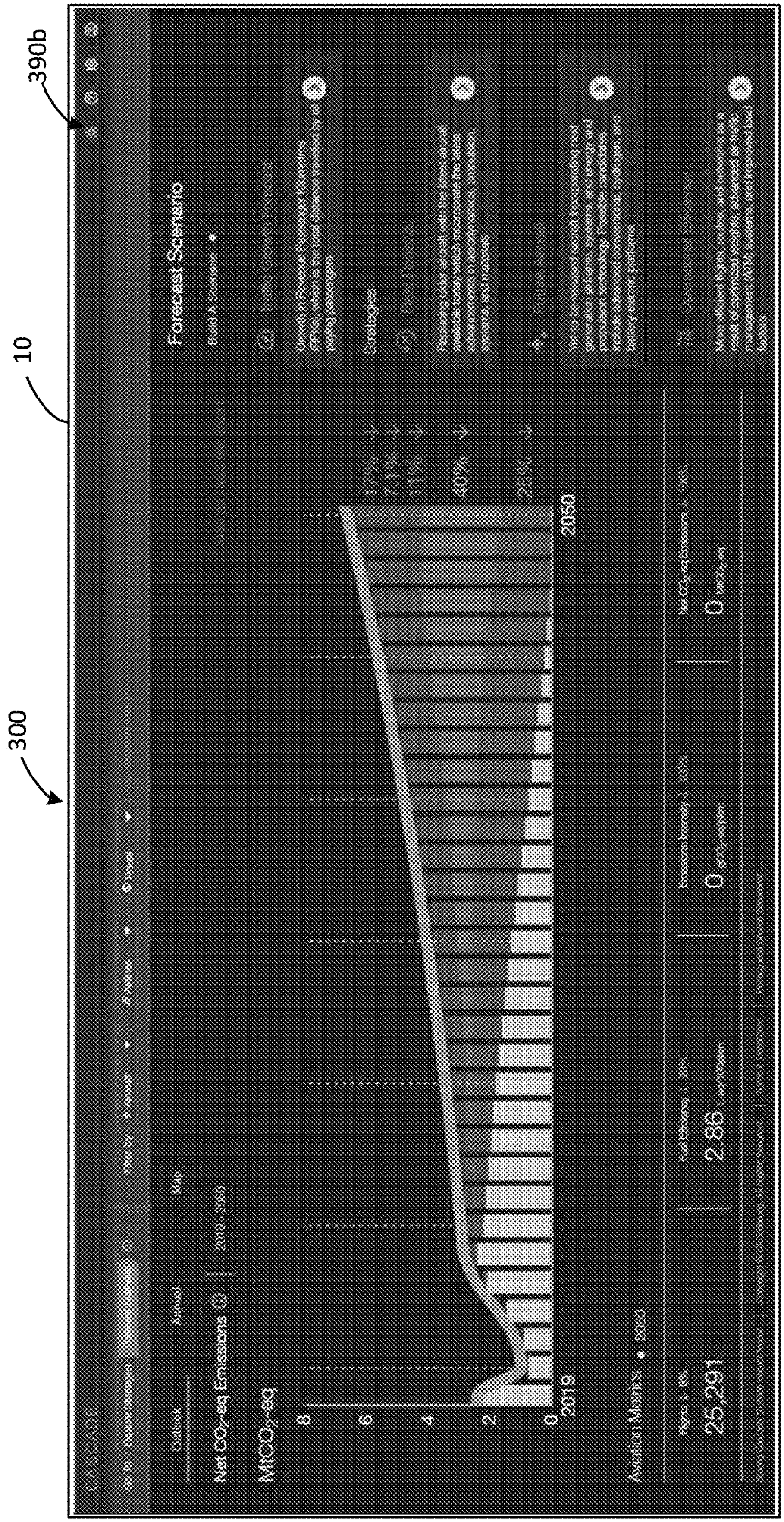
Figure 35C:
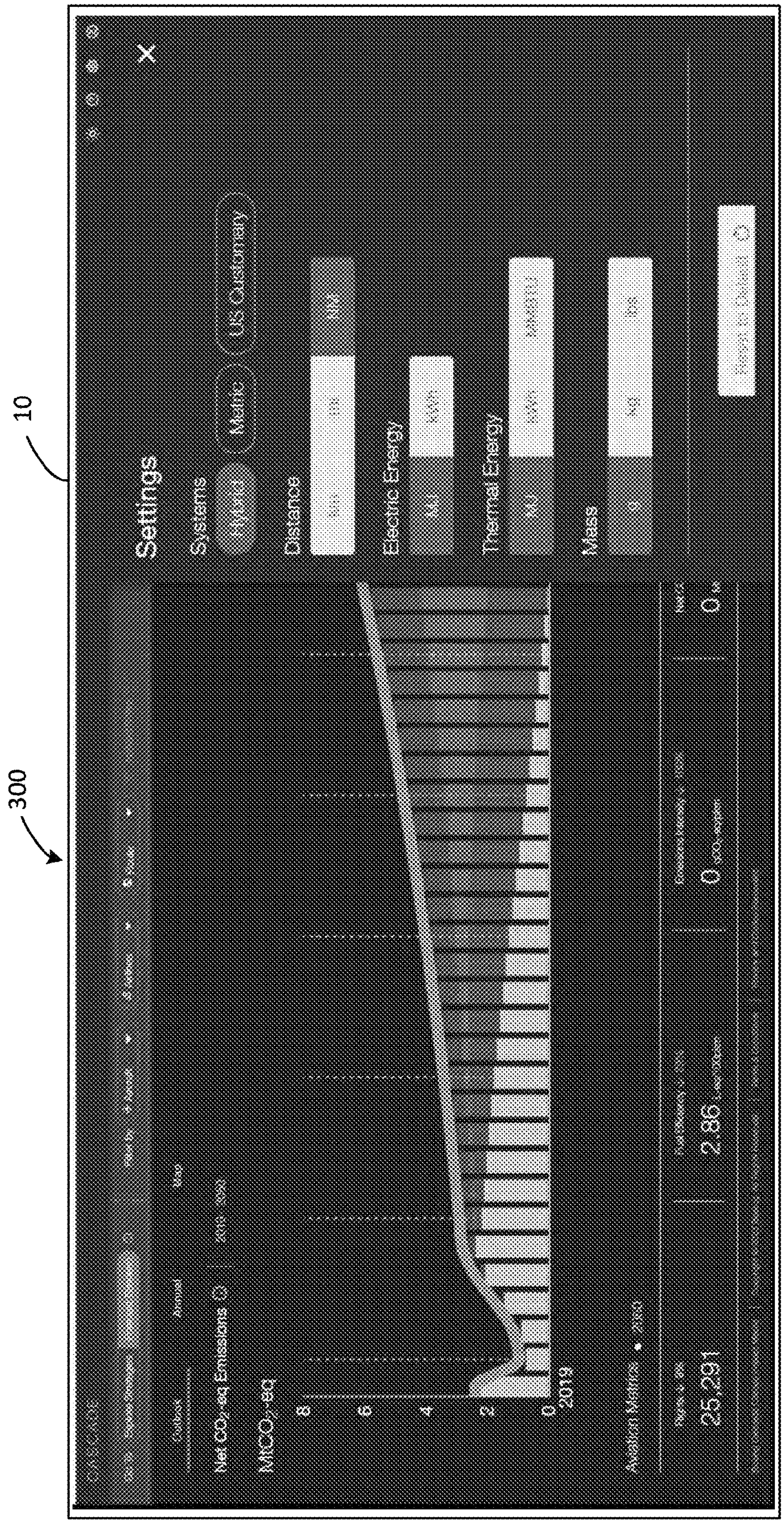

The figures shown herein are based on screenshots taking on a computing device while operating in "light mode." It should be appreciated that the same screenshots could be generated in "dark mode," for example, as shown in FIGS. 35B and 35C. In some embodiments, for example, as shown in FIGS. 35A and 35B, the GUI 300 may include user-selectable options 390*a* and 390*b* for toggling between the light mode shown in FIG. 35A and the dark mode shown in FIG. 35B.

It should be appreciated that the figures include a solid line around the periphery of each screenshot in order to represent an exemplary display screen 10 on which the corresponding graphical user interface may be displayed.

All or portions of the processes described herein, including method 500 of FIG. 49, may be performed by one or more processing devices or processors (e.g., analog to digital converters, encryption chips, etc.) that are within or external to the computing device 400 of FIG. 48. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the method 500. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding, or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIG. 49, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally, and equitably entitled.

What is claimed is:

1. A computer-implemented method of graphically displaying sustainability strategies for an aviation industry, the method comprising:

receiving, at one or more processors, aviation emissions information for a plurality of flights and a select time period;

displaying, on a display device, an aviation strategies graphical user interface;

graphically presenting, via the aviation strategies graphical user interface and using the one or more processors, the aviation emissions information in association with a plurality of sustainability strategies;

receiving, via one or more input devices of the aviation strategies graphical user interface, a user input for adjusting a select strategy of the plurality of sustainability strategies; and based on the user input, dynamically adjusting, using the one or more processors, the graphical presentation of one or more aspects of the aviation emissions information in the aviation strategies graphical user interface.

2. The method of claim 1, further comprising: graphically presenting, using the one or more processors, the plurality of flights on a geographic map user interface included in the aviation strategies graphical user interface.

3. The method of claim 1, wherein graphically presenting the aviation emissions information comprises: graphically presenting the aviation emissions information forecasted for a future portion of the select time period using a carbon emissions outlook user interface included in the aviation strategies graphical user interface.

4. The method of claim 1, wherein graphically presenting the aviation emissions information comprises: assigning a different color to each of the plurality of sustainability strategies; and presenting the aviation emissions information associated with each sustainability strategy in the assigned color.

5. The method of claim 1, wherein dynamically adjusting graphical presentation comprises: adjusting a dimension of one or more graphical elements configured to visually represent the one or more aspects of the aviation emissions information.

6. The method of claim 1, wherein dynamically adjusting the graphical presentation comprises:

adjusting, based on the user input, a first graphical element configured to visually represent the select strategy of the sustainability strategies; and in response to adjustment of the select strategy, automatically adjusting one or more other graphical elements configured to visually represent one or more other strategies of the sustainability strategies, the one or more other strategies configured to be dependent on the select strategy.

7. The method of claim 1, wherein the aviation emissions information comprises measured aviation emissions information collected for a past portion of the select time period and forecasted aviation emissions information determined based on projections for a future portion of the select time period.

8. A system comprising:

a display device; and one or more processors communicatively coupled to the display device, the one or more processors configured to:

receive aviation emissions information for a plurality of flights and a select time period; and display, via the display device, an aviation strategies graphical user interface, wherein the aviation strategies graphical user interface is configured to:

graphically present the aviation emissions information in association with a plurality of sustainability strategies;

receive, via one or more input devices of the aviation strategies graphical user interface, a user input for adjusting a select strategy of the plurality of sustainability strategies; and based on the user input, dynamically adjust the graphical presentation of one or more aspects of the aviation emissions information.

9. The system of claim 8, wherein the aviation strategies graphical user interface comprises a geographic map user interface configured to graphically present the plurality of flights.

10. The system of claim 8, wherein the aviation strategies graphical user interface comprises a carbon emissions outlook user interface configured to graphically present the aviation emissions information predicted forecasted for a future portion of the select time period.

11. The system of claim 8, wherein graphically present the aviation emissions information comprises: assign a different color to each of the plurality of sustainability strategies; and present the aviation emissions information associated with each sustainability strategy in the assigned color.

12. The system of claim 8, wherein dynamically adjust the graphical presentation comprises:

adjust a dimension of one or more graphical elements configured to visually represent the one or more aspects of the aviation emissions information.

13. The system of claim 8, wherein dynamically adjust the graphical presentation comprises:

adjust, based on the user input, a first graphical element configured to visually represent the select strategy of the sustainability strategies; and in response to adjustment of the select strategy, automatically adjust one or more other graphical elements configured to visually represent one or more other strategies of the sustainability strategies, the one or more other strategies configured to be dependent on the select strategy.

14. The system of claim 8, wherein the aviation emissions information comprises measured aviation emissions information collected for a past portion of the select time period and forecasted aviation emissions information determined based on projections for a future portion of the select time period.

15. A non-transitory computer-readable storage medium comprising instructions that, when executed by one or more processors, cause the one or more processors to:

receive aviation emissions information for a plurality of flights and a select time period;

display, via a display device, an aviation strategies graphical user interface;

graphically present, via the aviation strategies graphical user interface, the aviation emissions information in association with a plurality of sustainability strategies;

receive, via one or more input devices of the aviation strategies graphical user interface, a user input for adjusting a select strategy of the plurality of sustainability strategies; and based on the user input, dynamically adjust the graphical presentation of one or more aspects of the aviation emissions information in the aviation strategies graphical user interface.

16. The non-transitory computer-readable storage medium of claim 15, wherein the instructions further cause the one or more processors to: graphically present the plurality of flights on a geographic map user interface included in the aviation strategies graphical user interface.

17. The non-transitory computer-readable storage medium of claim 15, wherein graphically present the aviation emissions information comprises: graphically present the aviation emissions information forecasted for a future portion of the select time period using a carbon emissions outlook user interface included in the aviation strategies graphical user interface.

18. The non-transitory computer-readable storage medium of claim 15, wherein graphically present the aviation emissions information comprises: assign a different color to each of the plurality of sustainability strategies; and present the aviation emissions information associated with each sustainability strategy in the assigned color.

19. The non-transitory computer-readable storage medium of claim 15, wherein dynamically adjust the graphical presentation comprises: adjust a dimension of one or more graphical elements configured to visually represent the one or more aspects of the aviation emissions information.

20. The non-transitory computer-readable storage medium of claim 15, wherein dynamically adjust the graphical presentation comprises:

adjust, based on the user input, a first graphical element configured to visually represent the select strategy of the sustainability strategies; and in response to adjustment of the select strategy, automatically adjust one or more other graphical elements configured to visually represent one or more other strategies of the sustainability strategies, the one or more other strategies configured to be dependent on the select strategy.

* * * * *